United States Patent
Lubys et al.

(10) Patent No.: US 12,448,612 B2
(45) Date of Patent: Oct. 21, 2025

(54) MUTANT POLYMERASES AND METHODS OF USING THE SAME

(71) Applicant: Thermo Fisher Scientific Baltics UAB, Vilnius (LT)

(72) Inventors: Arvydas Lubys, Vilnius (LT); Zana Kapustina, Vilnius (LT); Aiste Jaspone, Vilnius (LT)

(73) Assignee: Thermo Fisher Scientific Baltics UAB, Vilnius (LT)

( * ) Notice: Subject to any disclaimer, the term of this patent is extended or adjusted under 35 U.S.C. 154(b) by 348 days.

(21) Appl. No.: 17/924,637

(22) PCT Filed: May 11, 2021

(86) PCT No.: PCT/EP2021/062559
§ 371 (c)(1),
(2) Date: Nov. 10, 2022

(87) PCT Pub. No.: WO2021/228905
PCT Pub. Date: Nov. 18, 2021

(65) Prior Publication Data
US 2023/0174957 A1 Jun. 8, 2023

Related U.S. Application Data

(60) Provisional application No. 63/023,026, filed on May 11, 2020.

(51) Int. Cl.
*C12N 9/12* (2006.01)
*C12P 19/34* (2006.01)

(52) U.S. Cl.
CPC ............ *C12N 9/1247* (2013.01); *C12P 19/34* (2013.01); *C12Y 207/07006* (2013.01)

(58) Field of Classification Search
None
See application file for complete search history.

(56) References Cited

FOREIGN PATENT DOCUMENTS

| EP | 2316934 A1 | 5/2011 |
|---|---|---|
| WO | WO 2015/143318 A1 | 9/2015 |
| WO | WO 2019/199807 A1 | 10/2019 |

OTHER PUBLICATIONS

Sousa and Padilla, EMBO Journal, vol. 14, No. 18., pp. 4609-4621, 1995.*
Ngo et al. in The Protein Folding Problem and Tertiary Structure Prediction, 1994, Merz et al. (ed.), Birkhauser, Boston, MA, pp. 433 and 492-495.*
Franceus et al., J. Ind. Microbiol. Biotechnol. vol. 44, pp. 687-695, 2017.*
International Search Report and Written Opinion mailed on Dec. 13, 2021 in International Application No. PCT/EP2021/062559 (23 pages).
Kapustina et al., "Enzymatic Synthesis of Chimeric DNA Oligonucleotides by in Vitro Transcription with dTTP, dCTP, dATP, and 2'-Fluoro Modified dGTP," *ACS Synthetic Biology*, vol. 10, No. 7, pp. 1625-1632, 2021.
Sousa et al., "A Mutant T7 RNA Polymerase as a DNA Polymerase," *The EMBO Journal*, vol. 14, No. 18, pp. 4609-4621, 1995.
Zheng et al., "Network of Dynamically Important Residues in the Open/Closed Transition in Polymerase Is Strongly Conserved," *Structure*, vol. 13, No. 4, pp. 565-577, 2005.

* cited by examiner

*Primary Examiner* — Richard G Hutson
(74) *Attorney, Agent, or Firm* — Klarquist Sparkman, LLP

(57) ABSTRACT

This application relates to mutant polymerases. This application discloses mutant phage-type RNA polymerases, such as a mutant T7, SP6, and T3 RNA polymerase, may use 2'-modified nucleoside triphosphates or deoxynucleotide triphosphates as substrates. Methods for producing nucleic acid molecules using these mutant polymerases are also disclosed.

6 Claims, 37 Drawing Sheets
Specification includes a Sequence Listing.

SEQUENCE LISTING

<160> NUMBER OF SEQ ID NOS: 71

<210> SEQ ID NO 1
<211> LENGTH: 883
<212> TYPE: PRT
<213> ORGANISM: Unknown
<220> FEATURE:
<223> OTHER INFORMATION: Escherichia phage T7 RNA polymerase

<400> SEQUENCE: 1

```
Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Gly Glu
        35                  40                  45

Ala Arg Phe Arg Lys Met Phe Glu Arg Gln Leu Lys Ala Gly Glu Val
    50                  55                  60

Ala Asp Asn Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
```

```
              115                 120                 125
Ala Asp Asn Thr Thr Val Gln Ala Val Ala Ser Ala Ile Gly Arg Ala
          130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
              165                 170                 175

Val Tyr Lys Lys Ala Phe Met Gln Val Glu Ala Asp Met Leu Ser
          180                 185                 190

Lys Gly Leu Leu Gly Gly Glu Ala Trp Ser Ser Trp His Lys Glu Asp
          195                 200                 205

Ser Ile His Val Gly Val Arg Cys Ile Glu Met Leu Ile Glu Ser Thr
          210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
              245                 250                 255

Arg Ala Gly Ala Leu Ala Gly Ile Ser Pro Met Phe Gln Pro Cys Val
          260                 265                 270

Val Pro Pro Lys Pro Trp Thr Gly Ile Thr Gly Gly Tyr Trp Ala
          275                 280                 285

Asn Gly Arg Arg Pro Leu Ala Leu Val Arg Thr His Ser Lys Lys Ala
          290                 295                 300

Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
              325                 330                 335

Val Ala Asn Val Ile Thr Lys Trp Lys His Cys Pro Val Glu Asp Ile
          340                 345                 350

Pro Ala Ile Glu Arg Glu Leu Pro Met Lys Pro Glu Asp Ile Asp
          355                 360                 365

Met Asn Pro Glu Ala Leu Thr Ala Trp Lys Arg Ala Ala Ala Val
          370                 375                 380

Tyr Arg Lys Asp Lys Ala Arg Lys Ser Arg Ile Ser Leu Glu Phe
385                 390                 395                 400

Met Leu Glu Gln Ala Asn Lys Phe Ala Asn His Lys Ala Ile Trp Phe
              405                 410                 415

Pro Tyr Asn Met Asp Trp Arg Gly Arg Val Tyr Ala Val Ser Met Phe
          420                 425                 430

Asn Pro Gln Gly Asn Asp Met Thr Lys Gly Leu Leu Thr Leu Ala Lys
          435                 440                 445

Gly Lys Pro Ile Gly Lys Glu Gly Tyr Tyr Trp Leu Lys Ile His Gly
          450                 455                 460

Ala Asn Cys Ala Gly Val Asp Lys Val Pro Phe Pro Glu Arg Ile Lys
          465                 470                 475                 480

Phe Ile Glu Glu Asn His Glu Asn Ile Met Ala Cys Ala Lys Ser Pro
              485                 490                 495

Leu Glu Asn Thr Trp Trp Ala Glu Gln Asp Ser Pro Phe Cys Phe Leu
          500                 505                 510

Ala Phe Cys Phe Glu Tyr Ala Gly Val Gln His His Gly Leu Ser Tyr
          515                 520                 525

Asn Cys Ser Leu Pro Leu Ala Phe Asp Gly Ser Cys Ser Gly Ile Gln
          530                 535                 540
```

-continued

His Phe Ser Ala Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
            565                 570                 575

Lys Val Asn Glu Ile Leu Gln Ala Asp Ala Ile Asn Gly Thr Asp Asn
        580                 585                 590

Glu Val Val Thr Val Thr Asp Glu Asn Thr Gly Glu Ile Ser Glu Lys
    595                 600                 605

Val Lys Leu Gly Thr Lys Ala Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ser Val Ser Val Thr
        675                 680                 685

Val Val Ala Ala Val Glu Ala Met Asn Trp Leu Lys Ser Ala Ala Lys
    690                 695                 700

Leu Leu Ala Ala Glu Val Lys Asp Lys Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
        755                 760                 765

Ile Asp Ala His Lys Gln Glu Ser Gly Ile Ala Pro Asn Phe Val His
    770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
    850                 855                 860

Pro Ala Lys Gly Asn Leu Asn Leu Arg Asp Ile Leu Glu Ser Asp Phe
865                 870                 875                 880

Ala Phe Ala

<210> SEQ ID NO 2
<211> LENGTH: 874
<212> TYPE: PRT
<213> ORGANISM: Salmonella virus SP6

<400> SEQUENCE: 2

Met Gln Asp Leu His Ala Ile Gln Leu Gln Leu Glu Glu Glu Met Phe
1               5                   10                  15

Asn Gly Gly Ile Arg Arg Phe Glu Ala Asp Gln Gln Arg Gln Ile Ala
            20                  25                  30

```
Ala Gly Ser Glu Ser Asp Thr Ala Trp Asn Arg Arg Leu Leu Ser Glu
            35                  40                  45

Leu Ile Ala Pro Met Ala Glu Gly Ile Gln Ala Tyr Lys Glu Glu Tyr
 50                  55                  60

Glu Gly Lys Lys Gly Arg Ala Pro Arg Ala Leu Ala Phe Leu Gln Cys
 65                  70                  75                  80

Val Glu Asn Glu Val Ala Ala Tyr Ile Thr Met Lys Val Val Met Asp
                 85                  90                  95

Met Leu Asn Thr Asp Ala Thr Leu Gln Ala Ile Ala Met Ser Val Ala
            100                 105                 110

Glu Arg Ile Glu Asp Gln Val Arg Phe Ser Lys Leu Glu Gly His Ala
            115                 120                 125

Ala Lys Tyr Phe Glu Lys Val Lys Lys Ser Leu Lys Ala Ser Arg Thr
            130                 135                 140

Lys Ser Tyr Arg His Ala His Asn Val Ala Val Val Ala Glu Lys Ser
145                 150                 155                 160

Val Ala Glu Lys Asp Ala Asp Phe Asp Arg Trp Glu Ala Trp Pro Lys
                165                 170                 175

Glu Thr Gln Leu Gln Ile Gly Thr Thr Leu Leu Glu Ile Leu Glu Gly
            180                 185                 190

Ser Val Phe Tyr Asn Gly Glu Pro Val Phe Met Arg Ala Met Arg Thr
            195                 200                 205

Tyr Gly Gly Lys Thr Ile Tyr Tyr Leu Gln Thr Ser Glu Ser Val Gly
210                 215                 220

Gln Trp Ile Ser Ala Phe Lys Glu His Val Ala Gln Leu Ser Pro Ala
225                 230                 235                 240

Tyr Ala Pro Cys Val Ile Pro Pro Arg Pro Trp Arg Thr Pro Phe Asn
                245                 250                 255

Gly Gly Phe His Thr Glu Lys Val Ala Ser Arg Ile Arg Leu Val Lys
            260                 265                 270

Gly Asn Arg Glu His Val Arg Lys Leu Thr Gln Lys Gln Met Pro Lys
            275                 280                 285

Val Tyr Lys Ala Ile Asn Ala Leu Gln Asn Thr Gln Trp Gln Ile Asn
290                 295                 300

Lys Asp Val Leu Ala Val Ile Glu Glu Val Ile Arg Leu Asp Leu Gly
305                 310                 315                 320

Tyr Gly Val Pro Ser Phe Lys Pro Leu Ile Asp Lys Glu Asn Lys Pro
                325                 330                 335

Ala Asn Pro Val Pro Val Glu Phe Gln His Leu Arg Gly Arg Glu Leu
            340                 345                 350

Lys Glu Met Leu Ser Pro Glu Gln Trp Gln Gln Phe Ile Asn Trp Lys
            355                 360                 365

Gly Glu Cys Ala Arg Leu Tyr Thr Ala Glu Thr Lys Arg Gly Ser Lys
370                 375                 380

Ser Ala Ala Val Val Arg Met Val Gly Gln Ala Arg Lys Tyr Ser Ala
385                 390                 395                 400

Phe Glu Ser Ile Tyr Phe Val Tyr Ala Met Asp Ser Arg Ser Arg Val
                405                 410                 415

Tyr Val Gln Ser Ser Thr Leu Ser Pro Gln Ser Asn Asp Leu Gly Lys
            420                 425                 430

Ala Leu Leu Arg Phe Thr Glu Gly Arg Pro Val Asn Gly Val Glu Ala
            435                 440                 445
```

```
Leu Lys Trp Phe Cys Ile Asn Gly Ala Asn Leu Trp Gly Trp Asp Lys
450                 455                 460

Lys Thr Phe Asp Val Arg Val Ser Asn Val Leu Asp Glu Glu Phe Gln
465                 470                 475                 480

Asp Met Cys Arg Asp Ile Ala Ala Asp Pro Leu Thr Phe Thr Gln Trp
                485                 490                 495

Ala Lys Ala Asp Ala Pro Tyr Glu Phe Leu Ala Trp Cys Phe Glu Tyr
                500                 505                 510

Ala Gln Tyr Leu Asp Leu Val Asp Glu Gly Arg Ala Asp Glu Phe Arg
                515                 520                 525

Thr His Leu Pro Val His Gln Asp Gly Ser Cys Ser Gly Ile Gln His
530                 535                 540

Tyr Ser Ala Met Leu Arg Asp Glu Val Gly Ala Lys Ala Val Asn Leu
545                 550                 555                 560

Lys Pro Ser Asp Ala Pro Gln Asp Ile Tyr Gly Ala Val Ala Gln Val
                565                 570                 575

Val Ile Lys Lys Asn Ala Leu Tyr Met Asp Ala Asp Asp Ala Thr Thr
                580                 585                 590

Phe Thr Ser Gly Ser Val Thr Leu Ser Gly Thr Glu Leu Arg Ala Met
                595                 600                 605

Ala Ser Ala Trp Asp Ser Ile Gly Ile Thr Arg Ser Leu Thr Lys Lys
610                 615                 620

Pro Val Met Thr Leu Pro Tyr Gly Ser Thr Arg Leu Thr Cys Arg Glu
625                 630                 635                 640

Ser Val Ile Asp Tyr Ile Val Asp Leu Glu Glu Lys Glu Ala Gln Lys
                645                 650                 655

Ala Val Ala Glu Gly Arg Thr Ala Asn Lys Val His Pro Phe Glu Asp
                660                 665                 670

Asp Arg Gln Asp Tyr Leu Thr Pro Gly Ala Ala Tyr Asn Tyr Met Thr
                675                 680                 685

Ala Leu Ile Trp Pro Ser Ile Ser Glu Val Val Lys Ala Pro Ile Val
                690                 695                 700

Ala Met Lys Met Ile Arg Gln Leu Ala Arg Phe Ala Ala Lys Arg Asn
705                 710                 715                 720

Glu Gly Leu Met Tyr Thr Leu Pro Thr Gly Phe Ile Leu Glu Gln Lys
                725                 730                 735

Ile Met Ala Thr Glu Met Leu Arg Val Arg Thr Cys Leu Met Gly Asp
                740                 745                 750

Ile Lys Met Ser Leu Gln Val Glu Thr Asp Ile Val Asp Glu Ala Ala
                755                 760                 765

Met Met Gly Ala Ala Ala Pro Asn Phe Val His Gly His Asp Ala Ser
770                 775                 780

His Leu Ile Leu Thr Val Cys Glu Leu Val Asp Lys Gly Val Thr Ser
785                 790                 795                 800

Ile Ala Val Ile His Asp Ser Phe Gly Thr His Ala Asp Asn Thr Leu
                805                 810                 815

Thr Leu Arg Val Ala Leu Lys Gly Gln Met Val Ala Met Tyr Ile Asp
                820                 825                 830

Gly Asn Ala Leu Gln Lys Leu Leu Glu Glu His Glu Glu Arg Trp Met
                835                 840                 845

Val Asp Thr Gly Ile Glu Val Pro Glu Gln Gly Glu Phe Asp Leu Asn
850                 855                 860

Glu Ile Met Asp Ser Glu Tyr Val Phe Ala
```

```
                865                 870
```

<210> SEQ ID NO 3
<211> LENGTH: 884
<212> TYPE: PRT
<213> ORGANISM: Unknown
<220> FEATURE:
<223> OTHER INFORMATION: Enterobacteria phage T3 RNA polymerase

<400> SEQUENCE: 3

```
Met Asn Ile Ile Glu Asn Ile Glu Lys Asn Asp Phe Ser Glu Ile Glu
1               5                   10                  15

Leu Ala Ala Ile Pro Phe Asn Thr Leu Ala Asp His Tyr Gly Ser Ala
            20                  25                  30

Leu Ala Lys Glu Gln Leu Ala Leu Glu His Glu Ser Tyr Glu Leu Gly
        35                  40                  45

Glu Arg Arg Phe Leu Lys Met Leu Glu Arg Gln Ala Lys Ala Gly Glu
    50                  55                  60

Ile Ala Asp Asn Ala Ala Ala Lys Pro Leu Leu Ala Thr Leu Leu Pro
65                  70                  75                  80

Lys Leu Thr Thr Arg Ile Val Glu Trp Leu Glu Glu Tyr Ala Ser Lys
                85                  90                  95

Lys Gly Arg Lys Pro Ser Ala Tyr Ala Pro Leu Gln Leu Leu Lys Pro
            100                 105                 110

Glu Ala Ser Ala Phe Ile Thr Leu Lys Val Ile Leu Ala Ser Leu Thr
        115                 120                 125

Ser Thr Asn Met Thr Thr Ile Gln Ala Ala Gly Met Leu Gly Lys
    130                 135                 140

Ala Ile Glu Asp Glu Ala Arg Phe Gly Arg Ile Arg Asp Leu Glu Ala
145                 150                 155                 160

Lys His Phe Lys Lys His Val Glu Glu Gln Leu Asn Lys Arg His Gly
                165                 170                 175

Gln Val Tyr Lys Lys Ala Phe Met Gln Val Val Glu Ala Asp Met Ile
            180                 185                 190

Gly Arg Gly Leu Leu Gly Gly Glu Ala Trp Ser Ser Trp Asp Lys Glu
        195                 200                 205

Thr Thr Met His Val Gly Ile Arg Leu Ile Glu Met Leu Ile Glu Ser
    210                 215                 220

Thr Gly Leu Val Glu Leu Gln Arg His Asn Ala Gly Asn Ala Gly Ser
225                 230                 235                 240

Asp His Glu Ala Leu Gln Leu Ala Gln Glu Tyr Val Asp Val Leu Ala
                245                 250                 255

Lys Arg Ala Gly Ala Leu Ala Gly Ile Ser Pro Met Phe Gln Pro Cys
            260                 265                 270

Val Val Pro Pro Lys Pro Trp Val Ala Ile Thr Gly Gly Tyr Trp
        275                 280                 285

Ala Asn Gly Arg Arg Pro Leu Ala Leu Val Arg Thr His Ser Lys Lys
    290                 295                 300

Gly Leu Met Arg Tyr Glu Asp Val Tyr Met Pro Glu Val Tyr Lys Ala
305                 310                 315                 320

Val Asn Leu Ala Gln Asn Thr Ala Trp Lys Ile Asn Lys Lys Val Leu
                325                 330                 335

Ala Val Val Asn Glu Ile Val Asn Trp Lys Asn Cys Pro Val Ala Asp
            340                 345                 350

Ile Pro Ser Leu Glu Arg Gln Glu Leu Pro Pro Lys Pro Asp Asp Ile
```

-continued

```
            355                 360                 365
Asp Thr Asn Glu Ala Ala Leu Lys Glu Trp Lys Lys Ala Ala Gly
            370                 375                 380

Ile Tyr Arg Leu Asp Lys Ala Arg Val Ser Arg Ile Ser Leu Glu
385                 390                 395                 400

Phe Met Leu Glu Gln Ala Asn Lys Phe Ala Ser Lys Lys Ala Ile Trp
                405                 410                 415

Phe Pro Tyr Asn Met Asp Trp Arg Gly Arg Val Tyr Ala Val Pro Met
                420                 425                 430

Phe Asn Pro Gln Gly Asn Asp Met Thr Lys Gly Leu Leu Thr Leu Ala
                435                 440                 445

Lys Gly Lys Pro Ile Gly Glu Glu Gly Phe Tyr Trp Leu Lys Ile His
                450                 455                 460

Gly Ala Asn Cys Ala Gly Val Asp Lys Val Pro Phe Pro Glu Arg Ile
465                 470                 475                 480

Ala Phe Ile Glu Lys His Val Asp Asp Ile Leu Ala Cys Ala Lys Asp
                485                 490                 495

Pro Ile Asn Asn Thr Trp Trp Ala Glu Gln Asp Ser Pro Phe Cys Phe
                500                 505                 510

Leu Ala Phe Cys Phe Glu Tyr Ala Gly Val Thr His His Gly Leu Ser
                515                 520                 525

Tyr Asn Cys Ser Leu Pro Leu Ala Phe Asp Gly Ser Cys Ser Gly Ile
                530                 535                 540

Gln His Phe Ser Ala Met Leu Arg Asp Glu Val Gly Gly Arg Ala Val
545                 550                 555                 560

Asn Leu Leu Pro Ser Glu Thr Val Gln Asp Ile Tyr Gly Ile Val Ala
                565                 570                 575

Gln Lys Val Asn Glu Ile Leu Lys Gln Asp Ala Ile Asn Gly Thr Pro
                580                 585                 590

Asn Glu Met Ile Thr Val Thr Asp Lys Asp Thr Gly Glu Ile Ser Glu
                595                 600                 605

Lys Leu Lys Leu Gly Thr Ser Thr Leu Ala Gln Gln Trp Leu Ala Tyr
                610                 615                 620

Gly Val Thr Arg Ser Val Thr Lys Arg Ser Val Met Thr Leu Ala Tyr
625                 630                 635                 640

Gly Ser Lys Glu Phe Gly Phe Arg Gln Gln Val Leu Asp Asp Thr Ile
                645                 650                 655

Gln Pro Ala Ile Asp Ser Gly Lys Gly Leu Met Phe Thr Gln Pro Asn
                660                 665                 670

Gln Ala Ala Gly Tyr Met Ala Lys Leu Ile Trp Asp Ala Val Ser Val
                675                 680                 685

Thr Val Val Ala Ala Val Glu Ala Met Asn Trp Leu Lys Ser Ala Ala
                690                 695                 700

Lys Leu Leu Ala Ala Glu Val Lys Asp Lys Thr Lys Glu Ile Leu
705                 710                 715                 720

Arg His Arg Cys Ala Val His Trp Thr Thr Pro Asp Gly Phe Pro Val
                725                 730                 735

Trp Gln Glu Tyr Arg Lys Pro Leu Gln Lys Arg Leu Asp Met Ile Phe
                740                 745                 750

Leu Gly Gln Phe Arg Leu Gln Pro Thr Ile Asn Thr Leu Lys Asp Ser
                755                 760                 765

Gly Ile Asp Ala His Lys Gln Glu Ser Gly Ile Ala Pro Asn Phe Val
770                 775                 780
```

His Ser Gln Asp Gly Ser His Leu Arg Met Thr Val Val Tyr Ala His
785                 790                 795                 800

Glu Lys Tyr Gly Ile Glu Ser Phe Ala Leu Ile His Asp Ser Phe Gly
            805                 810                 815

Thr Ile Pro Ala Asp Ala Gly Lys Leu Phe Lys Ala Val Arg Glu Thr
        820                 825                 830

Met Val Ile Thr Tyr Glu Asn Asn Asp Val Leu Ala Asp Phe Tyr Ser
            835                 840                 845

Gln Phe Ala Asp Gln Leu His Glu Thr Gln Leu Asp Lys Met Pro Pro
        850                 855                 860

Leu Pro Lys Lys Gly Asn Leu Asn Leu Gln Asp Ile Leu Lys Ser Asp
865                 870                 875                 880

Phe Ala Phe Ala

<210> SEQ ID NO 4
<211> LENGTH: 559
<212> TYPE: PRT
<213> ORGANISM: Unknown
<220> FEATURE:
<223> OTHER INFORMATION: catalytic domain of T7 RNA polymerase sequence

<400> SEQUENCE: 4

Asn Thr Ala Trp Lys Ile Asn Lys Lys Val Leu Ala Val Ala Asn Val
1               5                   10                  15

Ile Thr Lys Trp Lys His Cys Pro Val Glu Asp Ile Pro Ala Ile Glu
            20                  25                  30

Arg Glu Glu Leu Pro Met Lys Pro Glu Asp Ile Asp Met Asn Pro Glu
        35                  40                  45

Ala Leu Thr Ala Trp Lys Arg Ala Ala Ala Val Tyr Arg Lys Asp
    50                  55                  60

Lys Ala Arg Lys Ser Arg Arg Ile Ser Leu Glu Phe Met Leu Glu Gln
65                  70                  75                  80

Ala Asn Lys Phe Ala Asn His Lys Ala Ile Trp Phe Pro Tyr Asn Met
                85                  90                  95

Asp Trp Arg Gly Arg Val Tyr Ala Val Ser Met Phe Asn Pro Gln Gly
            100                 105                 110

Asn Asp Met Thr Lys Gly Leu Leu Thr Leu Ala Lys Gly Lys Pro Ile
        115                 120                 125

Gly Lys Glu Gly Tyr Tyr Trp Leu Lys Ile His Gly Ala Asn Cys Ala
130                 135                 140

Gly Val Asp Lys Val Pro Phe Pro Glu Arg Ile Lys Phe Ile Glu Glu
145                 150                 155                 160

Asn His Glu Asn Ile Met Ala Cys Ala Lys Ser Pro Leu Glu Asn Thr
                165                 170                 175

Trp Trp Ala Glu Gln Asp Ser Pro Phe Cys Phe Leu Ala Phe Cys Phe
            180                 185                 190

Glu Tyr Ala Gly Val Gln His His Gly Leu Ser Tyr Asn Cys Ser Leu
        195                 200                 205

Pro Leu Ala Phe Asp Gly Ser Cys Ser Gly Ile Gln His Phe Ser Ala
    210                 215                 220

Met Leu Arg Asp Glu Val Gly Gly Arg Ala Val Asn Leu Leu Pro Ser
225                 230                 235                 240

Glu Thr Val Gln Asp Ile Tyr Gly Ile Val Ala Lys Lys Val Asn Glu
                245                 250                 255

```
Ile Leu Gln Ala Asp Ala Ile Asn Gly Thr Asp Asn Glu Val Val Thr
            260                 265                 270

Val Thr Asp Glu Asn Thr Gly Glu Ile Ser Glu Lys Val Lys Leu Gly
        275                 280                 285

Thr Lys Ala Leu Ala Gly Gln Trp Leu Ala Tyr Gly Val Thr Arg Ser
    290                 295                 300

Val Thr Lys Arg Ser Val Met Thr Leu Ala Tyr Gly Ser Lys Glu Phe
305                 310                 315                 320

Gly Phe Arg Gln Gln Val Leu Glu Asp Thr Ile Gln Pro Ala Ile Asp
                325                 330                 335

Ser Gly Lys Gly Leu Met Phe Thr Gln Pro Asn Gln Ala Ala Gly Tyr
            340                 345                 350

Met Ala Lys Leu Ile Trp Glu Ser Val Ser Val Thr Val Val Ala Ala
        355                 360                 365

Val Glu Ala Met Asn Trp Leu Lys Ser Ala Ala Lys Leu Leu Ala Ala
    370                 375                 380

Glu Val Lys Asp Lys Lys Thr Gly Glu Ile Leu Arg Lys Arg Cys Ala
385                 390                 395                 400

Val His Trp Val Thr Pro Asp Gly Phe Pro Val Trp Gln Glu Tyr Lys
                405                 410                 415

Lys Pro Ile Gln Thr Arg Leu Asn Leu Met Phe Leu Gly Gln Phe Arg
            420                 425                 430

Leu Gln Pro Thr Ile Asn Thr Asn Lys Asp Ser Glu Ile Asp Ala His
        435                 440                 445

Lys Gln Glu Ser Gly Ile Ala Pro Asn Phe Val His Ser Gln Asp Gly
    450                 455                 460

Ser His Leu Arg Lys Thr Val Val Trp Ala His Glu Lys Tyr Gly Ile
465                 470                 475                 480

Glu Ser Phe Ala Leu Ile His Asp Ser Phe Gly Thr Ile Pro Ala Asp
                485                 490                 495

Ala Ala Asn Leu Phe Lys Ala Val Arg Glu Thr Met Val Asp Thr Tyr
            500                 505                 510

Glu Ser Cys Asp Val Leu Ala Asp Phe Tyr Asp Gln Phe Ala Asp Gln
        515                 520                 525

Leu His Glu Ser Gln Leu Asp Lys Met Pro Ala Leu Pro Ala Lys Gly
    530                 535                 540

Asn Leu Asn Leu Arg Asp Ile Leu Glu Ser Asp Phe Ala Phe Ala
545                 550                 555

<210> SEQ ID NO 5
<211> LENGTH: 577
<212> TYPE: PRT
<213> ORGANISM: Unknown
<220> FEATURE:
<223> OTHER INFORMATION: Catalytic domain of wild type SP6 RNA
      polymerase

<400> SEQUENCE: 5

Asn Thr Gln Trp Gln Ile Asn Lys Asp Val Leu Ala Val Ile Glu Glu
1               5                   10                  15

Val Ile Arg Leu Asp Leu Gly Tyr Gly Val Pro Ser Phe Lys Pro Leu
            20                  25                  30

Ile Asp Lys Glu Asn Lys Pro Ala Asn Pro Val Pro Val Glu Phe Gln
        35                  40                  45

His Leu Arg Gly Arg Glu Leu Lys Glu Met Leu Ser Pro Glu Gln Trp
    50                  55                  60
```

```
Gln Gln Phe Ile Asn Trp Lys Gly Glu Cys Ala Arg Leu Tyr Thr Ala
 65                  70                  75                  80

Glu Thr Lys Arg Gly Ser Lys Ser Ala Ala Val Val Arg Met Val Gly
                 85                  90                  95

Gln Ala Arg Lys Tyr Ser Ala Phe Glu Ser Ile Tyr Phe Val Tyr Ala
            100                 105                 110

Met Asp Ser Arg Ser Arg Val Tyr Val Gln Ser Ser Thr Leu Ser Pro
            115                 120                 125

Gln Ser Asn Asp Leu Gly Lys Ala Leu Leu Arg Phe Thr Glu Gly Arg
130                 135                 140

Pro Val Asn Gly Val Glu Ala Leu Lys Trp Phe Cys Ile Asn Gly Ala
145                 150                 155                 160

Asn Leu Trp Gly Trp Asp Lys Lys Thr Phe Asp Val Arg Val Ser Asn
                165                 170                 175

Val Leu Asp Glu Glu Phe Gln Asp Met Cys Arg Asp Ile Ala Ala Asp
            180                 185                 190

Pro Leu Thr Phe Thr Gln Trp Ala Lys Ala Asp Ala Pro Tyr Glu Phe
            195                 200                 205

Leu Ala Trp Cys Phe Glu Tyr Ala Gln Tyr Leu Asp Leu Val Asp Glu
210                 215                 220

Gly Arg Ala Asp Glu Phe Arg Thr His Leu Pro Val His Gln Asp Gly
225                 230                 235                 240

Ser Cys Ser Gly Ile Gln His Tyr Ser Ala Met Leu Arg Asp Glu Val
                245                 250                 255

Gly Ala Lys Ala Val Asn Leu Lys Pro Ser Asp Ala Pro Gln Asp Ile
            260                 265                 270

Tyr Gly Ala Val Ala Gln Val Val Ile Lys Lys Asn Ala Leu Tyr Met
            275                 280                 285

Asp Ala Asp Asp Ala Thr Thr Phe Thr Ser Gly Ser Val Thr Leu Ser
290                 295                 300

Gly Thr Glu Leu Arg Ala Met Ala Ser Ala Trp Asp Ser Ile Gly Ile
305                 310                 315                 320

Thr Arg Ser Leu Thr Lys Lys Pro Val Met Thr Leu Pro Tyr Gly Ser
                325                 330                 335

Thr Arg Leu Thr Cys Arg Glu Ser Val Ile Asp Tyr Ile Val Asp Leu
            340                 345                 350

Glu Glu Lys Glu Ala Gln Lys Ala Val Ala Glu Gly Arg Thr Ala Asn
            355                 360                 365

Lys Val His Pro Phe Glu Asp Asp Arg Gln Asp Tyr Leu Thr Pro Gly
            370                 375                 380

Ala Ala Tyr Asn Tyr Met Thr Ala Leu Ile Trp Pro Ser Ile Ser Glu
385                 390                 395                 400

Val Val Lys Ala Pro Ile Val Ala Met Lys Met Ile Arg Gln Leu Ala
                405                 410                 415

Arg Phe Ala Ala Lys Arg Asn Glu Gly Leu Met Tyr Thr Leu Pro Thr
            420                 425                 430

Gly Phe Ile Leu Glu Gln Lys Ile Met Ala Thr Glu Met Leu Arg Val
            435                 440                 445

Arg Thr Cys Leu Met Gly Asp Ile Lys Met Ser Leu Gln Val Glu Thr
            450                 455                 460

Asp Ile Val Asp Glu Ala Ala Met Met Gly Ala Ala Ala Pro Asn Phe
465                 470                 475                 480
```

```
Val His Gly His Asp Ala Ser His Leu Ile Leu Thr Val Cys Glu Leu
                485                 490                 495

Val Asp Lys Gly Val Thr Ser Ile Ala Val Ile His Asp Ser Phe Gly
            500                 505                 510

Thr His Ala Asp Asn Thr Leu Thr Leu Arg Val Ala Leu Lys Gly Gln
            515                 520                 525

Met Val Ala Met Tyr Ile Asp Gly Asn Ala Leu Gln Lys Leu Leu Glu
530                 535                 540

Glu His Glu Glu Arg Trp Met Val Asp Thr Gly Ile Glu Val Pro Glu
545                 550                 555                 560

Gln Gly Glu Phe Asp Leu Asn Glu Ile Met Asp Ser Gly Tyr Val Phe
                565                 570                 575

Ala
```

<210> SEQ ID NO 6
<211> LENGTH: 559
<212> TYPE: PRT
<213> ORGANISM: Unknown
<220> FEATURE:
<223> OTHER INFORMATION: Catalytic domain of wild type T3 RNA polymerase

<400> SEQUENCE: 6

```
Asn Thr Ala Trp Lys Ile Asn Lys Lys Val Leu Ala Val Val Asn Glu
1               5                   10                  15

Ile Val Asn Trp Lys Asn Cys Pro Val Ala Asp Ile Pro Ser Leu Glu
            20                  25                  30

Arg Gln Glu Leu Pro Pro Lys Pro Asp Asp Ile Asp Thr Asn Glu Ala
        35                  40                  45

Ala Leu Lys Glu Trp Lys Lys Ala Ala Gly Ile Tyr Arg Leu Asp
    50                  55                  60

Lys Ala Arg Val Ser Arg Arg Ile Ser Leu Glu Phe Met Leu Glu Gln
65                  70                  75                  80

Ala Asn Lys Phe Ala Ser Lys Lys Ala Ile Trp Phe Pro Tyr Asn Met
                85                  90                  95

Asp Trp Arg Gly Arg Val Tyr Ala Val Pro Met Phe Asn Pro Gln Gly
            100                 105                 110

Asn Asp Met Thr Lys Gly Leu Leu Thr Leu Ala Lys Gly Lys Pro Ile
        115                 120                 125

Gly Glu Glu Gly Phe Tyr Trp Leu Lys Ile His Gly Ala Asn Cys Ala
130                 135                 140

Gly Val Asp Lys Val Pro Phe Pro Glu Arg Ile Ala Phe Ile Glu Lys
145                 150                 155                 160

His Val Asp Asp Ile Leu Ala Cys Ala Lys Asp Pro Ile Asn Asn Thr
                165                 170                 175

Trp Trp Ala Glu Gln Asp Ser Pro Phe Cys Phe Leu Ala Phe Cys Phe
            180                 185                 190

Glu Tyr Ala Gly Val Thr His His Gly Leu Ser Tyr Asn Cys Ser Leu
        195                 200                 205

Pro Leu Ala Phe Asp Gly Ser Cys Ser Gly Ile Gln His Phe Ser Ala
    210                 215                 220

Met Leu Arg Asp Glu Val Gly Gly Arg Ala Val Asn Leu Leu Pro Ser
225                 230                 235                 240

Glu Thr Val Gln Asp Ile Tyr Gly Ile Val Ala Gln Lys Val Asn Glu
                245                 250                 255

Ile Leu Lys Gln Asp Ala Ile Asn Gly Thr Pro Asn Glu Met Ile Thr
```

```
                260             265             270
Val Thr Asp Lys Asp Thr Gly Glu Ile Ser Glu Lys Leu Lys Leu Gly
            275             280             285

Thr Ser Thr Leu Ala Gln Gln Trp Leu Ala Tyr Gly Val Thr Arg Ser
        290             295             300

Val Thr Lys Arg Ser Val Met Thr Leu Ala Tyr Gly Ser Lys Glu Phe
305             310             315                             320

Gly Phe Arg Gln Gln Val Leu Asp Asp Thr Ile Gln Pro Ala Ile Asp
                325             330             335

Ser Gly Lys Gly Leu Met Phe Thr Gln Pro Asn Gln Ala Ala Gly Tyr
            340             345             350

Met Ala Lys Leu Ile Trp Asp Ala Val Ser Val Thr Val Ala Ala
        355             360             365

Val Glu Ala Met Asn Trp Leu Lys Ser Ala Ala Lys Leu Leu Ala Ala
        370             375             380

Glu Val Lys Asp Lys Lys Thr Lys Glu Ile Leu Arg His Arg Cys Ala
385             390             395             400

Val His Trp Thr Thr Pro Asp Gly Phe Pro Val Trp Gln Glu Tyr Arg
                405             410             415

Lys Pro Leu Gln Lys Arg Leu Asp Met Ile Phe Leu Gly Gln Phe Arg
                420             425             430

Leu Gln Pro Thr Ile Asn Thr Leu Lys Asp Ser Gly Ile Asp Ala His
            435             440             445

Lys Gln Glu Ser Gly Ile Ala Pro Asn Phe Val His Ser Gln Asp Gly
            450             455             460

Ser His Leu Arg Met Thr Val Val Tyr Ala His Glu Lys Tyr Gly Ile
465             470             475             480

Glu Ser Phe Ala Leu Ile His Asp Ser Phe Gly Thr Ile Pro Ala Asp
                485             490             495

Ala Gly Lys Leu Phe Lys Ala Val Arg Glu Thr Met Val Ile Thr Tyr
            500             505             510

Glu Asn Asn Asp Val Leu Ala Asp Phe Tyr Ser Gln Phe Ala Asp Gln
            515             520             525

Leu His Glu Thr Gln Leu Asp Lys Met Pro Pro Leu Pro Lys Lys Gly
        530             535             540

Asn Leu Asn Leu Gln Asp Ile Leu Lys Ser Asp Phe Ala Phe Ala
545             550             555

<210> SEQ ID NO 7
<211> LENGTH: 18
<212> TYPE: DNA
<213> ORGANISM: Unknown
<220> FEATURE:
<223> OTHER INFORMATION: T7 promoter sequence

<400> SEQUENCE: 7
taatacgact cactatag                                                   18

<210> SEQ ID NO 8
<211> LENGTH: 18
<212> TYPE: DNA
<213> ORGANISM: Unknown
<220> FEATURE:
<223> OTHER INFORMATION: SP6 promoter sequence

<400> SEQUENCE: 8
atttaggtga cactatag                                                   18
```

```
<210> SEQ ID NO 9
<211> LENGTH: 18
<212> TYPE: DNA
<213> ORGANISM: Unknown
<220> FEATURE:
<223> OTHER INFORMATION: T3 promoter sequence

<400> SEQUENCE: 9
aattaaccct cactaaag                                                    18

<210> SEQ ID NO 10
<211> LENGTH: 20
<212> TYPE: DNA
<213> ORGANISM: Artificial Sequence
<220> FEATURE:
<223> OTHER INFORMATION: Primer for V783M mutation

<400> SEQUENCE: 10
actttatgca cagccaagac                                                  20

<210> SEQ ID NO 11
<211> LENGTH: 20
<212> TYPE: DNA
<213> ORGANISM: Artificial Sequence
<220> FEATURE:
<223> OTHER INFORMATION: Primer for V783M mutation

<400> SEQUENCE: 11
taggagcgat accagactcc                                                  20

<210> SEQ ID NO 12
<211> LENGTH: 20
<212> TYPE: DNA
<213> ORGANISM: Artificial Sequence
<220> FEATURE:
<223> OTHER INFORMATION: Primer for V689Q mutation

<400> SEQUENCE: 12
gacgcaggta gctgcggttg                                                  20

<210> SEQ ID NO 13
<211> LENGTH: 23
<212> TYPE: DNA
<213> ORGANISM: Artificial Sequence
<220> FEATURE:
<223> OTHER INFORMATION: Primer for V689Q mutation

<400> SEQUENCE: 13
acgctcacag attcccaaat cag                                              23

<210> SEQ ID NO 14
<211> LENGTH: 20
<212> TYPE: DNA
<213> ORGANISM: Artificial Sequence
<220> FEATURE:
<223> OTHER INFORMATION: Primer for V783L mutation

<400> SEQUENCE: 14
actttcttca cagccaagac                                                  20

<210> SEQ ID NO 15
<211> LENGTH: 20
<212> TYPE: DNA
<213> ORGANISM: Artificial Sequence
<220> FEATURE:
```

<223> OTHER INFORMATION: Primer for V783L mutation

<400> SEQUENCE: 15
taggagcgat accagactcc                                                     20

<210> SEQ ID NO 16
<211> LENGTH: 23
<212> TYPE: DNA
<213> ORGANISM: Artificial Sequence
<220> FEATURE:
<223> OTHER INFORMATION: Primer for G555L mutation

<400> SEQUENCE: 16
aggtactggg tcgcgcggtt aac                                                 23

<210> SEQ ID NO 17
<211> LENGTH: 23
<212> TYPE: DNA
<213> ORGANISM: Artificial Sequence
<220> FEATURE:
<223> OTHER INFORMATION: Primer for G555L mutation

<400> SEQUENCE: 17
catctcggag catcgcggag aag                                                 23

<210> SEQ ID NO 18
<211> LENGTH: 18
<212> TYPE: DNA
<213> ORGANISM: Artificial Sequence
<220> FEATURE:
<223> OTHER INFORMATION: Primers that have repetitive histidine codons

<400> SEQUENCE: 18
catcaccatc accatcac                                                       18

<210> SEQ ID NO 19
<211> LENGTH: 42
<212> TYPE: DNA
<213> ORGANISM: Artificial Sequence
<220> FEATURE:
<223> OTHER INFORMATION: Mutagenic primer

<400> SEQUENCE: 19
catcaccatc accatcacat gaacacgatt aacatcgcta ag                            42

<210> SEQ ID NO 20
<211> LENGTH: 20
<212> TYPE: DNA
<213> ORGANISM: Artificial Sequence
<220> FEATURE:
<223> OTHER INFORMATION: Mutagenic primer

<400> SEQUENCE: 20
ctcgagctcg gatccccatc                                                     20

<210> SEQ ID NO 21
<211> LENGTH: 42
<212> TYPE: DNA
<213> ORGANISM: Artificial Sequence
<220> FEATURE:
<223> OTHER INFORMATION: 42 nt oligonucleotide

<400> SEQUENCE: 21
gggaaagctt gcatgcctgc aggtcgactc tagaggatcc cc                            42

```
<210> SEQ ID NO 22
<211> LENGTH: 22
<212> TYPE: DNA
<213> ORGANISM: Artificial Sequence
<220> FEATURE:
<223> OTHER INFORMATION: Control reverse primer

<400> SEQUENCE: 22
caatttccca ttcgccattc ag                                              22

<210> SEQ ID NO 23
<211> LENGTH: 21
<212> TYPE: DNA
<213> ORGANISM: Artificial Sequence
<220> FEATURE:
<223> OTHER INFORMATION: Handle No 1

<400> SEQUENCE: 23
tacacgacgc tcttccgatc t                                               21

<210> SEQ ID NO 24
<211> LENGTH: 22
<212> TYPE: DNA
<213> ORGANISM: Artificial Sequence
<220> FEATURE:
<223> OTHER INFORMATION: Handle No 2

<400> SEQUENCE: 24
cagacgtgtg ctcttccgat ct                                              22

<210> SEQ ID NO 25
<211> LENGTH: 883
<212> TYPE: PRT
<213> ORGANISM: Unknown
<220> FEATURE:
<223> OTHER INFORMATION: Escherichia phage 13a sequence

<400> SEQUENCE: 25
```

Met Asn Thr Ile Asn Ile Ala Lys Asn Asp Phe Ser Asp Ile Glu Leu
1               5                   10                  15

Ala Ala Ile Pro Phe Asn Thr Leu Ala Asp His Tyr Gly Glu Arg Leu
            20                  25                  30

Ala Arg Glu Gln Leu Ala Leu Glu His Glu Ser Tyr Glu Met Gly Glu
        35                  40                  45

Ala Arg Phe Arg Lys Met Phe Glu Arg Gln Leu Lys Ala Gly Glu Val
    50                  55                  60

Ala Asp Asn Ala Ala Ala Lys Pro Leu Ile Thr Thr Leu Leu Pro Lys
65                  70                  75                  80

Met Ile Ala Arg Ile Asn Asp Trp Phe Glu Glu Val Lys Ala Lys Arg
                85                  90                  95

Gly Lys Arg Pro Thr Ala Phe Gln Phe Leu Gln Glu Ile Lys Pro Glu
            100                 105                 110

Ala Val Ala Tyr Ile Thr Ile Lys Thr Thr Leu Ala Cys Leu Thr Ser
        115                 120                 125

Val Asp Asn Thr Thr Val Gln Ala Val Ala Ser Ala Ile Gly Arg Ala
    130                 135                 140

Ile Glu Asp Glu Ala Arg Phe Gly Arg Ile Arg Asp Leu Glu Ala Lys
145                 150                 155                 160

His Phe Lys Lys Asn Val Glu Glu Gln Leu Asn Lys Arg Val Gly His
                165                 170                 175

Val Tyr Lys Lys Ala Phe Met Gln Val Val Glu Ala Asp Met Leu Ser

```
                180             185             190
Lys Gly Leu Leu Gly Glu Ala Trp Ser Ser Trp His Lys Glu Asp
            195             200             205
Ser Ile His Val Gly Val Arg Cys Ile Glu Met Leu Ile Glu Ser Thr
        210             215             220
Gly Met Val Ser Leu His Arg Gln Asn Ala Gly Val Val Gly Gln Asp
225             230             235             240
Ser Glu Thr Ile Glu Leu Ala Pro Glu Tyr Ala Glu Ala Ile Ala Thr
            245             250             255
Arg Ala Gly Ala Leu Ala Gly Ile Ser Pro Met Phe Gln Pro Cys Val
        260             265             270
Val Pro Pro Lys Pro Trp Thr Gly Ile Thr Gly Gly Tyr Trp Ala
    275             280             285
Asn Gly Arg Arg Pro Leu Ala Leu Val Arg Thr His Ser Lys Lys Ala
        290             295             300
Leu Met Arg Tyr Glu Asp Val Tyr Met Pro Glu Val Tyr Lys Ala Ile
305             310             315             320
Asn Ile Ala Gln Asn Thr Ala Trp Lys Ile Asn Lys Lys Val Leu Ala
            325             330             335
Val Ala Asn Val Ile Thr Lys Trp Lys His Cys Pro Val Glu Asp Ile
        340             345             350
Pro Ala Ile Glu Arg Glu Leu Pro Met Lys Pro Glu Asp Ile Asp
    355             360             365
Thr Asn Pro Asp Ala Leu Thr Ala Trp Lys Arg Ala Ala Ala Val
    370             375             380
Tyr Arg Lys Asp Lys Ala Arg Lys Ser Arg Arg Ile Ser Leu Glu Phe
385             390             395             400
Met Leu Glu Gln Ala Asn Lys Phe Ala Asn His Lys Ala Ile Trp Phe
            405             410             415
Pro Tyr Asn Met Asp Trp Arg Gly Arg Val Tyr Ala Val Ser Met Phe
            420             425             430
Asn Pro Gln Gly Asn Asp Met Thr Lys Gly Leu Leu Thr Leu Ala Lys
            435             440             445
Gly Lys Pro Ile Gly Lys Glu Gly Tyr Tyr Trp Leu Lys Ile His Gly
        450             455             460
Ala Asn Cys Ala Gly Val Asp Lys Val Pro Phe Pro Glu Arg Ile Lys
465             470             475             480
Phe Ile Glu Asp Asn His Glu Asn Ile Met Ala Cys Ala Lys Ser Pro
            485             490             495
Leu Glu Asn Thr Trp Trp Ala Glu Gln Asp Ser Pro Phe Cys Phe Leu
            500             505             510
Ala Phe Cys Phe Glu Tyr Ala Gly Val Gln His His Gly Leu Ser Tyr
            515             520             525
Asn Cys Ser Leu Pro Leu Ala Phe Asp Gly Ser Cys Ser Gly Ile Gln
        530             535             540
His Phe Ser Ala Met Leu Leu Asp Glu Ile Gly Gly Arg Ala Val Asn
545             550             555             560
Leu Leu Pro Ser Glu Thr Val Gln Asp Ile Tyr Gly Ile Val Ala Lys
            565             570             575
Lys Val Asn Val Ile Leu Gln Ala Asp Val Ile Asn Gly Thr Asp Asn
            580             585             590
Glu Val Val Thr Val Thr Asp Glu Asn Thr Gly Glu Ile Ser Glu Lys
            595             600             605
```

```
Val Lys Leu Gly Thr Lys Ala Leu Ala Gly Gln Trp Leu Ala Tyr Gly
    610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
            660                 665                 670

Ala Ala Gly Tyr Met Ala Lys Leu Ile Trp Glu Ala Ser Val Thr
        675                 680                 685

Val Val Ala Ala Val Glu Ala Met Asn Trp Leu Lys Ser Ala Ala Lys
    690                 695                 700

Leu Leu Ala Ala Glu Val Lys Asp Lys Thr Gly Glu Ile Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
        755                 760                 765

Ile Asp Ala His Lys Gln Glu Ser Gly Ile Ala Pro Asn Phe Val His
    770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
    850                 855                 860

Pro Ala Lys Gly Asn Leu Asn Leu Gln Asp Ile Leu Lys Ser Asp Phe
865                 870                 875                 880

Ala Phe Ala

<210> SEQ ID NO 26
<211> LENGTH: 883
<212> TYPE: PRT
<213> ORGANISM: Unknown
<220> FEATURE:
<223> OTHER INFORMATION: Escherichia phage 285P sequence

<400> SEQUENCE: 26

Met Thr Asn Val Ile Asn Ala Pro Lys Asn Asp Phe Ser Asp Ile Ala
1               5                   10                  15

Asn Ala Ile Met Pro Tyr Asn Ile Leu Ala Asp His Tyr Gly Ala Gln
            20                  25                  30

Leu Ala Ala Thr Gln Leu Gln Leu Glu His Glu Ala His Thr Glu Gly
        35                  40                  45

Glu Lys Arg Phe Leu Lys Ala Met Glu Arg Gln Ile Lys Ala Gly Glu
    50                  55                  60

Phe Gly Asp Asn Ala Val Ala Lys Pro Leu Leu Ser Ser Leu Ala Pro
65                  70                  75                  80
```

```
Lys Phe Ile Glu Ala Trp Asn Thr Trp Phe Thr Val Glu Ala Lys
                85                  90                  95

Arg Gly Lys Arg Pro Val Ala Tyr Asn Leu Val Gln Lys Val Ala Pro
            100                 105                 110

Glu Ala Ala Phe Ile Thr Leu Lys Val Thr Leu Ala Cys Leu Thr
            115                 120                 125

Lys Glu Glu Phe Thr Asn Leu Gln Ser Val Ala Thr Lys Ile Gly Arg
            130                 135                 140

Ser Ile Glu Asp Glu Leu Arg Phe Gly Arg Ile Arg Asp Glu Glu Ala
145                 150                 155                 160

Lys His Phe Lys Asn His Val Gln Glu Ala Leu Asn Lys Arg Val Gly
                165                 170                 175

Ile Val Tyr Lys Lys Ala Phe Met Gln Ala Val Glu Gly Lys Met Leu
            180                 185                 190

Asp Ala Gly Gln Leu Gln Thr Lys Trp Thr Thr Trp Thr Pro Glu Glu
            195                 200                 205

Ser Ile His Val Gly Val Arg Met Leu Glu Leu Ile Gly Ser Thr
210                 215                 220

Gly Leu Val Glu Leu His Arg Pro Phe Ala Gly Asn Val Glu Lys Asp
225                 230                 235                 240

Gly Glu Tyr Ile Gln Leu Thr Glu Gln Tyr Val Asp Leu Leu Ser Lys
                245                 250                 255

Arg Ala Gly Ala Leu Ala Ala Ile Ala Pro Met Tyr Gln Pro Cys Val
            260                 265                 270

Val Pro Pro Lys Pro Trp Thr Ser Pro Val Gly Gly Tyr Trp Ala
            275                 280                 285

Ala Gly Arg Lys Pro Leu Ser Leu Val Arg Thr Gly Ser Lys Lys Gly
            290                 295                 300

Leu Glu Arg Tyr Asn Asp Val Tyr Met Pro Glu Val Tyr Lys Ala Val
305                 310                 315                 320

Asn Ile Ala Gln Asn Thr Pro Trp Lys Ile Asn Lys Lys Val Leu Ala
                325                 330                 335

Val Val Asn Glu Ile Val Asn Trp Lys His Cys Pro Val Glu Asp Val
            340                 345                 350

Pro Ala Leu Glu Arg Gly Glu Leu Pro Val Lys Pro Glu Asp Ile Asp
            355                 360                 365

Thr Asn Glu Ala Ser Leu Lys Ala Trp Lys Lys Ala Ala Ser Ala Ile
            370                 375                 380

Tyr Arg Lys Glu Lys Ala Arg Val Ser Arg Arg Met Ser Met Glu Phe
385                 390                 395                 400

Met Leu Gly Gln Ala Asn Lys Phe Ala Gln Phe Lys Ala Ile Trp Phe
                405                 410                 415

Pro Met Asn Met Asp Trp Arg Gly Arg Val Tyr Ala Val Pro Met Phe
            420                 425                 430

Asn Pro Gln Gly Asn Asp Met Thr Lys Gly Leu Leu Thr Leu Ala Lys
            435                 440                 445

Gly Lys Pro Ile Gly Val Asp Gly Tyr Tyr Trp Leu Lys Ile His Gly
            450                 455                 460

Ala Asn Thr Ala Gly Val Asp Lys Val Asp Phe Ala Glu Arg Ile Lys
465                 470                 475                 480

Phe Ile Asp Asp Asn His Glu Asn Ile Met Ser Val Ala Ala Asp Pro
                485                 490                 495

Ile Ala Asn Thr Trp Trp Ala Glu Gln Asp Ser Pro Phe Cys Phe Leu
```

```
                500             505             510
Ala Phe Cys Phe Glu Tyr Ala Gly Val Gln His His Gly Met Asn Tyr
            515                 520                 525

Asn Cys Ser Leu Pro Leu Ala Phe Asp Gly Ser Cys Ser Gly Ile Gln
530                 535                 540

His Phe Ser Ala Met Leu Arg Asp Glu Ile Gly Gly Arg Ala Val Asn
545                 550                 555                 560

Leu Leu Pro Ser Lys Glu Val Gln Asp Ile Tyr Arg Ile Val Ala Glu
            565                 570                 575

Arg Val Asn Glu Ile Leu Asn Gln Asp Val Ile Asn Gly Thr Asp Asn
                580                 585                 590

Glu Val Glu Thr Val Thr Asn Lys Asp Thr Gly Glu Ile Thr Glu Lys
            595                 600                 605

Leu Lys Leu Gly Thr Lys Glu Leu Ala Gly Gln Trp Leu Ala Tyr Gly
            610                 615                 620

Val Thr Arg Lys Val Thr Lys Arg Ser Val Met Thr Leu Ala Tyr Gly
625                 630                 635                 640

Ser Lys Glu Tyr Gly Phe Arg Asp Gln Val Leu Glu Asp Thr Ile Gln
                645                 650                 655

Pro Ala Ile Asp Asp Gly Lys Gly Leu Met Phe Thr Gln Pro Asn Gln
                660                 665                 670

Ala Ala Gly Tyr Met Ala Lys Leu Ile Trp Asn Ala Val Thr Val Thr
            675                 680                 685

Val Val Ala Ala Val Glu Ala Met Asn Trp Leu Lys Ser Ala Ala Lys
            690                 695                 700

Leu Leu Ala Ala Glu Val Lys Asp Lys Lys Thr Lys Glu Val Leu Arg
705                 710                 715                 720

Lys Arg Cys Ala Val His Trp Val Thr Pro Asp Gly Phe Pro Val Trp
                725                 730                 735

Gln Glu Tyr Lys Lys Pro Val Gln Thr Arg Leu Asn Leu Met Phe Leu
                740                 745                 750

Gly Gln Ile Arg Leu Gln Pro Thr Val Asn Thr Asn Lys Asp Ser Gly
            755                 760                 765

Ile Asp Ala Arg Lys Gln Glu Ser Gly Ile Ala Pro Asn Phe Val His
            770                 775                 780

Ser Met Asp Gly Ser His Leu Arg Met Thr Val Val Arg Ser Asn Glu
785                 790                 795                 800

Val Tyr Gly Val Glu Ser Phe Ala Leu Ile His Asp Ser Phe Gly Thr
                805                 810                 815

Ile Pro Ala Asp Ala Gly Asn Leu Phe Lys Ala Val Arg Glu Thr Met
                820                 825                 830

Val Asn Thr Tyr Glu Glu Asn Asp Val Leu Ala Asp Phe Tyr Glu Gln
            835                 840                 845

Phe Ala Asp Gln Leu His Glu Ser Gln Leu Asp Lys Met Pro Glu Met
850                 855                 860

Pro Ala Lys Gly Ser Leu Asp Leu Gln Glu Ile Leu Lys Ser Asp Phe
865                 870                 875                 880

Ala Phe Ala

<210> SEQ ID NO 27
<211> LENGTH: 883
<212> TYPE: PRT
<213> ORGANISM: Unknown
<220> FEATURE:
```

<223> OTHER INFORMATION: Enterobacteria phage sequence

<400> SEQUENCE: 27

```
Met Thr Asn Val Ile Asn Ala Pro Lys Asn Asp Phe Ser Asp Ile Ala
1               5                   10                  15
Asn Ala Ile Gln Pro Tyr Asn Ile Leu Ala Asp His Tyr Gly Ala Gln
            20                  25                  30
Leu Ala Ala Thr Gln Leu Glu Leu Glu His Glu Ala His Thr Glu Gly
        35                  40                  45
Glu Lys Arg Phe Leu Lys Ala Met Glu Arg Gln Ile Lys Ala Gly Glu
    50                  55                  60
Phe Gly Asp Asn Ala Val Ala Lys Pro Leu Leu Ser Ser Leu Ala Pro
65                  70                  75                  80
Lys Phe Ile Glu Ala Trp Asn Thr Trp Phe Thr Glu Val Glu Ala Lys
                85                  90                  95
Arg Gly Lys Arg Pro Val Ala Tyr Asn Leu Val Gln Lys Val Ala Pro
            100                 105                 110
Glu Ala Ala Ala Phe Ile Thr Leu Lys Val Thr Leu Ala Cys Leu Thr
        115                 120                 125
Lys Glu Glu Phe Thr Asn Leu Gln Ser Val Ala Thr Lys Ile Gly Arg
    130                 135                 140
Ser Ile Glu Asp Glu Leu Arg Phe Gly Arg Ile Arg Asp Glu Glu Ala
145                 150                 155                 160
Lys His Phe Lys Asn His Val Gln Glu Ala Leu Asn Lys Arg Val Gly
                165                 170                 175
Ile Val Tyr Lys Lys Ala Phe Met Gln Ala Val Glu Gly Lys Met Leu
            180                 185                 190
Asp Ala Gly Gln Leu Gln Thr Lys Trp Thr Thr Trp Thr Pro Glu Glu
        195                 200                 205
Ser Ile His Val Gly Val Arg Met Leu Glu Leu Leu Ile Gly Ser Thr
210                 215                 220
Gly Leu Val Glu Leu His Arg Pro Phe Ala Gly Asn Val Glu Lys Asp
225                 230                 235                 240
Gly Glu Tyr Ile Gln Leu Thr Glu Gln Tyr Val Asp Leu Leu Ser Lys
                245                 250                 255
Arg Ala Gly Ala Leu Ala Ala Ile Ala Pro Met Tyr Gln Pro Cys Val
            260                 265                 270
Val Pro Pro Lys Pro Trp Thr Ser Pro Val Gly Gly Tyr Trp Ala
        275                 280                 285
Ala Gly Arg Lys Pro Leu Ser Leu Val Arg Thr Gly Ser Lys Lys Gly
    290                 295                 300
Leu Glu Arg Tyr Asn Asp Val Tyr Met Pro Glu Val Tyr Lys Ala Val
305                 310                 315                 320
Asn Ile Ala Gln Asn Thr Pro Trp Lys Ile Asn Lys Lys Val Leu Ala
                325                 330                 335
Val Val Asn Glu Ile Val Asn Trp Lys His Cys Pro Val Asp Asp Val
            340                 345                 350
Pro Ala Leu Glu Arg Gly Glu Leu Pro Ile Lys Pro Glu Asp Ile Asp
        355                 360                 365
Thr Asn Glu Ala Ala Leu Lys Ala Trp Lys Lys Ala Ala Ser Ala Ile
    370                 375                 380
Tyr Arg Lys Glu Lys Ala Arg Val Ser Arg Arg Met Ser Met Glu Phe
385                 390                 395                 400
```

```
Met Leu Gly Gln Ala Asn Lys Phe Ala Gln Phe Lys Ala Ile Trp Phe
                405                 410                 415
Pro Met Asn Met Asp Trp Arg Gly Arg Val Tyr Ala Val Pro Met Phe
            420                 425                 430
Asn Pro Gln Gly Asn Asp Met Thr Lys Gly Leu Leu Thr Leu Ala Lys
        435                 440                 445
Gly Lys Pro Ile Gly Val Asp Gly Tyr Tyr Trp Leu Lys Ile His Gly
    450                 455                 460
Ala Asn Thr Ala Gly Val Asp Lys Val Asp Phe Ala Glu Arg Ile Lys
465                 470                 475                 480
Phe Ile Asp Asp Asn His Glu Asn Ile Met Ser Val Ala Ala Asp Pro
                485                 490                 495
Ile Ala Asn Thr Trp Trp Ala Glu Gln Asp Ser Pro Phe Cys Phe Leu
            500                 505                 510
Ala Phe Cys Phe Glu Tyr Ala Gly Val Gln His His Gly Met Lys Tyr
        515                 520                 525
Asn Cys Ser Leu Pro Leu Ala Phe Asp Gly Ser Cys Ser Gly Ile Gln
    530                 535                 540
His Phe Ser Ala Met Leu Arg Asp Glu Ile Gly Gly Arg Ala Val Asn
545                 550                 555                 560
Leu Leu Pro Ser Lys Glu Val Gln Asp Ile Tyr Arg Ile Val Ala Glu
                565                 570                 575
Arg Val Asn Glu Ile Leu Lys Gln Asp Val Ile Asn Gly Thr Asp Asn
            580                 585                 590
Glu Val Glu Ile Val Thr Asn Lys Asp Thr Gly Glu Ile Thr Glu Lys
        595                 600                 605
Leu Lys Leu Gly Thr Lys Glu Leu Ala Gly Gln Trp Leu Ala Tyr Gly
    610                 615                 620
Val Thr Arg Lys Val Thr Lys Arg Ser Val Met Thr Leu Ala Tyr Gly
625                 630                 635                 640
Ser Lys Glu Tyr Gly Phe Arg Asp Gln Val Leu Glu Asp Thr Ile Gln
                645                 650                 655
Pro Ala Ile Asp Asp Gly Lys Gly Leu Met Phe Thr Gln Pro Asn Gln
            660                 665                 670
Ala Ala Gly Tyr Met Ala Lys Leu Ile Trp Asn Ala Val Thr Val Thr
        675                 680                 685
Val Val Ala Ala Val Glu Ala Met Asn Trp Leu Lys Ser Ala Ala Lys
    690                 695                 700
Leu Leu Ala Ala Glu Val Lys Asp Lys Thr Lys Glu Val Leu Arg
705                 710                 715                 720
Lys Arg Cys Ala Val His Trp Val Thr Pro Asp Gly Phe Pro Val Trp
                725                 730                 735
Gln Glu Tyr Lys Lys Pro Val Gln Thr Arg Leu Asn Leu Met Phe Leu
            740                 745                 750
Gly Gln Ile Arg Leu Gln Pro Thr Val Asn Thr Asn Lys Asp Ser Gly
        755                 760                 765
Ile Asp Ala Arg Lys Gln Glu Ser Gly Ile Ala Pro Asn Phe Val His
    770                 775                 780
Ser Met Asp Gly Ser His Leu Arg Met Thr Val Arg Ser Tyr Glu
785                 790                 795                 800
Val Tyr Gly Val Glu Ser Phe Ala Leu Ile His Asp Ser Phe Gly Thr
                805                 810                 815
Ile Pro Ala Asp Ala Gly Asn Leu Phe Lys Ala Val Arg Glu Thr Met
```

```
                    820             825             830
Val Asn Thr Tyr Glu Glu Asn Asp Val Leu Ala Asp Phe Tyr Glu Gln
            835             840             845

Phe Ala Asp Gln Leu His Glu Ser Gln Leu Asp Lys Met Pro Glu Met
            850             855             860

Pro Ala Lys Gly Ser Leu Asp Leu Gln Glu Ile Leu Lys Ser Asp Phe
865             870             875             880

Ala Phe Ala

<210> SEQ ID NO 28
<211> LENGTH: 893
<212> TYPE: PRT
<213> ORGANISM: Unknown
<220> FEATURE:
<223> OTHER INFORMATION: Escherichia phage EcoDS1 sequence

<400> SEQUENCE: 28

Met Ser Val Ile Ser Ile Asp Lys His Asp Phe Ser Asp Val Ser Asn
1               5                   10                  15

Ala Ile Glu Pro Phe Asn Leu Leu Ala Asp His Tyr Gly Gln Asp Leu
            20                  25                  30

Ala Val Lys Gln Leu Gln Leu Glu His Glu Ala Tyr Thr Glu Gly Glu
        35                  40                  45

Arg Arg Phe Ile Lys Asn Leu Glu Arg Gln Thr Glu Arg Gly Glu Leu
    50                  55                  60

Ala Asp Asn Gln Val Ala Lys Pro Leu Met Gln Thr Leu Val Pro Lys
65                  70                  75                  80

Ile Ala Gln Ala Val Arg Glu Trp His Glu Gly Pro Asp Gly Lys Leu
                85                  90                  95

Ser Thr Ser Arg Pro Ser Val Ala Phe Thr Met Leu Ser Thr Glu Glu
            100                 105                 110

Lys Ala Val Lys Asp Arg Ser Leu Arg Ile Ser Cys Glu Ser Ala Ser
        115                 120                 125

Val Ile Ile Leu Lys Val Ile Leu Ser Lys Leu Val Lys Pro Glu Gly
    130                 135                 140

Ile Pro Ile Thr Pro Met Ala Ser Ala Ile Gly Arg Thr Leu Glu Asp
145                 150                 155                 160

Glu Ile Arg Phe Gly Arg Ile Arg Asp Lys Lys Glu His Phe Lys
                165                 170                 175

Lys Ala Ile Ala Asp Asn Leu Asn Lys Arg Ala Gly Ala Ser Tyr Lys
            180                 185                 190

Lys Ala Tyr Met Gln Ala Val Glu Thr Ser Met Leu Glu Gln Gly Gln
        195                 200                 205

Leu Glu Asp Ala Trp Gly Thr Trp Ser Pro Thr Glu Ala Val His Val
    210                 215                 220

Gly Ile Lys Met Leu Glu Ile Val Ile Gln Ser Thr Gln Leu Val Glu
225                 230                 235                 240

Leu Lys Arg Tyr Gly Ala Gly Asn Ala Ala Asp Val Glu Met Val
                245                 250                 255

His Leu Ser Asp Phe Trp Val Lys Met Ala Gln Arg Gly Phe Ser
            260                 265                 270

Leu Ala Gly Ile Ala Pro Val Tyr Gln Pro Cys Val Val Pro Pro Lys
        275                 280                 285

Pro Trp Thr Gly Val Val Gly Gly Gly Tyr Trp Ala Lys Gly Arg Arg
    290                 295                 300
```

```
Pro Leu Pro Leu Ile Arg Leu Gly Ser Lys Ser Ala Val Ala Arg Tyr
305                 310                 315                 320

Glu Asp Val Tyr Met Pro Glu Val Tyr Asp Ala Val Asn Ile Ile Gln
            325                 330                 335

Asn Thr Pro Trp Lys Val Asn Lys Lys Val Leu Glu Val Val Asn Met
        340                 345                 350

Val Glu Lys Leu Asn Asn Thr Pro Ile Asp Asp Ile Pro Gln Met Glu
            355                 360                 365

Pro Leu Lys Pro Glu Asp Tyr Ala Gly Glu Thr Glu Glu Glu Leu Lys
        370                 375                 380

Ala Trp Lys Lys Ala Ala Ala Gly Ile Tyr Arg Arg Glu Lys Ala Arg
385                 390                 395                 400

Gln Ser Arg Arg Leu Ser Leu Ser Phe Ile Val Asn Gln Ala Asn Lys
                405                 410                 415

Phe Ser Gln Phe Lys Ala Ile Trp Phe Pro Tyr Asn Met Asp Trp Arg
            420                 425                 430

Gly Arg Val Tyr Ala Val Pro Met Phe Asn Pro Gln Gly Asn Asp Met
            435                 440                 445

Gln Lys Gly Leu Leu Thr Leu Ala Val Gly Lys Pro Ile Gly Ala Asp
        450                 455                 460

Gly Phe Lys Trp Leu Lys Val His Gly Ala Asn Cys Ala Gly Ile Asp
465                 470                 475                 480

Lys Val Thr Phe Glu Glu Arg Ile Lys Trp Val Glu Asp Asn His Asp
            485                 490                 495

Asn Ile Met Ala Thr Ala Lys Ala Pro Met Asp Ser Ile Glu Trp Trp
            500                 505                 510

Gly Lys Leu Asp Ser Pro Phe Cys Phe Leu Ala Phe Cys Phe Glu Tyr
        515                 520                 525

Ala Gly Val Met His His Gly Leu Ser Tyr Ser Cys Ser Leu Pro Ile
        530                 535                 540

Ala Phe Asp Gly Ser Cys Ser Gly Ile Gln His Phe Ser Ala Met Leu
545                 550                 555                 560

Arg Asp His Ile Gly Gly His Ala Val Asn Leu Thr Pro Ser Gly Lys
                565                 570                 575

Val Gln Asp Ile Tyr Arg Ile Val Ser Asp Arg Ile Glu Glu Glu Leu
            580                 585                 590

Lys Val Leu Leu Val Asn Gly Thr Asp Asn Glu Met Val Thr His Glu
            595                 600                 605

Asp Lys Lys Thr Gly Glu Ile Thr Glu Arg Leu Lys Leu Gly Thr Arg
        610                 615                 620

Glu Leu Ala Arg Gln Trp Leu Thr Tyr Gly Met Ser Arg Lys Val Thr
625                 630                 635                 640

Lys Arg Ser Val Met Thr Leu Ala Tyr Gly Ser Lys Glu Tyr Gly Phe
            645                 650                 655

Ala Asp Gln Val Tyr Glu Asp Ile Val Met Pro Ala Ile Asp Ser Gly
            660                 665                 670

Ser Gly Ala Met Phe Thr Glu Pro Ser Gln Ala Ser Arg Phe Met Ala
        675                 680                 685

Lys Met Ile Trp Glu Ala Val Ser Val Thr Val Val Ala Ala Val Asp
        690                 695                 700

Ala Met Lys Trp Leu Gln Gly Ala Ala Lys Leu Leu Ala Ala Glu Val
705                 710                 715                 720
```

Lys Asp Lys Lys Thr Gly Glu Ile Leu Lys Pro Cys Leu Pro Val His
            725                 730                 735

Trp Val Thr Pro Asp Gly Phe Pro Val Trp Gln Glu Tyr Arg Lys Lys
        740                 745                 750

Asp Thr Thr Arg Leu Asn Leu Met Phe Leu Gly Ser Phe Asn Leu Gln
        755                 760                 765

Pro Thr Val Asn Lys Gly Thr Lys Lys Glu Leu Asp Lys His Lys Gln
    770                 775                 780

Glu Ser Gly Ile Ser Pro Asn Phe Val His Ser Gln Asp Gly Ser His
785                 790                 795                 800

Leu Arg Lys Thr Val Val His Thr His Arg Lys Tyr Gly Val Met Ser
                805                 810                 815

Phe Ala Val Ile His Asp Ser Phe Gly Thr Ile Pro Ala Asp Ala Glu
                820                 825                 830

Tyr Leu Phe Arg Gly Val Arg Glu Thr Met Val Glu Thr Tyr Arg Asp
            835                 840                 845

Asn Asp Val Leu Leu Asp Phe Tyr Glu Gln Phe Glu Tyr Gln Leu His
    850                 855                 860

Glu Ser Gln Arg Asp Lys Leu Pro Glu Leu Pro Lys Lys Gly Lys Leu
865                 870                 875                 880

Asn Ile Glu Asp Ile Leu Ser Ser Asp Phe Ala Phe Ala
                885                 890

<210> SEQ ID NO 29
<211> LENGTH: 883
<212> TYPE: PRT
<213> ORGANISM: Unknown
<220> FEATURE:
<223> OTHER INFORMATION: Yersinia phage Yepe2 sequence

<400> SEQUENCE: 29

Met Thr Asn Val Ile Asn Ala Pro Lys Asn Asp Phe Ser Asp Ile Ala
1               5                   10                  15

Asn Ala Ile Gln Pro Tyr Asn Ile Leu Ala Asp His Tyr Gly Ala Gln
                20                  25                  30

Leu Ala Ala Thr Gln Leu Glu Leu Glu His Glu Ala His Thr Glu Gly
            35                  40                  45

Glu Lys Arg Phe Leu Lys Ala Met Glu Arg Gln Ile Lys Ala Gly Glu
        50                  55                  60

Phe Gly Asp Asn Thr Val Ala Lys Pro Leu Leu Ser Ser Leu Ala Pro
65                  70                  75                  80

Lys Phe Val Glu Ala Trp Asn Thr Trp Phe Thr Glu Val Glu Ala Lys
                85                  90                  95

Arg Gly Lys Arg Pro Val Ala Tyr Asn Leu Val Gln Lys Val Ala Pro
            100                 105                 110

Glu Ala Ala Ala Phe Ile Thr Leu Lys Val Thr Leu Ala Cys Leu Thr
        115                 120                 125

Lys Glu Glu Phe Thr Asn Leu Gln Ser Val Ala Thr Lys Ile Gly Arg
    130                 135                 140

Ser Ile Glu Asp Glu Leu Arg Phe Gly Arg Ile Arg Asp Glu Glu Ala
145                 150                 155                 160

Lys His Phe Lys Asn His Val Gln Glu Ala Leu Asn Lys Arg Val Gly
                165                 170                 175

Ile Val Tyr Lys Lys Ala Phe Met Gln Ala Val Glu Gly Lys Met Leu
            180                 185                 190

-continued

```
Glu Ala Gly Gln Leu His Thr Lys Trp Thr Thr Trp Thr Pro Glu Glu
            195                 200                 205
Val Ile His Val Gly Val Arg Met Leu Glu Leu Leu Ile Gly Ser Thr
        210                 215                 220
Gly Leu Val Glu Leu His Arg Pro Phe Ala Gly Asn Ile Glu Lys Asp
225                 230                 235                 240
Gly Glu Tyr Ile Gln Leu Thr Glu Gln Tyr Val Asp Leu Leu Ser Lys
                245                 250                 255
Arg Ala Gly Ala Leu Ala Ala Ile Ala Pro Met Tyr Gln Pro Cys Val
            260                 265                 270
Val Pro Pro Lys Pro Trp Thr Ser Pro Val Gly Gly Tyr Trp Ala
        275                 280                 285
Ala Gly Arg Lys Pro Leu Ser Met Val Arg Thr Gly Ser Lys Lys Gly
    290                 295                 300
Leu Glu Arg Tyr Asn Asp Val Tyr Met Pro Glu Val Tyr Lys Ala Val
305                 310                 315                 320
Asn Ile Ala Gln Asn Thr Pro Trp Lys Ile Asn Lys Lys Val Leu Ala
                325                 330                 335
Val Val Asn Glu Ile Val Ser Trp Lys His Cys Pro Val Ala Asp Val
            340                 345                 350
Pro Ala Met Glu Arg Gly Glu Leu Pro Val Lys Pro Val Asp Ile Asp
        355                 360                 365
Thr Asn Glu Val Ala Leu Lys Ala Trp Lys Lys Ala Ser Ala Ile
    370                 375                 380
Tyr Arg Lys Glu Lys Ala Arg Val Ser Arg Arg Met Ser Met Glu Phe
385                 390                 395                 400
Met Leu Gly Gln Ala Asn Lys Phe Ala Gln Phe Lys Ala Ile Trp Phe
                405                 410                 415
Pro Met Asn Met Asp Trp Arg Gly Arg Val Tyr Ala Val Pro Met Phe
            420                 425                 430
Asn Pro Gln Gly Asn Asp Met Thr Lys Gly Leu Leu Thr Leu Ala Lys
        435                 440                 445
Gly Lys Pro Ile Gly Val Asp Gly Phe Tyr Trp Leu Lys Ile His Gly
    450                 455                 460
Ala Asn Thr Ala Gly Val Asp Lys Val Asp Phe Ala Glu Arg Ile Lys
465                 470                 475                 480
Phe Ile Asp Asp Asn His Glu Asn Ile Met Ser Val Ala Ala Asp Pro
                485                 490                 495
Ile Ala Asn Thr Trp Trp Thr Glu Gln Asp Ser Pro Phe Cys Phe Leu
            500                 505                 510
Ala Phe Cys Phe Glu Tyr Ala Gly Val Gln His His Gly Met Asn Tyr
        515                 520                 525
Asn Cys Ser Leu Pro Leu Ala Phe Asp Gly Ser Cys Ser Gly Ile Gln
    530                 535                 540
His Phe Ser Ala Met Leu Arg Asp Glu Val Gly Gly Arg Ala Val Asn
545                 550                 555                 560
Leu Leu Pro Ser Lys Glu Val Gln Asp Ile Tyr Arg Ile Val Ala Glu
                565                 570                 575
Arg Val Asn Glu Ile Leu Asn Gln Asp Val Ile Asn Gly Thr Asp Asn
            580                 585                 590
Glu Val Glu Thr Leu Thr Asn Lys Asp Thr Gly Glu Ile Thr Glu Lys
        595                 600                 605
Leu Lys Leu Gly Thr Lys Glu Leu Ala Gly Gln Trp Leu Ala Tyr Gly
```

```
            610                 615                 620
Val Thr Arg Lys Val Thr Lys Arg Ser Val Met Thr Leu Ala Tyr Gly
625                 630                 635                 640

Ser Lys Glu Tyr Gly Phe Arg Asp Gln Val Leu Glu Asp Thr Ile Gln
                645                 650                 655

Pro Ala Ile Asp Asp Gly Lys Gly Leu Met Phe Thr Gln Pro Asn Gln
                660                 665                 670

Ala Ala Gly Tyr Met Ala Lys Leu Ile Trp Asn Ala Val Thr Val Thr
            675                 680                 685

Val Val Ala Ala Val Glu Ala Met Asn Trp Leu Lys Ser Ala Ala Lys
690                 695                 700

Leu Leu Ala Ala Glu Val Lys Asp Lys Lys Thr Lys Glu Val Leu Arg
705                 710                 715                 720

Asn Arg Cys Ala Val Tyr Trp Val Thr Pro Asp Gly Phe Pro Val Trp
                725                 730                 735

Gln Glu Tyr Arg Lys Pro Val Gln Thr Arg Leu Asn Leu Met Phe Leu
                740                 745                 750

Gly Gln Ile Arg Leu Gln Pro Thr Val Asn Thr Asn Lys Asp Ser Gly
            755                 760                 765

Ile Asp Ala Arg Lys Gln Glu Ser Gly Ile Ala Pro Asn Phe Val His
770                 775                 780

Ser Met Asp Gly Ser His Leu Arg Met Thr Val Val Arg Ser Tyr Glu
785                 790                 795                 800

Val Tyr Gly Val Glu Ser Phe Ala Leu Ile His Asp Ser Phe Gly Thr
                805                 810                 815

Ile Pro Ala Asp Ala Gly Asn Leu Phe Lys Ala Val Arg Glu Thr Met
                820                 825                 830

Val Asn Thr Tyr Glu Glu Asn Asp Val Leu Ala Asp Phe Tyr Asp Gln
            835                 840                 845

Phe Ala Asp Gln Leu His Glu Ser Gln Leu Asp Lys Met Pro Glu Met
850                 855                 860

Pro Ala Lys Gly Ser Leu Asp Ile Gln Glu Ile Leu Lys Ser Asp Phe
865                 870                 875                 880

Ala Phe Ala

<210> SEQ ID NO 30
<211> LENGTH: 906
<212> TYPE: PRT
<213> ORGANISM: Unknown
<220> FEATURE:
<223> OTHER INFORMATION: Klebsiella phage K11 sequence

<400> SEQUENCE: 30

Met Asn Ala Leu Asn Ile Ala Arg Asn Asp Phe Ser Glu Ile Glu Leu
1               5                   10                  15

Ala Ala Ile Pro Tyr Asn Ile Leu Ser Glu His Tyr Gly Asp Lys Leu
                20                  25                  30

Ala Arg Glu Gln Leu Ala Leu Glu His Glu Ala Tyr Glu Leu Gly Glu
            35                  40                  45

Gln Arg Phe Leu Lys Met Leu Glu Arg Gln Val Lys Ala Gly Glu Phe
        50                  55                  60

Ala Asp Asn Ala Ala Ala Lys Pro Leu Val Leu Thr Leu His Pro Gln
65                  70                  75                  80

Leu Thr Lys Arg Ile Asp Asp Trp Lys Glu Glu Gln Ala Asn Ala Arg
                85                  90                  95
```

```
Gly Lys Lys Pro Arg Ala Tyr Tyr Pro Ile Lys His Gly Val Ala Ser
                100                 105                 110

Lys Leu Ala Val Ser Met Gly Ala Glu Val Leu Lys Glu Lys Arg Gly
                115                 120                 125

Val Ser Ser Glu Ala Ile Ala Leu Leu Thr Ile Lys Val Val Leu Gly
                130                 135                 140

Thr Leu Thr Asp Ala Ser Lys Ala Thr Ile Gln Gln Val Ser Ser Gln
145                 150                 155                 160

Leu Gly Lys Ala Leu Glu Asp Glu Ala Arg Phe Gly Arg Ile Arg Glu
                165                 170                 175

Gln Glu Ala Ala Tyr Phe Lys Lys Asn Val Ala Asp Gln Leu Asp Lys
                180                 185                 190

Arg Val Gly His Val Tyr Lys Lys Ala Phe Met Gln Val Val Glu Ala
                195                 200                 205

Asp Met Ile Ser Lys Gly Met Leu Gly Gly Asp Asn Trp Ala Ser Trp
                210                 215                 220

Lys Thr Asp Glu Gln Met His Val Gly Thr Lys Leu Leu Glu Leu Leu
225                 230                 235                 240

Ile Glu Gly Thr Gly Leu Val Glu Met Thr Lys Asn Lys Met Ala Asp
                245                 250                 255

Gly Ser Asp Asp Val Thr Ser Met Gln Met Val Gln Leu Ala Pro Ala
                260                 265                 270

Phe Val Glu Leu Leu Ser Lys Arg Ala Gly Ala Leu Ala Gly Ile Ser
                275                 280                 285

Pro Met His Gln Pro Cys Val Pro Pro Lys Pro Trp Val Glu Thr
                290                 295                 300

Val Gly Gly Gly Tyr Trp Ser Val Gly Arg Arg Pro Leu Ala Leu Val
305                 310                 315                 320

Arg Thr His Ser Lys Lys Ala Leu Arg Arg Tyr Ala Asp Val His Met
                325                 330                 335

Pro Glu Val Tyr Lys Ala Val Asn Leu Ala Gln Asn Thr Pro Trp Lys
                340                 345                 350

Val Asn Lys Lys Val Leu Ala Val Val Asn Glu Ile Val Asn Trp Lys
                355                 360                 365

His Cys Pro Val Gly Asp Val Pro Ala Ile Glu Arg Glu Glu Leu Pro
                370                 375                 380

Pro Arg Pro Asp Asp Ile Asp Thr Asn Glu Val Ala Arg Lys Ala Trp
385                 390                 395                 400

Arg Lys Glu Ala Ala Val Tyr Arg Lys Asp Lys Ala Arg Gln Ser
                405                 410                 415

Arg Arg Leu Ser Met Glu Phe Met Val Ala Gln Ala Asn Lys Phe Ala
                420                 425                 430

Asn His Lys Ala Ile Trp Phe Pro Tyr Asn Met Asp Trp Arg Gly Arg
                435                 440                 445

Val Tyr Ala Val Ser Met Phe Asn Pro Gln Gly Asn Asp Met Thr Lys
                450                 455                 460

Gly Met Leu Thr Leu Ala Lys Gly Lys Pro Ile Gly Leu Asp Gly Phe
465                 470                 475                 480

Tyr Trp Leu Lys Ile His Gly Ala Asn Cys Ala Gly Val Asp Lys Val
                485                 490                 495

Pro Phe Pro Glu Arg Ile Lys Phe Ile Glu Glu Asn Glu Gly Asn Ile
                500                 505                 510
```

Leu Ala Ser Ala Ala Asp Pro Leu Asn Asn Thr Trp Trp Thr Gln Gln
        515                 520                 525

Asp Ser Pro Phe Cys Phe Leu Ala Phe Cys Phe Glu Tyr Ala Gly Val
        530                 535                 540

Lys His His Gly Leu Asn Tyr Asn Cys Ser Leu Pro Leu Ala Phe Asp
545                 550                 555                 560

Gly Ser Cys Ser Gly Ile Gln His Phe Ser Ala Met Leu Arg Asp Ser
                565                 570                 575

Ile Gly Gly Arg Ala Val Asn Leu Leu Pro Ser Asp Thr Val Gln Asp
            580                 585                 590

Ile Tyr Lys Ile Val Ala Asp Lys Val Asn Glu Val Leu His Gln His
        595                 600                 605

Ala Val Asn Gly Ser Gln Thr Val Val Glu Gln Ile Ala Asp Lys Glu
    610                 615                 620

Thr Gly Glu Phe His Glu Lys Val Thr Leu Gly Glu Ser Val Leu Ala
625                 630                 635                 640

Ala Gln Trp Leu Gln Tyr Gly Val Thr Arg Lys Val Thr Lys Arg Ser
                645                 650                 655

Val Met Thr Leu Ala Tyr Gly Ser Lys Glu Phe Gly Phe Arg Gln Gln
            660                 665                 670

Val Leu Glu Asp Thr Ile Gln Pro Ala Ile Asp Asn Gly Glu Gly Leu
        675                 680                 685

Met Phe Thr His Pro Asn Gln Ala Ala Gly Tyr Met Ala Lys Leu Ile
    690                 695                 700

Trp Asp Ala Val Thr Val Thr Val Val Ala Ala Val Glu Ala Met Asn
705                 710                 715                 720

Trp Leu Lys Ser Ala Ala Lys Leu Leu Ala Ala Glu Val Lys Asp Lys
                725                 730                 735

Lys Thr Lys Glu Val Leu Arg Lys Arg Cys Ala Ile His Trp Val Thr
            740                 745                 750

Pro Asp Gly Phe Pro Val Trp Gln Glu Tyr Arg Lys Gln Asn Gln Ala
        755                 760                 765

Arg Leu Lys Leu Val Phe Leu Gly Gln Ala Asn Val Lys Met Thr Tyr
    770                 775                 780

Asn Thr Gly Lys Asp Ser Glu Ile Asp Ala His Lys Gln Glu Ser Gly
785                 790                 795                 800

Ile Ala Pro Asn Phe Val His Ser Gln Asp Gly Ser His Leu Arg Met
                805                 810                 815

Thr Val Val His Ala Asn Glu Val Tyr Gly Ile Asp Ser Phe Ala Leu
            820                 825                 830

Ile His Asp Ser Phe Gly Thr Ile Pro Ala Asp Ala Gly Asn Leu Phe
        835                 840                 845

Lys Ala Val Arg Glu Thr Met Val Lys Thr Tyr Glu Asp Asn Asp Val
    850                 855                 860

Ile Ala Asp Phe Tyr Asp Gln Phe Ala Asp Gln Leu His Glu Ser Gln
865                 870                 875                 880

Leu Asp Lys Met Pro Ala Val Pro Ala Lys Gly Asp Leu Asn Leu Arg
                885                 890                 895

Asp Ile Leu Glu Ser Asp Phe Ala Phe Ala
            900                 905

<210> SEQ ID NO 31
<211> LENGTH: 884
<212> TYPE: PRT

<213> ORGANISM: Unknown
<220> FEATURE:
<223> OTHER INFORMATION: Salmonella phage phiSG-JL2 sequence

<400> SEQUENCE: 31

```
Met Asn Ile Ile Glu Asn Ile Glu Lys Asn Asp Phe Ser Glu Ile Glu
1               5                   10                  15

Leu Ala Ala Ile Pro Phe Asn Thr Leu Ala Asp His Tyr Gly Ser Ala
            20                  25                  30

Leu Ala Arg Glu Gln Leu Ala Leu Glu His Glu Ser Tyr Glu Leu Gly
        35                  40                  45

Glu Arg Arg Phe Leu Lys Met Leu Glu Arg Gln Ala Lys Ala Gly Glu
    50                  55                  60

Ile Ala Asp Asn Ala Ala Ala Lys Pro Leu Leu Ala Thr Leu Leu Pro
65                  70                  75                  80

Lys Leu Thr Ala Arg Ile Val Glu Trp Leu Glu Glu Tyr Ala Ser Lys
                85                  90                  95

Lys Gly Arg Lys Pro Val Ala Tyr Ala Pro Leu Gln Leu Leu Lys Pro
            100                 105                 110

Glu Ala Ser Ala Phe Ile Thr Leu Lys Val Ile Leu Ala Ser Leu Thr
        115                 120                 125

Ser Thr Asn Met Thr Thr Ile Gln Ala Ala Gly Met Leu Gly Lys
    130                 135                 140

Ala Ile Glu Asp Glu Ala Arg Phe Gly Arg Ile Arg Asp Leu Glu Ala
145                 150                 155                 160

Lys His Phe Lys Lys His Val Glu Glu Gln Leu Asn Lys Arg His Gly
                165                 170                 175

Gln Val Tyr Lys Lys Ala Phe Met Gln Val Val Glu Ala Asp Met Ile
            180                 185                 190

Gly Arg Gly Leu Leu Gly Gly Glu Ala Trp Ser Ser Trp Asp Lys Glu
        195                 200                 205

Thr Thr Met His Val Gly Ile Arg Leu Ile Glu Met Leu Ile Glu Ser
    210                 215                 220

Thr Gly Leu Val Glu Leu Gln Arg His Asn Ala Gly Asn Ala Gly Ser
225                 230                 235                 240

Asp His Glu Ala Leu Gln Leu Ala Gln Glu Tyr Val Asp Val Leu Ala
                245                 250                 255

Lys Arg Ala Gly Ala Leu Ala Gly Ile Ser Pro Met Phe Gln Pro Cys
            260                 265                 270

Val Val Pro Pro Lys Pro Trp Val Ala Ile Thr Gly Gly Gly Tyr Trp
        275                 280                 285

Ala Asn Gly Arg Arg Pro Leu Ala Leu Val Arg Thr His Ser Lys Lys
    290                 295                 300

Gly Leu Met Arg Tyr Glu Asp Val Tyr Met Pro Glu Val Tyr Lys Ala
305                 310                 315                 320

Val Asn Ile Ala Gln Asn Thr Ala Trp Lys Ile Asn Lys Lys Val Leu
                325                 330                 335

Ala Val Val Asn Glu Ile Val Asn Trp Lys Asn Cys Pro Val Ala Asp
            340                 345                 350

Ile Pro Ser Leu Glu Arg Gln Glu Leu Pro Pro Lys Pro Asp Asp Ile
        355                 360                 365

Asp Thr Asn Glu Ala Ala Leu Lys Glu Trp Lys Lys Ala Ala Ala Gly
    370                 375                 380

Val Tyr Arg Leu Asp Lys Ala Arg Val Ser Arg Arg Ile Ser Leu Glu
```

```
385                 390                 395                 400
Phe Met Leu Glu Gln Ala Asn Lys Phe Ala Ser Lys Lys Ala Ile Trp
                405                 410                 415
Phe Pro Tyr Asn Met Asp Trp Arg Gly Arg Val Tyr Ala Val Pro Met
                420                 425                 430
Phe Asn Pro Gln Gly Asn Asp Met Thr Lys Gly Leu Leu Thr Leu Ala
                435                 440                 445
Lys Gly Lys Pro Ile Gly Glu Glu Gly Phe Tyr Trp Leu Lys Ile His
                450                 455                 460
Gly Ala Asn Cys Ala Gly Val Asp Lys Val Pro Phe Pro Glu Arg Ile
465                 470                 475                 480
Ala Phe Ile Glu Lys His Val Asp Asp Ile Leu Ala Cys Ala Lys Asp
                485                 490                 495
Pro Ile Asn Asn Thr Trp Trp Ala Glu Gln Asp Ser Pro Phe Cys Phe
                500                 505                 510
Leu Ala Phe Cys Phe Glu Tyr Ala Gly Val Ala His His Gly Leu Ser
                515                 520                 525
Tyr Asn Cys Ser Leu Pro Leu Ala Phe Asp Gly Ser Cys Ser Gly Ile
                530                 535                 540
Gln His Phe Ser Ala Met Leu Arg Asp Glu Val Gly Gly Arg Ala Val
545                 550                 555                 560
Asn Leu Leu Pro Ser Glu Thr Val Gln Asp Ile Tyr Gly Ile Val Ala
                565                 570                 575
Gln Lys Val Asn Glu Ile Leu Lys Gln Asp Ala Ile Asn Gly Thr Pro
                580                 585                 590
Asn Glu Met Ile Thr Val Thr Asp Lys Asp Thr Gly Glu Ile Ser Glu
                595                 600                 605
Lys Leu Lys Leu Gly Thr Ser Thr Leu Ala Gln Gln Trp Leu Ala Tyr
                610                 615                 620
Gly Val Thr Arg Ser Val Thr Lys Arg Ser Val Met Thr Leu Ala Tyr
625                 630                 635                 640
Gly Ser Lys Glu Phe Gly Phe Arg Gln Gln Val Leu Asp Asp Thr Ile
                645                 650                 655
Gln Pro Ala Ile Asp Ser Gly Lys Gly Leu Met Phe Thr Gln Pro Asn
                660                 665                 670
Gln Ala Ala Gly Tyr Met Ala Lys Leu Ile Trp Asp Ala Val Ser Val
                675                 680                 685
Thr Val Val Ala Ala Val Glu Ala Met Asn Trp Leu Lys Ser Ala Ala
                690                 695                 700
Lys Leu Leu Ala Ala Glu Val Lys Asp Lys Lys Thr Lys Glu Ile Leu
705                 710                 715                 720
Arg His Arg Cys Ala Val His Trp Thr Thr Pro Asp Gly Phe Pro Val
                725                 730                 735
Trp Gln Glu Tyr Arg Lys Pro Leu Gln Lys Arg Leu Asp Met Ile Phe
                740                 745                 750
Leu Gly Gln Phe Arg Leu Gln Pro Thr Ile Asn Thr Leu Lys Asp Ser
                755                 760                 765
Gly Ile Asp Ala His Lys Gln Glu Ser Gly Ile Ala Pro Asn Phe Val
                770                 775                 780
His Ser Gln Asp Gly Ser His Leu Arg Met Thr Val Val Tyr Ala His
785                 790                 795                 800
Glu Lys Tyr Gly Ile Glu Ser Phe Ala Leu Ile His Asp Ser Phe Gly
                805                 810                 815
```

```
Thr Ile Pro Ala Asp Ala Gly Lys Leu Phe Lys Ala Val Arg Glu Thr
            820                 825                 830

Met Val Leu Thr Tyr Glu Asn Asn Asp Val Leu Ala Asp Phe Tyr Asp
            835                 840                 845

Gln Phe Ala Asp Gln Leu His Glu Thr Gln Leu Asp Lys Met Pro Pro
850                 855                 860

Leu Pro Lys Lys Gly Lys Leu Asn Leu Gln Asp Ile Leu Lys Ser Asp
865                 870                 875                 880

Phe Ala Phe Ala

<210> SEQ ID NO 32
<211> LENGTH: 883
<212> TYPE: PRT
<213> ORGANISM: Unknown
<220> FEATURE:
<223> OTHER INFORMATION: Yersinia phage Berlin sequence

<400> SEQUENCE: 32

Met Thr Asn Val Ile Asn Ala Pro Lys Asn Asp Phe Ser Asp Ile Ala
1               5                   10                  15

Asn Ala Ile Gln Pro Tyr Asn Ile Leu Ala Asp His Tyr Gly Ala Gln
            20                  25                  30

Leu Ala Ala Thr Gln Leu Glu Leu Glu His Glu Ala His Thr Glu Gly
        35                  40                  45

Glu Lys Arg Phe Leu Lys Ala Met Glu Arg Gln Ile Lys Ala Gly Glu
    50                  55                  60

Phe Gly Asp Asn Thr Val Ala Lys Pro Leu Ser Ser Leu Ala Pro
65                  70                  75                  80

Lys Phe Ile Glu Ala Trp Asn Thr Trp Phe Ile Asp Val Glu Ala Lys
                85                  90                  95

Arg Gly Lys Arg Pro Val Ala Tyr Asn Leu Val Gln Lys Val Ala Pro
            100                 105                 110

Glu Ala Ala Ala Phe Ile Thr Leu Lys Val Thr Leu Ala Cys Leu Thr
        115                 120                 125

Lys Glu Glu Phe Thr Asn Leu Gln Ser Val Ala Thr Lys Ile Gly Arg
    130                 135                 140

Ser Ile Glu Asp Glu Leu Arg Phe Gly Arg Ile Arg Asp Glu Glu Ala
145                 150                 155                 160

Lys His Phe Lys Asn His Val Gln Glu Ala Leu Asn Lys Arg Val Gly
                165                 170                 175

Ile Val Tyr Lys Lys Ala Phe Met Gln Ala Val Glu Gly Lys Met Leu
            180                 185                 190

Asp Ala Gly Gln Leu Gln Thr Lys Trp Thr Thr Trp Thr Pro Glu Glu
        195                 200                 205

Val Ile His Val Gly Val Arg Met Leu Glu Leu Leu Ile Gly Ser Thr
    210                 215                 220

Gly Leu Val Glu Leu His Arg Pro Phe Ala Gly Asn Ile Glu Lys Asp
225                 230                 235                 240

Gly Glu Tyr Ile Gln Leu Thr Glu Gln Tyr Val Asp Leu Leu Ser Lys
                245                 250                 255

Arg Ala Gly Ala Leu Ala Ala Ile Ala Pro Met Tyr Gln Pro Cys Val
            260                 265                 270

Val Pro Pro Lys Pro Trp Thr Ser Pro Val Gly Gly Gly Tyr Trp Ala
        275                 280                 285
```

-continued

```
Ala Gly Arg Lys Pro Leu Ser Met Val Arg Thr Gly Ser Lys Lys Gly
290                     295                 300
Leu Glu Arg Tyr Asn Asp Val Tyr Met Pro Glu Val Tyr Lys Ala Val
305                 310                 315                 320
Asn Ile Ala Gln Asn Thr Pro Trp Lys Ile Asn Lys Lys Val Leu Ala
                325                 330                 335
Val Val Asn Glu Ile Val Asn Trp Lys His Cys Pro Val Ala Asp Val
            340                 345                 350
Pro Ala Met Glu Arg Gly Glu Leu Pro Val Lys Pro Val Asp Ile Asp
        355                 360                 365
Thr Asn Glu Ala Ser Leu Lys Ala Trp Lys Lys Ala Ala Ser Ala Ile
370                 375                 380
Tyr Arg Lys Glu Lys Ala Arg Val Ser Arg Arg Met Ser Met Glu Phe
385                 390                 395                 400
Met Leu Gly Gln Ala Asn Lys Phe Ala Gln Phe Lys Ala Ile Trp Phe
                405                 410                 415
Pro Met Asn Met Asp Trp Arg Gly Arg Val Tyr Ala Val Pro Met Phe
            420                 425                 430
Asn Pro Gln Gly Asn Asp Met Thr Lys Gly Leu Leu Thr Leu Ala Lys
        435                 440                 445
Gly Lys Pro Ile Gly Val Asp Gly Phe Tyr Trp Leu Lys Ile His Gly
    450                 455                 460
Ala Asn Thr Ala Gly Val Asp Lys Val Asp Phe Ala Glu Arg Ile Lys
465                 470                 475                 480
Phe Ile Glu Asp Asn His Glu Asn Ile Met Ser Val Ala Ala Asp Pro
                485                 490                 495
Ile Ala Asn Thr Trp Trp Thr Glu Gln Asp Ser Pro Phe Cys Phe Leu
            500                 505                 510
Ala Phe Cys Phe Glu Tyr Ala Gly Val Gln His His Gly Met Asn Tyr
        515                 520                 525
Asn Cys Ser Leu Pro Leu Ala Phe Asp Gly Ser Cys Ser Gly Ile Gln
    530                 535                 540
His Phe Ser Ala Met Leu Arg Asp Glu Val Gly Gly Arg Ala Val Asn
545                 550                 555                 560
Leu Leu Pro Ser Lys Glu Val Gln Asp Ile Tyr Arg Ile Val Ala Glu
                565                 570                 575
Arg Val Asn Glu Ile Leu Asn Gln Asp Val Ile Asn Gly Thr Asp Asn
            580                 585                 590
Glu Val Glu Thr Leu Thr Asn Lys Asp Thr Gly Glu Ile Thr Glu Lys
        595                 600                 605
Leu Lys Leu Gly Thr Lys Glu Leu Ala Gly Gln Trp Leu Ala Tyr Gly
    610                 615                 620
Val Thr Arg Lys Val Thr Lys Arg Ser Val Met Thr Leu Ala Tyr Gly
625                 630                 635                 640
Ser Lys Glu Tyr Gly Phe Arg Asp Gln Val Leu Glu Asp Thr Ile Gln
                645                 650                 655
Pro Ala Ile Asp Asp Gly Lys Gly Leu Met Phe Thr Gln Pro Asn Gln
            660                 665                 670
Ala Ala Gly Tyr Met Ala Lys Leu Ile Trp Asn Ala Val Thr Val Thr
        675                 680                 685
Val Val Ala Ala Val Glu Ala Met Asn Trp Leu Lys Ser Ala Ala Lys
    690                 695                 700
Leu Leu Ala Ala Glu Val Lys Asp Lys Lys Thr Lys Glu Val Leu Arg
```

```
                705                 710                 715                 720
        Asn Arg Cys Ala Val Tyr Trp Val Thr Pro Asp Gly Phe Pro Val Trp
                        725                 730                 735

Gln Glu Tyr Arg Lys Pro Val Gln Thr Arg Leu Asn Leu Met Phe Leu
                        740                 745                 750

Gly Gln Ile Arg Leu Gln Pro Thr Val Asn Thr Asn Lys Asp Ser Gly
                        755                 760                 765

Ile Asp Ala Arg Lys Gln Glu Ser Gly Ile Ala Pro Asn Phe Val His
                        770                 775                 780

Ser Met Asp Gly Ser His Leu Arg Met Thr Val Val Arg Ser Tyr Glu
        785                 790                 795                 800

Val Tyr Gly Val Glu Ser Phe Ala Leu Ile His Asp Ser Phe Gly Thr
                        805                 810                 815

Ile Pro Ala Asp Ala Gly Asn Leu Phe Lys Ala Val Arg Glu Thr Met
                        820                 825                 830

Val Asn Thr Tyr Glu Glu Asn Asp Val Leu Ala Asp Phe Tyr Asp Gln
                        835                 840                 845

Phe Ala Asp Gln Leu His Glu Ser Gln Leu Asp Lys Met Pro Glu Met
                        850                 855                 860

Pro Ala Lys Gly Ser Leu Asp Ile Gln Glu Ile Leu Lys Ser Asp Phe
        865                 870                 875                 880

Ala Phe Ala

<210> SEQ ID NO 33
        <211> LENGTH: 883
        <212> TYPE: PRT
        <213> ORGANISM: Unknown
        <220> FEATURE:
        <223> OTHER INFORMATION: Salmonella phage Vi06 sequence

<400> SEQUENCE: 33

Met Asn Thr Ile Ser Ile Thr Lys Asn Asp Phe Ser Asp Ile Glu Leu
        1               5                   10                  15

Ala Ala Ile Pro Phe Asn Thr Leu Ala Asp His Tyr Gly Glu Arg Leu
                        20                  25                  30

Ala Arg Glu Gln Leu Ala Leu Glu His Glu Ser Tyr Glu Met Gly Glu
                        35                  40                  45

Val Arg Phe Arg Lys Met Phe Glu Arg Gln Leu Lys Ala Gly Glu Ile
                        50                  55                  60

Ala Asp Asn Asp Ala Thr Lys Pro Leu Ile Thr Thr Leu Leu Pro Lys
        65                  70                  75                  80

Met Ile Ala Arg Ile Asn Ser Trp Phe Lys Glu Val Gln Ala Lys Cys
                        85                  90                  95

Gly Lys Arg Pro Thr Ala Phe Gln Phe Leu Gln Gly Ile Lys Pro Glu
                        100                 105                 110

Ala Ile Ala Tyr Ile Thr Ile Lys Thr Leu Ala Arg Leu Thr Ser
                        115                 120                 125

Met Asp Asn Thr Thr Val Gln Ala Val Ala Ser Ala Ile Gly Arg Ala
        130                 135                 140

Ile Glu Asp Glu Ala Arg Phe Gly Arg Ile Arg Asp Leu Glu Ala Lys
        145                 150                 155                 160

His Phe Lys Lys Asn Val Glu Glu Gln Leu Asn Lys Arg Val Gly His
                        165                 170                 175

Val Tyr Lys Lys Ala Phe Met Gln Val Ile Glu Ala Asp Met Leu Ser
                        180                 185                 190
```

-continued

```
Lys Gly Leu Leu Gly Gly Glu Ser Trp Ser Trp His Lys Glu Asp
            195                 200                 205

Ser Ile His Val Gly Val Arg Cys Ile Glu Met Leu Ile Glu Ser Thr
    210                 215                 220

Gly Met Val Ser Leu His Arg Gln Asn Ala Gly Val Val Gly Gln Asp
225                 230                 235                 240

Ser Glu Thr Ile Glu Leu Ala Pro Glu Tyr Ala Glu Ala Ile Ala Thr
                245                 250                 255

Arg Ala Gly Ala Leu Ala Gly Ile Ser Pro Met Phe Gln Pro Cys Val
                260                 265                 270

Val Pro Pro Lys Pro Trp Thr Ser Ile Ser Gly Gly Tyr Trp Ala
            275                 280                 285

Asn Gly Arg Arg Pro Leu Ala Leu Val Arg Thr His Ser Lys Lys Ala
290                 295                 300

Leu Met Arg Tyr Ala Asp Val Tyr Met Pro Glu Val Tyr Lys Ala Val
305                 310                 315                 320

Asn Ile Ala Gln Asn Thr Ala Trp Arg Ile Asn Lys Lys Val Leu Ala
                325                 330                 335

Val Ala Asn Val Val Thr Lys Trp Lys His Cys Pro Val Asp Tyr Ile
                340                 345                 350

Pro Thr Ile Glu Arg Glu Glu Leu Pro Met Lys Pro Glu Asp Ile Asp
            355                 360                 365

Thr Asn Pro Glu Ala Leu Ala Ser Trp Lys Arg Ala Ala Ala Val
    370                 375                 380

Tyr Arg Lys Asp Lys Ala Arg Lys Ser Arg Arg Met Ser Leu Glu Phe
385                 390                 395                 400

Met Leu Glu Gln Ala Asn Lys Phe Ala Asn His Arg Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
            435                 440                 445

Gly Lys Pro Ile Gly Lys Glu Gly Phe Tyr Trp Leu Lys Ile His Gly
    450                 455                 460

Ala Asn Cys Ala Gly Val Asp Lys Val Pro Phe Pro Glu Arg Ile Lys
465                 470                 475                 480

Phe Ile Glu Asp Asn His Glu Asn Ile Leu Ala Cys Ala Lys Ser Pro
                485                 490                 495

Leu Glu Asn Thr Trp Trp Ser Glu Gln Asp Ser Pro Phe Cys Phe Leu
            500                 505                 510

Ala Phe Cys Phe Glu Tyr Ala Gly Gly Gln His His Gly Leu Ser Tyr
    515                 520                 525

Asn Cys Ser Leu Pro Leu Ala Phe Asp Gly Ser Cys Phe Gly Ile Gln
530                 535                 540

His Phe Ser Val Met Leu Arg Asp Glu Val Gly Gly Arg Ala Val Asn
545                 550                 555                 560

Leu Leu Pro Ser Glu Thr Val Gln Asp Ile Tyr Gly Ile Val Ala Lys
                565                 570                 575

Lys Val Asn Glu Ile Leu Gln Val Asp Met Ile Asn Gly Thr Asp Asn
            580                 585                 590

Glu Val Val Thr Val Thr Asp Asp Lys Thr Gly Glu Ile Tyr Glu Lys
    595                 600                 605
```

Ile Lys Leu Gly Thr Lys Glu Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr His Pro Asn Gln
            660                 665                 670

Ala Ala Gly Tyr Met Ala Lys Leu Ile Trp Glu Ala Ser Val Thr
        675                 680                 685

Val Val Ala Ala Val Glu Ala Met Asn Trp Leu Lys Ser Ala Ala Lys
690                 695                 700

Leu Leu Ala Val Glu Val Lys Asp Arg Lys Thr Gly Glu Ile Leu Arg
705                 710                 715                 720

Lys Arg Cys Ala Val His Trp Thr Thr Pro Asp Gly Phe Pro Val Trp
                725                 730                 735

Gln Glu Tyr Lys Lys Pro Val Gln Thr Arg Leu Asn Leu Ile Phe Leu
                740                 745                 750

Gly Gln Phe Arg Leu Gln Pro Thr Ile Asn Thr Asn Arg Asp Ser Glu
            755                 760                 765

Ile Asp Ala Tyr Lys Gln Glu Ser Gly Ile Ala Pro Asn Phe Val His
770                 775                 780

Ser Gln Asp Gly Ser His Leu Arg Lys Thr Val Val Trp Ala His Glu
785                 790                 795                 800

Lys Tyr Gly Ile Asp Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Ala Thr Tyr Glu Ser Cys Asp Val Leu Ala Asp Phe Tyr Ala Gln
                835                 840                 845

Phe Ala Asp Gln Leu His Lys Ser Gln Leu Asp Lys Met Pro Val Leu
        850                 855                 860

Pro Ser Lys Gly Asn Leu Asn Leu Gln Asp Ile Leu Lys Ser Asp Phe
865                 870                 875                 880

Ala Phe Ala

<210> SEQ ID NO 34
<211> LENGTH: 885
<212> TYPE: PRT
<213> ORGANISM: Unknown
<220> FEATURE:
<223> OTHER INFORMATION: Pseudomonad phage gh-1 sequence

<400> SEQUENCE: 34

Met Thr Ile Ala Ile Pro Glu Arg His Asp Phe Ser Asp Ile Asn Ser
1               5                   10                  15

Ser Ala Ala Phe Asp Ala Leu Ser Asn Ile Tyr Gly Pro Ala Leu Ala
                20                  25                  30

Ala Glu Gln Leu Gln Leu Glu His Glu Ala Tyr Thr Leu Gly Glu Glu
        35                  40                  45

Arg Phe His Lys Ala Met Glu Arg Gln Met Glu Arg Gly Glu Phe Ser
    50                  55                  60

Asn Ser Gln Val Ala Lys Pro Leu Leu Gly His Leu Val Pro Met Leu
65                  70                  75                  80

Ser Lys Ala Ile Thr Asp Trp Ile Glu His Gln Thr Thr Lys Val Arg

-continued

```
                85                  90                  95
Arg Lys His Val Ala Leu Gly Ala Phe Gln Gln Met Asn Pro Glu Thr
                100                 105                 110
Met Ala Ser Ile Val Ile Arg Trp Thr Ile Asn Arg Ile Ala Gln Arg
                115                 120                 125
Ser Gly Ala Pro Thr Ile Thr Glu Met Ala Val Ser Ile Gly Gly Ala
                130                 135                 140
Leu Glu Glu Glu Ala Arg Phe Gly Arg Ile Arg Val Leu Glu Gln Gln
145                 150                 155                 160
His Tyr Gln Lys His Ile Lys Lys Ala Leu Ala Gln Arg Asn Gly Met
                165                 170                 175
Thr Tyr Lys Val Ala Tyr Met Glu Lys Val Glu Ala His Met Ile Glu
                180                 185                 190
Ala Gly Gln Leu Asn Glu Pro Trp Thr Glu Trp Asp Gln Ser Gly Ala
                195                 200                 205
Asp Val Arg Tyr His Met Gly Ile Arg Met Leu Glu Leu Leu Ile Glu
                210                 215                 220
Ser Thr Gln Leu Ile Glu Val Val Arg Glu His Lys Gly Asn Lys Lys
225                 230                 235                 240
Leu Asp Gly Glu Tyr Val Tyr Leu Lys Ala Glu Trp Ala Asp Lys Leu
                245                 250                 255
Gln Ser Arg Ala Tyr Ile Leu Ser Gly Val Phe Pro Arg Tyr Gln Pro
                260                 265                 270
Met Val Val Pro Pro Lys Pro Trp Asn Gly Val Arg Gly Gly Gly Tyr
                275                 280                 285
Trp Ala Lys Gly Arg Lys Pro Val Thr Phe Ile Arg Val Pro Thr Lys
                290                 295                 300
Arg Ala Leu Asn Arg Tyr Arg Asp Val His Met Pro Glu Val Tyr Lys
305                 310                 315                 320
Ala Val Asn Leu Ala Gln Ala Thr Pro Trp Ala Ile Asn Gln Lys Val
                325                 330                 335
Leu Ala Val Ala Asn Ala Val Met Ser Trp Glu Asn Val Pro Ile Lys
                340                 345                 350
Glu Phe Pro Ser Thr Glu Arg Glu Ala Leu Pro Ile Lys Pro Gly Asp
                355                 360                 365
Ile Glu Thr Asn Glu Glu Ala Leu Lys Ala Trp Lys Lys Ala Ala Ala
                370                 375                 380
Gly Val Tyr Arg Lys Asp Ala Ala Arg Val Ser Arg Arg Leu Ser Tyr
385                 390                 395                 400
Glu Phe Ser Leu Glu Gln Ala Asn Lys Phe Ala Glu Tyr Asp Ala Ile
                405                 410                 415
Tyr Phe Pro Tyr Asn Leu Asp Trp Arg Gly Arg Val Tyr Ala Ile Pro
                420                 425                 430
Ala Phe Asn Pro Gln Ser Asn Asp Met Thr Lys Gly Ile Leu Gln Ala
                435                 440                 445
Ala Lys Gly Glu Pro Val Gly Lys Asp Gly Ile Glu Trp Leu Met Ile
                450                 455                 460
His Gly Ala Asn Cys Ala Gly Val Asp Lys Val Asp Phe Ser Gln Arg
465                 470                 475                 480
Lys Gln Trp Ile Lys Asp Asn Glu Glu Met Ile Leu Arg Cys Ala His
                485                 490                 495
Asp Pro Leu Ile Asn Thr Asp Trp Met Asp Met Asp Ser Pro Phe Cys
                500                 505                 510
```

Phe Leu Ala Phe Cys Phe Glu Trp Gln Gly Val Lys Leu His Gly Glu
    515                 520                 525

Ala His Val Ser Ala Leu Pro Ile Ala Phe Asp Gly Ser Cys Ser Gly
530                 535                 540

Ile Gln His Phe Ser Ala Met Leu Arg Asp Glu Arg Gly Gly Arg Ala
545                 550                 555                 560

Val Asn Leu Leu Gln Ser Asp Asp Val Gln Asp Ile Tyr Lys Leu Val
                565                 570                 575

Ser Asp Glu Val Glu Ile Ala Leu Gln Trp Asp Leu Lys Tyr Gly Thr
            580                 585                 590

Glu Asp Ser Thr Val Leu Asp Thr Asn Glu Asp Thr Gly Glu Ile Thr
        595                 600                 605

Glu Arg Arg Val Leu Gly Thr Lys Thr Leu Ala Met Ala Trp Leu Thr
    610                 615                 620

Tyr Gly Met Ser Arg Lys Val Thr Lys Arg Ser Val Met Thr Leu Ala
625                 630                 635                 640

Tyr Gly Ser Lys Ala Tyr Gly Phe Ala Asp Gln Val Arg Glu Asp Ile
                645                 650                 655

Val Lys Lys Ala Ile Asp Asn Gly Asp Gly Glu Met Phe Thr Ser Pro
            660                 665                 670

Gly Glu Ala Ser Arg Tyr Met Ala Gly Lys Ile Trp Asp Ser Val Ser
        675                 680                 685

Val Val Val Val Ala Ala Val Glu Ala Met Asn Trp Leu Gln Lys Ala
    690                 695                 700

Ala Lys Leu Leu Ala Ser Glu Val Lys Cys Lys Thr Lys Gln Val
705                 710                 715                 720

Leu Lys Pro Ala Met Pro Val Tyr Trp Val Thr Pro Asp Gly Phe Pro
                725                 730                 735

Val Trp Gln Glu Tyr Met Ile Pro Glu Thr Arg Arg Ile Asp Leu Met
            740                 745                 750

Phe Leu Gly Asp Val Arg Ile Gln Ala Thr Val Thr Val Arg Asp Ser
        755                 760                 765

Asp Lys Ile Asp Ala Arg Lys Gln Glu Ser Gly Ile Ser Pro Asn Phe
    770                 775                 780

Val His Ser Gln Asp Gly Ser His Leu Arg Lys Thr Val His Ala
785                 790                 795                 800

Ala Glu Arg Tyr Gly Ile Glu Phe Phe Ala Leu Ile His Asp Ser Phe
                805                 810                 815

Gly Thr Ile Pro Ala His Ala Gly Ala Met Phe Lys Ala Val Arg Glu
            820                 825                 830

Thr Met Val Glu Thr Tyr Glu Ser Asn Asn Val Leu Glu Asp Phe Arg
        835                 840                 845

Glu Gln Phe Met Asp Gln Leu His Glu Ser Gln Leu Asp Lys Met Pro
    850                 855                 860

Pro Ile Pro Glu Met Gly Thr Leu Asp Ile Arg Glu Ile Leu Lys Ser
865                 870                 875                 880

Gln Phe Ala Phe Ala
                885

<210> SEQ ID NO 35
<211> LENGTH: 893
<212> TYPE: PRT
<213> ORGANISM: Unknown
<220> FEATURE:

-continued

<223> OTHER INFORMATION: Escherichia phage K1F sequence

<400> SEQUENCE: 35

```
Met Ser Val Ile Ser Ile Asp Lys His Asp Phe Ser Asp Val Ser Asn
1               5                   10                  15

Ala Ile Glu Pro Phe Asn Leu Leu Ala Asp His Tyr Gly Gln Asp Leu
            20                  25                  30

Ala Val Lys Gln Leu Gln Leu Glu His Glu Ala Tyr Thr Glu Gly Glu
        35                  40                  45

Arg Arg Phe Ile Lys Asn Leu Glu Arg Gln Thr Glu Arg Gly Glu Leu
    50                  55                  60

Ala Asp Asn Gln Val Ala Lys Pro Leu Met Gln Thr Leu Val Pro Lys
65                  70                  75                  80

Ile Ala Gln Ala Val Lys Glu Trp His Glu Gly Pro Asp Gly Lys Leu
                85                  90                  95

Ser Thr Ser Arg Pro Ser Val Ala Phe Thr Met Leu Ser Thr Glu Glu
            100                 105                 110

Arg Ala Val Lys Asp Arg Ser Leu Arg Ile Ser Cys Glu Ser Ala Ala
        115                 120                 125

Val Ile Ile Leu Lys Val Ile Leu Ser Lys Leu Val Lys Pro Glu Gly
130                 135                 140

Ile Pro Ile Thr Pro Met Ala Ser Ala Ile Gly Arg Thr Leu Glu Asp
145                 150                 155                 160

Glu Ile Arg Phe Gly Arg Ile Arg Asp Lys Glu Lys Glu His Phe Lys
                165                 170                 175

Lys Ala Ile Ala Asp Asn Leu Asn Lys Arg Ala Gly Ala Ser Tyr Lys
            180                 185                 190

Lys Ala Tyr Met Gln Ala Val Glu Ala Ser Met Leu Glu Gln Gly Gln
        195                 200                 205

Leu Glu Asp Ala Trp Gly Thr Trp Ser Pro Thr Glu Ala Val His Val
    210                 215                 220

Gly Ile Lys Met Leu Glu Ile Val Ile Gln Ser Thr Gln Leu Val Glu
225                 230                 235                 240

Leu Lys Arg Tyr Gly Ala Gly Asn Ala Ala Ala Asp Val Glu Met Val
                245                 250                 255

His Leu Ser Asp Phe Trp Val Lys Met Ala Gln Arg Gly Phe Ser
            260                 265                 270

Leu Ala Gly Ile Ala Pro Val Tyr Gln Pro Cys Val Pro Pro Lys
        275                 280                 285

Pro Trp Thr Gly Val Val Gly Gly Tyr Trp Ala Lys Gly Arg Arg
    290                 295                 300

Pro Leu Pro Leu Ile Arg Leu Gly Ser Lys Ser Ala Val Ala Arg Tyr
305                 310                 315                 320

Glu Asp Val Tyr Met Pro Glu Val Tyr Glu Ala Val Asn Ile Ile Gln
                325                 330                 335

Asn Thr Pro Trp Lys Val Asn Lys Val Leu Asp Val Val Asn Met
            340                 345                 350

Val Glu Lys Leu Asn Asn Thr Pro Ile Asp Asp Ile Pro Gln Met Glu
        355                 360                 365

Pro Leu Lys Pro Glu Ala Tyr Ala Gly Glu Thr Glu Glu Leu Lys
    370                 375                 380

Ala Trp Lys Lys Ala Ala Ala Gly Ile Tyr Arg Arg Glu Lys Ala Arg
385                 390                 395                 400
```

-continued

```
Gln Ser Arg Arg Leu Ser Leu Ser Phe Ile Val Asn Gln Ala Asn Lys
            405                 410                 415

Phe Ser Gln Phe Lys Ala Ile Trp Phe Pro Tyr Asn Met Asp Trp Arg
        420                 425                 430

Gly Arg Val Tyr Ala Val Pro Met Phe Asn Pro Gln Gly Asn Asp Met
            435                 440                 445

Gln Lys Gly Leu Leu Thr Leu Ala Val Gly Lys Pro Ile Gly Ala Asp
    450                 455                 460

Gly Phe Lys Trp Leu Lys Val His Gly Ala Asn Cys Ala Gly Val Asp
465                 470                 475                 480

Lys Val Thr Phe Glu Glu Arg Ile Lys Trp Val Glu Asp Asn His Asp
                485                 490                 495

Asn Ile Met Ala Ala Lys Ala Pro Met Asp Ser Ile Glu Trp Trp
            500                 505                 510

Gly Lys Leu Asp Ser Pro Phe Cys Phe Leu Ala Phe Cys Phe Glu Tyr
            515                 520                 525

Ala Gly Val Met His His Gly Leu Ser Tyr Ser Cys Ser Leu Pro Ile
    530                 535                 540

Ala Phe Asp Gly Ser Cys Ser Gly Ile Gln His Phe Ser Ala Met Leu
545                 550                 555                 560

Arg Asp His Ile Gly Gly His Ala Val Asn Leu Thr Pro Ser Gly Lys
                565                 570                 575

Val Gln Asp Ile Tyr Arg Ile Val Ser Asp Arg Ile Glu Glu Leu
            580                 585                 590

Lys Val Leu Leu Val Asn Gly Thr Asp Asn Glu Met Val Thr His Glu
    595                 600                 605

Asp Lys Lys Thr Gly Glu Ile Thr Glu Arg Leu Lys Leu Gly Thr Arg
    610                 615                 620

Glu Leu Ala Arg Gln Trp Leu Thr Tyr Gly Met Ser Arg Lys Val Thr
625                 630                 635                 640

Lys Arg Ser Val Met Thr Leu Ala Tyr Gly Ser Lys Glu Tyr Gly Phe
                645                 650                 655

Ala Asp Gln Val Tyr Glu Asp Ile Val Met Pro Ala Ile Asp Ser Gly
            660                 665                 670

Ser Gly Ala Met Phe Thr Glu Pro Ser Gln Ala Ser Arg Phe Met Ala
        675                 680                 685

Lys Met Ile Trp Glu Ala Val Ser Val Thr Val Val Ala Ala Val Asp
            690                 695                 700

Ala Met Lys Trp Leu Gln Gly Ala Ala Lys Leu Leu Ala Ala Glu Val
705                 710                 715                 720

Lys Asp Lys Lys Thr Gly Glu Ile Leu Lys Pro Cys Leu Pro Val His
                725                 730                 735

Trp Val Thr Pro Asp Gly Phe Pro Val Trp Gln Glu Tyr Arg Lys Lys
            740                 745                 750

Asp Thr Thr Arg Leu Asn Leu Met Phe Leu Gly Ser Phe Asn Leu Gln
        755                 760                 765

Pro Thr Val Asn Lys Gly Thr Lys Lys Glu Leu Asp Lys His Lys Gln
    770                 775                 780

Glu Ser Gly Ile Ser Pro Asn Phe Val His Ser Gln Asp Gly Ser His
785                 790                 795                 800

Leu Arg Lys Thr Val His Thr His Arg Lys Tyr Gly Val Met Ser
                805                 810                 815

Phe Ala Val Ile His Asp Ser Phe Gly Thr Ile Pro Ala Asp Ala Glu
```

```
                820             825             830
Tyr Leu Phe Arg Gly Val Arg Glu Thr Met Val Glu Thr Tyr Arg Asp
            835             840             845
Asn Asp Val Leu Leu Asp Phe Tyr Glu Gln Phe Glu Tyr Gln Leu His
            850             855             860
Glu Ser Gln Arg Asp Lys Leu Pro Glu Leu Pro Lys Lys Gly Lys Leu
865             870             875             880
Asn Ile Glu Asp Ile Leu Ser Ser Asp Phe Ala Phe Ala
            885             890

<210> SEQ ID NO 36
<211> LENGTH: 883
<212> TYPE: PRT
<213> ORGANISM: Unknown
<220> FEATURE:
<223> OTHER INFORMATION: Yersinia phage phiA1122 sequence

<400> SEQUENCE: 36

Met Asn Thr Ile Asn Ile Ala Lys Asn Asp Phe Ser Asp Ile Glu Leu
1               5                   10                  15
Ala Ala Ile Pro Phe Asn Thr Leu Ala Asp His Tyr Gly Glu Arg Leu
            20                  25                  30
Ala Arg Glu Gln Leu Ala Leu Glu His Glu Ser Tyr Glu Met Gly Glu
        35                  40                  45
Ala Arg Phe Arg Lys Met Phe Glu Arg Gln Leu Lys Ala Gly Glu Val
    50                  55                  60
Ala Asp Asn Ala Ala Ala Lys Pro Leu Ile Thr Thr Leu Leu Pro Lys
65              70                  75                  80
Met Ile Ala Arg Ile Asn Asp Trp Phe Glu Glu Val Lys Ala Lys Arg
            85                  90                  95
Gly Lys Arg Pro Thr Ala Phe Gln Phe Leu Gln Glu Ile Lys Pro Glu
            100                 105                 110
Ala Val Ala Tyr Ile Thr Ile Lys Thr Thr Leu Ala Cys Leu Thr Ser
        115                 120                 125
Ala Asp Asn Thr Thr Val Gln Ala Val Ala Ser Ala Ile Gly Arg Ala
    130                 135                 140
Ile Glu Asp Glu Ala Arg Phe Gly Arg Ile Arg Asp Leu Glu Ala Lys
145             150                 155                 160
His Phe Lys Lys Asn Val Glu Gln Leu Asn Lys Arg Val Gly His
            165                 170                 175
Val Tyr Lys Lys Ala Phe Met Gln Val Val Glu Ala Asp Met Leu Ser
            180                 185                 190
Lys Gly Leu Leu Gly Gly Glu Ala Trp Ser Ser Trp His Lys Glu Asp
        195                 200                 205
Ser Ile His Val Gly Val Arg Cys Ile Glu Met Leu Ile Glu Ser Thr
    210                 215                 220
Gly Met Val Asn Leu His Arg Gln Asn Ala Gly Val Val Gly Gln Asp
225             230                 235                 240
Ser Glu Thr Ile Glu Leu Thr Pro Glu Tyr Ala Glu Ala Ile Ala Thr
            245                 250                 255
Arg Ala Gly Ala Leu Ala Gly Ile Ser Pro Met Phe Gln Pro Cys Val
        260                 265                 270
Val Pro Pro Lys Pro Trp Thr Gly Ile Thr Gly Gly Gly Tyr Trp Ala
    275                 280                 285
Asn Gly Arg Arg Pro Leu Ala Leu Val Arg Thr His Ser Lys Lys Ala
```

-continued

```
                290                 295                 300
Leu Met Arg Tyr Glu Asp Val Tyr Met Pro Glu Val Tyr Lys Ala Ile
305                 310                 315                 320

Asn Ile Ala Gln Asn Thr Ala Trp Lys Ile Asn Lys Lys Val Leu Ala
                325                 330                 335

Val Ala Asn Val Ile Thr Lys Trp Lys His Cys Pro Val Glu Asp Ile
                340                 345                 350

Pro Ala Ile Glu Arg Glu Leu Pro Met Lys Pro Glu Asp Ile Asp
                355                 360                 365

Thr Asn Pro Glu Ala Leu Thr Ala Trp Lys Arg Ala Ala Ala Val
370                 375                 380

Tyr Arg Lys Asp Lys Ala Arg Lys Ser Arg Ile Ser Leu Glu Phe
385                 390                 395                 400

Met Leu Glu Gln Ala Asn Lys Phe Ala Asn His Lys Ala Ile Trp Phe
                405                 410                 415

Pro Tyr Asn Met Asp Trp Arg Gly Arg Val Tyr Ala Val Ser Met Phe
                420                 425                 430

Asn Pro Gln Gly Asn Asp Met Thr Lys Gly Leu Leu Thr Leu Ala Lys
                435                 440                 445

Gly Lys Pro Ile Gly Lys Glu Gly Tyr Tyr Trp Leu Lys Ile His Gly
                450                 455                 460

Ala Asn Cys Ala Gly Val Asp Lys Val Pro Phe Pro Glu Arg Ile Lys
465                 470                 475                 480

Phe Ile Glu Asp Asn His Glu Asn Ile Met Ala Cys Ala Lys Ser Pro
                485                 490                 495

Leu Glu Asn Thr Trp Trp Ala Glu Gln Asp Ser Pro Phe Cys Phe Leu
                500                 505                 510

Ala Phe Cys Phe Glu Tyr Ala Gly Val Gln His His Gly Leu Ser Tyr
                515                 520                 525

Asn Cys Ser Leu Pro Leu Ala Phe Asp Gly Ser Cys Ser Gly Ile Gln
                530                 535                 540

His Phe Ser Ala Met Leu Leu Asp Glu Val Gly Gly Leu Ala Val Asn
545                 550                 555                 560

Leu Leu Pro Ser Ala Thr Val Gln Asp Ile Tyr Gly Ile Val Ala Lys
                565                 570                 575

Lys Val Asn Val Ile Leu Gln Ala Asp Val Ile Asn Gly Thr Asp Asn
                580                 585                 590

Glu Val Val Thr Val Thr Asp Glu Asn Thr Gly Glu Ile Pro Glu Lys
                595                 600                 605

Val Lys Leu Gly Thr Lys Ala Leu Ala Gly Gln Trp Leu Ala Tyr Gly
610                 615                 620

Val Thr Arg Ser Val Thr Lys Arg Ser Val Met Thr Leu Ala Tyr Gly
625                 630                 635                 640

Ser Lys Glu Phe Gly Phe Arg Gln Gln Val Leu Glu Asp Thr Ile Gln
                645                 650                 655

Pro Ala Ile Asp Ser Gly Lys Gly Leu Met Phe Thr Gln Pro Asn Gln
                660                 665                 670

Ala Ala Gly Tyr Met Ala Lys Leu Ile Trp Glu Ala Val Ser Val Thr
                675                 680                 685

Val Val Ala Ala Val Glu Ala Met Asn Trp Leu Lys Ser Ala Ala Lys
                690                 695                 700

Leu Leu Ala Ala Glu Val Lys Asp Lys Lys Thr Gly Glu Ile Leu Arg
705                 710                 715                 720
```

```
Lys Arg Cys Ala Val His Trp Val Thr Pro Asp Gly Phe Pro Val Trp
                725                 730                 735

Gln Glu Tyr Lys Lys Pro Ile Gln Thr Arg Leu Asn Leu Met Phe Leu
            740                 745                 750

Gly Gln Phe Arg Leu Gln Pro Thr Ile Asn Thr Asn Lys Asp Ser Glu
        755                 760                 765

Ile Asp Ala His Lys Gln Glu Ser Gly Ile Ala Pro Asn Phe Val His
    770                 775                 780

Ser Gln Asp Gly Ser His Leu Arg Lys Thr Val Val Trp Ala His Glu
785                 790                 795                 800

Lys Tyr Gly Ile Glu Ser Phe Ala Leu Ile His Asp Ser Phe Gly Thr
                805                 810                 815

Ile Pro Ala Asp Ala Ala Asn Leu Phe Lys Ala Val Arg Glu Thr Met
            820                 825                 830

Val Asp Thr Tyr Glu Ser Cys Asp Val Leu Ala Asp Phe Tyr Asp Gln
        835                 840                 845

Phe Ala Asp Gln Leu His Glu Ser Gln Leu Asp Lys Met Pro Ala Leu
    850                 855                 860

Pro Ala Lys Gly Asn Leu Asn Leu Gln Asp Ile Leu Lys Ser Asp Phe
865                 870                 875                 880

Ala Phe Ala

<210> SEQ ID NO 37
<211> LENGTH: 884
<212> TYPE: PRT
<213> ORGANISM: Unknown
<220> FEATURE:
<223> OTHER INFORMATION: Yersinia phage phiYeO3-12 sequence

<400> SEQUENCE: 37

Met Asn Ile Ile Glu Asn Ile Glu Lys Asn Asp Phe Ser Glu Ile Glu
1               5                   10                  15

Leu Ala Ala Ile Pro Phe Asn Thr Leu Ala Asp His Tyr Gly Ser Ala
                20                  25                  30

Leu Ala Arg Glu Gln Leu Ala Leu Glu His Glu Ser Tyr Glu Leu Gly
            35                  40                  45

Glu Arg Arg Phe Leu Lys Met Leu Glu Arg Gln Ala Lys Ala Gly Glu
        50                  55                  60

Ile Ala Asp Asn Ala Ala Ala Lys Pro Leu Leu Ala Thr Leu Leu Pro
65                  70                  75                  80

Lys Leu Thr Thr Arg Ile Val Glu Trp Leu Glu Glu Tyr Ala Thr Lys
                85                  90                  95

Lys Gly Arg Lys Pro Val Ala Tyr Ala Pro Leu Gln Ser Leu Lys Pro
            100                 105                 110

Glu Ala Ser Ala Phe Ile Thr Leu Lys Val Ile Leu Ala Ser Leu Thr
        115                 120                 125

Ser Thr Asn Met Thr Thr Ile Gln Ala Ala Ala Gly Met Leu Gly Lys
130                 135                 140

Ala Ile Glu Asp Glu Ala Arg Phe Gly Arg Ile Arg Asp Leu Glu Ala
145                 150                 155                 160

Lys His Phe Lys Lys His Val Glu Glu Gln Leu Asn Lys Arg His Gly
                165                 170                 175

Gln Val Tyr Lys Lys Ala Phe Met Gln Val Val Glu Ala Asp Met Ile
            180                 185                 190
```

Gly Arg Gly Leu Leu Gly Gly Glu Ala Trp Ser Ser Trp Asp Lys Glu
        195                 200                 205

Thr Thr Met His Val Gly Ile Arg Leu Ile Glu Met Leu Ile Glu Ser
    210                 215                 220

Thr Gly Leu Val Glu Leu Gln Arg His Asn Ala Gly Asn Ala Gly Ser
225                 230                 235                 240

Asp His Glu Ala Leu Gln Leu Ala Gln Glu Tyr Val Asp Val Leu Ala
                245                 250                 255

Lys Arg Ala Gly Ala Leu Ala Gly Ile Ser Pro Met Phe Gln Pro Cys
                260                 265                 270

Val Val Pro Pro Lys Pro Trp Val Ala Ile Thr Gly Gly Tyr Trp
                275                 280                 285

Ala Asn Gly Arg Arg Pro Leu Ala Leu Val Arg Thr His Ser Lys Lys
    290                 295                 300

Gly Leu Met Arg Tyr Glu Asp Val Tyr Met Pro Glu Val Tyr Lys Ala
305                 310                 315                 320

Val Asn Ile Ala Gln Asn Thr Ala Trp Lys Ile Asn Lys Lys Val Leu
                325                 330                 335

Ala Val Val Asn Glu Ile Val Asn Trp Lys Asn Cys Pro Val Ala Asp
                340                 345                 350

Ile Pro Ser Leu Glu Arg Gln Glu Leu Pro Pro Lys Pro Asp Asp Ile
            355                 360                 365

Asp Thr Asn Glu Ala Ala Leu Lys Glu Trp Lys Lys Ala Ala Ala Gly
    370                 375                 380

Ile Tyr Arg Leu Asp Lys Ala Arg Val Ser Arg Arg Ile Ser Leu Glu
385                 390                 395                 400

Phe Met Leu Glu Gln Ala Asn Lys Phe Ala Ser Lys Lys Ala Ile Trp
                405                 410                 415

Phe Pro Tyr Asn Met Asp Trp Arg Gly Arg Val Tyr Ala Val Pro Met
            420                 425                 430

Phe Asn Pro Gln Gly Asn Asp Met Thr Lys Gly Leu Leu Thr Leu Ala
        435                 440                 445

Lys Gly Lys Pro Ile Gly Glu Glu Gly Phe Tyr Trp Leu Lys Ile His
450                 455                 460

Gly Ala Asn Cys Ala Gly Val Asp Lys Val Pro Phe Pro Glu Arg Ile
465                 470                 475                 480

Ala Phe Ile Glu Lys His Val Asp Asp Ile Leu Ala Cys Ala Lys Asp
                485                 490                 495

Pro Ile Asn Asn Thr Trp Trp Ala Glu Gln Asp Ser Pro Phe Cys Phe
            500                 505                 510

Leu Ala Phe Cys Phe Glu Tyr Ala Gly Val Ala His His Gly Leu Ser
        515                 520                 525

Tyr Asn Cys Ser Leu Pro Leu Ala Phe Asp Gly Ser Cys Ser Gly Ile
    530                 535                 540

Gln His Phe Ser Ala Met Leu Arg Asp Glu Val Gly Gly Arg Ala Val
545                 550                 555                 560

Asn Leu Leu Pro Ser Glu Thr Val Gln Asp Ile Tyr Gly Ile Val Ala
                565                 570                 575

Gln Lys Val Asn Glu Ile Leu Lys Gln Asp Ala Ile Asn Gly Thr Pro
                580                 585                 590

Asn Glu Met Ile Thr Val Thr Asp Lys Asp Thr Gly Glu Ile Ser Glu
            595                 600                 605

Lys Leu Lys Leu Gly Thr Ser Thr Leu Ala Gln Gln Trp Leu Ala Tyr

```
            610                 615                 620
Gly Val Thr Arg Ser Val Thr Lys Arg Ser Val Met Thr Leu Ala Tyr
625                 630                 635                 640

Gly Ser Lys Glu Phe Gly Phe Arg Gln Gln Val Leu Asp Asp Thr Ile
                645                 650                 655

Gln Pro Ala Ile Asp Ser Gly Lys Gly Leu Met Phe Thr Gln Pro Asn
                    660                 665                 670

Gln Ala Ala Gly Tyr Met Ala Lys Leu Ile Trp Asp Ala Val Ser Val
                        675                 680                 685

Thr Val Val Ala Ala Val Glu Ala Met Asn Trp Leu Lys Ser Ala Ala
690                 695                 700

Lys Leu Leu Ala Ala Glu Val Lys Asp Lys Lys Thr Lys Glu Ile Leu
705                 710                 715                 720

Arg His Arg Cys Ala Val His Trp Thr Thr Pro Asp Gly Phe Pro Val
                    725                 730                 735

Trp Gln Glu Tyr Arg Lys Pro Leu Gln Lys Arg Leu Asp Met Ile Phe
                        740                 745                 750

Leu Gly Gln Phe Arg Leu Gln Pro Thr Ile Asn Thr Leu Lys Asp Ser
        755                 760                 765

Gly Ile Asp Ala His Lys Gln Glu Ser Gly Ile Ala Pro Asn Phe Val
770                 775                 780

His Ser Gln Asp Gly Ser His Leu Arg Met Thr Val Tyr Ala His
785                 790                 795                 800

Glu Asn Tyr Gly Ile Glu Ser Phe Ala Leu Ile His Asp Ser Phe Gly
                    805                 810                 815

Thr Ile Pro Ala Asp Ala Gly Lys Leu Phe Lys Ala Val Arg Glu Thr
                        820                 825                 830

Met Val Ile Thr Tyr Glu Asn Asn Asp Val Leu Ala Asp Phe Tyr Asp
            835                 840                 845

Gln Phe Ala Asp Gln Leu His Glu Thr Gln Leu Asp Lys Met Pro Pro
                850                 855                 860

Leu Pro Lys Lys Gly Asn Leu Asn Leu Gln Asp Ile Leu Lys Ser Asp
865                 870                 875                 880

Phe Ala Phe Ala

<210> SEQ ID NO 38
<211> LENGTH: 882
<212> TYPE: PRT
<213> ORGANISM: Unknown
<220> FEATURE:
<223> OTHER INFORMATION: Kluyvera phage Kvp1 sequence

<400> SEQUENCE: 38

Met Asn Val Ile Asn Ala Pro Lys Asn Asp Phe Ser Asp Ile Ala Asn
1               5                   10                  15

Ala Ile Gln Pro Tyr Asn Ile Leu Ala Asp His Tyr Gly Ala Gln Leu
                20                  25                  30

Ala Ala Thr Gln Leu Glu Leu Glu His Glu Ala His Thr Glu Gly Glu
            35                  40                  45

Lys Arg Phe Leu Lys Ala Met Glu Arg Gln Ile Lys Ala Gly Glu Phe
        50                  55                  60

Gly Asp Asn Ala Val Ala Lys Pro Leu Leu Ser Ser Leu Ala Pro Lys
65                  70                  75                  80

Phe Ile Glu Ala Trp Asn Thr Trp Phe Thr Glu Val Glu Ala Lys Arg
                85                  90                  95
```

-continued

Gly Lys Arg Pro Val Ala Tyr Asn Leu Val Gln Lys Val Ala Pro Glu
                100                 105                 110

Ala Ala Ala Phe Ile Thr Leu Lys Val Thr Leu Ala Cys Leu Thr Lys
            115                 120                 125

Glu Glu Phe Thr Asn Leu Gln Ser Val Ala Thr Lys Ile Gly Arg Ser
        130                 135                 140

Ile Glu Asp Glu Leu Arg Phe Gly Arg Ile Arg Asp Glu Glu Ala Lys
145                 150                 155                 160

His Phe Lys Asn His Val Gln Glu Ala Leu Asn Lys Arg Val Gly Ile
                165                 170                 175

Val Tyr Lys Lys Ala Phe Met Gln Ala Val Glu Gly Lys Met Leu Asp
            180                 185                 190

Ala Gly Gln Leu Gln Thr Lys Trp Thr Thr Trp Thr Pro Glu Glu Ser
        195                 200                 205

Ile His Val Gly Val Arg Met Leu Glu Leu Leu Ile Gly Ser Thr Gly
        210                 215                 220

Leu Val Glu Leu His Arg Pro Phe Ala Gly Asn Val Glu Lys Asp Gly
225                 230                 235                 240

Glu Tyr Ile Gln Leu Thr Glu Gln Tyr Val Asp Leu Leu Ser Lys Arg
                245                 250                 255

Ala Gly Ala Leu Ala Ala Ile Ala Pro Met Tyr Gln Pro Cys Val Val
            260                 265                 270

Pro Pro Lys Pro Trp Thr Ser Pro Val Gly Gly Tyr Trp Ala Ala
        275                 280                 285

Gly Arg Lys Pro Leu Ser Leu Val Arg Thr Gly Ser Lys Lys Gly Leu
        290                 295                 300

Glu Arg Tyr Asn Asp Val Tyr Met Pro Glu Val Tyr Lys Ala Val Asn
305                 310                 315                 320

Ile Ala Gln Asn Thr Pro Trp Lys Ile Asn Lys Lys Val Leu Ala Val
                325                 330                 335

Val Asn Glu Ile Val Asn Trp Lys His Cys Pro Val Glu Asp Val Pro
            340                 345                 350

Ala Leu Glu Arg Gly Glu Leu Pro Val Lys Pro Glu Asp Ile Asp Thr
        355                 360                 365

Asn Glu Ala Ala Leu Lys Ala Trp Lys Lys Ala Ser Ala Ile Tyr
        370                 375                 380

Arg Lys Glu Lys Ala Arg Val Ser Arg Arg Met Ser Met Glu Phe Met
385                 390                 395                 400

Leu Gly Gln Ala Asn Lys Phe Ala Gln Phe Lys Ala Ile Trp Phe Pro
                405                 410                 415

Met Asn Met Asp Trp Arg Gly Arg Val Tyr Ala Val Pro Met Phe Asn
            420                 425                 430

Pro Gln Gly Asn Asp Met Thr Lys Gly Leu Leu Thr Leu Ala Lys Gly
        435                 440                 445

Lys Pro Ile Gly Val Asp Gly Tyr Tyr Trp Leu Lys Ile His Gly Ala
        450                 455                 460

Asn Thr Ala Gly Val Asp Lys Val Asp Phe Ala Glu Arg Ile Lys Phe
465                 470                 475                 480

Ile Asp Asp Asn His Glu Asn Ile Met Ser Val Ala Ala Asp Pro Ile
                485                 490                 495

Ala Asn Thr Trp Trp Ala Glu Gln Asp Ser Pro Phe Cys Phe Leu Ala
            500                 505                 510

Phe Cys Phe Glu Tyr Ala Gly Val Gln His His Gly Met Asn Tyr Asn
515                 520                 525

Cys Ser Leu Pro Leu Ala Phe Asp Gly Ser Cys Ser Gly Ile Gln His
530                 535                 540

Phe Ser Ala Met Leu Arg Asp Glu Val Gly Gly Arg Ala Val Asn Leu
545                 550                 555                 560

Leu Pro Ser Lys Glu Val Gln Asp Ile Tyr Arg Ile Val Ala Glu Arg
                565                 570                 575

Val Asn Glu Met Leu Arg Glu Ala Val Ile Asn Gly Thr Asp Asn Glu
                580                 585                 590

Val Glu Thr Val Thr Asn Lys Asp Thr Gly Glu Ile Thr Glu Lys Leu
                595                 600                 605

Lys Leu Gly Thr Lys Glu Leu Ala Gly Gln Trp Leu Ala Tyr Gly Val
610                 615                 620

Thr Arg Lys Val Thr Lys Arg Ser Val Met Thr Leu Ala Tyr Gly Ser
625                 630                 635                 640

Lys Glu Tyr Gly Phe Arg Asp Gln Val Leu Glu Asp Thr Ile Gln Pro
                645                 650                 655

Ala Ile Asp Asp Gly Lys Gly Leu Met Phe Thr Gln Pro Asn Gln Ala
                660                 665                 670

Ala Gly Tyr Met Ala Lys Leu Ile Trp Glu Ser Val Thr Val Thr Val
                675                 680                 685

Val Ala Ala Val Glu Ala Met Asn Trp Leu Lys Ser Ala Ala Lys Leu
                690                 695                 700

Leu Ala Ala Glu Val Lys Asp Lys Lys Thr Lys Glu Val Leu Arg Lys
705                 710                 715                 720

Arg Cys Ala Val His Trp Val Thr Pro Asp Gly Phe Pro Val Trp Gln
                725                 730                 735

Glu Tyr Lys Lys Pro Val Gln Thr Arg Leu Asn Leu Met Phe Leu Gly
                740                 745                 750

Gln Ile Arg Leu Gln Pro Thr Val Asn Thr Asn Lys Asp Ser Gly Ile
                755                 760                 765

Asp Ala Arg Lys Gln Glu Ser Gly Ile Ala Pro Asn Phe Val His Ser
                770                 775                 780

Met Asp Gly Ser His Leu Arg Met Thr Val Val Arg Ser Asn Glu Val
785                 790                 795                 800

Tyr Gly Val Glu Ser Phe Ala Leu Ile His Asp Ser Phe Gly Thr Ile
                805                 810                 815

Pro Ala Asp Ala Gly Asn Leu Phe Lys Ala Val Arg Glu Thr Met Val
                820                 825                 830

Asn Thr Tyr Glu Glu Asn Asp Val Leu Ala Asp Phe Tyr Glu Gln Phe
                835                 840                 845

Ala Asp Gln Leu His Glu Ser Gln Leu Asp Lys Met Pro Glu Met Pro
850                 855                 860

Ala Lys Gly Ser Leu Asp Leu Gln Glu Ile Leu Lys Ser Asp Phe Ala
865                 870                 875                 880

Phe Ala

<210> SEQ ID NO 39
<211> LENGTH: 883
<212> TYPE: PRT
<213> ORGANISM: Unknown
<220> FEATURE:
<223> OTHER INFORMATION: Morganella phage MmP1 sequence

<400> SEQUENCE: 39

```
Met Ser Ile Ala Ala Val Asn Lys Asn Asp Phe Ser Asp Val Glu
1               5                   10                  15

Leu Ala Ala Ile Pro Phe Asn Thr Leu Ala Asp His Tyr Gly Ala Asp
            20                  25                  30

Leu Ala Arg Glu Gln Leu Gln Leu Glu His Glu Ser Tyr Val Met Gly
        35                  40                  45

Glu Glu Arg Phe Arg Lys Met Leu Glu Arg Gln Glu Lys Ala Glu Glu
    50                  55                  60

Phe Gly Asp Ser Ser Val Ala Lys Pro Leu Ile Ile Thr Leu Leu Pro
65                  70                  75                  80

Lys Val Thr Gln Arg Ile Thr Asp Trp Leu Asn Glu Trp Ala Asp Pro
                85                  90                  95

Asn Lys Lys Gly Arg Lys Pro Ile Ala Tyr Thr His Leu Lys Asp Ile
            100                 105                 110

Lys Pro Glu Thr Leu Ala Phe Ile Thr Ile Lys Val Val Leu Asn Lys
        115                 120                 125

Leu Ala Gly Lys Asp Asp Ala Phe Met Gln Pro Leu Ala Tyr Ala Ile
    130                 135                 140

Gly Ser Ser Ile Glu Asp Glu Ala Arg Phe Gly Arg Ile Arg Glu Leu
145                 150                 155                 160

Glu Met Ala His Phe Lys Lys Cys Ala Glu Glu Asn Leu Asn Lys Arg
                165                 170                 175

Arg Gly Thr Ala Tyr Arg Lys Ala Phe Leu Ser Val Val Glu Ala Asp
            180                 185                 190

Met Leu Asp Lys Gly Leu Leu Gly Gly Glu Ser Trp Gly Thr Trp Asn
    195                 200                 205

Lys Thr Asp Val Met Asn Ile Gly Ile Ser Met Leu Glu Lys Leu Ile
210                 215                 220

Glu Ala Thr Gly Leu Val Glu Leu Arg Glu Lys Arg Asn Phe Glu Glu
225                 230                 235                 240

Met Asp Arg Ile Val Ile Ala Glu Glu Tyr Val Lys Ala Met Ala Thr
                245                 250                 255

Arg Ala Gln Ser Leu Ala Gly Ile Ser Pro Met Tyr Gln Pro Cys Val
            260                 265                 270

Val Pro Pro Lys Pro Trp Val Ser Ile Thr Gly Gly Gly Tyr Trp Ala
        275                 280                 285

Asn Gly Arg Lys Pro Thr Ala Leu Ile Arg Thr His Thr Arg Lys Ala
    290                 295                 300

Leu Tyr Arg Tyr Glu Asp Val Tyr Met Pro Glu Val Tyr Lys Ala Ile
305                 310                 315                 320

Asn Tyr Ala Gln Glu Thr Pro Trp Arg Ile Asn Arg Lys Val Leu Ala
                325                 330                 335

Val Val Asn Glu Leu Val Lys Trp Lys Asn Asn Pro Val Lys Asp Met
            340                 345                 350

Pro Ser Ile Asp Lys Leu Glu Leu Pro Gln Arg Pro Asp Asp Ile Asp
        355                 360                 365

Thr Asn Glu Glu Ala Leu Arg Ser Trp Lys Arg Glu Ala Ala Ala Val
    370                 375                 380

Tyr Arg Lys Asp Glu Gln Arg Lys Ser Arg Tyr Leu Ser Met Ser Phe
385                 390                 395                 400

Ala Leu Glu Gln Ala Asn Lys Phe Ser Asn Lys Lys Ala Ile Tyr Phe
                405                 410                 415
```

```
Pro Tyr Asn Met Asp Trp Arg Gly Arg Val Tyr Ala Leu Pro Met Phe
            420                 425                 430

Asn Pro Gln Gly Asn Asp Met Val Lys Gly Leu Leu Thr Leu Ala Lys
            435                 440                 445

Gly Lys Pro Ile Gly Lys Asp Gly Phe Tyr Trp Leu Lys Ile His Gly
450                 455                 460

Ala Asn Thr Ala Gly Val Asp Lys Val Thr Phe Pro Glu Arg Ile Lys
465                 470                 475                 480

Phe Ile Glu Asp Asn His Asp Asn Ile Met Gln Cys Ala Glu Ser Pro
                485                 490                 495

Leu Asp Asn Leu Trp Trp Thr Glu Gln Asp Ser Pro Phe Cys Phe Leu
            500                 505                 510

Ala Phe Cys Phe Glu Tyr Ala Gln Val Thr Lys Lys Gly Leu Gly Trp
            515                 520                 525

Val Cys Ser Leu Pro Ile Ala Leu Asp Gly Ser Cys Ser Gly Ile Gln
530                 535                 540

His Phe Ser Ala Met Leu Arg Asp Asp Ile Gly Gly Arg Ala Val Asn
545                 550                 555                 560

Leu Leu Pro Ser Glu Thr Val Gln Asp Ile Tyr Gly Ile Val Ala Asp
            565                 570                 575

Lys Val Asn Glu Ala Leu Lys Glu Leu Val Ile Asn Gly Thr Asp Asn
            580                 585                 590

Tyr Thr Asp Thr Val Thr Asp Lys Ser Thr Gly Glu Ile Ile Glu Arg
            595                 600                 605

Tyr Arg Leu Gly Glu Lys Glu Leu Ala Arg Gln Trp Leu Glu Phe Gly
            610                 615                 620

Val Thr Arg Ser Val Thr Lys Arg Ser Val Met Thr Leu Ala Tyr Gly
625                 630                 635                 640

Ser Lys Glu Tyr Gly Phe Arg Asp Gln Val Leu Glu Asp Thr Ile Arg
                645                 650                 655

Pro Ala Ile Asp Ser Gly Lys Gly Ala Met Phe Thr Asn Pro Ser Gln
            660                 665                 670

Ala Ala Ser Phe Met Ala Lys Arg Ile Trp Glu Ala Val Ser Val Thr
            675                 680                 685

Val Val Ala Ala Val Gly Ala Met Lys Trp Leu Gln Ser Ser Ala Lys
            690                 695                 700

Leu Met Ala Ala Glu Val Lys Asp Lys Thr Lys Glu Val Leu Arg
705                 710                 715                 720

Lys Arg Cys Ala Val His Trp Val Thr Pro Asp Gly Phe Pro Val Trp
                725                 730                 735

Gln Glu Tyr Arg Lys Pro Lys Gln Lys Arg Val His Leu Met Phe Leu
            740                 745                 750

Gly Ser Tyr Tyr Asp Ala Arg Met Lys Glu Thr Ser Ser Asp Cys Ser
            755                 760                 765

Ile Asp Ala His Lys Gln Glu Ser Gly Ile Ser Pro Asn Phe Val His
            770                 775                 780

Ser Gln Asp Gly Asn His Leu Arg Met Thr Val Val Tyr Ala Arg Glu
785                 790                 795                 800

Lys Tyr Asn Val Glu Ser Phe Ala Leu Ile His Asp Ser Phe Gly Thr
            805                 810                 815

Ile Pro Ala Asp Val Pro Asn Leu Phe Lys Ala Val Arg Glu Thr Met
            820                 825                 830
```

Val Asn Met Tyr Glu Asn Asn Asp Val Leu Ala Asp Phe Tyr Glu Gln
                835                 840                 845

Phe Ala Asp Gln Leu His Glu Ser Gln Leu Asp Lys Met Pro Ala Leu
    850                 855                 860

Pro Pro Lys Gly Lys Leu Asn Leu Gln Asp Ile Leu Lys Ser Asp Phe
865                 870                 875                 880

Ala Phe Ala

<210> SEQ ID NO 40
<211> LENGTH: 883
<212> TYPE: PRT
<213> ORGANISM: Unknown
<220> FEATURE:
<223> OTHER INFORMATION: Vibrio phage N4 sequence

<400> SEQUENCE: 40

Met Ala Asn Val Ile Lys Pro Glu Ser His Asn Phe Ser Asp Ile Ser
1               5                   10                  15

Ala Ala Ile Leu Pro Phe Asn Val Leu Ala Asp Ser Tyr Gly Glu Ala
            20                  25                  30

Leu Ala Ala Glu Gln Leu Met Leu Glu His Glu Ser Tyr Gln Leu Gly
        35                  40                  45

Glu Ala Arg Phe Ile Lys Ala Met Glu Arg Gln Val Glu Arg Gly Glu
    50                  55                  60

Val Ser Asp Asn Ala Val Ala Lys Pro Leu Leu Asp Thr Leu Ile Pro
65                  70                  75                  80

Ala Leu Ala Ala Arg Ile Thr Glu Phe Val Glu Met Lys Gln Arg Gly
                85                  90                  95

Lys Pro His Val Ser Lys Gly Tyr Phe Ala Met Ile Lys Pro Glu Ser
            100                 105                 110

Ala Ala Phe Ile Ile Val Lys Thr Thr Leu Asn Ile Leu Ala Lys Glu
        115                 120                 125

Glu Ser Val Pro Val Gln Arg Val Ala Met Ala Ile Gly Gly Asn Ile
    130                 135                 140

Glu Asp Glu Ile Arg Phe Gly Arg Ile Arg Asp Glu Glu Ile Lys His
145                 150                 155                 160

Phe Lys Glu Arg Val Lys Pro Asn Leu Asp Lys Arg Asn Gly Phe Ile
                165                 170                 175

Tyr Lys Lys Ala Tyr Met Glu Ala Val Glu Ala Gly Met Gln Asp Lys
            180                 185                 190

Gly Glu Leu Asn Ser Thr His Glu Ala Trp Glu Lys Asp Val Lys Phe
        195                 200                 205

His Val Gly Ile Arg Ala Ile Glu Met Leu Ile Glu Ala Thr Gly Met
    210                 215                 220

Val Gln Leu Glu Arg Lys Phe Lys Gly Ile Pro Asp Lys Asp His Glu
225                 230                 235                 240

Ala Leu His Leu Ala Pro Glu Tyr Val Glu Lys Leu Thr Asn Arg Ala
                245                 250                 255

His Ala Leu Ala Gly Ile Ser Pro Met Tyr Gln Pro Met Ile Val Lys
            260                 265                 270

Pro Lys Arg Trp Thr Gly Val Gln Gly Gly Tyr Trp Ala Lys Gly
            275                 280                 285

Arg Arg Pro Leu Asn Leu Ile Arg Val Gly Ser Lys Arg Ala Leu Asp
    290                 295                 300

Arg Tyr Arg Gln Val Asp Met Pro Glu Val Tyr Asp Ala Ile Asn Thr

```
              305                 310                 315                 320
         Ile Gln Glu Thr Ala Trp Arg Ile Asn Lys Asp Val Leu Ala Val Val
                         325                 330                 335

Asn Asn Val Val Thr Trp Ala Asn Cys Pro Val Glu Asp Val Pro Ser
                         340                 345                 350

Ile Asp Lys Leu Ala Leu Pro Glu Lys Pro Glu Asp Ile Asp Ser Asn
                         355                 360                 365

Glu Glu Ser Leu Lys Lys Trp Lys Lys Ala Ala Ala Ile Tyr Arg
         370                 375                 380

Lys Glu Lys Ala Arg Gln Ser Arg Arg Ile Ser Leu Glu Phe Ala Leu
         385                 390                 395                 400

Ser Gln Ala Asn Lys Phe Ser Lys Tyr Asn Glu Ile Tyr Phe Pro Tyr
                         405                 410                 415

Asn Met Asp Trp Arg Gly Arg Val Tyr Ala Ile Pro Met Phe Asn Pro
                         420                 425                 430

Gln Gly Asn Asp Met Val Lys Gly Leu Leu Thr Phe Ala Lys Lys Val
                         435                 440                 445

Pro Val Gly Ile Asp Gly Gly Tyr Trp Leu Ala Val His Gly Ala Asn
         450                 455                 460

Cys Ala Gly Val Asp Lys Val Ser Leu Glu Asp Arg Val Lys Trp Val
         465                 470                 475                 480

Asn Asp Asn Glu Ala Asn Ile Leu Ala Ser Ala Glu Ala Pro Leu Asp
                         485                 490                 495

Phe Thr Trp Trp Ala Glu Gln Asp Ser Pro Phe Cys Phe Leu Ala Phe
                         500                 505                 510

Cys Phe Glu Trp Ala Ala Tyr Val Lys Ala Gly Lys Lys Pro Ser Phe
                         515                 520                 525

Glu Ser Ser Leu Pro Leu Ala Phe Asp Gly Thr Cys Ser Gly Leu Gln
                         530                 535                 540

His Phe Ser Ala Met Leu Arg Asp Glu Ile Gly Gly Ala Ala Val Asn
         545                 550                 555                 560

Leu Leu Pro Ala Asp Lys Pro Gln Asp Ile Tyr Gly Ile Val Ala Val
                         565                 570                 575

Lys Val Asn Glu Val Leu Arg Asp Leu Val Ile Ser Gly Thr Glu Asp
                         580                 585                 590

Glu Met Gln Thr Leu Glu Asp Lys Lys Thr Gly Glu Ile Thr Glu Arg
                         595                 600                 605

Leu Val Leu Gly Thr Arg Thr Leu Ala Ala Gln Trp Leu Glu Tyr Gly
         610                 615                 620

Val Thr Arg Ser Val Thr Lys Arg Ser Val Met Thr Leu Ala Tyr Gly
         625                 630                 635                 640

Ser Lys Glu Tyr Gly Phe Ala Asp Gln Val Phe Glu Asp Thr Val Met
                         645                 650                 655

Pro Ala Ile Asp Asn Gly Lys Gly Ala Met Phe Thr Glu Pro Ser Gln
                         660                 665                 670

Ala Cys Arg Phe Met Ala Lys Leu Ile Trp Asp Ala Val Ser Lys Thr
                         675                 680                 685

Val Val Ala Ala Val Glu Ala Met Gln Trp Leu Gln Ser Ala Ala Lys
                         690                 695                 700

Leu Val Ser Ser Glu Val Lys Asp Lys Lys Ser Gly Glu Ile Leu Lys
         705                 710                 715                 720

His Ala Met Pro Val His Trp Thr Thr Pro Asn Gly Phe Pro Val Trp
                         725                 730                 735
```

```
Ser Glu Tyr Cys Lys Gln Gln Lys Arg Ile Asp Cys Val Ile Leu
                740                 745                 750

Gly Thr His Arg Met Ala Leu Thr Ile Asn Ile Arg Asp Lys Lys Glu
755                 760                 765

Ile Asp Ala Ala Lys Gln Thr Ser Gly Ile Ala Pro Asn Phe Val His
        770                 775                 780

Ser Met Asp Ala Ser His Leu Gln Met Thr Val Asn Lys Cys Phe Lys
785                 790                 795                 800

Val Tyr Gly Ile His Ser Phe Ala Met Ile His Asp Ser Phe Gly Cys
                805                 810                 815

His Ala Gly Phe Ala Ser Lys Met Phe Arg Ala Val Arg Glu Thr Met
            820                 825                 830

Val Glu Thr Tyr Glu Glu His Asp Val Ile Gln Glu Phe Tyr Asn Gln
                835                 840                 845

Phe Glu Gln Gln Leu His Glu Ser Gln Ile Glu Lys Met Pro Val Leu
    850                 855                 860

Pro Arg Lys Gly Asn Leu Glu Leu Arg Glu Ile Leu Lys Ser Leu Tyr
865                 870                 875                 880

Thr Phe Ser

<210> SEQ ID NO 41
<211> LENGTH: 883
<212> TYPE: PRT
<213> ORGANISM: Unknown
<220> FEATURE:
<223> OTHER INFORMATION: Vibrio phage VP4 sequence

<400> SEQUENCE: 41

Met Ala Asn Val Ile Lys Pro Gln Ser His Asn Phe Ser Asp Ile Ser
1               5                   10                  15

Ala Ala Ile Leu Pro Phe Asn Val Leu Ala Asp Ser Tyr Gly Glu Ala
            20                  25                  30

Leu Ala Ala Glu Gln Leu Met Leu Glu His Glu Ser Tyr Gln Leu Gly
        35                  40                  45

Glu Ala Arg Phe Ile Lys Ala Met Glu Arg Gln Val Glu Arg Gly Glu
    50                  55                  60

Val Ser Asp Asn Ala Val Ala Lys Pro Leu Leu Asp Thr Leu Ile Pro
65                  70                  75                  80

Ala Leu Ala Ala Arg Ile Thr Glu Phe Val Glu Met Lys Gln Arg Gly
                85                  90                  95

Lys Pro His Val Ser Lys Gly Tyr Phe Ala Met Ile Lys Pro Glu Ser
                100                 105                 110

Ala Ala Phe Ile Ile Val Lys Thr Thr Leu Asn Ile Leu Ala Lys Glu
            115                 120                 125

Glu Ser Val Pro Val Gln Arg Val Ala Met Ala Ile Gly Gly Asn Ile
        130                 135                 140

Glu Asp Glu Ile Arg Phe Gly Arg Ile Arg Glu Glu Ile Lys His
145                 150                 155                 160

Phe Lys Glu Arg Val Lys Pro Asn Leu Asp Lys Arg Asn Gly Phe Ile
                165                 170                 175

Tyr Lys Lys Ala Tyr Met Glu Ala Val Glu Ala Gly Met Gln Asp Lys
            180                 185                 190

Gly Glu Leu Asn Ser Thr His Glu Ala Trp Glu Lys Asp Val Lys Phe
        195                 200                 205
```

-continued

His Val Gly Ile Arg Ala Ile Glu Met Leu Ile Glu Ala Thr Gly Met
    210                 215                 220

Val Gln Leu Glu Arg Lys Phe Lys Gly Ile Pro Asp Lys Asp His Glu
225                 230                 235                 240

Ala Leu His Leu Ala Pro Glu Tyr Val Glu Lys Leu Thr Asn Arg Ala
                245                 250                 255

His Ala Leu Ala Gly Ile Ser Pro Met Tyr Gln Pro Met Ile Val Lys
            260                 265                 270

Pro Lys Arg Trp Thr Gly Val Gln Gly Gly Tyr Trp Ala Lys Gly
        275                 280                 285

Arg Arg Pro Leu Asn Leu Ile Arg Val Gly Ser Lys Arg Ala Leu Asp
290                 295                 300

Arg Tyr Arg Gln Val Asp Met Pro Glu Val Tyr Asp Ala Ile Asn Thr
305                 310                 315                 320

Ile Gln Glu Thr Ala Trp Arg Ile Asn Lys Asp Val Leu Ala Val Val
                325                 330                 335

Asn Asn Val Val Thr Trp Thr Asn Cys Pro Val Glu Asp Val Pro Ser
            340                 345                 350

Ile Asp Lys Leu Ala Leu Pro Glu Lys Pro Glu Asp Ile Asp Asn Asn
        355                 360                 365

Glu Glu Ser Leu Lys Lys Trp Lys Lys Ala Ala Ala Ile Tyr Arg
370                 375                 380

Lys Glu Lys Ala Arg Gln Ser Arg Arg Ile Ser Leu Glu Phe Ala Leu
385                 390                 395                 400

Ser Gln Ala Asn Lys Phe Ser Lys Tyr Asn Glu Ile Tyr Phe Pro Tyr
                405                 410                 415

Asn Met Asp Trp Arg Gly Arg Val Tyr Ala Ile Pro Met Phe Asn Pro
            420                 425                 430

Gln Gly Asn Asp Met Val Lys Gly Leu Leu Thr Phe Ala Lys Lys Val
        435                 440                 445

Pro Val Gly Ile Asp Gly Gly Tyr Trp Leu Ala Val His Gly Ala Asn
450                 455                 460

Cys Ala Gly Val Asp Lys Val Ser Leu Glu Asp Arg Val Lys Trp Val
465                 470                 475                 480

Asn Asp Asn Glu Ala Asn Ile Ile Ala Ser Ala Glu Ala Pro Leu Asp
                485                 490                 495

Phe Thr Trp Trp Ala Glu Gln Asp Ser Pro Phe Cys Phe Leu Ala Phe
            500                 505                 510

Cys Phe Glu Trp Ala Ala Tyr Val Lys Ala Gly Lys Lys Pro Ser Phe
        515                 520                 525

Glu Ser Ser Leu Pro Leu Ala Phe Asp Gly Thr Cys Ser Gly Leu Gln
530                 535                 540

His Phe Ser Ala Met Leu Arg Asp Glu Ile Gly Gly Ala Ala Val Asn
545                 550                 555                 560

Leu Leu Pro Ala Asp Lys Pro Gln Asp Ile Tyr Gly Ile Val Ala Val
                565                 570                 575

Lys Val Asn Glu Val Leu Arg Asp Leu Val Ile Ser Gly Thr Glu Asp
            580                 585                 590

Glu Met Gln Thr Leu Glu Asp Lys Lys Thr Gly Glu Ile Thr Glu Arg
        595                 600                 605

Leu Val Leu Gly Thr Arg Thr Leu Ala Ala Gln Trp Leu Glu Tyr Gly
610                 615                 620

Val Thr Arg Ser Val Thr Lys Arg Ser Val Met Thr Leu Ala Tyr Gly

```
                625                 630                 635                 640
Ser Lys Glu Tyr Gly Phe Ala Asp Gln Val Phe Glu Asp Thr Val Met
                    645                 650                 655

Pro Ala Ile Asp Asn Gly Lys Gly Thr Met Phe Thr Glu Pro Ser Gln
            660                 665                 670

Ala Cys Arg Phe Met Ala Lys Leu Ile Trp Asp Ala Val Ser Lys Thr
            675                 680                 685

Val Val Ala Ala Val Glu Ala Met Gln Trp Leu Gln Ser Ala Ala Lys
        690                 695                 700

Leu Val Ser Ser Glu Val Lys Asp Lys Lys Ser Gly Glu Ile Leu Lys
705                 710                 715                 720

His Ala Met Pro Val His Trp Thr Thr Pro Asn Gly Phe Pro Val Trp
                725                 730                 735

Ser Glu Tyr Cys Lys Gln Glu Gln Lys Val Ile Asp Cys Val Ile Leu
                740                 745                 750

Gly Ser Met Arg Leu Gln Leu Lys Leu Asn Met Arg Asp Lys Lys Glu
            755                 760                 765

Ile Asp Thr Ala Lys Gln Ala Ser Gly Ile Ala Pro Asn Phe Val His
        770                 775                 780

Ser Met Asp Ala Ser His Leu Gln Met Thr Val Asn Lys Cys Phe Lys
785                 790                 795                 800

Val Tyr Gly Ile His Ser Phe Ala Met Ile His Asp Ser Phe Gly Cys
                805                 810                 815

His Ala Gly Phe Ala Ser Lys Met Phe Arg Ala Val Arg Glu Thr Met
            820                 825                 830

Val Glu Thr Tyr Glu Glu His Asp Val Ile Gln Glu Phe Tyr Asn Gln
        835                 840                 845

Phe Glu Lys Gln Leu His Glu Ser Gln Ile Glu Lys Met Pro Ala Leu
            850                 855                 860

Pro Arg Lys Gly Asn Leu Glu Leu Arg Glu Ile Leu Lys Ser Leu Tyr
865                 870                 875                 880

Thr Phe Ser

<210> SEQ ID NO 42
<211> LENGTH: 906
<212> TYPE: PRT
<213> ORGANISM: Unknown
<220> FEATURE:
<223> OTHER INFORMATION: Enterobacteria phage K11 sequence

<400> SEQUENCE: 42

Met Asn Ala Leu Asn Ile Gly Arg Asn Asp Phe Ser Glu Ile Glu Leu
1               5                   10                  15

Ala Ala Ile Pro Tyr Asn Ile Leu Ser Glu His Tyr Gly Asp Gln Ala
            20                  25                  30

Ala Arg Glu Gln Leu Ala Leu Glu His Glu Ala Tyr Glu Leu Gly Arg
        35                  40                  45

Gln Arg Phe Leu Lys Met Leu Glu Arg Gln Val Lys Ala Gly Glu Phe
    50                  55                  60

Ala Asp Asn Ala Ala Lys Pro Leu Val Leu Thr Leu His Pro Gln
65                  70                  75                  80

Leu Thr Lys Arg Ile Asp Asp Trp Lys Glu Glu Gln Ala Asn Ala Arg
                85                  90                  95

Gly Lys Lys Pro Arg Ala Tyr Tyr Pro Ile Lys His Gly Val Ala Ser
            100                 105                 110
```

Glu Leu Ala Val Ser Met Gly Ala Glu Val Leu Lys Glu Lys Arg Gly
            115                 120                 125

Val Ser Ser Glu Ala Ile Ala Leu Leu Thr Ile Lys Val Val Leu Gly
        130                 135                 140

Asn Ala His Arg Pro Leu Lys Gly His Asn Pro Ala Val Ser Ser Gln
145                 150                 155                 160

Leu Gly Lys Ala Leu Glu Asp Glu Ala Arg Phe Gly Arg Ile Arg Glu
                165                 170                 175

Gln Glu Ala Ala Tyr Phe Lys Lys Asn Val Ala Asp Gln Leu Asp Lys
            180                 185                 190

Arg Val Gly His Val Tyr Lys Lys Ala Phe Met Gln Val Val Glu Ala
        195                 200                 205

Asp Met Ile Ser Lys Gly Met Leu Gly Gly Asp Asn Trp Ala Ser Trp
    210                 215                 220

Lys Thr Asp Glu Gln Met His Val Gly Thr Lys Leu Leu Glu Leu Leu
225                 230                 235                 240

Ile Glu Gly Thr Gly Leu Val Glu Met Thr Lys Asn Lys Met Ala Asp
                245                 250                 255

Gly Ser Asp Asp Val Thr Ser Met Gln Met Val Gln Leu Ala Pro Ala
            260                 265                 270

Phe Val Glu Leu Leu Ser Lys Arg Ala Gly Ala Leu Ala Gly Ile Ser
        275                 280                 285

Pro Met His Gln Pro Cys Val Pro Pro Lys Pro Trp Val Glu Thr
    290                 295                 300

Val Gly Gly Gly Tyr Trp Ser Val Gly Arg Arg Pro Leu Ala Leu Val
305                 310                 315                 320

Arg Thr His Ser Lys Lys Ala Leu Arg Arg Tyr Ala Asp Val His Met
                325                 330                 335

Pro Glu Val Tyr Lys Ala Val Asn Leu Ala Gln Asn Thr Pro Trp Lys
            340                 345                 350

Val Asn Lys Lys Val Leu Ala Val Val Asn Glu Ile Val Asn Trp Lys
        355                 360                 365

His Cys Pro Val Gly Asp Val Pro Ala Ile Glu Arg Glu Glu Leu Pro
    370                 375                 380

Pro Arg Pro Asp Asp Ile Asp Thr Asn Glu Val Ala Arg Lys Ala Trp
385                 390                 395                 400

Arg Lys Glu Ala Ala Ala Val Tyr Arg Lys Asp Lys Ala Arg Gln Ser
                405                 410                 415

Arg Arg Cys Arg Cys Glu Phe Met Val Ala Gln Ala Asn Lys Phe Ala
            420                 425                 430

Asn His Lys Ala Ile Trp Phe Pro Tyr Asn Met Asp Trp Arg Gly Arg
        435                 440                 445

Val Tyr Ala Val Ser Met Phe Asn Pro Gln Gly Asn Asp Met Thr Lys
    450                 455                 460

Gly Ser Leu Thr Leu Ala Lys Gly Lys Pro Ile Gly Leu Asp Gly Phe
465                 470                 475                 480

Tyr Trp Leu Lys Ile His Gly Ala Asn Cys Ala Gly Val Asp Lys Val
                485                 490                 495

Pro Phe Pro Glu Arg Ile Lys Phe Ile Glu Glu Asn Glu Gly Asn Ile
            500                 505                 510

Leu Ala Ser Ala Ala Asp Pro Leu Asn Asn Thr Trp Trp Thr Gln Gln
        515                 520                 525

Asp Ser Pro Phe Cys Phe Leu Ala Phe Cys Phe Glu Tyr Ala Gly Val
            530                 535                 540

Lys His His Gly Leu Asn Tyr Asn Cys Ser Leu Pro Leu Ala Phe Asp
545                 550                 555                 560

Gly Ser Cys Ser Gly Ile Gln His Phe Ser Ala Met Leu Arg Asp Ser
                565                 570                 575

Ile Gly Gly Arg Ala Val Asn Leu Leu Pro Ser Asp Thr Val Gln Asp
            580                 585                 590

Ile Tyr Lys Ile Val Ala Asp Lys Val Asn Glu Val Leu His Gln His
        595                 600                 605

Ala Val Asn Gly Ser Gln Thr Val Val Glu Gln Ile Ala Asp Lys Glu
610                 615                 620

Thr Gly Glu Phe His Glu Lys Val Thr Leu Gly Glu Ser Val Leu Ala
625                 630                 635                 640

Ala Gln Trp Leu Gln Tyr Gly Val Thr Arg Lys Val Thr Lys Arg Ser
                645                 650                 655

Val Met Thr Leu Ala Tyr Gly Ser Lys Glu Ser Leu Val Arg Gln Gln
            660                 665                 670

Val Leu Glu Asp Thr Ile Gln Pro Ala Ile Asp Asn Gly Glu Gly Leu
        675                 680                 685

Met Phe Thr His Pro Asn Gln Ala Ala Gly Tyr Met Ala Lys Leu Ile
690                 695                 700

Trp Asp Ala Val Thr Val Thr Val Val Ala Ala Val Glu Ala Met Asn
705                 710                 715                 720

Trp Leu Lys Ser Ala Ala Lys Leu Leu Ala Ala Glu Val Lys Asp Lys
                725                 730                 735

Lys Thr Lys Glu Val Leu Arg Lys Arg Cys Ala Ile His Trp Val Thr
            740                 745                 750

Pro Asp Gly Phe Pro Val Trp Gln Glu Tyr Arg Lys Gln Asn Gln Ala
        755                 760                 765

Arg Leu Lys Leu Val Phe Leu Gly Gln Ala Asn Val Lys Met Thr Tyr
770                 775                 780

Asn Thr Gly Lys Asp Ser Glu Ile Asp Ala His Lys Gln Glu Ser Gly
785                 790                 795                 800

Ile Ala Pro Asn Phe Val His Ser Gln Asp Gly Ser His Leu Arg Met
                805                 810                 815

Thr Val Val His Ala Asn Glu Val Tyr Gly Ile Asp Ser Phe Ala Leu
            820                 825                 830

Ile His Asp Ser Ser Gly Thr Ile Pro Ala Asp Ala Gly Asn Leu Phe
        835                 840                 845

Lys Ala Val Arg Glu Thr Met Val Lys Thr Tyr Glu Asp Asn Asp Val
850                 855                 860

Ile Ala Asp Phe Tyr Asp Gln Phe Ala Asp Gln Leu His Glu Ser Gln
865                 870                 875                 880

Leu Asp Lys Met Pro Ala Val Pro Ala Lys Gly Asp Leu Asn Leu Arg
                885                 890                 895

Asp Ile Leu Glu Ser Asp Phe Ala Phe Ala
            900                 905

<210> SEQ ID NO 43
<211> LENGTH: 779
<212> TYPE: PRT
<213> ORGANISM: Synechococcus virus Syn5

<400> SEQUENCE: 43

```
Met Ser Phe Asp Leu Ile Ala Arg Gln Leu Gln Arg Glu Thr Glu Ala
1               5                   10                  15

Ala Glu Leu Ala Arg Lys Arg Leu Gln Asp Ala Arg Arg Glu Ala Asn
            20                  25                  30

Glu Arg Ser Tyr Ala Ser Ser Asn Ile Glu Ser Arg Lys Ala Ile Ala
        35                  40                  45

Thr Phe Leu Asp Pro Ile Ala Gln Arg Ile Gly Glu Arg Leu Phe Thr
    50                  55                  60

Leu Arg Arg Gly Thr Gly Ala Val Asp Ala Ala Glu Val Tyr Lys His
65                  70                  75                  80

Leu Lys Asn Ala Asp His His Leu Ala Leu Ile Thr Met Lys Thr
            85                  90                  95

Ala Leu Asp Val Leu Gly Lys Asp Pro Glu Pro Gln Ile Gln Gln Leu
                100                 105                 110

Thr Thr Ala Ile Gly Arg Asn Ile Gln Leu Glu Leu Arg Leu Thr Tyr
            115                 120                 125

Tyr Ala Glu Glu Asn Pro Glu Leu Tyr Lys Gln Ala Ser Arg Phe Phe
        130                 135                 140

His Ala Gly Thr Gly Thr Arg Gln Lys Ala Thr Val Ile Lys Leu Lys
145                 150                 155                 160

Phe Asn Arg Glu Gly Ile Glu Trp Asp Gln Trp Ser Arg Val Thr Cys
                165                 170                 175

His Lys Val Gly Gln Trp Leu Met Leu Ala Met Ala Asp Val Thr Gly
                180                 185                 190

Trp Ile Glu Arg Ala Thr Asp Arg Thr Ser Gly Gly Arg Lys Thr Lys
            195                 200                 205

Thr Arg Ile Cys Tyr Ser Arg Glu Phe Leu Gln His Arg Asp Thr Ile
    210                 215                 220

Leu Ala Ala Ala Glu Gln Leu Ala Phe Cys Gln Trp Pro Met Leu Cys
225                 230                 235                 240

Pro Pro Ile Glu Trp Ser Asn Asp His Asn Gly Gly Tyr Leu Ser Glu
                245                 250                 255

Gln Ile Arg Arg Val Asn Pro Leu Ile Arg Lys Thr Gly Pro Leu Gly
            260                 265                 270

Thr Arg Lys Gln Gly Asp Ile Pro Leu Ala Met Leu Asn Asn Leu Gln
    275                 280                 285

Gly Gln Ala Tyr Lys Val Asn Pro Glu Val Leu Asp Ile Ala Asn His
            290                 295                 300

Cys Tyr Glu Ser Asn Val Thr Val Gly Lys Phe Ile Arg His Ala Pro
305                 310                 315                 320

Leu Pro Val Pro Pro Ser Pro Gly Glu Asp Cys Thr Glu Asp Gln Leu
                325                 330                 335

Thr Ala Tyr Lys Arg Ala Arg Arg Glu Ala Glu Asp Phe Asn Ala Gln
            340                 345                 350

Ile Ser Gln Lys Asn Trp Arg Thr Thr Glu Val Met Tyr Val Ala Arg
    355                 360                 365

Lys Tyr Ala Asp Glu Ala Ser Phe Trp Met Pro Ala Ser Phe Asp Tyr
    370                 375                 380

Arg Gly Arg Val Tyr Phe Leu Asn Thr Ala Leu Asn Pro Gln Gly Thr
385                 390                 395                 400

Asp Phe Asp Lys Ala Leu Leu Tyr Phe Ala Glu Glu Gly Pro Val Asn
            405                 410                 415
```

```
Glu Trp Trp Leu Ser Phe His Val Ala Thr Thr Tyr Gly Leu Asp Lys
            420                 425                 430

Glu Thr Met Val Asn Arg Val Gln Trp Ala Arg Asp Asn His Glu Leu
            435                 440                 445

Ile Asp Arg Ile Ala Ser Asp Pro Val Arg His Thr Glu Trp His Asp
450                 455                 460

Ala Asp Glu Pro Trp Cys Phe Leu Ala Ala Cys Leu Glu Tyr Lys Ala
465                 470                 475                 480

Cys Val Ile Asp Gly Thr Lys Gln Thr Ser Gly Leu Pro Ile Gly Ile
                485                 490                 495

Asp Ala Thr Cys Ser Gly Leu Gln His Leu Ala Ala Met Thr Arg Cys
            500                 505                 510

Gly Arg Thr Ala Ala Leu Val Asn Val Thr Pro Thr Asp Lys Pro Ala
            515                 520                 525

Asp Ala Tyr Lys Thr Val Ala Gln Ala Ser Leu Lys His Leu Pro Lys
530                 535                 540

Glu Gln His Glu Trp Ile Thr Arg Lys Val Thr Lys Arg Pro Val Met
545                 550                 555                 560

Cys Thr Pro Tyr Gly Val Thr Met Ser Ser Ala Arg Gly Tyr Ile Arg
                565                 570                 575

Asp Gln Leu Val Lys Asp Gly His Lys Glu Asp Leu Arg Ser Pro Gly
            580                 585                 590

Val Leu Asn Gly Ile Val Lys Ala Ile Phe Asn Glu Ala Ile Pro Glu
            595                 600                 605

Val Ile Pro Gly Pro Val Gln Val Met Ala Trp Leu Lys Arg Ser Ala
610                 615                 620

Gly Gln Ile Ile Asp Arg Gly Asp Ser Thr Ile Thr Trp Thr Thr Pro
625                 630                 635                 640

Ser Gly Phe Glu Val Val Gln Asp Leu Lys Lys Ser Lys Thr Tyr Glu
                645                 650                 655

Val Lys Thr Arg Ile Met Gly Gly Ala Arg Ile Lys Leu Gln Val Gly
            660                 665                 670

Asp Gly Phe Thr Asp Glu Pro Asp Arg Asp His His Lys Ser Ala Leu
            675                 680                 685

Ala Pro Asn Val Val His Ser Asn Asp Ala Ser Leu Leu His Leu Thr
690                 695                 700

Phe Ala Phe Trp Asp Lys Pro Phe Thr Val Ile His Asp Cys Val Leu
705                 710                 715                 720

Gly Arg Ser Cys Asp Met Asp Gln Met Gly Ser Asp Ile Arg Leu His
                725                 730                 735

Phe Ala Glu Met Tyr Lys Ala Asp Val Met Gln Asp Trp Ala Asp Gln
            740                 745                 750

Val Gly Val Glu Leu Pro Val Asp Leu Ile Lys Asn Thr Leu Asp Ile
            755                 760                 765

Asp Ser Val Asn Gln Ser Leu Tyr Phe Phe Ser
770                 775

<210> SEQ ID NO 44
<211> LENGTH: 20
<212> TYPE: DNA
<213> ORGANISM: Artificial Sequence
<220> FEATURE:
<223> OTHER INFORMATION: T7 promoter sequence with 3'-GG

<400> SEQUENCE: 44
```

```
taatacgact cactataggg                                              20
```

<210> SEQ ID NO 45
<211> LENGTH: 51
<212> TYPE: DNA
<213> ORGANISM: Artificial Sequence
<220> FEATURE:
<223> OTHER INFORMATION: Anchored Oligo(dT)
<220> FEATURE:
<221> NAME/KEY: modified_base
<222> LOCATION: (51)..(51)
<223> OTHER INFORMATION: a, c, t, or g
<220> FEATURE:
<221> NAME/KEY: misc_feature
<222> LOCATION: (51)..(51)
<223> OTHER INFORMATION: n is a, c, g, or t

<400> SEQUENCE: 45

```
gggcagacgt gtgctcttcc gatctttttt tttttttttt ttttttttv n            51
```

<210> SEQ ID NO 46
<211> LENGTH: 29
<212> TYPE: DNA
<213> ORGANISM: Artificial Sequence
<220> FEATURE:
<223> OTHER INFORMATION: Oligonucleotide tethered to ddNTP
<220> FEATURE:
<221> NAME/KEY: modified_base
<222> LOCATION: (1)..(8)
<223> OTHER INFORMATION: a, c, t, or g
<220> FEATURE:
<221> NAME/KEY: misc_feature
<222> LOCATION: (1)..(8)
<223> OTHER INFORMATION: n is a, c, g, or t

<400> SEQUENCE: 46

```
nnnnnnnnag atcggaagag cgtcgtgta                                   29
```

<210> SEQ ID NO 47
<211> LENGTH: 42
<212> TYPE: DNA
<213> ORGANISM: Artificial Sequence
<220> FEATURE:
<223> OTHER INFORMATION: Fw primer for gene Z

<400> SEQUENCE: 47

```
tacacgacgc tcttccgatc tcaatggcca ttaaccgcgt tg                     42
```

<210> SEQ ID NO 48
<211> LENGTH: 43
<212> TYPE: DNA
<213> ORGANISM: Artificial Sequence
<220> FEATURE:
<223> OTHER INFORMATION: Rev primer for gene Z

<400> SEQUENCE: 48

```
cagacgtgtg ctcttccgat ctacctttca gggatgaacg ctg                    43
```

<210> SEQ ID NO 49
<211> LENGTH: 42
<212> TYPE: DNA
<213> ORGANISM: Artificial Sequence
<220> FEATURE:
<223> OTHER INFORMATION: Fw primer for gene U

<400> SEQUENCE: 49

```
tacacgacgc tcttccgatc tgcagttgcc gtttatctca cc                     42
```

```
<210> SEQ ID NO 50
<211> LENGTH: 43
<212> TYPE: DNA
<213> ORGANISM: Artificial Sequence
<220> FEATURE:
<223> OTHER INFORMATION: Rev primer for gene U

<400> SEQUENCE: 50
cagacgtgtg ctcttccgat ctaactccac aagcccgcat cat          43

<210> SEQ ID NO 51
<211> LENGTH: 42
<212> TYPE: DNA
<213> ORGANISM: Artificial Sequence
<220> FEATURE:
<223> OTHER INFORMATION: Fw primer for gene V

<400> SEQUENCE: 51
tacacgacgc tcttccgatc tcgaatccgc tttcagacgt tg           42

<210> SEQ ID NO 52
<211> LENGTH: 43
<212> TYPE: DNA
<213> ORGANISM: Artificial Sequence
<220> FEATURE:
<223> OTHER INFORMATION: Rev primer for gene V

<400> SEQUENCE: 52
cagacgtgtg ctcttccgat ctgggtatcg ccttcattaa acc          43

<210> SEQ ID NO 53
<211> LENGTH: 42
<212> TYPE: DNA
<213> ORGANISM: Artificial Sequence
<220> FEATURE:
<223> OTHER INFORMATION: Fw primer for gene G

<400> SEQUENCE: 53
tacacgacgc tcttccgatc ttgatgaaac ggcaggcaga ac           42

<210> SEQ ID NO 54
<211> LENGTH: 43
<212> TYPE: DNA
<213> ORGANISM: Artificial Sequence
<220> FEATURE:
<223> OTHER INFORMATION: Rev primer for gene G

<400> SEQUENCE: 54
cagacgtgtg ctcttccgat cttacatacc agacagccgg tac          43

<210> SEQ ID NO 55
<211> LENGTH: 42
<212> TYPE: DNA
<213> ORGANISM: Artificial Sequence
<220> FEATURE:
<223> OTHER INFORMATION: Fw primer for gene T

<400> SEQUENCE: 55
tacacgacgc tcttccgatc tctgctggat atgcactttt cc           42

<210> SEQ ID NO 56
<211> LENGTH: 43
<212> TYPE: DNA
<213> ORGANISM: Artificial Sequence
<220> FEATURE:
<223> OTHER INFORMATION: Rev primer for gene T
```

-continued

<400> SEQUENCE: 56
cagacgtgtg ctcttccgat ctcccttctg atactgtcat cag          43

<210> SEQ ID NO 57
<211> LENGTH: 42
<212> TYPE: DNA
<213> ORGANISM: Artificial Sequence
<220> FEATURE:
<223> OTHER INFORMATION: Fw primer for gene H

<400> SEQUENCE: 57
tacacgacgc tcttccgatc tgatattggt cgtcctgata cc           42

<210> SEQ ID NO 58
<211> LENGTH: 43
<212> TYPE: DNA
<213> ORGANISM: Artificial Sequence
<220> FEATURE:
<223> OTHER INFORMATION: Rev primer for gene H

<400> SEQUENCE: 58
cagacgtgtg ctcttccgat cttcggtata tttcagccgt gac          43

<210> SEQ ID NO 59
<211> LENGTH: 42
<212> TYPE: DNA
<213> ORGANISM: Artificial Sequence
<220> FEATURE:
<223> OTHER INFORMATION: Fw primer for gene M

<400> SEQUENCE: 59
tacacgacgc tcttccgatc tgctttggtg atggctattc tc           42

<210> SEQ ID NO 60
<211> LENGTH: 43
<212> TYPE: DNA
<213> ORGANISM: Artificial Sequence
<220> FEATURE:
<223> OTHER INFORMATION: Rev primer for gene M

<400> SEQUENCE: 60
cagacgtgtg ctcttccgat ctcagttcac cacctgttca aac          43

<210> SEQ ID NO 61
<211> LENGTH: 42
<212> TYPE: DNA
<213> ORGANISM: Artificial Sequence
<220> FEATURE:
<223> OTHER INFORMATION: Fw primer for gene L

<400> SEQUENCE: 61
tacacgacgc tcttccgatc ttttacgccc gttttctgga tg           42

<210> SEQ ID NO 62
<211> LENGTH: 43
<212> TYPE: DNA
<213> ORGANISM: Artificial Sequence
<220> FEATURE:
<223> OTHER INFORMATION: Rev primer for gene L

<400> SEQUENCE: 62
cagacgtgtg ctcttccgat ctgacgttgg ctggtcatat tca          43

<210> SEQ ID NO 63
<211> LENGTH: 42

```
<212> TYPE: DNA
<213> ORGANISM: Artificial Sequence
<220> FEATURE:
<223> OTHER INFORMATION: Fw primer for gene K

<400> SEQUENCE: 63
tacacgacgc tcttccgatc tcgattcata agttccgctg tg                        42

<210> SEQ ID NO 64
<211> LENGTH: 43
<212> TYPE: DNA
<213> ORGANISM: Artificial Sequence
<220> FEATURE:
<223> OTHER INFORMATION: Rev primer for gene K

<400> SEQUENCE: 64
cagacgtgtg ctcttccgat cttgattcgg cactgatgaa cca                       43

<210> SEQ ID NO 65
<211> LENGTH: 42
<212> TYPE: DNA
<213> ORGANISM: Artificial Sequence
<220> FEATURE:
<223> OTHER INFORMATION: Fw primer for gene I

<400> SEQUENCE: 65
tacacgacgc tcttccgatc tttacaacga tttggtcgcc gc                        42

<210> SEQ ID NO 66
<211> LENGTH: 43
<212> TYPE: DNA
<213> ORGANISM: Artificial Sequence
<220> FEATURE:
<223> OTHER INFORMATION: Rev primer for gene I

<400> SEQUENCE: 66
cagacgtgtg ctcttccgat ctgacaatct ggaatacgcc acc                       43

<210> SEQ ID NO 67
<211> LENGTH: 42
<212> TYPE: DNA
<213> ORGANISM: Artificial Sequence
<220> FEATURE:
<223> OTHER INFORMATION: Fw primer for gene J

<400> SEQUENCE: 67
tacacgacgc tcttccgatc tagcgtgaaa gcagtgtgga ct                        42

<210> SEQ ID NO 68
<211> LENGTH: 43
<212> TYPE: DNA
<213> ORGANISM: Artificial Sequence
<220> FEATURE:
<223> OTHER INFORMATION: Rev primer for gene J

<400> SEQUENCE: 68
cagacgtgtg ctcttccgat ctccgctggc atgtcaacaa tac                       43

<210> SEQ ID NO 69
<211> LENGTH: 26
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: modified_base
<222> LOCATION: (26)..(26)
```

```
<223> OTHER INFORMATION: a, c, t, or g
<220> FEATURE:
<221> NAME/KEY: misc_feature
<222> LOCATION: (26)..(26)
<223> OTHER INFORMATION: n is a, c, g, or t

<400> SEQUENCE: 69
tttttttttt tttttttttt tttttvn                                    26

<210> SEQ ID NO 70
<211> LENGTH: 15
<212> TYPE: DNA
<213> ORGANISM: Artificial Sequence
<220> FEATURE:
<223> OTHER INFORMATION: Synthetic oligonucleotide

<400> SEQUENCE: 70
tttttttttt ttttt                                                 15

<210> SEQ ID NO 71
<211> LENGTH: 15
<212> TYPE: DNA
<213> ORGANISM: Artificial Sequence
<220> FEATURE:
<223> OTHER INFORMATION: Synthetic oligonucleotide

<400> SEQUENCE: 71
aaaaaaaaaa aaaaa                                                 15
```

MUTANT POLYMERASES AND METHODS OF USING THE SAME

CROSS REFERENCE TO RELATED APPLICATIONS

This application is the § 371 U.S. National Stage of International Application No. PCT/EP2021/062559, filed May 11, 2021, which was published in English under PCT Article 21 (2), which in turn claims the benefit of U.S. Provisional Application No. 63/023,026, filed May 11, 2020, which is incorporated herein by reference in its entirety.

SEQUENCE LISTING

The instant application contains a Sequence Listing which is submitted electronically in ASCII text format and is hereby incorporated by reference in its entirety. Said file was created on Nov. 10, 2022, is named LT01512PCT_SL.txt and is 191,812 bytes in size.

FIELD OF THE INVENTION

The current disclosure relates to mutant phage-type RNA polymerases, including mutant T7, SP6, and T3 RNA polymerases that can use 2'-modified nucleoside triphosphates or deoxynucleotide triphosphates as substrates. This disclosure also relates to methods for producing nucleic acid molecules using these mutant polymerases.

BACKGROUND

RNA stability is a major issue in RNA research and applications involving RNA (e.g. monitoring of gene expression, in vitro transcription for generation of RNA probes, studies of ribozymes, RNA interference, CRISPR/Cas9 mediated genome editing, selection of aptamers, etc.). Oligonucleotides with altered chemistry have proven to be of great value. Modifications, especially at 2' position of the ribose, do not significantly change the conformation of RNA, however, substantially increase its melting temperature, resistance to ribonucleases, result in faster hybridization kinetics and greater chemical stability.

In response to rapid development of the field of RNA biology, synthesis of natural and modified RNA has become an active field. Chemical synthesis of RNA oligonucleotides can be low-yielding, time-consuming, difficult to scale and expensive. Low coupling efficiency of RNA monomers significantly limits the length of attainable RNA. Alternatively, bacteriophage T7 RNA polymerase (T7 RNAP) is the enzyme of choice for highly efficient enzymatic synthesis of RNA. However, wild type T7 RNAP is able to efficiently incorporate only natural (or canonical) ribonucleoside triphosphates (rNTPs). Some T7 RNA mutants exhibit reduced discrimination between canonical and noncanonical triphosphates; however, such discrimination is still substantial. Substitutions of multiple rNTPs with dNTPs causes significant reductions in the activity of known T7 RNA polymerases, thus limiting the use of these enzymes in the synthesis of mixed rNMP/dNMP-containing transcripts. It has also been proposed that mutations that confer new activity in an enzyme also destabilize the protein, rendering it less active overall, with low transcriptional yields (See Wang, et al., *Journal of Molecular Biology* 320:85-95 (2002) and Romero et al., *Biotechnology and Bioengineering* 103 (3): 472-479 (2009)).

Enzymatic synthesis of modified RNA and/or DNA oligonucleotides and polynucleotides is useful for many applications, especially those where chemically stable, non-immunogenic oligonucleotides are required. Interest in efficient enzymatic synthesis of single-stranded DNA (ssDNA) has been growing due to its broad applicability in nanotechnology, genome editing, drug delivery, data storage, and many more. Thus, there are needs for enzymes (e.g. polymerases and other enzymes) with expanded ranges of accepted nucleotide substrates and/or overall high activity. Provided herein are polymerases, in particular, mutant RNA polymerases, and related methods and compositions that can solve these needs and/or provide other benefits.

SUMMARY

Disclosed herein are mutant RNA polymerases. These polymerases may be mutant phage-type RNA polymerases, including mutant T7, SP6, or T3 RNA polymerases. These mutant polymerases may have enhanced ability to incorporate one or more modified nucleoside triphosphates, modified rNTPs, dNTPs, and/or ddNTPs compared with the wild type RNA polymerase. Methods for producing nucleic acid molecules using these mutant polymerases are also disclosed.

In some aspects, a mutant polymerase comprises:
a. a catalytic domain having at least 80%, 85%, 90%, 95%, 98% or 99% sequence identity with SEQ ID NO: 4, and wherein the mutant polymerase comprises one or more mutations at position V459, G231, V365, F222, M372, T405, P406, Q462, and/or D463 relative to SEQ ID NO: 4; or
b. a catalytic domain having at least 80%, 85%, 90%, 95%, 98% or 99% sequence identity with SEQ ID NO: 5, and wherein the mutant polymerase comprises one or more mutations at position V481, G257, T391, H247, I398, L430, P431, H484, and/or D485 relative to SEQ ID NO: 5; or
c. a catalytic domain having at least 80%, 85%, 90%, 95%, 98% or 99% sequence identity with SEQ ID NO: 6, and wherein the mutant polymerase comprises one or more mutations at position V459, G231, V365, F222, M372, T405, P406, Q462, and/or D463 relative to SEQ ID NO: 6.

In some aspects, the mutant polymerase further comprises an N-terminal domain having at least 80%, 85%, 90%, 95%, 98% or 99% sequence identity with amino acid sequence corresponding to amino acids 1-324 of SEQ ID NO: 1, 1-297 of SEQ ID NO: 2, or 1-325 of SEQ ID NO: 3.

In some aspects, the mutant polymerase comprises:
(i) a catalytic domain having at least 80%, 85%, 90%, 95%, 98% or 99% sequence identity with SEQ ID NO: 4,
(ii) one or more mutations at position V459, G231, V365, F222, M372, T405, P406, Q462, and/or D463 relative to SEQ ID NO: 4, and
(iii) an N-terminal domain having at least 80%, 85%, 90%, 95%, 98% or 99% sequence identity with amino acid sequence corresponding to amino acids 1-324 of SEQ ID NO: 1.

In some aspects, the mutant polymerase comprises:
(i) a catalytic domain having at least 80%, 85%, 90%, 95%, 98% or 99% sequence identity with SEQ ID NO: 5,
(ii) one or more mutations at position V481, G257, T391, H247, I398, L430, P431, H484, and/or D485 relative to SEQ ID NO: 5, and (iii) an N-terminal domain having at least 80%, 85%, 90%, 95%, 98% or 99% sequence identity with amino acid sequence corresponding to amino acids 1-297 of SEQ ID NO: 2.

In some aspects, the mutant polymerase comprises:
(i) a catalytic domain having at least 80%, 85%, 90%, 95%, 98% or 99% sequence identity with SEQ ID NO: 6,
(ii) one or more mutations at position V459, G231, V365, F222, M372, T405, P406, Q462, and/or D463 relative to SEQ ID NO: 6, and
(iii) an N-terminal domain having at least 80%, 85%, 90%, 95%, 98% or 99% sequence identity with amino acid sequence corresponding to amino acids 1-325 of SEQ ID NO: 3.

In some aspects, the catalytic domain and the N-terminal domain of mutant polymerase are covalently linked. In some aspects, the catalytic domain and the N-terminal domain of mutant polymerase are non-covalently linked.

In some aspects, a mutant polymerase comprises:
a. at least 80%, 85%, 90%, 95%, 98% or 99% sequence identity with SEQ ID NO: 1 and one or more mutations at position V783, G555, V689, F546, M696, T729, P730, Q786, and/or D787 relative to SEQ ID NO: 1; or
b. at least 80%, 85%, 90%, 95%, 98% or 99% sequence identity with SEQ ID NO: 2 and one or more mutations at position V778, G554, T688, H544, I695, L727, P728, H781, and/or D782 relative to SEQ ID NO: 2; or
c. at least 80%, 85%, 90%, 95%, 98% or 99% sequence identity with SEQ ID NO: 3 and one or more mutations at position V784, G556, V690, F547, M697, T730, P731, Q787, and/or D788 relative to SEQ ID NO: 3.

In some aspects, the mutant polymerase comprises:
a. at least 80%, 85%, 90%, 95%, 98% or 99% sequence identity with SEQ ID NO: 1 and one or more mutations at position V783, G555, V689, F546, M696, T729, P730, Q786, and/or D787 relative to SEQ ID NO: 1, and wherein the mutant polymerase can bind a T7 promoter; or
b. at least 80%, 85%, 90%, 95%, 98% or 99% sequence identity with SEQ ID NO: 2 and one or more mutations at position V778, G554, T688, H544, I695, L727, P728, H781, and/or D782 relative to SEQ ID NO: 2, and wherein the mutant polymerase can bind a SP6 promoter; or
c. at least 80%, 85%, 90%, 95%, 98% or 99% sequence identity with SEQ ID NO: 3 and one or more mutations at position V784, G556, V690, F547, M697, T730, P731, Q787, and/or D788 relative to SEQ ID NO: 3, and wherein the mutant polymerase can bind a T3 promoter.

In some aspects, the mutant polymerase comprises:
a. at least 80%, 85%, 90%, 95%, 98% or 99% sequence identity with SEQ ID NO: 1 and one or more mutations at position V783, G555, and/or V689 relative to SEQ ID NO: 1; or
b. at least 80%, 85%, 90%, 95%, 98% or 99% sequence identity with SEQ ID NO: 2 and one or more mutations at position V778, G554, and/or T688 relative to SEQ ID NO: 2; or
c. at least 80%, 85%, 90%, 95%, 98% or 99% sequence identity with SEQ ID NO: 3 and one or more mutations at position V784, G556, and/or V690 relative to SEQ ID NO: 3.

In some aspects, the mutant polymerase comprises:
a. 1, 2, 3, 4, 5, 6, 7, 8, 9, or 10 mutations in the catalytic domain,
b. 1, 2, 3, 4, 5, 6, 7, 8, 9, or 10 mutations in the fingers subdomain, and/or
c. 1, 2, 3, 4, 5, 6, 7, 8, 9, or 10 mutations in the palm subdomains.

In some aspects, the mutant polymerase is provided, having at least 30%, 35%, 40%, 45%, 50%, 55%, 60%, 65%, 70%, 75%, 80%, 85%, 90%, 95%, 98% or 99% of the polymerase activity of the corresponding wild type polymerase when unmodified rNTPs are used for synthesizing RNA oligonucleotides from a DNA template.

In some aspects, the mutant polymerase is provided, having at least 80%, 85%, 90%, 95%, 98% or 99% sequence identity with SEQ ID NO: 1.

In some aspects, the mutant polymerase comprises one or more of the following substitutions relative to SEQ ID NO: 1:
a. a V783M, V783L, V783I, or V783C substitution,
b. a G555L, G555M, G555I, G555V, or G555Y substitution,
c. a V689Q, V689N, V689D, V689E, V689R, V689S, or V689W substitution,
d. a F546E, F546M, or F546I substitution,
e. a M696G or M696H substitution,
f. a T729H, T729L, or T729R substitution,
g. a P730Y substitution,
h. a Q786M, Q786L, Q786N, or Q786W substitution, and/or
i. a D787I substitution.

In some aspects, the mutant polymerase comprises two or more substitutions selected from V783M, G555L, and V689Q. In some aspects, the mutant polymerase comprises V783M, G555L, and V689Q substitutions.

In some aspects, provided herein is a method for synthesizing a single-stranded nucleic acid comprising the steps of:
a. preparing a synthesis reaction mixture comprising:
i. a mutant RNA polymerase having enhanced ability to incorporate one or more modified nucleoside triphosphates, modified rNTPs, dNTPs, and/or ddNTPs compared with the wild type RNA polymerase,
ii. at least one nucleic acid template, and
iii. a mixture of nucleoside triphosphates; and
b. performing a synthesis reaction under conditions that result in the production of one or more single-stranded nucleic acids.

In some aspects, the mutant RNA polymerase used in said method comprises an amino acid sequence having at least 80%, 85%, 90%, 95%, 98%, or 99% sequence identity with a sequence selected from SEQ ID NOs: 1 to 6, and 25 to 43, wherein said mutant RNA polymerase comprises at least one substitution or substitution set in said amino acid sequence. In further aspects of the method, the mutant RNA polymerase comprises at least one amino acid substitution at a position corresponding to the position V783, G555, and/or V689 of SEQ ID NO:1. In further aspects, the mutant RNA polymerase is the mutant polymerase as disclosed in previous paragraphs. In some aspects, the at least one nucleic acid template used in a method for synthesizing single-stranded nucleic acid comprises one or more promoter sequences recognized by the mutant polymerase. In some aspects, the at least one nucleic acid template comprises a T7, SP6, or T3 promoter operably linked to a target nucleotide sequence.

In some aspects, in a method of synthesizing single-stranded nucleic acid, the mixture of nucleoside triphosphates comprises one or more nucleoside triphosphates selected from modified nucleoside triphosphates, modified rNTPs, dNTPs, and ddNTPs. In some aspects, the mixture of nucleoside triphosphates comprises one or more dNTPs. In some aspects, the mixture of nucleoside triphosphates consists essentially of one or more dNTPs. In some aspects, one or more dNTPs in the mixture of nucleoside triphosphates are modified; in further aspects, one or more dNTPs are 2'-F modified.

In some aspects, in a method of synthesizing single-stranded nucleic acid, the mixture of nucleoside triphosphates comprises one or more 2'-modified rNTPs. In some aspects, the one or more 2'-modified rNTPs are selected from 2'-O-methyl, 2'-NH$_2$, 2'-F, and 2'-methoxy ethyl rNTPs. In some aspects, the mixture of nucleoside triphosphates consists essentially of one or more 2'-modified rNTPs.

In some aspects, a mixture of nucleoside triphosphates comprises:
  a. one or more dNTPs and one or more rNTPs,
  b. three different dNTPs and one rNTP,
  c. two different dNTPs and two different rNTPs, or
  d. one dNTP and three different rNTPs.

In some aspects, one or more rNTPs are modified. In some aspects, one or more rNTPs are 2'-modified.

In some aspects, a mixture of nucleoside triphosphates comprises:
  a. dTTP, dCTP, ATP, and GTP;
  b. dTTP, CTP, ATP, and dGTP;
  c. dTTP, dCTP, dATP, and GTP;
  d. dTTP, dCTP, dATP, and 2'-F-dGTP;
  e. dUTP, dCTP, ATP, and GTP; or
  f. dUTP, dCTP, dATP, and GTP.

In some aspects, a mixture of nucleoside triphosphates further comprises one or more ddNTP. In some aspects, one or more ddNTP is modified.

In some aspects, synthesis reaction mixture further comprises a cap or cap analog.

In some aspects, the mixture of nucleoside triphosphates comprises one or more oligonucleotide-tethered nucleotide of formula (A):

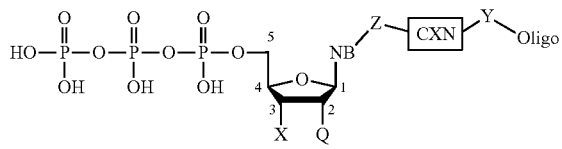

Oligo is an oligonucleotide of 3 to 100 nucleotides;
each of X and Q are independently chosen from, H, OH, N$_3$, halo, alkyl, alkoxy, alkyl, alkenyl, alkynyl, acyl, cyano, amino, ester, and amido;
each of Z and Y are independently chosen from a bond, amino, amido, alkyl, alkenyl, alkynyl, thioether, sulfonyl, sulfonamido, ether, ketone, carbonyl, anhydride, ester, imido, urea, urethane, and combinations thereof; and
CXN is chosen from alkylene, alkenylene, alkynylene, ketone, carbonate, ester, ether, anhydride, amido, amino, aminoalkylene, imino, imido, diazo, carbamate ester, phosphodiester, sulfide, disulfide, sulfonyl, sulfonamido, and a heterocyclic group containing from one to four N, O, S atom(s) or a combination thereof where heterocyclic group is optionally substituted at carbon, nitrogen or sulfur atom(s).

In some aspects, CXN is Click and wherein Click is a product of a click reaction between one of the following pairs of functional groups: i) alkynyl and azido; ii) thiol and alkynyl; iii) thiol and alkenyl; iv) azido and cyclooctanyl; and v) cyclooctanyl and nitrone.

In some aspects, the mixture of nucleoside triphosphates comprises one or more oligonucleotide-tethered nucleotide of formula (I):

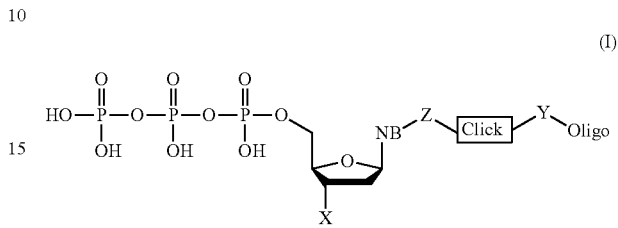

or a salt thereof,
wherein X is H, N$_3$, or OH;
NB represents a nucleobase chosen from adenine, 7-deaza-adenine, cytosine, guanine, 7-deazaguanine, thymine, uracil and inosine;
Z and Y are linkers, wherein Z and Y each independently comprise at least one linking moiety chosen from amino, amido, alkyl, alkenyl, alkynyl, thioether, sulfonyl, sulfonamido, ether, ketone, carbonyl, anhydride, ester, imide, urea, urethane, or any combination thereof; Click is the product of a click reaction; and
Oligo is an oligonucleotide of 3 to 100 nucleotides in length.

In some aspects, X of formula (A) or formula (I) is OH. In other aspects, X of formula (A) or formula (I) is H.

In some aspects, the one or more synthesized nucleic acid synthesized by method of synthesizing single-stranded nucleic acid comprise deoxyribonucleotides and/or ribonucleotides. In some aspects, the one or more synthesized nucleic acid comprise deoxyribonucleotides. In other aspects, the one or more nucleic acid comprise deoxyribonucleotides and ribonucleotides.

In some aspects, a method of synthesizing single-stranded nucleic acid further comprises an amplification reaction, wherein at least one or more of the synthesized nucleic acids serves as a primer. In some aspects, the primer comprises from about 8 to about 200 nucleotides.

In some aspects, the one or more synthesized nucleic acid synthesized by method of synthesizing single-stranded nucleic acid comprise ribonucleotides. In some aspects, one or more nucleic acid comprise modified ribonucleotides. In some aspects, the one or more nucleic acid comprising ribonucleotides are an RNA aptamer, a ribozyme, an siRNA, an miRNA, or an antisense RNA.

In some aspects, the one or more nucleic acids synthesized by method for synthesizing single-stranded nucleic acid comprise from about 8 to about 2000 nucleotides.

In some aspects, the synthesis reaction does not require primers.

In some aspects, the amplification reaction does not require addition of primers.

In some aspects, the synthesis reaction is performed without changes in reaction temperature.

In some aspects, the method for synthesizing single-stranded nucleic acid is used for production of barcoded nucleic acid oligonucleotides, enzymatic primer synthesis, unbiased amplification of specific targets, whole genome amplification, or tagging via in vitro transcription.

In some aspects, nucleic acids obtained by the method of synthesizing single-stranded nucleic acid are used for amplicon sequencing or preparation of a sequencing library.

Data presented are with the following PCR mixes: (A) DreamTaq PCR Master Mix (2×); (B) Platinum II Hot-Start PCR Master Mix; (C) Platinum SuperFi PCR Master Mix; (D) Phusion Hot Start II High-Fidelity PCR Master Mix; and (E) Phusion U Multiplex PCR Master Mix. NC—a negative control reaction with no primer having SEQ ID NO: 21 added; ssDNA primer—a chemically synthesized primer having SEQ ID NO: 21 used as a positive control reaction. First and last lanes-GeneRuler DNA Ladder Mix (Thermo Scientific, SM0331).

Figure 8:
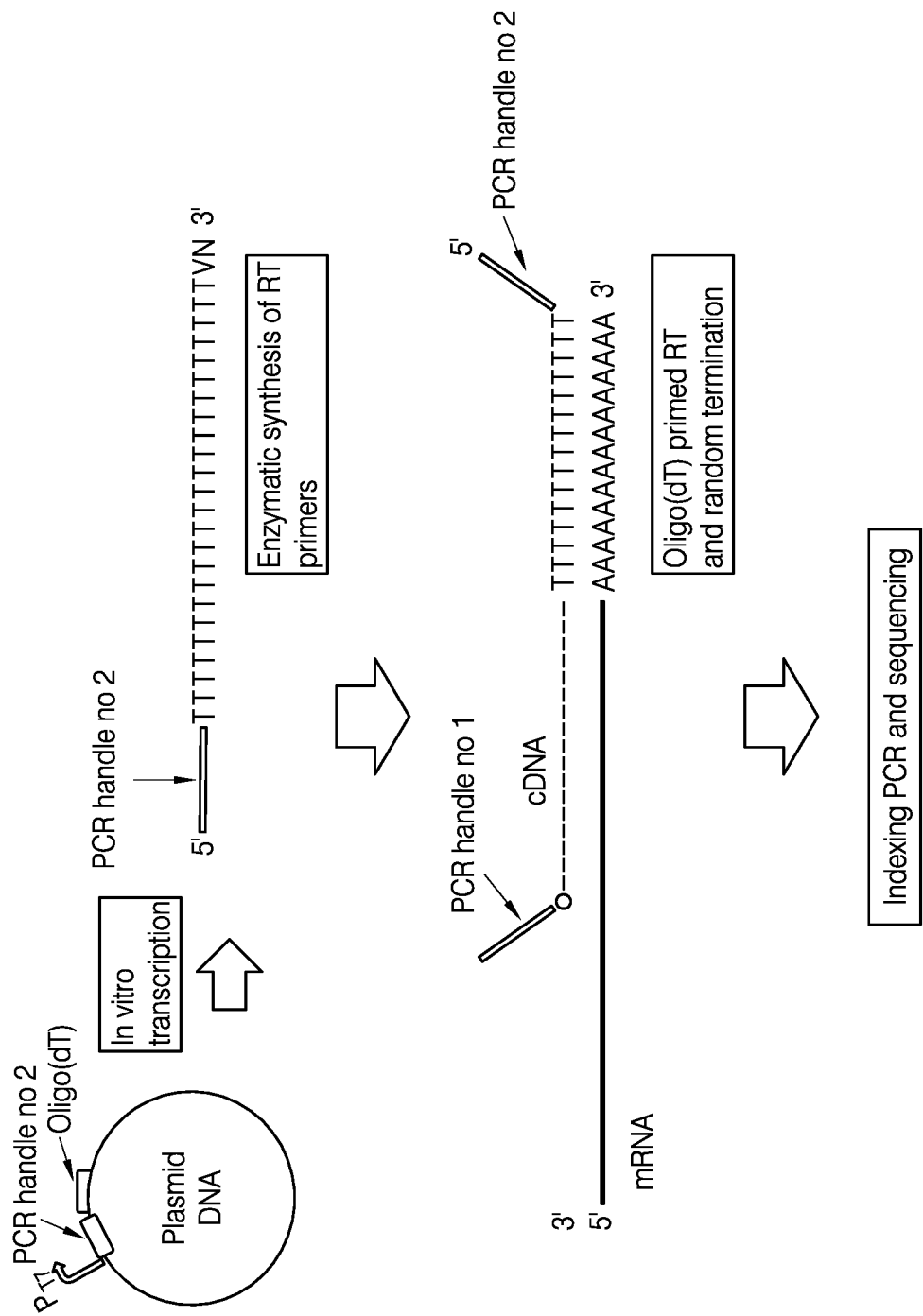

FIG. 8 shows an exemplary scheme of using oligonucleotides synthesized by T7 RNA mutant polymerase in a reverse transcription reaction. Oligo (dT) anchored with, e.g. PCR handle 2, are synthesized during in vitro transcription. Anchored oligo (dT) are used by reverse transcriptase as primers to synthesize first strand cDNA. Optionally, first strand cDNA synthesis is randomly terminated by incorporation of oligo-tethered ddNTP (comprising, e.g. PCR handle 1) by reverse transcriptase. Reverse transcription reaction products can then be used in indexing PCR. FIG. 8 discloses SEQ ID NOS 69-71, respectively in order of appearance.

Figure 9A:
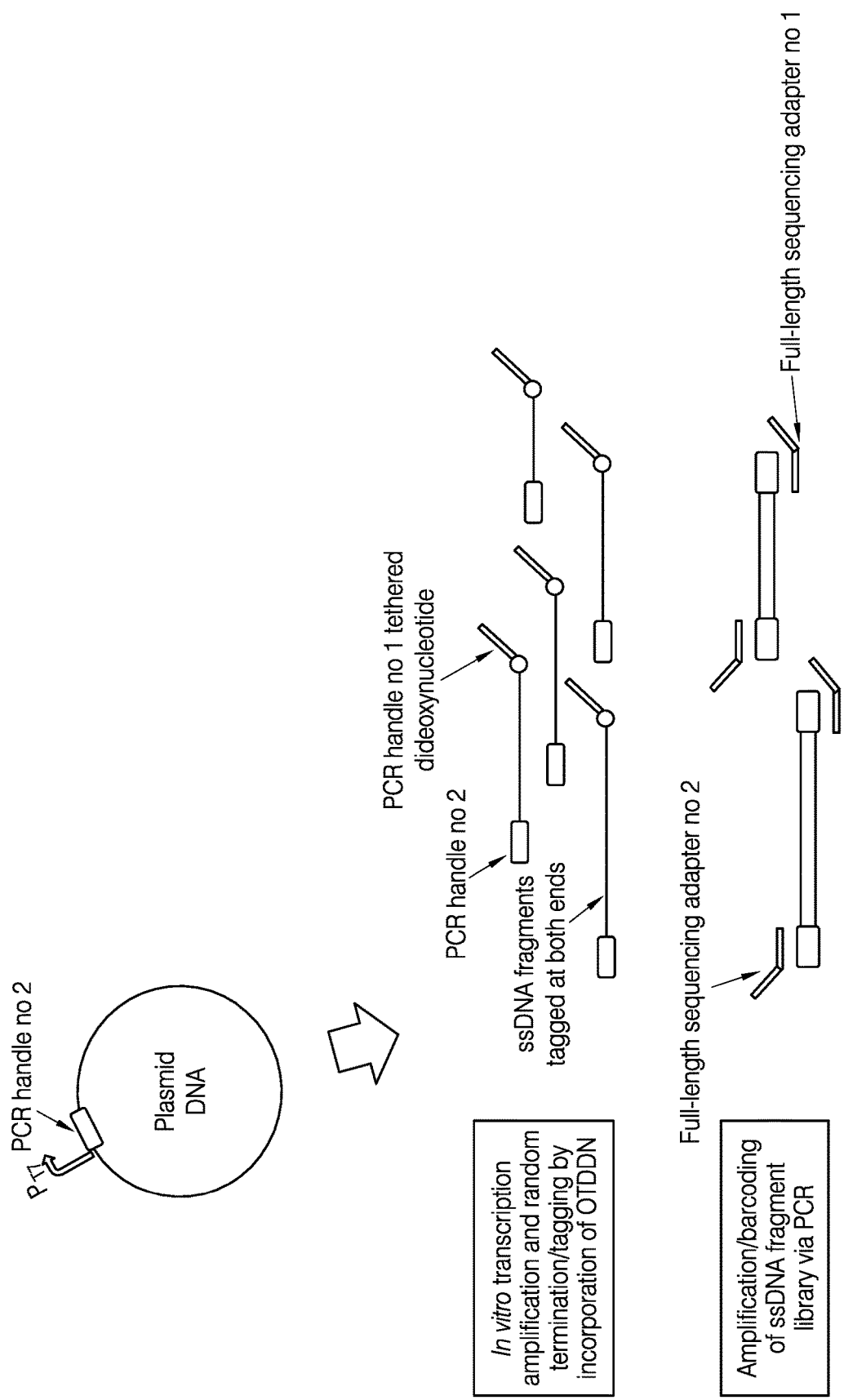
Figure 9B:
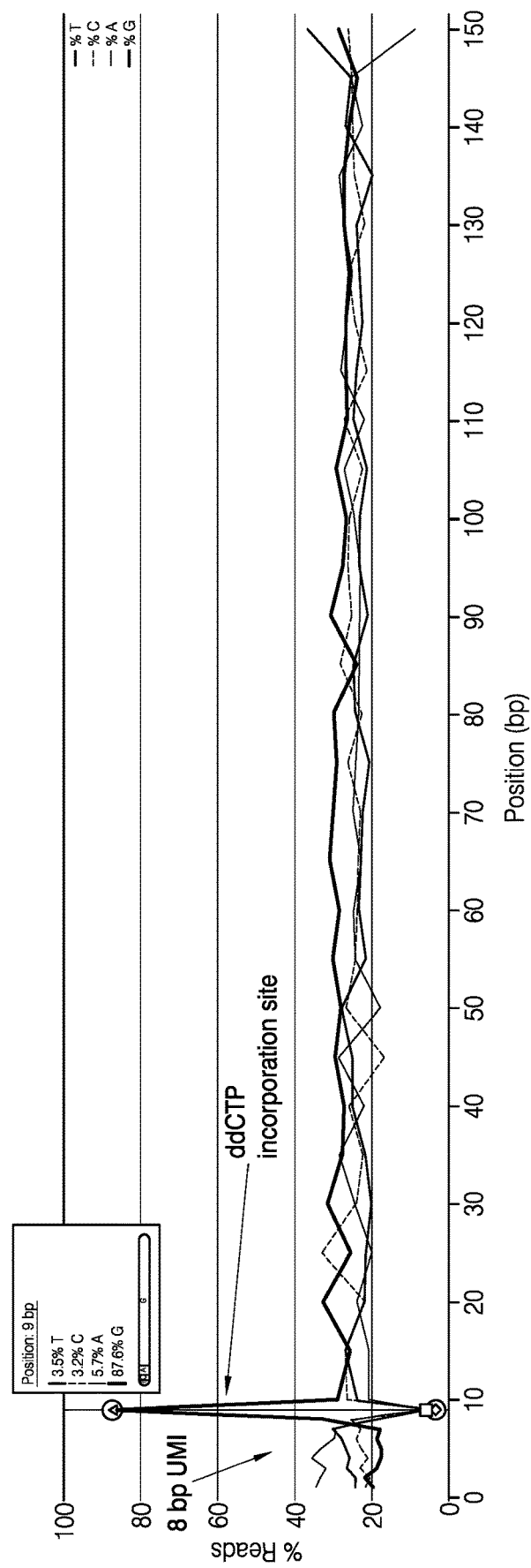
Figure 9C:
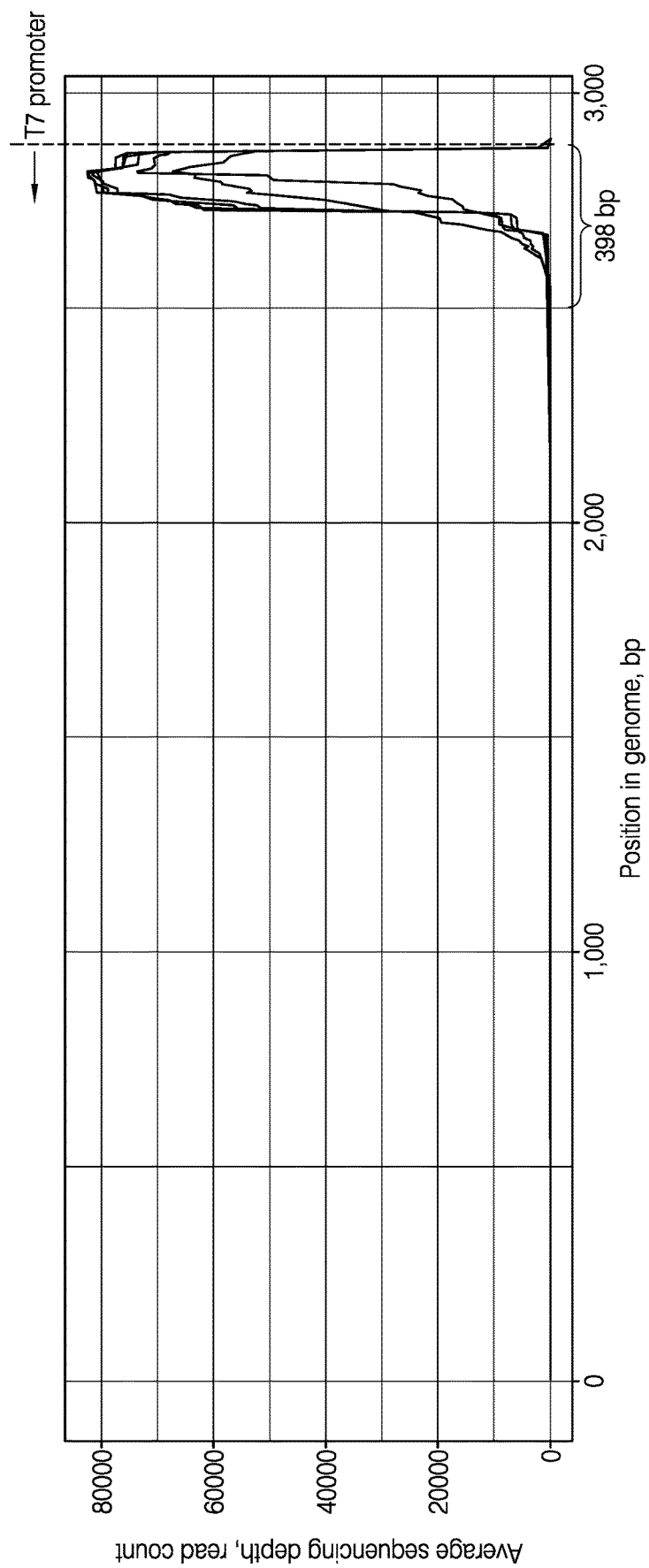

FIGS. 9A-9C show nucleic acid amplification and random termination/tagging via in vitro transcription. (A) Principal protocol of nucleic acid amplification and random termination/tagging via in vitro transcription using T7 mutant RNA polymerases; during in vitro transcription from T7 promoter, a nucleic acid with PCR handle 2 at 5'-end is synthesized, the synthesis is randomly terminated when T7 RNA polymerase incorporates oligo-tethered ddNTP; oligonucleotide in oligo-tethered ddNTP comprises, e.g. PCR handle 1. Thus, single stranded nucleic acid fragments are generated that have tag sequences at both ends; tag sequences are used for introduction of, e.g. full length sequencing adapters during further PCR step. (B) Read 1 structure of libraries generated by nucleic acid amplification and random termination/tagging via in vitro transcription; (C) Average sequencing depth (read counts) across reference. Dashed line indicates a position of T7 promoter in the reference sequence. OTDDN-oligonucleotide-tethered ddNTPs; ssDNA-single-stranded DNA.

Figure 10:
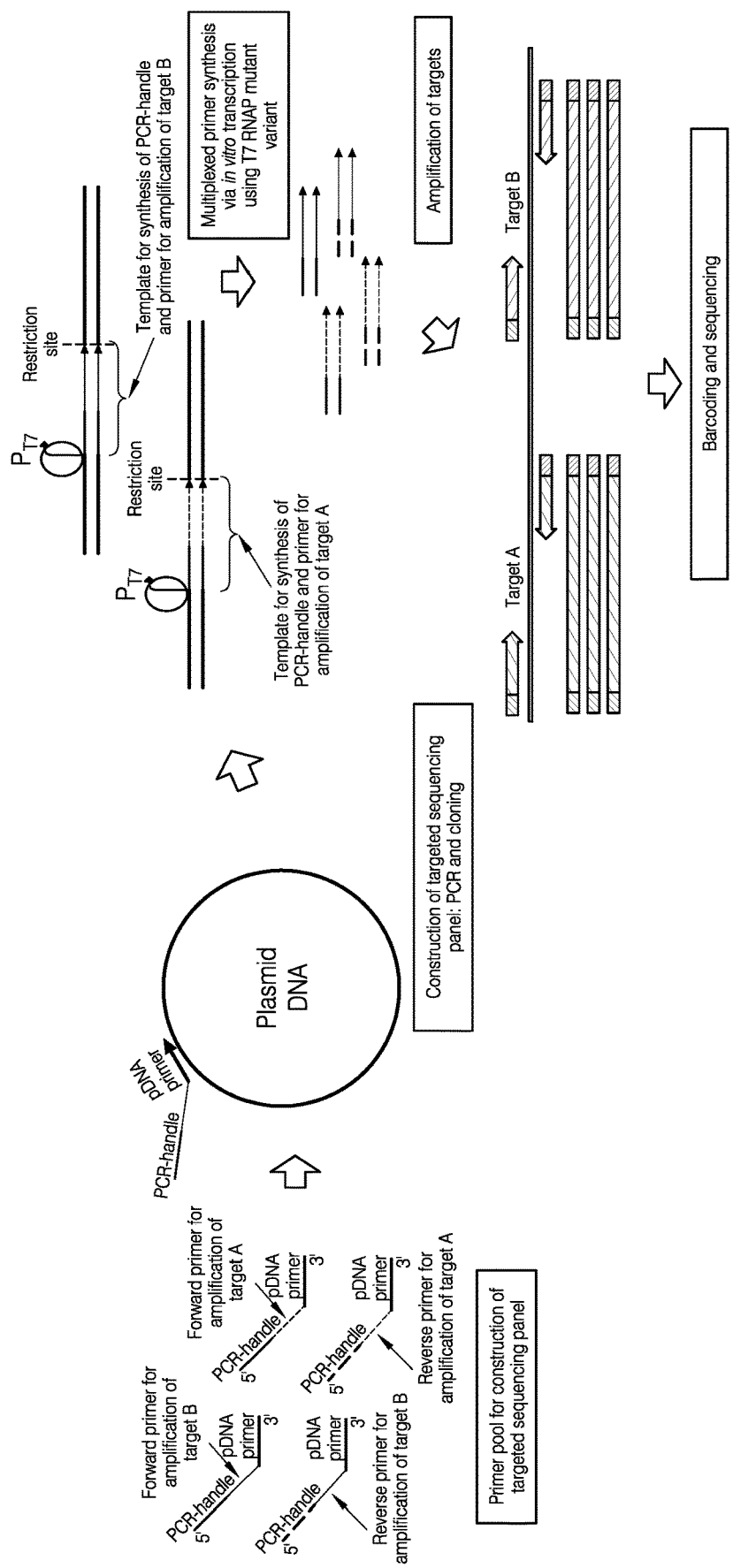

FIG. 10. A scheme of multiplexed enzymatic primer synthesis using a T7 mutant polymerase for amplicon sequencing. The sequences of amplification primer pairs for target sequences (e.g. target A, B etc.) to be amplified are created; the amplification primers may comprise an anchor sequence (e.g. PCR handle; anchor sequence may be used for subsequent amplification step). pDNA primer denotes the part of construction oligonucleotide that hybridizes with a sequence of plasmid DNA (pDNA) for introduction of the oligonucleotide into the plasmid DNA. Then, a pool of in vitro transcription templates (e.g. plasmid DNA molecules that comprise the amplification primer sequence downstream of T7 promoter) is constructed, e.g. by PCR. Next, mutant RNAP (e.g. T7 mutant RNAP of current disclosure) is used to produce a pool of single stranded primers during the multiplexed primer synthesis from a pool of in vitro transcription templates. The enzymatically synthesized primer pool can then used in multiplex PCR, optionally followed by barcoding and sequencing in further steps.

FIG. 11 depicts an alignment of exemplary phage-type RNA polymerases. Consensus levels: high (uppercase letters)=90%, low (lowercase letters)=50%; Consensus symbols (all in high consensus category) are as follows: ! is any one of IV, $ is anyone of LM, % is anyone of FY, # is anyone of NDQEBZ. Amino acid positions of exemplary phage-type RNA polymerases corresponding to G555, V689, and V783 of T7 RNA polymerase (SEQ ID NO: 1) are in bold and highlighted in gray.

DESCRIPTION OF THE SEQUENCES

Table 1 provides a listing of certain sequences referenced herein.

TABLE 1

Description of the Sequences

| Description | Sequences | SEQ ID NO |
|---|---|---|
| Wild type T7 RNA Polymerase (GenBank Acc. No. ACY75835.1) Bold font represents positions identified with mutations during selection. | MNTINIAKND FSDIELAAIP ENTLADHYGE RLAREQLALE HESYEMGEAR FRKMFERQLK AGEVADNAAA KPLITTLLPK MIARINDWFE EVKAKRGKRP TAFQFLQEIK PEAVAYITIK TTLACLTSAD NTTVQAVASA IGRAIEDEAR FGRIRDLEAK HFKKNVEEQL NKRVGHVYKK AFMQVVEADM LSKGLLGGEA WSSWHKEDSI HVGVRCIEML IESTGMVSLH RQNAGVVGQD SETIELAPEY AEAIATRAGA LAGISPMFQP CVVPPKPWTG ITGGGYWANG RRPLALVRTH SKKALMRYED VYMPEVYKAI NIAQNTAWKI NKKVLAVANV ITKWKHCPVE DIPAIEREEL PMKPEDIDMN PEALTAWKRA AAAVYRKDKA RKSRRISLEF MLEQANKFAN HKAIWFPYNM DWRGRVYAVS MENPQGNDMT KGLLLTLAKGK PIGKEGYYWL KIHGANCAGV DKVPFPERIK FIEENHENIM ACAKSPLENT WWAEQDSPFC FLAFCFEYAG VQHHGLSYNC SLPLAFDGSC SGIQHFSAML RDEVGGRAVN LLPSETVQDI YGIVAKKVNE ILQADAINGT DNEVVTVTDE NTGEISEKVK LGTKALAGQW LAYGVTRSVT KRSVMTLAYG SKEFGFRQQV LEDTIQPAID SGKGLMFTQP NQAAGYMAKL IWESVSVTVV AAVEAMNWLK SAAKLLAAEV KDKKTGEILR KRCAVHWVTP DGFPVWQEYK KPIQTRLNLM FLGQFRLQPT INTNKDSEID AHKQESGIAP NFVHSQDGSH LRKTVVWAHE KYGIESFALI HDSFGTIPAD AANLFKAVRE TMVDTYESCD VLADFYDQFA DQLHESQLDK MPALPAKGNL NLRDILESDE AFA | 1 |
| Wild type SP6 RNA polymerase (GenBank Acc. No. AAR90000.1). Bold font represents positions aligned with positions identified with mutations during selection | MQDLHAIQLQ LEEEMENGGI RRFEADQQRQ IAAGSESDTA WNRRLLSELI APMAEGIQAY KEEYEGKKGR APRALAFLQC VENEVAAYIT MKVVMDMLNT DATLQAIAMS VAERIEDQVR FSKLEGHAAK YFEKVKKSLK ASRTKSYRHA HNVAVVAEKS VAEKDADEDR WEAWPKETQL QIGTTLLEIL EGSVFYNGEP VFMRAMRTYG GKTIYYLQTS ESVGQWISAF KEHVAQLSPA YAPCVIPPRP WRTPENGGFH TEKVASRIRL VKGNREHVRK LTQKOMPKVY KAINALONTQ WQINKDVLAV IEEVIRLDLG YGVPSFKPLI DKENKPANPV PVEFQHLRGR ELKEMLSPEQ WQQFINWKGE CARLYTAETK RGSKSAAVVR MVGQARKYSA FESIYFVYAM DSRSRVYVQS STLSPQSNDI GKALLRFTEG RPVNGVEALK WFCINGANLW GWDKKTEDVR VSNVLDEEFQ DMCRDIAADP LTFTQWAKAD APYEFLAWCF EYAQYLDLVD EGRADEFRTH LPVHODGSCS GIQHYSAMLR DEVGAKAVNL KPSDAPQDIY GAVAQVVIKK NALYMDADDA TTFTSGSVTL SGTELRAMAS AWDSIGITRS LTKKPVMTLP YGSTRLTCRE SVIDYIVDLE EKEAQKAVAE GRTANKVHPF EDDRQDYLTP GAAYNYMTAL IWPSISEVVK APIVAMKMIR QLARFAAKRN EGLMYTLPTG FILEQKIMAT HDASHLILTV GDIKMSLQVE TDIVDEAAMM GAAAPNEVHG EMLRVRTCLM CELVDKGVTS IAVIHDSFGT HADNTLTLRV ALKGQMVAMY IDGNALQKLL EEHEERWMVD TGIEVPEQGE FDLNEIMDSE YVFA | 2 |
| Wild type T3 RNA polymerase (GenBank Acc. No. CAC86264.1). Bold font represents positions aligned with positions identified with mutations during selection | MNIIENIEKN DESEIELAAI PENTLADHYG SALAKEQLAL EHESYELGER RELKMLERQA KAGEIADNAA AKPLLATLLP KLTTRIVEWL EEYASKKGRK PSAYAPLQLL KPEASAFITL KVILASLTST NMTTIQAAAG MLGKAIEDEA REGRIRDLEA KHFKKHVEEQ LNKRHGQVYK KAFMQVVEAD MIGRGLLGGE DHEALQLAQE YVDVLAKRAG ALAGISPMFQ QRHNAGNAGS AWSSWDKETT MHVGIRLIEM LIESTGLVEL PCVVPPKPWV AITGGGYWAN GRRPLALVRT HSKKGLMRYE DVYMPEVYKA VNLAQNTAWK INKKVLAVVN EIVNWKNCPV ADIPSLERQE LPPKPDDIDT NEAALKEWKK AAAGIYRLDK ARVSRRISLE FMLEQANKFA SKKAIWFPYN MDWRGRVYAV PMENPQGNDM TKGLLTLAKG KPIGEEGFYW LKIHGANCAG VDKVPFPERI AFIEKHVDDI LACAKDPINN TWWAEQDSPF CFLAFCFEYA GVTHHGLSYN CSLPLAFDGS CSGIQHFSAM LRDEVGGRAV NLLPSETVQD IYGIVAQKVN EILKQDAING TPNEMITVTD KDTGEISEKL KLGTSTLAQQ WLAYGVTRSV TKRSVMTLAY GSKEFGFRQQ VLDDTIQPAI DSGKGLMFTQ PNQAAGYMAK | 3 |

TABLE 1-continued

Description of the Sequences

| Description | Sequences | SEQ ID NO |
|---|---|---|
| | LIWDAVSVTV VAAVEAMNWL KSAAKLLAAE VKDKKTKEIL<br>RHRCAVHWTT PDGFPVWQEY RKPLQKRLDM IFLGQFRLQP<br>TINTLKDSGI DAHKQESGIA PNFVHSQDGS HLRMTVVYAH<br>EKYGIESFAL IHDSFGTIPA DAGKLFKAVR ETMVITYENN<br>DVLADFYSQF ADQLHETQLD KMPPLPKKGN LNLQDILKSD<br>FAFA | |
| Catalytic domain of wild type T7 RNA polymerase; Bold font represents positions identified with mutations during selection. | NTAWKI NKKVLAVANV ITKWKHCPVE DIPAIEREEL<br>PMKPEDIDMN PEALTAWKRA AAAVYRKDKA RKSRRISLEF<br>MLEQANKFAN HKAIWFPYNM WWAEQDSPFC MFNPQGNDMT<br>KGLLTLAKGK PIGKEGYYWL DWRGRVYAVS DKVPFPERIK<br>FIEENHENIM ACAKSPLENT KIHGANCAGV FLAFCFEYAG<br>VQHHGLSYNC SLPLAFDGSC SGIQHFSAML RDEVGGRAVN<br>LLPSETVQDI YGIVAKKVNE ILQADAINGT DNEVVTVTDE<br>NTGEISEKVK LGTKALAGQW LAYGVTRSVT KRSVMTLAYG<br>SKEFGFRQQV LEDTIQPAID SGKGLMFTQP NQAAGYMAKL<br>IWESVSVTVV AAVEAMNWLK SAAKLLAAEV KDKKTGEILR<br>KRCAVHWVTP DGFPVWQEYK KPIQTRLNLM FLGQFRLOPT<br>INTNKDSEID AHKQESGIAP NFVHSQ**DGSH LRKTVVWAHE<br>KYGIESFALI HDSFGTIPAD AANLFKAVRE TMVDTYESCD<br>VLADFYDQFA DQLHESQLDK MPALPAKGNL NLRDILESDE<br>AFA | 4 |
| Catalytic domain of wild type SP6 RNA polymerase; Bold font represents positions aligned with positions identified with mutations during selection | NTQ WQINKDVLAV IEEVIRLDLG YGVPSEKPLI<br>DKENKPANPV PVEFQHLRGR ELKEMLSPEQ WQQFINWKGE<br>CARLYTAETK RGSKSAAVVR MVGQARKYSA FESIYFVYAM<br>DSRSRVYVQS STLSPQSNDL GKALLRETEG RPVNGVEALK<br>WFCINGANLW GWDKKTFDVR VSNVLDEEFQ DMCRDIAADP<br>LTFTQWAKAD APYEFLAWCF EYAQYLDLVD EGRADEFRTH<br>LPVHQDGSCS GIQHYSAMLR DEVGAKAVNL KPSDAPQDIY<br>GAVAQVVIKK NALYMDADDA TTFTSGSVTL SGTELRAMAS<br>AWDSIGITRS LTKKPVMTLP YGSTRLTCRE SVIDYIVDLE<br>EKEAQKAVAE GRTANKVHPF EDDRQDYLTP GAAYNYMTAL<br>IWPSISEVVK APIVAMKMIR QLARFAAKRN EGLMYTLPTG<br>FILEQKIMAT EMLRVRTCLM GDIKMSLQVE TDIVDEAAMM<br>HADNTLTLRV ALKGQMVAMY IDGNALQKLL IAVIHDSFGT<br>GAAAPNFVHG HDASHLILTV CELVDKGVTS EEHEERWMVD<br>TGIEVPEQGE FDLNEIMDSE YVFA | 5 |
| Catalytic domain of wild type T3 RNA polymerase; Bold font represents positions aligned with positions identified with mutations during selection | NTAWK INKKVLAVVN EIVNWKNCPV ADIPSLERQE<br>LPPKPDDIDT NEAALKEWKK AAAGIYRLDK ARVSRRISLE<br>FMLEQANKFA SKKAIWFPYN MDWRGRVYAV PMFNPQGNDM<br>TKGLLTLAKG KPIGEEGFYW LKIHGANCAG VDKVPFPERI<br>AFIEKHVDDI LACAKDPINN TWWAEQDSPF CFLAFCFEYA<br>GVTHHGLSYN CSLPLAFDGS CSGIQHFSAM LRDEVGGRAV<br>NLLPSETVQD IYGIVAQKVN EILKQDAING TPNEMITVTD<br>KDTGEISEKL KLGTSTLAQQ WLAYGVTRSV TKRSVMTLAY<br>GSKEFGFRQQ VLDDTIQPAI DSGKGLMFTQ PNQAAGYMAK<br>LIWDAVSVTV VAAVEAMNWL KSAAKLLAAE VKDKKTKEIL<br>RHRCAVHWTT PDGFPVWQEY RKPLQKRLDM IFLGQFRLQP<br>TINTLKDSGI DAHKQESGIA PNFVHSQ**DGS HLRMTVVYAH<br>EKYGIESFAL IHDSFGTIPA DAGKLFKAVR ETMVITYENN<br>DVLADFYSQF ADQLHETQLD KMPPLPKKGN LNLQDILKSD<br>FAFA | 6 |
| T7 promoter sequence | TAATACGACTCACTATAG | 7 |
| SP6 promoter sequence | ATTTAGGTGACACTATAG | 8 |
| T3 promoter sequence | AATTAACCCTCACTAAAG | 9 |
| Primer for V783M mutation | ACTTTATGCACAGCCAAGAC | 10 |
| Primer for V783M mutation | TAGGAGCGATACCAGACTCC | 11 |
| Primer for V689Q mutation | GACGCAGGTAGCTGCGGTTG | 12 |
| Primer for V689Q mutation | ACGCTCACAGATTCCCAAATCAG | 13 |
| Primer for V783L mutation | ACTTTCTTCACAGCCAAGAC | 14 |

TABLE 1-continued

Description of the Sequences

| Description | Sequences | SEQ ID NO |
|---|---|---|
| Primer for V783L mutation | TAGGAGCGATACCAGACTCC | 15 |
| Primer for G555L mutation | AGGTACTGGGTCGCGCGGTTAAC | 16 |
| Primer for G555L mutation | CATCTCGGAGCATCGCGGAGAAG | 17 |
| Primers that have repetitive histidine codons | CATCACCATCACCATCAC | 18 |
| Mutagenic primer | CATCACCATCACCATCACATGAACACGATTAACATCGCTAAG | 19 |
| Mutagenic primer | CTCGAGCTCGGATCCCCATC | 20 |
| 42 nt oligonucleotide | GGGAAAGCTTGCATGCCTGCAGGTCGACTCTAGAGGATCCCC | 21 |
| Control reverse primer | CAATTTCCCATTCGCCATTCAG | 22 |
| Handle No 1 | TACACGACGCTCTTCCGATCT | 23 |
| Handle No 2 | CAGACGTGTGCTCTTCCGATCT | 24 |
| Protein from Enterobacteria phage 13a (GenBank Acc. No. ACF15888.1) | MNTINIAKNDESDIELAAIPENTLADHYGERLAREQLALEHES YEMGEARFRKMFERQLKAGEVADNAAAKPLITTLLPKMIARIN DWFEEVKAKRGKRPTAFQFLQEIKPEAVAYITIKTTLACLTSV DNTTVQAVASAIGRAIEDEARFGRIRDLEAKHEKKNVEEQLNK RVGHVYKKAFMQVVEADMLSKGLLGGEAWSSWHKEDSIHVGVR CIEMLIESTGMVSLHRQNAGVVGQDSETIELAPEYAEAIATRA GALAGISPMFQPCVVPPKPWTGITGGGYWANGRRPLALVRTHS KKALMRYEDVYMPEVYKAINIAQNTAWKINKKVLAVANVITKW KHCPVEDIPAIEREELPMKPEDIDTNPDALTAWKRAAAAVYRK DKARKSRRISLEFMLEQANKFANHKAIWFPYNMDWRGRVYAVS MFNPQGNDMTKGLLTLAKGKPIGKEGYYWLKIHGANCAGVDKV PFPERIKFIEDNHENIMACAKSPLENTWWAEQDSPFCFLAFCF EYAGVQHHGLSYNCSLPLAFDGSCSGIQHFSAMLLDEIGGRAV NLLPSETVQDIYGIVAKKVNVILQADVINGTDNEVVTVTDENT GEISEKVKLGTKALAGQWLAYGVTRSVTKRSVMTLAYGSKEFG FRQQVLEDTIQPAIDSGKGLMFTQPNQAAGYMAKLIWEAVSVT VVAAVEAMNWLKSAAKLLAAEVKDKKTGEILRKRCAVHWVTPD GFPVWQEYKKPIQTRLNLMFLGQFRLQPTINTNKDSEIDAHKQ ESGIAPNFVHSQDGSHLRKTVVWAHEKYGIESFALIHDSEGTI PADAANLFKAVRETMVDTYESCDVLADFYDQFADQLHESQLDK MPALPAKGNLNLQDILKSDFAFA | 25 |
| Protein from Enterobacteria phage 285P (GenBank Acc. No. ACV32460.1) | MTNVINAPKNDESDIANAIMPYNILADHYGAQLAATQLQLEHE AHTEGEKRELKAMERQIKAGEFGDNAVAKPLLSSLAPKFIEAW NTWFTEVEAKRGKRPVAYNLVQKVAPEAAAFITLKVTLACLTK EEFTNLQSVATKIGRSIEDELRFGRIRDEEAKHFKNHVQEALN KRVGIVYKKAFMQAVEGKMLDAGQLQTKWTTWTPEESIHVGVR MLELLIGSTGLVELHRPFAGNVEKDGEYIQLTEQYVDLLSKRA GALAAIAPMYQPCVVPPKPWTSPVGGGYWAAGRKPLSLVRTGS KKGLERYNDVYMPEVYKAVNIAQNTPWKINKKVLAVVNEIVNW KHCPVEDVPALERGELPVKPEDIDTNEASLKAWKKAASATYRK EKARVSRRMSMEFMLGQANKFAQFKAIWFPMNMDWRGRVYAVP MFNPQGNDMTKGLLTLAKGKPIGVDGYYWLKIHGANTAGVDKV DFAERIKFIDDNHENIMSVAADPIANTWWAEQDSPFCFLAFCF EYAGVQHHGMNYNCSLPLAFDGSCSGIQHFSAMLRDEIGGRAV NLLPSKEVQDIYRIVAERVNEILNQDVINGTDNEVETVTNKDT GEITEKLKLGTKELAGQWLAYGVTRKVTKRSVMTLAYGSKEYG FRDQVLEDTIQPAIDDGKGLMFTQPNQAAGYMAKLIWNAVTVT VVAAVEAMNWLKSAAKLLAAEVKDKKTKEVLRKRCAVHWVTPD GFPVWQEYKKPVQTRLNLMFLGQIRLQPTVNTNKDSGIDARKQ ESGIAPNFVHSMDGSHLRMTVVRSNEVYGVESFALIHDSEGTI PADAGNLFKAVRETMVNTYEENDVLADFYEQFADQLHESQLDK MPEMPAKGSLDLQEILKSDFAFA | 26 |
| Protein from Enterobacteria phage (GenBank Acc. No. BA14ACF15731.1) | MTNVINAPKNDESDIANAIQPYNILADHYGAQLAATQLELEHE AHTEGEKRELKAMERQIKAGEFGDNAVAKPLLSSLAPKFIEAW NTWFTEVEAKRGKRPVAYNLVQKVAPEAAAFITLKVTLACLTK EEFTNLQSVATKIGRSIEDELREGRIRDEEAKHFKNHVQEALN KRVGIVYKKAFMQAVEGKMLDAGQLQTKWTTWTPEESIHVGVR | 27 |

TABLE 1-continued

Description of the Sequences

| Description | Sequences | SEQ ID NO |
|---|---|---|
| | MLELLIGSTGLVELHRPFAGNVEKDGEYIQLTEQYVDLLSKRA<br>GALAAIAPMYQPCVVPPKPWTSPVGGGYWAAGRKPLSLVRTGS<br>KKGLERYNDVYMPEVYKAVNIAQNTPWKINKKVLAVVNEIVNW<br>KHCPVDDVPALERGELPIKPEDIDTNEAALKAWKKAASATYRK<br>EKARVSRRMSMEFMLGQANKFAQFKAIWFPMNMDWRGRVYAVP<br>MFNPQGNDMTKGLLTLAKGKPIGVDGYYWLKIHGANTAGVDKV<br>DEAERIKFIDDNHENIMSVAADPIANTWWAEQDSPFCFLAFCF<br>EYAGVQHHGMKYNCSLPLAFDGSCSGIQHFSAMLRDEIGGRAV<br>NLLPSKEVQDIYRIVAERVNEILKQDVINGTDNEVEIVINKDT<br>GEITEKLKLGTKELAGQWLAYGVTRKVTKRSVMTLAYGSKEYG<br>FRDQVLEDTIQPAIDDGKGLMFTQPNQAAGYMAKLIWNAVTVT<br>VVAAVEAMNWLKSAAKLLAAEVKDKKTKEVLRKRCAVHWVTPD<br>GFPVWQEYKKPVQTRLNLMELGQIRLQPTVNTNKDSGIDARKQ<br>ESGIAPNFVHSMDGSHLRMTVVRSYEVYGVESFALIHDSEGTI<br>PADAGNLFKAVRETMVNTYEENDVLADFYEQFADQLHESQLDK<br>MPEMPAKGSLDLQEILKSDFAFA | |
| Protein from<br>Enterobacteria phage<br>EcoDS1 (GenBank Acc.<br>No. ACF15785.1) | MSVISIDKHDFSDVSNAIEPENLLADHYGQDLAVKQLQLEHEA<br>YTEGERRFIKNLERQTERGELADNQVAKPLMQTLVPKIAQAVR<br>EWHEGPDGKLSTSRPSVAFTMLSTEEKAVKDRSLRISCESASV<br>IILKVILSKLVKPEGIPITPMASAIGRTLEDEIRFGRIRDKEK<br>EHFKKAIADNLNKRAGASYKKAYMQAVETSMLEQGQLEDAWGT<br>WSPTEAVHVGIKMLEIVIQSTQLVELKRYGAGNAAADVEMVHL<br>SDFWVKKMAQRGFSLAGIAPVYQPCVVPPKPWTGVVGGGYWAK<br>GRRPLPLIRLGSKSAVARYEDVYMPEVYDAVNIIQNTPWKVNK<br>KVLEVVNMVEKLNNTPIDDIPQMEPLKPEDYAGETEEELKAWK<br>KAAAGIYRREKARQSRRLSLSFIVNQANKESQFKAIWFPYNMD<br>WRGRVYAVPMENPQGNDMQKGLLTLAVGKPIGADGFKWLKVHG<br>ANCAGIDKVTFEERIKWVEDNHDNIMATAKAPMDSIEWWGKLD<br>SPFCFLAFCFEYAGVMHHGLSYSCSLPIAFDGSCSGIQHFSAM<br>LRDHIGGHAVNLTPSGKVQDIYRIVSDRIEEELKVLLVNGTDN<br>EMVTHEDKKTGEITERLKLGTRELARQWLTYGMSRKVTKRSVM<br>TLAYGSKEYGFADQVYEDIVMPAIDSGSGAMFTEPSQASREMA<br>KMIWEAVSVTVVAAVDAMKWLQGAAKLLAAEVKDKKTGEILKP<br>CLPVHWVTPDGFPVWQEYRKKDTTRLNLMELGSENLQPTVNKG<br>TKKELDKHKQESGISPNFVHSQDGSHLRKTVVHTHRKYGVMSF<br>AVIHDSFGTIPADAEYLFRGVRETMVETYRDNDVLLDFYEQFE<br>YQLHESQRDKLPELPKKGKLNIEDILSSDFAFA | 28 |
| Protein from Yersinia<br>phage Yepe2 (GenBank<br>Acc. No. ACF15684.1) | MTNVINAPKNDESDIANAIQPYNILADHYGAQLAATQLELEHE<br>AHTEGEKRFLKAMERQIKAGEFGDNTVAKPLLSSLAPKFVEAW<br>NTWFTEVEAKRGKRPVAYNLVQKVAPEAAAFITLKVTLACLTK<br>EEFTNLQSVATKIGRSIEDELREGRIRDEEAKHFKNHVQEALN<br>KRVGIVYKKAFMQAVEGKMLEAGQLHTKWTTWTPEEVIHVGVR<br>MLELLIGSTGLVELHRPFAGNIEKDGEYIQLTEQYVDLLSKRA<br>GALAAIAPMYQPCVVPPKPWTSPVGGGYWAAGRKPLSMVRTGS<br>KKGLERYNDVYMPEVYKAVNIAQNTPWKINKKVLAVVNEIVSW<br>KHCPVADVPAMERGELPVKPVDIDTNEVALKAWKKAASAIYRK<br>EKARVSRRMSMEFMLGQANKFAQFKAIWFPMNMDWRGRVYAVP<br>MFNPQGNDMTKGLLTLAKGKPIGVDGFYWLKIHGANTAGVDKV<br>DFAERIKFIDDNHENIMSVAADPIANTWWTEQDSPFCFLAFCE<br>EYAGVQHHGMNYNCSLPLAFDGSCSGIQHFSAMLRDEVGGRAV<br>NLLPSKEVQDIYRIVAERVNEILNQDVINGTDNEVETLTNKDT<br>GEITEKLKLGTKELAGQWLAYGVTRKVTKRSVMTLAYGSKEYG<br>FRDQVLEDTIQPAIDDGKGLMFTQPNQAAGYMAKLIWNAVTVT<br>VVAAVEAMNWLKSAAKLLAAEVKDKKTKEVLRNRCAVYWVTPD<br>GFPVWQEYRKPVQTRLNLMELGQIRLQPTVNTNKDSGIDARKQ<br>ESGIAPNFVHSMDGSHLRMTVVRSYEVYGVESFALIHDSFGTI<br>PADAGNLFKAVRETMVNTYEENDVLADFYDQFADQLHESQLDK<br>MPEMPAKGSLDIQEILKSDFAFA | 29 |
| Protein from Klebsiella<br>phage K11 (GenBank Acc.<br>No. ACF15837.1) | MNALNIARNDESEIELAAIPYNILSEHYGDKLAREQLALEHEA<br>YELGEQRFLKMLERQVKAGEFADNAAAKPLVLTLHPQLTKRID<br>DWKEEQANARGKKPRAYYPIKHGVASKLAVSMGAEVLKEKRGV<br>SSEAIALLTIKVVLGTLTDASKATIQQVSSQLGKALEDEARFG<br>RIREQEAAYFKKNVADQLDKRVGHVYKKAFMQVVEADMISKGM<br>LGGDNWASWKTDEQMHVGTKLLELLIEGTGLVEMTKNKMADGS<br>DDVTSMQMVQLAPAFVELLSKRAGALAGISPMHQPCVVPPKPW<br>VETVGGGYWSVGRRPLALVRTHSKKALRRYADVHMPEVYKAVN<br>LAQNTPWKVNKKVLAVVNEIVNWKHCPVGDVPAIEREELPPRP<br>DDIDTNEVARKAWREAAAVYRKDKARQSRRLSMEFMVAQANK<br>FANHKAIWFPYNMDWRGRVYAVSMENPQGNDMTKGMLTLAKGK<br>PIGLDGFYWLKIHGANCAGVDKVPFPERIKFIEENEGNILASA<br>ADPLNNTWWTQQDSPFCFLAFCFEYAGVKHHGLNYNCSLPLAF<br>DGSCSGIQHFSAMLRDSIGGRAVNLLPSDTVQDIYKIVADKVN | 30 |

TABLE 1-continued

Description of the Sequences

| Description | Sequences | SEQ ID NO |
|---|---|---|
| | EVLHQHAVNGSQTVVEQIADKETGEFHEKVTLGESVLAAQWLQ YGVTRKVTKRSVMTLAYGSKEFGFRQQVLEDTIQPAIDNGEGL MFTHPNQAAGYMAKLIWDAVTVTVVAAVEAMNWLKSAAKLLAA EVKDKKTKEVLRKRCAIHWVTPDGFPVWQEYRKQNQARLKLVE LGQANVKMTYNTGKDSEIDAHKQESGIAPNFVHSQDGSHLRMT VVHANEVYGIDSFALIHDSFGTIPADAGNLFKAVRETMVKTYE DNDVIADFYDQFADQLHESQLDKMPAVPAKGDLNLRDILESDE AFA | |
| Protein from Salmonella phage phiSG-JL2 (GenBank Acc. No. ACD75668.1) | MNIIENIEKNDFSEIELAAIPENTLADHYGSALAREQLALEHE SYELGERRFLKMLERQAKAGEIADNAAAKPLLATLLPKLTARI VEWLEEYASKKGRKPVAYAPLQLLKPEASAFITLKVILASLTS TNMTTIQAAAGMLGKAIEDEARFGRIRDLEAKHEKKHVEEQLN KRHGQVYKKAFMQVVEADMIGRGLLGGEAWSSWDKETTMHVGI RLIEMLIESTGLVELQRHNAGNAGSDHEALQLAQEYVDVLAKR AGALAGISPMFQPCVVPPKPWVAITGGGYWANGRRPLALVRTH SKKGLMRYEDVYMPEVYKAVNIAQNTAWKINKKVLAVVNEIVN WKNCPVADIPSLERQELPPKPDDIDTNEAALKEWKKAAAGVYR LDKARVSRRISLEFMLEQANKFASKKAIWFPYNMDWRGRVYAV PMFNPQGNDMTKGLLTLAKGKPIGEEGFYWLKIHGANCAGVDK VPFPERIAFIEKHVDDILACAKDPINNTWWAEQDSPFCFLAFC FEYAGVAHHGLSYNCSLPLAFDGSCSGIQHFSAMLRDEVGGRA VNLLPSETVQDIYGIVAQKVNEILKQDAINGTPNEMITVTDKD TGEISEKLKLGTSTLAQQWLAYGVTRSVTKRSVMTLAYGSKEF GFRQQVLDDTIQPAIDSGKGLMFTQPNQAAGYMAKLIWDAVSV TVVAAVEAMNWLKSAAKLLAAEVKDKKTKEILRHRCAVHWTTP DGFPVWQEYRKPLQKRLDMIFLGQFRLQPTINTLKDSGIDAHK QESGIAPNFVHSQDGSHLRMTVVYAHEKYGIESFALIHDSFGT IPADAGKLFKAVRETMVLTYENNDVLADFYDQFADQLHETQLD KMPPLPKKGKLNLQDILKSDFAFA | 31 |
| Protein from Yersinia phage Berlin (GenBank Acc. No. CAJ70654.1) | MTNVINAPKNDESDIANAIQPYNILADHYGAQLAATQLELEHE AHTEGEKRFLKAMERQIKAGEFGDNTVAKPLLSSLAPKFIEAW NTWFIDVEAKRGKRPVAYNLVQKVAPEAAAFITLKVTLACLTK EEFTNLQSVATKIGRSIEDELREGRIRDEEAKHFKNHVQEALN KRVGIVYKKAFMQAVEGKMLDAGQLQTKWTTWTPEEVIHVGVR MLELLIGSTGLVELHRPFAGNIEKDGEYIQLTEQYVDLLSKRA GALAAIAPMYQPCVVPPKPWTSPVGGGYWAAGRKPLSMVRTGS KKGLERYNDVYMPEVYKAVNIAQNTPWKINKKVLAVVNEIVNW KHCPVADVPAMERGELPVKPVDIDTNEASLKAWKKAASATYRK EKARVSRRMSMEFMLGQANKFAQFKAIWFPMNMDWRGRVYAVP MENPQGNDMTKGLLTLAKGKPIGVDGFYWLKIHGANTAGVDKV DFAERIKFIEDNHENIMSVAADPIANTWWTEQDSPFCFLAFCF EYAGVQHHGMNYNCSLPLAFDGSCSGIQHFSAMLRDEVGGRAV NLLPSKEVQDIYRIVAERVNEILNQDVINGTDNEVETLINKDT GEITEKLKLGTKELAGQWLAYGVTRKVTKRSVMTLAYGSKEYG FRDQVLEDTIQPAIDDGKGLMFTQPNQAAGYMAKLIWNAVTVT VVAAVEAMNWLKSAAKLLAAEVKDKKTKEVLRNRCAVYWVTPD GFPVWQEYRKPVQTRLNLMFLGQIRLQPTVNTNKDSGIDARKQ ESGIAPNFVHSMDGSHLRMTVVRSYEVYGVESFALIHDSEGTI PADAGNLFKAVRETMVNTYEENDVLADFYDQFADQLHESQLDK MPEMPAKGSLDIQEILKSDFAFA | 32 |
| RNA polymerase from Salmonella phage Vi06 (GenBank Acc. No. CBV65202.1) | MNTISITKNDESDIELAAIPENTLADHYGERLAREQLALEHES YEMGEVRERKMFERQLKAGEIADNDATKPLITTLLPKMIARIN SWFKEVQAKCGKRPTAFQFLQGIKPEAIAYITIKTTLARLTSM DNTTVQAVASAIGRAIEDEARFGRIRDLEAKHEKKNVEEQLNK RVGHVYKKAFMQVIEADMLSKGLLGGESWSSWHKEDSIHVGVR CIEMLIESTGMVSLHRQNAGVVGQDSETIELAPEYAEAIATRA GALAGISPMFQPCVVPPKPWTSISGGGYWANGRRPLALVRTHS KKALMRYADVYMPEVYKAVNIAQNTAWRINKKVLAVANVVTKW KHCPVDYIPTIEREELPMKPEDIDTNPEALASWKRAAAAVYRK DKARKSRRMSLEFMLEQANKFANHRAIWFPYNMDWRGRVYAVS MFNPQGNDMTKGLLTLAKGKPIGKEGFYWLKIHGANCAGVDKV PFPERIKFIEDNHENILACAKSPLENTWWSEQDSPFCFLAFCF EYAGGQHHGLSYNCSLPLAFDGSCFGIQHFSVMLRDEVGGRAV NLLPSETVQDIYGIVAKKVNEILQVDMINGTDNEVVTVTDDKT GEIYEKIKLGTKELAGQWLAYGVTRSVTKRSVMTLAYGSKEFG FRQQVLEDTIQPAIDSGKGLMFTHPNQAAGYMAKLIWEAVSVT VVAAVEAMNWLKSAAKLLAVEVKDRKTGEILRKRCAVHWTTPD GFPVWQEYKKPVQTRLNLIFLGQFRLQPTINTNRDSEIDAYKQ ESGIAPNFVHSQDGSHLRKTVVAHEKYGIDSFALIHDSEGTI PADAANLFKAVRETMVATYESCDVLADFYAQFADQLHKSQLDK MPVLPSKGNLNLQDILKSDFAFA | 33 |

TABLE 1-continued

Description of the Sequences

| Description | Sequences | SEQ ID NO |
|---|---|---|
| RNA polymerase from Pseudomonad phage gh-1 (GenBank Acc. No. AAO73140.1) | MTIAIPERHDFSDINSSAAFDALSNIYGPALAAEQLQLEHEAY TLGEERFHKAMERQMERGEFSNSQVAKPLLGHLVPMLSKAITD WIEHQTTKVRRKHVALGAFQQMNPETMASIVIRWTINRIAQRS GAPTITEMAVSIGGALEEEARFGRIRVLEQQHYQKHIKKALAQ RNGMTYKVAYMEKVEAHMIEAGQLNEPWTEWDQSGADVRYHMG IRMLELLIESTQLIEVVREHKGNKKLDGEYVYLKAEWADKLQS RAYILSGVFPRYQPMVVPPKPWNGVRGGGYWAKGRKPVTFIRV PTKRALNRYRDVHMPEVYKAVNLAQATPWAINQKVLAVANAVM SWENVPIKEFPSTEREALPIKPGDIETNEEALKAWKKAAAGVY RKDAARVSRRLSYEFSLEQANKFAEYDAIYFPYNLDWRGRVYA IPAFNPQSNDMTKGILQAAKGEPVGKDGIEWLMIHGANCAGVD KVDFSQRKQWIKDNEEMILRCAHDPLINTDWMDMDSPFCFLAF CFEWQGVKLHGEAHVSALPIAFDGSCSGIQHFSAMLRDERGGR AVNLLQSDDVQDIYKLVSDEVEIALQWDLKYGTEDSTVLDTNE DTGEITERRVLGTKTLAMAWLTYGMSRKVTKRSVMTLAYGSKA YGFADQVREDIVKKAIDNGDGEMFTSPGEASRYMAGKIWDSVS VVVVAAVEAMNWLQKAAKLLASEVKCKKTKQVLKPAMPVYWVT PDGFPVWQEYMIPETRRIDLMELGDVRIQATVTVRDSDKIDAR KQESGISPNFVHSQDGSHLRKTVVHAAERYGIEFFALIHDSFG TIPAHAGAMFKAVRETMVETYESNNVLEDFREQFMDQLHESQL DKMPPIPEMGTLDIREILKSQFAFA | 34 |
| RNA polymerase from Enterobacteria phage K1F (GenBank Acc. No. AAZ72968.1) | MSVISIDKHDFSDVSNAIEPENLLADHYGQDLAVKQLQLEHEA YTEGERRFIKNLERQTERGELADNQVAKPLMQTLVPKIAQAVK EWHEGPDGKLSTSRPSVAFTMLSTEERAVKDRSLRISCESAAV IILKVILSKLVKPEGIPITPMASAIGRTLEDEIRFGRIRDKEK EHFKKAIADNLNKRAGASYKKAYMQAVEASMLEQGQLEDAWGT WSPTEAVHVGIKMLEIVIQSTQLVELKRYGAGNAAADVEMVHL SDFWVKKMAQRGESLAGIAPVYQPCVVPPKPWTGVVGGGYWAK GRRPLPLIRLGSKSAVARYEDVYMPEVYEAVNIIQNTPWKVNK KVLDVVNMVEKLNNTPIDDIPQMEPLKPEAYAGETEEEELKAWK KAAAGIYRREKARQSRRLSLSFIVNQANKESQFKAIWFPYNMD WRGRVYAVPMFNPQGNDMQKGLLTLAVGKPIGADGFKWLKVHG ANCAGVDKVTFEERIKWVEDNHDNIMAAAKAPMDSIEWWGKLD SPFCFLAFCFEYAGVMHHGLSYSCSLPIAFDGSCSGIQHFSAM LRDHIGGHAVNLTPSGKVQDIYRIVSDRIEEELKVLLVNGTDN EMVTHEDKKTGEITERLKLGTRELARQWLTYGMSRKVTKRSVM TLAYGSKEYGFADQVYEDIVMPAIDSGSGAMFTEPSQASREMA KMIWEAVSVTVVAAVDAMKWLQGAAKLLAAEVKDKKTGEILKP CLPVHWVTPDGFPVWQEYRKKDTTRLNLMELGSENLQPTVNKG TKKELDKHKQESGISPNFVHSQDGSHLRKTVVHTHRKYGVMSF AVIHDSEGTIPADAEYLFRGVRETMVETYRDNDVLLDFYEQFE YQLHESQRDKLPELPKKGKLNIEDILSSDFAFA | 35 |
| RNA polymerase from Yersinia phage phiA1122 (GenBank Acc. No. AAP20500.1) | MNTINIAKNDESDIELAAIPENTLADHYGERLAREQLALEHES YEMGEARFRKMFERQLKAGEVADNAAAKPLITTLLPKMIARIN DWFEEVKAKRGKRPTAFQFLQEIKPEAVAYITIKTTLACLTSA DNTTVQAVASAIGRAIEDEARFGIRDLEAKHFKKNVEEQLNK RVGHVYKKAFMQVVEADMLSKGLLGGEAWSSWHKEDSIHVGKR CIEMLIESTGMVNLHRQNAGVVGQDSETIELTPEYAEAIATRA GALAGISPMFQPCVVPPKPWTGITGGGYWANGRRPLALVRTHS KKALMRYEDVYMPEVYKAINIAQNTAWKINKKVLAVANVITKW KHCPVEDIPAIEREELPMKPEDIDTNPEALTAWKRAAAAVYRK DKARKSRRISLEFMLEQANKFANHKAIWFPYNMDWRGRVYAVS MFNPQGNDMTKGLLTLAKGKPIGKEGYYWLKIHGANCAGVDKV PFPERIKFIEDNHENIMACAKSPLENTWWAEQDSPFCFLAFCF EYAGVQHHGLSYNCSLPLAFDGSCSGIQHFSAMLLDEVGGLAV NLLPSATVQDIYGIVAKKVNVILQADVINGTDNEVVTVTDENT GEIPEKVKLGTKALAGQWLAYGVTRSVTKRSVMTLAYGSKEFG FRQQVLEDTIQPAIDSGKGLMFTQPNQAAGYMAKLIWEAVSVT VVAAVEAMNWLKSAAKLLAAEVKDKKTGEILRKRCAVHWVTPD GFPVWQEYKKPIQTRLNLMFLGQFRLQPTINTNKDSEIDAHKQ ESGIAPNFVHSQDGSHLRKTVVWAHEKYGIESFALIHDSFGTI PADAANLFKAVRETMVDTYESCDVLADFYDQFADQLHESQLDK MPALPAKGNLNLQDILKSDFAFA | 36 |
| RNA polymerase from Yersinia phage phiYeO3-12 (GenBank Acc. No. CAB63592.1) | MNIIENIEKNDESEIELAAIPENTLADHYGSALAREQLALEHE SYELGERRFLKMLERQAKAGEIADNAAAKPLLATLLPKTTRI VEWLEEYATKKGRKPVAYAPLQSLKPEASAFITLKVILASLTS TNMTTIQAAAGMLGKAIEDEARFGIRDLEAKHFKKHVEEQLN KRHGQVYKKAFMQVVEADMIGRGLLGGEAWSSWDKETTMHVGI RLIEMLIESTGLVELQRHNAGNAGSDHEALQLAQEYVDVLAKR AGALAGISPMFQPCVVPPKPWVAITGGGYWANGRRPLALVRTH SKKGLMRYEDVYMPEVYKAVNIAQNTAWKINKKVLAVVNEIVN WKNCPVADIPSLERQELPPKPDDIDTNEAALKEWKKAAAGIYR | 37 |

TABLE 1-continued

Description of the Sequences

| Description | Sequences | SEQ ID NO |
|---|---|---|
| | LDKARVSRRISLEFMLEQANKFASKKAIWFPYNMDWRGRVYAV PMFNPQGNDMTKGLLTLAKGKPIGEEGFYWLKIHGANCAGVDK VPFPERIAFIEKHVDDILACAKDPINNTWWAEQDSPFCELAFC FEYAGVAHHGLSYNCSLPLAFDGSCSGIQHFSAMLRDEVGGRA VNLLPSETVQDIYGIVAQKVNEILKQDAINGTPNEMITVTDKD TGEISEKLKLGTSTLAQQWLAYGVTRSVTKRSVMTLAYGSKEF GFRQQVLDDTIQPAIDSGKGLMFTQPNQAAGYMAKLIWDAVSV TVVAAVEAMNWLKSAAKLLAAEVKDKKTKEILRHRCAVHWTTP DGFPVWQEYRKPLQKRLDMIFLGQFRLQPTINTLKDSGIDAHK QESGIAPNFVHSQDGSHLRMTVVYAHENYGIESFALIHDSFGT IPADAGKLFKAVRETMVITYENNDVLADFYDQFADQLHETQLD KMPPLPKKGNLNLQDILKSDFAFA | |
| RNA polymerase from Kluyvera phage Kvp1 (GenBank Acc. No. ACJ14548.1) | MNVINAPKNDESDIANAIQPYNILADHYGAQLAATQLELEHEA HTEGEKRFLKAMERQIKAGEFGDNAVAKPLLSSLAPKFIEAWN TWFTEVEAKRGKRPVAYNLVQKVAPEAAAFITLKVTLACLTKE EFTNLQSVATKIGRSIEDELRFGIRDEEAKHFKNHVQEALNK RVGIVYKKAFMQAVEGKMLDAGQLQTKWTTWTPEESIHVGVRM LELLIGSTGLVELHRPFAGNVEKDGEYIQLTEQYVDLLSKRAG ALAAAIAPMYQPCVVPPKPWTSPVGGGYWAAGRKPLSLVRTGSK KGLERYNDVYMPEVYKAVNIAQNTPWKINKKVLAVVNEIVNWK HCPVEDVPALERGELPVKPEDIDTNEAALKAWKKAASAIYRKE KARVSRRMSMEFMLGQANKFAQFKAIWFPMNMDWRGRVYAVPM FNPQGNDMTKGLLTLAKGKPIGVDGYYWLKIHGANTAGVDKVD FAERIKFIDDNHENIMSVAADPIANTWWAEQDSPFCFLAFCFE YAGVQHHGMNYNCSLPLAFDGSCSGIQHFSAMLRDEVGGRAVN LLPSKEVQDIYRIVAERVNEMLREAVINGTDNEVETVTNKDTG EITEKLKLGTKELAGQWLAYGVTRKVTKRSVMTLAYGSKEYGF RDQVLEDTIQPAIDDGKGLMFTQPNQAAGYMAKLIWESVTVTV VAAVEAMNWLKSAAKLLAAEVKDKKTKEVLRKRCAVHWVTPDG FPVWQEYKKPVQTRLNLMELGQIRLQPTVNTNKDSGIDARKQE SGIAPNFVHSMDGSHLRMTVVRSNEVYGVESFALIHDSFGTIP ADAGNLFKAVRETMVNTYEENDVLADFYEQFADQLHESQLDKM PEMPAKGSLDLQEILKSDFAFA | 38 |
| RNA polymerase from Morganella phage MmP1 (GenBank Acc. No. ACY74627.1) | MSIAAAVNKNDESDVELAAIPENTLADHYGADLAREQLQLEHE SYVMGEERFRKMLERQEKAEEFGDSSVAKPLIITLLPKVTQRI TDWLNEWADPNKKGRKPIAYTHLKDIKPETLAFITIKVVLNKL AGKDDAFMQPLAYAIGSSIEDEARFGIRELEMAHFKKCAEEN LNKRRGTAYRKAFLSVVEADMLDKGLLGGESWGTWNKTDVMNI GISMLEKLIEATGLVELREKRNFEEMDRIVIAEEYVKAMATRA QSLAGISPMYQPCVVPPKPWVSITGGGYWANGRKPTALIRTHT RKALYRYEDVYMPEVYKAINYAQETPWRINRKVLAVVNELVKW KNNPVKDMPSIDKLELPQRPDDIDTNEEALRSWKREAAAVYRK DEQRKSRYLSMSFALEQANKFSNKKAIYFPYNMDWRGRVYALP MFNPQGNDMVKGLLTLAKGKPIGKDGFYWLKIHGANTAGVDKV TFPERIKFIEDNHDNIMQCAESPLDNLWWTEQDSPFCFLAFCF EYAQVTKKGLGWVCSLPIALDGSCSGIQHFSAMLRDDIGGRAV NLLPSETVQDIYGIVADKVNEALKELVINGTDNYTDVTDKST GEIIERYRLGEKELARQWLEFGVTRSVTKRSVMTLAYGSKEYG FRDQVLEDTIRPAIDSGKGAMFTNPSQAASEMAKRIWEAVSVT VVAAVGAMKWLQSSAKLMAAEVKDKKTKEVLRKRCAVHWVTPD GFPVWQEYRKPKQKRVHLMELGSYYDARMKETSSDCSIDAHKQ ESGISPNFVHSQDGNHLRMTVVYAREKYNVESFALIHDSEGTI PADVPNLFKAVRETMVNMYENNDVLADFYEQFADQLHESQLDK MPALPPKGKLNLQDILKSDFAFA | 39 |
| RNA polymerase from Vibrio phage N4 (GenBank Acc. No. ACR16468.1) | MANVIKPESHNFSDISAAILPENVLADSYGEALAAEQLMLEHE SYQLGEARFIKAMERQVERGEVSDNAVAKPLLDTLIPALAARI TEFVEMKQRGKPHVSKGYFAMIKPESAAFIIVKTTLNILAKEE SVPVQRVAMAIGGNIEDEIRFGIRDEEIKHFKERVKPNLDKR NGFIYKKAYMEAVEAGMQDKGELNSTHEAWEKDVKFHVGIRAI EMLIEATGMVQLERKEKGIPDKDHEALHLAPEYVEKLTNRAHA LAGISPMYQPMIVKPKRWTGVQGGGYWAKGRRPLNLIRVGSKR ALDRYRQVDMPEVYDAINTIQETAWRINKDVLAVVNNVVTWAN CPVEDVPSIDKLALPEKPEDISNEESLKKWKKAAAAIYRKEK ARQSSRRISLEFALSQANKFSKYNEIYFPYNMDWRGRVYAIPME NPQGNDMVKGLLTFAKKVPVGIDGGYWLAVHGANCAGVDKVSL EDRVKWVNDNEANILASAEAPLDETWWAEQDSPFCFLAFCFEW AAYVKAGKKPSFESSLPLAFDGTCSGLQHFSAMLRDEIGGAAV NLLPADKPQDIYGIVAVKVNEVLRDLVISGTEDEMQTLEDKKT GEITERLVLGTRTLAAQWLEYGVTRSVTKRSVMTLAYGSKEYG FADQVFEDTVMPAIDNGKGAMFTEPSQACREMAKLIWDAVSKT VVAAVEAMQWLQSSAKLVSSEVKDKKSGEILKHAMPVHWTTPN GFPVWSEYCKQEQKRIDCVILGTHRMALTINIRDKKEIDAAKQ | 40 |

TABLE 1-continued

Description of the Sequences

| Description | Sequences | SEQ ID NO |
|---|---|---|
| | TSGIAPNFVHSMDASHLQMTVNKCFKVYGIHSFAMIHDSFGCH AGFASKMFRAVRETMVETYEEHDVIQEFYNQFEQQLHESQIEK MPVLPRKGNLELREILKSLYTES | |
| RNA polymerase from Vibriophage VP4 (GenBank Acc. No. AAY46276.1) | MANVIKPQSHNESDISAAILPENVLADSYGEALAAEQLMLEHE SYQLGEARFIKAMERQVERGEVSDNAVAKPLLDTLIPALAARI TEFVEMKQRGKPHVSKGYFAMIKPESAAFIIVKTTLNILAKEE SVPVQRVAMAIGGNIEDEIRFGRIRDEEIKHFKERVKPNLDKR NGFIYKKAYMEAVEAGMQDKGELNSTHEAWEKDVKFHVGIRAI EMLIEATGMVQLERKEKGIPDKDHEALHLAPEYVEKLTNRAHA LAGISPMYQPMIVKPKRWTGVQGGGYWAKGRRPLNLIRVGSKR ALDRYRQVDMPEVYDAINTIQETAWRINKDVLAVVNNVVTWTN CPVEDVPSIDKLALPEKPEDIDNNEESLKKWKKAAAAIYRKEK ARQSRRISLEFALSQANKESKYNEIYFPYNMDWRGRVYAIPME NPQGNDMVKGLLTFAKKVPVGIDGGYWLAVHGANCAGVDKVSL EDRVKWVNDNEANIIASAEAPLDFTWWAEQDSPFCFLAFCFEW AAYVKAGKKPSFESSLPLAFDGTCSGLQHFSAMLRDEIGGAAV NLLPADKPQDIYGIVAVKVNEVLRDLVISGTEDEMQTLEDKKT GEITERLVLGTRTLAAQWLEYGVTRSVTKRSVMTLAYGSKEYG FADQVFEDTVMPAIDNGKGTMFTEPSQACREMAKLIWDAVSKT VVAAVEAMQWLQSAAKLVSSEVKDKKSGEILKHAMPVHWTTPN GFPVWSEYCKQEQKVIDCVILGSMRLQLKLNMRDKKEIDTAKQ ASGIAPNFVHSMDASHLQMTVNKCFKVYGIHSFAMIHDSFGCH AGFASKMFRAVRETMVETYEEHDVIQEFYNQFEKQLHESQIEK MPALPRKGNLELREILKSLYTES | 41 |
| Protein from Enterobacteria phage K11 (GenBank Acc. No. CAA37330.1) | MNALNIGRNDESEIELAAIPYNILSEHYGDQAAREQLALEHEA YELGRQRFLKMLERQVKAGEFADNAAAKPLVLTLHPQLTKRID DWKEEQANARGKKPRAYYPIKHGVASELAVSMGAEVLKEKRGV SSEAIALLTIKVVLGNAHRPLKGHNPAVSSQLGKALEDEARFG RIREQEAAYFKKNVADQLDKRVGHVYKKAFMQVVEADMISKGM LGGDNWASWKTDEQMHVGTKLLELLIEGTGLVEMTKNKMADGS DDVTSMQMVQLAPAFVELLSKRAGALAGISPMHQPCVVPPKPW VETVGGGYWSVGRRPLALVRTHSKKALRRYADVHMPEVYKAVN LAQNTPWKVNKKVLAVVNEIVNWKHCPVGDVPAIEREELPPRP DDIDTNEVARKAWRKEAAAVYRKDKARQSRRCREFMVAQANK FANHKAIWFPYNMDWRGRVYAVSMENPQGNDMTKGSLTLAKGK PIGLDGFYWLKIHGANCAGVDKVPFPERIKFIEENEGNILASA ADPLNNTWWTQQDSPFCFLAFCFEYAGVKHHGLNYNCSLPLAF DGSCSGIQHFSAMLRDSIGGRAVNLLPSDTVQDIYKIVADKVN EVLHQHAVNGSQTVVEQIADKETGEFHEKVTLGESVLAAQWLQ YGVTRKVTKRSVMTLAYGSKESLVRQQVLEDTIQPAIDNGEGL MFTHPNQAAGYMAKLIWDAVTVTVVAAVEAMNWLKSAAKLLAA EVKDKKTKEVLRKRCAIHWVTPDGFPVWQEYRKQNQARLKLVE LGQANVKMTYNTGKDSEIDAHKQESGIAPNFVHSQDGSHLRMT VVHANEVYGIDSFALIHDSSGTIPADAGNLFKAVRETMVKTYE DNDVIADFYDQFADQLHESQLDKMPAVPAKGDLNLRDILESDE AFA | 42 |
| RNA polymerase from Synechococcus virus Syn5 (GenBank Acc. No: YP_001285424.1); Bold font represents position V693 that aligns and corresponds to position V783 of T7 RNA polymerase | MSFDLIARQLQRETEAAELARKRLQDARREANERSYASSNIES RKAIATFLDPIAQRIGERLFTLRRGTGAVDAAEVYKHLKNADH HHLALITMKTALDVLGKDPEPQIQQLTTAIGRNIQLELRLTYY AEENPELYKQASRFFHAGTGTRQKATVIKLKENREGIEWDQWS RVTCHKVGQWLMLAMADVTGWIERATDRTSGGRKTKTRICYSR EFLQHRDTILAAAEQLAFCQWPMLCPPIEWSNDHNGGYLSEQI RRVNPLIRKTGPLGTRKQGDIPLAMLNNLQGGQAYKVNPEVLDI ANHCYESNVTVGKFIRHAPLVPPSPGEDCTEDQLTAYKRARR EAEDENAQISQKNWRTTEVMYVARKYADEASFWMPASEDYRGR VYFLNTALNPQGTDEDKALLYFAEEGPVNEWWLSFHVATTYGL DKETMVNRVQWARDNHELIDRIASDPVRHTEWHDADEPWCFLA ACLEYKACVIDGTKQTSGLPIGIDATCSGLQHLAAMTRCGRTA ALVNVTPTDKPADAYKTVAQASLKHLPKEQHEWITRKVTKRPV MCTPYGVTMSSARGYIRDQLVKDGHKEDLRSPGVLNGIVKAIF NEAIPEVIPGPVQVMAWLKRSAGQIIDRGDSTITWTTPSGFEV VQDLKKSKTYEVKTRIMGGARIKLQVGDGFTDEPDRDHHKSAL APNVVHSNDASLLHLTFAFWDKPFTVIHDCVLGRSCDMDQMGS DIRLHFAEMYKADVMQDWADQVGVELPVDLIKNTLDIDSVNQS LYFFS | 43 |
| T7 promoter sequence with 3'-GG | TAATACGACTCACTATAGGG | 44 |
| Anchored Oligo(dT) | GGGCAGACGTGTGCTCTTCCGATCTTTTTTTTTTTTTTTTTTT TTTTTTVN, wherein V is A or G, and N is A, T, C or G | 45 |

TABLE 1-continued

Description of the Sequences

| Description | Sequences | SEQ ID NO |
|---|---|---|
| Oligonucleotide tethered to ddNTP | NNNNNNNNNAGATCGGAAGAGCGTCGTGTA-biotin, wherein N is A, T, C or G | 46 |
| Fw primer for gene Z | TACACGACGCTCTTCCGATCTCAATGGCCATTAACCGCGTTG | 47 |
| Rev primer for gene Z | CAGACGTGTGCTCTTCCGATCTACCTTTCAGGGATGAACGCTG | 48 |
| Fw primer for gene U | TACACGACGCTCTTCCGATCTGCAGTTGCCGTTTATCTCACC | 49 |
| Rev primer for gene U | CAGACGTGTGCTCTTCCGATCTAACTCCACAAGCCCGCATCAT | 50 |
| Fw primer for gene V | TACACGACGCTCTTCCGATCTCGAATCCGCTTTCAGACGTTG | 51 |
| Rev primer for gene V | CAGACGTGTGCTCTTCCGATCTGGGTATCGCCTTCATTAAACC | 52 |
| Fw primer for gene G | TACACGACGCTCTTCCGATCTTGATGAAACGGCAGGCAGAAC | 53 |
| Rev primer for gene G | CAGACGTGTGCTCTTCCGATCTTACATACCAGACAGCCGGTAC | 54 |
| Fw primer for gene T | TACACGACGCTCTTCCGATCTCTGCTGGATATGCACTTTTCC | 55 |
| Rev primer for gene T | CAGACGTGTGCTCTTCCGATCTCCCTTCTGATACTGTCATCAG | 56 |
| Fw primer for gene H | TACACGACGCTCTTCCGATCTGATATTGGTCGTCCTGATACC | 57 |
| Rev primer for gene H | CAGACGTGTGCTCTTCCGATCTTCGGTATATTTCAGCCGTGAC | 58 |
| Fw primer for gene M | TACACGACGCTCTTCCGATCTGCTTTGGTGATGGCTATTCTC | 59 |
| Rev primer for gene M | CAGACGTGTGCTCTTCCGATCTCAGTTCACCACCTGTTCAAAC | 60 |
| Fw primer for gene L | TACACGACGCTCTTCCGATCTTTTACGCCCGTTTTCTGGATG | 61 |
| Rev primer for gene L | CAGACGTGTGCTCTTCCGATCTGACGTTGGCTGGTCATATTCA | 62 |
| Fw primer for gene K | TACACGACGCTCTTCCGATCTCGATTCATAAGTTCCGCTGTG | 63 |
| Rev primer for gene K | CAGACGTGTGCTCTTCCGATCTTGATTCGGCACTGATGAACCA | 64 |
| Fw primer for gene I | TACACGACGCTCTTCCGATCTTTACAACGATTTGGTCGCCGC | 65 |
| Rev primer for gene I | CAGACGTGTGCTCTTCCGATCTGACAATCTGGAATACGCCACC | 66 |
| Fw primer for gene J | TACACGACGCTCTTCCGATCTAGCGTGAAAGCAGTGTGGACT | 67 |
| Rev primer for gene J | CAGACGTGTGCTCTTCCGATCTCCGCTGGCATGTCAACAATAC | 68 |

DESCRIPTION

I. Definitions

As used herein, a "mutant" of an RNA polymerase (RNAP) refers to an RNAP that comprises one or more modifications of the amino acid sequence, for example by substitution, deletion, insertion or chemical modification, wherein such modifications change the functionality of the RNAP. This change in functionality may be an increase or decrease in a given function. A mutant polymerase may also have additional amino acid modifications that do not alter function of the protein or peptide. A mutant may comprise one or more amino acids have been replaced by their respective D-stereoisomers or by amino acids other than the naturally occurring 20 amino acids, such as, for example, ornithine, hydroxyproline, citrulline, homoserine, hydroxylysine, or norvaline.

As used herein, a "fragment" refers to an N-terminally and/or C-terminally shortened polypeptide, i.e. a polypeptide that lacks one or more of the N-terminal and/or C-terminal amino acids. Usually, the fragments are still functional, i.e. retain the biologic activity of the full-length polypeptide at least to a certain extent. The fragments may be at least 100, at least 200, at least 300, at least 400, at least 500, at least 600, or at least 700 amino acids long and retain the polymerase activity of the protein. As used herein, a RNAP may comprise a fragment of a RNAP, such as a fragment comprising the catalytic domain of a given RNAP.

The terms "identical" or percent "identity," in the context of two or more polypeptide sequences, refer to two or more sequences or subsequences that have a homology of 100% when aligned. Sequences are "X % identical" if two sequences have a specified X percentage of amino acid residues that are the same (i.e., X % may be 80%, 85%, 90%, or 95% identity over a specified region, or, when not specified, over the entire sequence), when compared and aligned for maximum correspondence over a comparison window, designated region as measured using one of the sequence comparison algorithms or by manual alignment and visual inspection. A "comparison window", as used herein, includes reference to a segment of any one of the number of contiguous positions selected from the group consisting of from 20 to 600, usually about 50 to about 200, more usually about 100 to about 150 in which a sequence may be compared to a reference sequence of the same number of contiguous positions after the two sequences are optimally aligned. Methods of alignment of sequences for comparison are well known in the art. Optimal alignment of sequences for comparison can be conducted, e.g., by the local homology algorithm of Smith and Waterman (1970) Adv. Appl. Math. 2: 482c, by the homology alignment algorithm of Needleman and Wunsch (1970) J. Mol. Biol. 48:443, by the search for similarity method of Pearson and Lipman (1988) Proc. Nat'l. Acad. Sci. USA 85:2444, by computerized implementations of these algorithms (GAP, BESTFIT, FASTA, and TFASTA in the Wisconsin Genetics Software Package, Genetics Computer Group, 575 Science Dr., Madison, Wis.), or by manual alignment and visual inspection (see, e.g., Ausubel et al., Current Protocols in Molecular Biology (1995 supplement)). Two examples of algorithms that are suitable for determining percent sequence identity and sequence similarity are the BLAST and BLAST 2.0 algorithms, which are described in Altschul et al. (1977) Nuc. Acids Res. 25:3389-3402, and Altschul et al. (1990) J. Mol. Biol. 215:403-410, respectively. Software for performing BLAST analyses is publicly available through the National Center for Biotechnology Information (http://www.ncbi.nlm.nih.gov/).

"Biological activity" or the property of being "functional," as used herein, refers to an enzymatic activity of a polypeptide, an interaction with another molecule, or a cellular localization of a polypeptide. The functional or biological activity of polypeptide may be 20 or more, 30 or more, 40 or more, 50 or more, 60 or more, 70 or more, 80 or more, 90 or more, or 100 percent, or greater than 100 percent of the activity of an appropriate reference, e.g. a wildtype polypeptide.

The term "polymerase activity," as used herein, relates to the enzymatic functionality of a wt and mutant T7 RNA polymerase and means that a T7 RNA polymerase (T7 RNAP) is capable of synthesizing a nucleic acid molecule from substrate nucleotides that may be wild type (i.e. canonical, ribo-) nucleotides and/or modified/non-canonical nucleotides. Polymerase activity is also considered to be present, if a T7 RNAP can use only one specific modified nucleotide as a substrate and incorporate it into the nucleic acid being synthesized and/or only produces short molecules of only 2-10 nucleotides.

A "non-canonical" nucleotide or substrate, as used herein, relates to any nucleotides other than ribonucleotides (rNTP) conventionally used (i.e. that are canonical) as substrate by WT T7 RNAP. Non-canonical substrates include deoxynucleotides (dNTP) and 2'-modified rNTPs, such as 2'-methoxy or 2'-F modified rNTPs. Non-canonical nucleotides also include oligonucleotide-tethered nucleotides.

A "promoter," as used herein, is a regulatory nucleotide sequence that stimulates transcription. For example, multiple RNA copies can be transcribed from a DNA template that includes a functional promoter recognized by RNA polymerase. Such a DNA template comprises a promoter operably linked to a target nucleotide sequence to be transcribed.

The term "operably linked," as used herein, refers to the association of two or more nucleic acid fragments on a single vector so that the function of one is affected by the other. For example, a promoter may be operably linked with a target nucleic acid sequence, wherein the promoter can affect the expression (e.g. in an in vitro transcription) of that target sequence. In this example, the target nucleic acid sequence is under the transcriptional control of the promoter.

A "target nucleic acid," as used herein, is a nucleic acid sequence of interest. A target nucleic acid may be a specific sequence (for example, a specific gene) or target nucleic acids may be sequences from a whole genome. A target nucleic acid may be comprised in a biological sample.

A "template nucleic acid," as used herein, is a nucleic acid molecule that comprises a promoter operably linked to a target nucleotide sequence to be transcribed. A target nucleotide sequence portion of a template nucleic acid may be double stranded or single stranded, as long as a promoter portion is double stranded. A template nucleic acid may be a DNA or RNA molecule. A template may be part single-stranded and part double-stranded.

As used herein, the term "amplification" relates to the production of additional copies of a nucleic acid molecule. Amplification as used herein is often carried out using polymerase chain reaction (PCR) technologies well known in the art, but may also be carried out by other means including isothermal amplification methods such as, e.g., transcription mediated amplification, strand displacement amplification, rolling circle amplification, loop-mediated isothermal amplification, helicase dependent amplification, single primer isothermal amplification or recombinase polymerase.

II. Phage-Type RNA Polymerases

This application is related to mutant polymerases with improved ability to use 2'-modified ribonucleoside triphosphates (rNTPs) or deoxynucleotide triphosphates (dNTPs) as substrates. In some instances, the mutant polymerase is a phage-type RNA polymerases (RNAP), such as T7, SP6, or T3 RNAP.

a. Phage-Type RNA Polymerases

T7 RNA polymerase (which may be referred to as "wild type T7 RNA polymerase or "WT T7 RNAP) is a DNA-directed RNA polymerase of bacteriophage T7 (enterobacteria phage T7) with the UniProtKB/Swiss-Prot Accession No. P00573 (version 98 of the entry and version 2 of the sequence) and as set forth in SEQ ID NO: 1. WT T7 RNAP also includes isoforms of this protein, in particular naturally occurring isoforms. WT T7 RNAP also includes variants of this protein, which comprise one or more change in amino acid sequence that have little or no effect on the function of the RNAP. The polypeptide is encoded by nucleotides 3171 to 5822 of the T7 bacteriophage genome. Examples of related RNAPs include SP6 RNAP as set forth in SEQ ID NO: 2 and T3 RNA RNAP as set forth in SEQ ID NO: 3.

As used herein, a "phage-type RNA polymerase" or a "phage-type RNAP" refers to a polymerase with homology to T7 RNAP and which can incorporate rNTPs into RNA. Exemplary phage-type polymerases include RNAPs from the phage-type phages T7, T3, SP6, ΦI, ΦII, W31, H, Y, A1, 122, cro, C21, C22, and C23; gh-1, IV, ViIII or 11, or a mitochondrial RNAP, as well as derivative and mutant forms of these RNAPs. A "phage-type RNAP promoter" is a promoter from which transcription is initiated by a phage-type RNAP. In an aspect, the T7, SP6, or T3 RNAP initiates synthesis of a single-stranded nucleic acid molecule via the T7, SP6, or T3 promoter, respectively. In some aspects, the promoter sequence of the T7, SP6, and T3 promoters comprises SEQ ID NOs: 7, 8 and 9, respectively. In some instances, the promoter sequence of the T7, SP6, and T3 promoters is SEQ ID NOs: 7, 8 and 9, respectively. In some instances, the T7 promoter comprises SEQ ID NO: 7 with additional G or GG at 3'-end. In some instances, the T7 promoter comprises SEQ ID NO: 44. Other phage-type RNA polymerases initiate synthesis of nucleic acid molecule via an appropriate promoter.

Suitable exemplary phage-type RNA polymerases include, but are not limited to, RNA polymerases from *Escherichia* phage T7 (T7 RNA polymerase, Genbank: ACY75835.1; SEQ ID NO: 1), *Salmonella* virus SP6 (SP6 RNA polymerase, GenBank: AAR90000.1; SEQ ID NO: 2), Enterobacteria phage T3 (T3 RNA polymerase, GenBank: CAC86264.1; SEQ ID NO: 3), Enterobacteria phage 13a (GenBank: ACF15888.1; SEQ ID NO: 25), Enterobacteria phage 285P (GenBank: ACV32460.1; SEQ ID NO: 26), Enterobacteria phage BA14 (GenBank: ACF15731.1; SEQ ID NO: 27), Enterobacteria phage EcoDS1 (GenBank: ACF15785.1; SEQ ID NO: 28), *Yersinia* phage Yepe2 (GenBank: ACF15684.1; SEQ ID NO: 29), *Klebsiella* phage K11 (GenBank: ACF15837.1; SEQ ID NO: 30), *Salmonella* phage phiSG-JL2 (GenBank: ACD75668.1; SEQ ID NO: 31), *Yersinia* phage Berlin (GenBank: CAJ70654.1; SEQ ID NO: 32), *Salmonella* phage Vi06 (GenBank: CBV65202.1; SEQ ID NO: 33), Pseudomonad phage gh-1 (GenBank: AAO73140.1; SEQ ID NO: 34), Enterobacteria phage KIF (GenBank: AAZ72968.1; SEQ ID NO: 35), *Yersinia* phage phiA1122 (GenBank: AAP20500.1; SEQ ID NO: 36), *Yersinia* phage phiYe03-12 (GenBank: CAB63592.1; SEQ ID NO: 37), *Kluyvera* phage Kvp1 (GenBank: ACJ14548.1; SEQ ID NO: 38), *Morganella* phage MmP1 (GenBank: ACY74627.1; SEQ ID NO: 39), *Vibrio* phage N4 (GenBank: ACR16468.1 (SEQ ID NO: 40), AAY46276.1 (SEQ ID NO: 41)), Enterobacteria phage K11 (GenBank: CAA37330.1; SEQ ID NO: 42), and Synechococcus virus Syn5 (GenBank Acc. No: YP 001285424.1; SEQ ID NO: 43).

In some aspects, a phage-type RNAP has at least 30%, 35%, 40%, 45%, 50%, 55%, 60%, 65%, 70%, 75%, 80%, 85%, 90%, 95%, 98% or 99% sequence identity to SEQ ID NO: 1. For example, Table 1 of U.S. Pat. No. 9,062,292, which is incorporated in its entirety herein by reference, provides a listing of known RNA polymerases, including the homology of those RNA polymerases to T7 (SEQ ID NO: 1). SP6 and T3 are exemplary phage-type RNA polymerases.

Positions in various RNAPs that correspond to positions in T7 RNAP can be determined by alignment of amino acid sequences. Alignment of amino acid sequences can be achieved in various ways that are within the skill in the art, for instance, using publicly available computer software such as BLAST, ALIGN, Clustal Omega or MultiAlin software. Those skilled in the art can determine appropriate parameters for measuring alignment, including any algorithms needed to achieve maximal alignment over the full length of the sequences being compared.

B. Domains and Structures of RNAPs

Phage-type RNAPs have been widely studied, and a variety of domains have been described for these enzymes. Phage-type RNAPs comprise a catalytic domain, N-terminal domain, fingers subdomain, palm 1 subdomain, and palm 2 subdomain. The palm 1 subdomain and palm 2 subdomain may be referred to as the palm subdomains.

The fingers subdomain functions to bind the nucleoside triphosphates with the template base, while the palm subdomains functions to coordinate the nucleoside triphosphates with the template.

The N-terminal domain comprises multiple subdomains. N-terminal domain is involved in promoter recognition and DNA strand separation via the participation of an AT-rich recognition loop and an intercalating beta-hairpin loop. Three regions, the specificity loop (amino acids 739-770 of T7 RNAP as disclosed in SEQ ID NO: 1), the AT-rich recognition loop, and the intercalating beta-hairpin loop, can interact with the promoter.

The AT-rich recognition loop, which comprises residues 93-101 of SEQ ID NO: 1, indirectly binds through its inherent flexibility to the DNA sequence in the minor groove. The intercalating beta-hairpin loop plays an important role in transcription initiation: formation and stabilization of the transcription bubble. It facilitates strand separation of the promoter duplex so that the template strand can be accessible to the binding site of the T7 RNA polymerase.

In some instances, a phage-type RNAP comprises a N-terminal domain, a catalytic domain, a fingers subdomain, and palm subdomains.

In some aspects, a T7 RNAP comprises a N-terminal domain, a catalytic domain, a fingers subdomain, and palm subdomains. In some aspects, a T7 RNAP comprises SEQ ID NO: 1. In further aspects, the catalytic domain of a T7 RNAP comprises amino acids 325-883 of SEQ ID NO: 1. In some aspects, the N-terminal domain of a T7 RNAP comprises amino acids 1-324 of SEQ ID NO: 1. In some aspects, the fingers subdomain of a T7 RNAP comprises amino acids 566-784 of SEQ ID NO: 1. In some aspects, the palm 1 subdomain of a T7 RNAP comprises amino acids 325-411 of SEQ ID NO: 1. In some aspects, the palm 2 subdomain of a T7 RNAP comprises amino acids 785-883 of SEQ ID NO: 1.

In some aspects, a SP6 RNAP comprises a N-terminal domain, a catalytic domain, a fingers subdomain, and palm subdomains. In some aspects, a SP6 RNAP comprises SEQ ID NO: 2. In some aspects, the catalytic domain of a SP6 RNAP comprises amino acids 298-894 of SEQ ID NO: 2. In some aspects, the N-terminal domain of a SP6 RNAP comprises amino acids 1-297 of SEQ ID NO: 2. In some aspects, the fingers subdomain of a SP6 RNAP comprises amino acids 565-779 of SEQ ID NO: 2. In some aspects, the palm 1 subdomain of a SP6 RNAP comprises amino acids 298-401 of SEQ ID NO: 2. In some aspects, the palm 2 subdomain of a SP6 RNAP comprises amino acids 780-984 of SEQ ID NO: 2.

In some aspects, a T3 RNAP comprises a N-terminal domain, a catalytic domain, a fingers subdomain, and palm subdomains. In some aspects, a T3 RNAP comprises SEQ ID NO: 3. In some aspects, the catalytic domain of a T3 RNAP comprises amino acids 326-884 of SEQ ID NO: 3. In some aspects, the N-terminal domain of a T3 RNAP comprises amino acids 1-325 of SEQ ID NO: 3. In some aspects, the fingers subdomain of a T3 RNAP comprises amino acids 567-785 of SEQ ID NO: 3. In some aspects, the palm 1 subdomain of a T3 RNAP comprises amino acids 326-412 of SEQ ID NO: 3. In some aspects, the palm 2 subdomain of a T3 RNAP comprises amino acids 786-884 of SEQ ID NO: 3.

In some aspects, a catalytic domain of a T7 RNAP comprises a fingers subdomain and palm subdomains. In some aspects, a catalytic domain of a T7 RNAP comprises SEQ ID NO: 4. In some aspects, the fingers subdomain of a T7 RNAP catalytic domain comprises amino acids 262-460 of SEQ ID NO: 4. In some aspects, the palm 1 subdomain of a T7 RNAP catalytic domain comprises amino acids 1-87 of SEQ ID NO: 4. In some aspects, the palm 2 subdomain of a T7 RNAP catalytic domain comprises amino acids 461-559 of SEQ ID NO: 4.

In some aspects, a catalytic domain of a SP6 RNAP comprises a fingers subdomain and palm subdomains. In some aspects, a catalytic domain of a SP6 RNAP comprises SEQ ID NO: 5. In some aspects, the fingers subdomain of a SP6 RNAP catalytic domain comprises amino acids 268-488 of SEQ ID NO: 5. In some aspects, the palm 1 subdomain of a SP6 RNAP catalytic domain comprises amino acids 1-104 of SEQ ID NO: 5. In some aspects, the palm 2 subdomain of a SP6 RNAP catalytic domain comprises amino acids 483-597 of SEQ ID NO: 5.

In some aspects, a catalytic domain of a T3 RNAP comprises a fingers subdomain and palm subdomains. In some aspects, a catalytic domain of a T3 RNAP comprises SEQ ID NO: 6. In some aspects, the fingers subdomain of a T3 RNAP catalytic domain comprises amino acids 242-459 of SEQ ID NO: 6. In some aspects, the palm 1 subdomain of a T3 RNAP catalytic domain comprises amino acids 1-87 of SEQ ID NO: 6. In some aspects, the palm 2 subdomain of a T3 RNAP catalytic domain comprises amino acids 460-559 of SEQ ID NO: 6.

C. Mutant Polymerases

In some instances, a mutant polymerase described herein comprises one or more amino acid mutations that alter the function of mutant polymerase compared to the corresponding wild-type (WT) polymerase. In some aspects, one or more mutation is comprised in the catalytic domain of the RNAP. Representative catalytic domains of a RNAP are SEQ ID NOs: 4-6 (from T7, SP6, and T3 RNAPs, respectively).

In some aspects, a mutant polymerase comprises a catalytic domain having at least 80%, 85%, 90%, 95%, 98% or 99% sequence identity with SEQ ID NO: 4, and wherein the mutant polymerase comprises one or more mutations at position V459, G231, V365, F222, M372, T405, P406, Q462, and/or D463 relative to SEQ ID NO: 4.

In some aspects, a mutant polymerase comprises a catalytic domain having at least 80%, 85%, 90%, 95%, 98% or 99% sequence identity with SEQ ID NO: 5, and wherein the mutant polymerase comprises one or more mutations at position V481, G257, T391, H247, I398, L430, P431, H484, and/or D485 relative to SEQ ID NO: 5.

In some aspects, a mutant polymerase comprises a catalytic domain having at least 80%, 85%, 90%, 95%, 98% or 99% sequence identity with SEQ ID NO: 6, and wherein the mutant polymerase comprises one or more mutations at position V459, G231, V365, F222, M372, T405, P406, Q462, and/or D463 relative to SEQ ID NO: 6.

In some aspects, a mutant polymerase comprises a catalytic domain and an N-terminal domain having at least 80%, 85%, 90%, 95%, 98% or 99% sequence identity with amino acid sequence corresponding to amino acids 1-324 of SEQ ID NO: 1, 1-297 of SEQ ID NO: 2, or 1-325 of SEQ ID NO: 3.

In some instances, the mutant polymerase comprises: (i) a catalytic domain having at least 80%, 85%, 90%, 95%, 98% or 99% sequence identity with SEQ ID NO: 4, (ii) one or more mutations at position V459, G231, V365, F222, M372, T405, P406, Q462, and/or D463 relative to SEQ ID NO: 4, and (iii) an N-terminal domain having at least 80%, 85%, 90%, 95%, 98% or 99% sequence identity with amino acid sequence corresponding to amino acids 1-324 of SEQ ID NO: 1.

In some instances, the mutant polymerase comprises: (i) a catalytic domain having at least 80%, 85%, 90%, 95%, 98% or 99% sequence identity with SEQ ID NO: 5, (ii) one or more mutations at position V481, G257, T391, H247, I398, L430, P431, H484, and/or D485 relative to SEQ ID NO: 5, and (iii) an N-terminal domain having at least 80%, 85%, 90%, 95%, 98% or 99% sequence identity with amino acid sequence corresponding to amino acids 1-297 of SEQ ID NO: 2.

In some instances, the mutant polymerase comprises: (i) a catalytic domain having at least 80%, 85%, 90%, 95%, 98% or 99% sequence identity with SEQ ID NO: 6, (ii) one or more mutations at position V459, G231, V365, F222, M372, T405, P406, Q462, and/or D463 relative to SEQ ID NO: 6, and (iii) an N-terminal domain having at least 80%, 85%, 90%, 95%, 98% or 99% sequence identity with amino acid sequence corresponding to amino acids 1-325 of SEQ ID NO: 3.

In some aspects, the catalytic domain and the N-terminal domain of mutant polymerase disclosed herein are covalently linked. In other aspects, the catalytic domain and the N-terminal domain of mutant polymerase disclosed herein are non-covalently linked.

In some aspects, a mutant polymerase comprises at least 80%, 85%, 90%, 95%, 98% or 99% sequence identity with SEQ ID NO: 1 and comprises one or more mutations at position V783, G555, V689, F546, M696, T729, P730, Q786, and/or D787 relative to SEQ ID NO: 1.

In some aspects, a mutant polymerase comprises at least 80%, 85%, 90%, 95%, 98% or 99% sequence identity with SEQ ID NO: 2 and comprises one or more mutations at position V778, G554, T688, H544, 1695, L727, P728, H781, and/or D782 relative to SEQ ID NO: 2; or In some aspects, a mutant polymerase comprises at least 80%, 85%, 90%, 95%, 98% or 99% sequence identity with SEQ ID NO: 3 and comprises one or more mutations at position V784, G556, V690, F547, M697, T730, P731, Q787, and/or D relative to SEQ ID NO: 3.

In some aspects, a mutant polymerase comprises at least 80%, 85%, 90%, 95%, 98% or 99% sequence identity with SEQ ID NO: 1 and comprises one or more mutations at position V783, G555, V689, F546, M696, T729, P730, Q786, and/or D787 relative to SEQ ID NO: 1, wherein the mutant polymerase can bind the T7 promoter. In some aspects, a mutant polymerase further comprises (a) 1, 2, 3, 4, 5, 6, 7, 8, 9, or 10 mutations in the polymerase catalytic domain; (b) 1, 2, 3, 4, 5, 6, 7, 8, 9, or 10 mutations in the fingers subdomain; and/or (c) 1, 2, 3, 4, 5, 6, 7, 8, 9, or 10 mutations in the palm subdomains.

In some aspects, a mutant polymerase comprises at least 80%, 85%, 90%, 95%, 98% or 99% sequence identity with SEQ ID NO: 2 and comprises one or more mutations at position V778, G554, T688, H544, 1695, L727, P728, H781, and/or D782 relative to SEQ ID NO: 2, wherein the mutant polymerase can bind the SP6 promoter. In some aspects, a mutant polymerase further comprises (a) 1, 2, 3, 4, 5, 6, 7, 8, 9, or 10 mutations in the polymerase catalytic domain; (b) 1, 2, 3, 4, 5, 6, 7, 8, 9, or 10 mutations in the fingers subdomain; and/or (c) 1, 2, 3, 4, 5, 6, 7, 8, 9, or 10 mutations in the palm subdomains.

In some aspects, a mutant polymerase comprises at least 80%, 85%, 90%, 95%, 98% or 99% sequence identity with SEQ ID NO: 3 and comprises one or more mutations at position V784, G556, V690, F547, M697, T730, P731, Q787, and/or D788 relative to SEQ ID NO: 3, wherein the mutant polymerase can bind the T3 promoter. In some aspects, a mutant polymerase further comprises (a) 1, 2, 3, 4, 5, 6, 7, 8, 9, or 10 mutations in the polymerase catalytic domain; (b) 1, 2, 3, 4, 5, 6, 7, 8, 9, or 10 mutations in the fingers subdomain; and/or (c) 1, 2, 3, 4, 5, 6, 7, 8, 9, or 10 mutations in the palm subdomains.

In some aspects, a mutant polymerase has at least 30%, 35%, 40%, 45%, 50%, 55%, 60%, 65%, 70%, 75%, 80%, 85%, 90%, 95%, 98% or 99% of the polymerase activity of the corresponding wild type polymerase when unmodified rNTPs are used for synthesizing RNA oligonucleotides from a DNA template. In some aspects, polymerase activity is measured such that one unit of the enzyme incorporates 1 nmol of AMP into a polynucleotide fraction in 60 minutes at 37° C.

In some aspects, a mutant polymerase has at least 80%, 85%, 90%, 95%, 98% or 99% sequence identity with SEQ ID NO: 1 and comprises one or more of the following substitutions relative to SEQ ID NO: 1: a V783M, V783L, V783I, or V783C substitution; a G555L, G555M, G555I, G555V, or G555Y substitution; a V689Q, V689N, V689D, V689E, V689R, V689S, or V689W substitution; a F546E, F546M, or F546I substitution; a M696G or M696H substitution; a T729H, T729L, or T729R substitution; a P730Y substitution; a Q786M, Q786L, Q786N, or Q786W substitution; and/or a D787I substitution. In some aspects, the mutant polymerase comprises at least one substitution selected from V783M, G555L, and V689Q. In some aspects, the mutant polymerase comprises two or more substitutions selected from V783M, G555L, and V689Q. In some aspects, the mutant polymerase comprises V783M, G555L, and V689Q substitutions.

In some aspects, a mutant polymerase comprises one or more mutation at a position corresponding to V783, G555, and/or V689 of SEQ ID NO: 1 based on a sequence alignment. In some aspects, a mutant polymerase has at least 80%, 85%, 90%, 95%, 98% or 99% sequence identity with any of the sequence of SEQ ID NOs: 1-6, and 25-43, and comprises one or more mutation at a position corresponding to V783, G555, and/or V689 of SEQ ID NO: 1. Residues "correspond" to each other where they occur at equivalent positions in aligned amino acid sequences, such as phage-type RNA polymerase sequences and/or a domain thereof, such as e.g. a catalytic domain. Corresponding positions can be identified as positions that align with one another. Related or variant polypeptides are aligned by any method in the art. Such methods typically maximize matches, and include methods such as using manual alignments and by using any of the numerous alignment programs available (for example, BLASTP) and others known in the art. By aligning the sequences of polypeptides, one of skill in the art can identify corresponding residues, using conserved and identical amino acid residues as guides. In some embodiments, an amino acid of a polypeptide is considered to correspond to an amino acid in a disclosed sequence when the amino acid of the polypeptide is aligned with the amino acid in the disclosed sequence upon alignment of the polypeptide with the disclosed sequence to maximize identity and homology (e.g., where conserved amino acids are aligned) using a standard alignment algorithm, such as the BLASTP algorithm with default scoring parameters (such as, for example, BLOSUM62 Matrix, Gap existence penalty 11, Gap extension penalty 1, and with default general parameters). As a nonlimiting example, with reference to the multiple sequence alignment shown in FIGS. 11-1 to 11-5, amino acid residue 783 in SEQ ID NO: 1 corresponds to positions 783, 806, 784, 693 in SEQ ID NOs: 25, 30, 31, 43 (marked in grey in Figures).

In some aspects, amino acid substitutions identical or similar to those described above can be introduced to an phage-type RNA polymerase or a subsequence thereof. Alternative amino acid substitutions can be made using any of the techniques and guidelines for conservative and non-conservative amino acids as set forth, for example, by a standard Dayhoff frequency exchange matrix or BLOSUM matrix. Six general classes of amino acid side chains have been categorized and include: Class I (Cys); Class II (Ser, Thr, Pro, Ala, Gly); Class III (Asn, Asp, Gln, Glu); Class IV (His, Arg, Lys); Class V (Ile, Leu, Val, Met); and Class VI (Phe, Tyr, Trp). For example, substitution of an Asp for another class III residue such as Asn, Gln, or Glu, is a conservative substitution. As used herein, "non-conservative substitution" refers to the substitution of an amino acid in one class with an amino acid from another class; for example, substitution of an Ala, a class II residue, with a class III residue such as Asp, Asn, Glu, or Gln. Appropriate amino acid alterations allowed in relevant positions may be confirmed by testing the resulting modified RNA polymerases for activity in the in vitro assays known in the art or as described in the Examples below.

III. Methods of Use

The mutant polymerases described herein can incorporate modified nucleotides, dNTPs, and ddNTPs to synthesize single-stranded nucleic acid. These mutant polymerases have advantages in a variety of methods involving nucleic acid synthesis.

In some aspects, a method for synthesizing a single-stranded nucleic acid comprises the steps of preparing a synthesis reaction mixture comprising a mutant RNA polymerase having enhanced ability to incorporate one or more modified nucleoside triphosphates, modified rNTPs, dNTPs, and/or ddNTPs compared with the wild type RNA polymerase, at least one nucleic acid template, and a mixture of nucleoside triphosphates; and performing a synthesis reaction under conditions that result in the production of one or more single-stranded nucleic acid. In some instances, mutant RNA polymerase comprising an amino acid sequence having at least 80%, 85%, 90%, 95%, 98%, or 99% sequence identity with a sequence selected from SEQ ID NOs: 1 to 6, and 25 to 43, and comprising at least one substitution or substitution set in said amino acid sequence is used. In further aspects, mutant RNA polymerase comprises at least one amino acid substitution at a position corresponding to the position V783, G555, and/or V689 of SEQ ID NO:1. In some aspects, a mutant polymerase that comprises at least 80%, 85%, 90%, 95%, 98% or 99% sequence identity with SEQ ID NO: 1 and comprises one or more mutations at position V783, G555, V689, F546, M696, T729, P730, Q786, and/or D787 relative to SEQ ID NO: 1 is used. In further aspects, a mutant polymerase that comprises at least 80%, 85%, 90%, 95%, 98% or 99% sequence identity with SEQ ID NO: 1 and comprises one or more mutations at position V783, G555, and/or V689 relative to SEQ ID NO: 1 is used.

In other instances, in a method for synthesizing single-stranded nucleic acid, a mutant polymerase that comprises at least 80%, 85%, 90%, 95%, 98% or 99% sequence identity with SEQ ID NO: 2 and comprises one or more mutations at position V778, G554, T688, H544, I695, L727, P728, H781, and/or D782 relative to SEQ ID NO: 2 is used. In other instances, a mutant polymerase that comprises at least 80%, 85%, 90%, 95%, 98% or 99% sequence identity with SEQ ID NO: 3 and comprises one or more mutations at position V784, G556, V690, F547, M697, T730, P731, Q787, and/or D788 relative to SEQ ID NO: 3 is used.

In some aspects, the at least one nucleic acid template used in the method for synthesizing a single-stranded nucleic acid described herein comprises one or more promoter sequences recognized by the mutant polymerase. In some aspects, when, for example, a mutant polymerase that comprises at least 80%, 85%, 90%, 95%, 98% or 99% sequence identity with SEQ ID NO: 1 and comprises one or more mutations at position V783, G555 and/or V689 relative to SEQ ID NO: 1 is used, the at least one nucleic acid template comprises a T7 promoter operably linked to a target nucleotide sequence. In some aspects, the target nucleotide sequence is the sequence to be transcribed.

In some aspects, when, for example, a mutant polymerase that comprises at least 80%, 85%, 90%, 95%, 98% or 99% sequence identity with SEQ ID NO: 2 and comprises one or more mutations at position V778, G554, and/or T688 relative to SEQ ID NO: 2 is used, the at least one nucleic acid template comprises a SP6 promoter operably linked to a target nucleotide sequence.

In some aspects, when, for example, a mutant polymerase that comprises at least 80%, 85%, 90%, 95%, 98% or 99% sequence identity with SEQ ID NO: 3 and comprises one or more mutations at position V784, G556, and/or V690 relative to SEQ ID NO: 3 is used, the at least one nucleic acid template comprises a T3 promoter operably linked to a target nucleotide sequence.

In an aspect, synthesis reaction that takes place in a method for synthesizing a single-stranded nucleic acid described herein advantageously does not require primers. In further aspect, the synthesis reaction is performed without changes in reaction temperature, which makes the method more simple.

In some aspects, the mixture of nucleoside triphosphates used in the currently described method for synthesizing single-stranded nucleic acid comprises one or more nucleoside triphosphates selected from modified nucleoside triphosphates, modified rNTPs, dNTPs, ddNTPs, and modified NTPs.

In an aspect, the mixture of nucleoside triphosphates comprises one or more dNTPs. In some aspects, the mixture of nucleoside triphosphates may consist essentially of one or more dNTPs. In some aspects, the mixture of nucleoside triphosphates consists of 1, 2, 3 or 4 dNTPs. In other aspects, one or more dNTPs are modified. In some aspects, one or more dNTPs are 2'-F modified. As a result, the nucleic acid synthesized according the currently described method will comprise one or more deoxyribonucleotides.

In some aspects, in a method for synthesizing a single stranded nucleic acid, a mutant polymerase that comprises at least 80%, 85%, 90%, 95%, 98% or 99% sequence identity with SEQ ID NO: 1 and comprises one or more mutations at position V783, G555 and/or V689 relative to SEQ ID NO: 1 is used, wherein at least one nucleic acid template comprises a T7 promoter operably linked to a target nucleotide sequence, and wherein the mixture of nucleoside triphosphates comprises one or more dNTPs. In some aspects, one or more dNTPs are 2'-F modified.

In some aspects, the mixture of nucleoside triphosphates used in the currently described method for synthesizing single-stranded nucleic acid comprises one or more 2'-modified rNTPs. In some aspects, the one or more 2'-modified rNTPs are selected from 2'-O-methyl, 2'-NH2, 2'-F, and 2'-methoxy ethyl rNTPs. In some aspects, the mixture of nucleoside triphosphates consists essentially of one or more 2'-modified rNTPs. As a result, the nucleic acid synthesized according the currently described method will comprise one or more 2'-modified ribonucleotides.

In some aspects, the mixture of nucleoside triphosphates used in the currently described method for synthesizing single-stranded nucleic acid comprises (i) one or more dNTPs and one or more rNTPs; (ii) three different dNTPs and one rNTP; (iii) two different dNTPs and two different rNTPs; or (iv) one dNTP and three different rNTPs. As a result, when synthesized by mutant polymerase according to present disclosure using the method for synthesizing single-stranded nucleic acid, the synthesized nucleic acid may comprise deoxyribonucleotides and ribonucleotides. In certain aspects, the one or more rNTPs are modified, in further aspects, the one or more rNTPs may be 2'-modified.

In some aspects, the mixture of nucleoside triphosphates used in the currently described method for synthesizing single-stranded nucleic acid comprises dTTP, dCTP, ATP, and GTP; dTTP, CTP, ATP, and dGTP; dTTP, dCTP, dATP, and GTP; dTTP, dCTP, dATP, and 2'-F-dGTP; dUTP, dCTP, ATP, and GTP; or dUTP, dCTP, dATP, and GTP. In some aspects, in a method for synthesizing a single stranded nucleic acid, a mutant polymerase that comprises at least 80%, 85%, 90%, 95%, 98% or 99% sequence identity with SEQ ID NO: 1 and comprises one or more mutations at position V783, G555 and/or V689 relative to SEQ ID NO: 1 is used, wherein the mixture of nucleoside triphosphates comprises one of the mixtures: dTTP, dCTP, ATP, and GTP; dTTP, CTP, ATP, and dGTP; dTTP, dCTP, dATP, and GTP; dTTP, dCTP, dATP, and 2'-F-dGTP; dUTP, dCTP, ATP, and GTP; or dUTP, dCTP, dATP, and GTP.

In some aspects, in a method for synthesizing a single stranded nucleic acid the mixture of nucleoside triphosphates comprising dNTPs and/or rNTPs, further comprises one or more ddNTP. The one or more ddNTP may be modified. For example, the modified ddNTP may further comprise a reporter moiety or an oligonucleotide attached to a linker attached to the ddNTP. The reporter moiety may include any suitable chemical or substance that may be detected as a signal or contrast using imaging techniques, or it can be any moiety capable of binding to a substrate, for example, a magnetic bead, a chromatography column bound with, for example, avidin, streptavidin, antigen, antibody, and the like. In some aspects, such moiety can be selected from biotin, iminobiotin, avidin, and streptavidin.

In some aspects, the mixture of nucleoside triphosphates comprises one or more oligonucleotide-tethered nucleotide. Examples and aspects of oligonucleotide-tethered nucleotides are described in part "A" below.

In some aspects, the synthesis reaction mixture used in the currently disclosed method of synthesizing single-stranded nucleic acid further comprises a cap or cap analog. As an example, "cap" may refer to the guanine nucleoside that is joined via its 5' carbon to a triphosphate group that is, in turn, joined to the 5' carbon of the most 5' nucleotide of a transcript. In some examples, the nitrogen at the 7 position of guanine in the cap is methylated. As an example, "cap analog" may refer to a dinucleotide, tri- or tetranucleotide containing a 5'-5' di-, tri-, or tetra-phosphate linkage between the first and the second nucleotide. One end of the cap analog terminates in a either a guanosine or substituted guanosine residue; it is this end from which RNA polymerase will initiate transcription by extending from the 3' hydroxyl. The second nucleotide of cap analog is a guanosine that mimics the eukaryotic cap structure, and may have 7-methyl-, 7-benzyl-, or 7-ethyl-substitutions and/or 7-aminomethyl or 7-aminoethyl substitutions. As another example of "cap analog", the terms "ARCA" and "anti-reverse cap analog" refer to chemically modified forms of cap analogs, designed to maximize the efficient of in vitro translation by ensuring that the cap analog is properly incorporated into the transcript in the correct orientation.

In some aspects, the one or more nucleic acid synthesized using the currently described method for synthesizing single-stranded nucleic acid comprise deoxyribonucleotides and/or ribonucleotides. In some aspects, the one or more nucleic acid comprise deoxyribonucleotides. As such, the one or more nucleic acid may comprise DNA. In some aspects, the one or more nucleic acid comprise deoxyribonucleotides and ribonucleotides. As such, the one or more nucleic acid may comprise RNA/DNA chimeric sequence.

In some aspects, the one or more nucleic acid comprise ribonucleotides. As such, the one or more nucleic acid may comprise RNA. In some aspects, the one or more nucleic acid comprising ribonucleotides are an RNA aptamer, a ribozyme, an siRNA, an miRNA, or an antisense RNA. In further aspects, the nucleic acid comprises canonical and non-canonical (e.g. modified) ribonucleotides.

In some aspects, the one or more nucleic acid comprise deoxyribonucleotides and ribonucleotides. As such, the one or more nucleic acid may comprise a DNA/RNA chimera.

In some aspects, the one or more nucleic acid synthesized by the method of synthesizing a single-strande nucleic acid described herein comprise from about 8 to about 2000 nucleotides, including intermediate ranges, such as from about 100 to about 1500 nucleotides, from about 800 to about 1500 nucleotides, from about 800 to about 1000 nucleotides, as from about 10 to about 50 nucleotides, from about 15 to about 35 nucleotides, from about 18 to about 75 nucleotides and from about 25 to about 150 nucleotides.

A. Oligonucleotide-Tethered Nucleotides

The present mutant polymerases have an ability to incorporate modified dNTPs bearing bulky groups attached to their nucleobases, such as oligonucleotide-tethered oligonucleotides, and these oligonucleotide-tethered nucleotides can be incorporated into a growing nucleic acid strand by a mutant polymerase during nucleic acid synthesis.

By using appropriately designed oligonucleotide-tethered ddNTPs (OTDDNs, as shown in FIG. 9A) it is possible to generate DNA ends that are compatible with sequencing on various platforms, including but not limited to the Illumina platform.

While not being bound by theory, it is believed that efficient incorporation of modified nucleotides, during nucleic acid synthesis is highly dependent on the size of attached label. More importantly, the length of linker, between nucleotide heterocyclic base and label, has the significant impact on incorporation. The linker should be long enough to reduce label steric hinderance and changes of nucleotide steric structure. At the same time, it has to be short enough to avoid back-folding. Moreover, the terminal functional groups of the linker must be tolerated by the polymerase enzymes. A properly designed linker will allow to incorporate nucleotides bearing large labels.

When the oligonucleotide-tethered nucleotide has 3'-H instead of the 3'-hydroxyl group (dideoxy-modified nucleotide), incorporation of such the oligonucleotide-tethered nucleotide would terminate the DNA synthesis. Using an oligonucleotide-tethered dideoxynucleotide and target-specific or random primers with a universal sequence, a set of randomly terminated fragments is generated, which can then be subjected to PCR conditions for platform-specific full-length sequencing adaptor introduction. In some aspects, this method can also be used to overcome the need for nucleic acid fragmentation. The oligonucleotide-tethered nucleotides may optionally be biotin-modified to facilitate enrichment.

The below disclosure describes tethering of an oligonucleotide to any nucleotide and its later incorporation into nucleic acid sequence while performing strand synthesis with nucleic acid polymerase. Also, this method provides advantages to attach an oligonucleotide to any final nucleotide of any nucleic acid sequence composition.

In some aspects, the oligonucleotide-tethered nucleotides used herein generally have a structure according to formula (A), or a salt thereof:

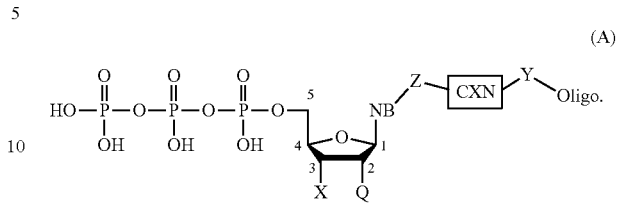

wherein NB is a nucleobase; Oligo is an oligonucleotide of 3 to 100 nucleotides; each of X and Q are independently chosen from, H, OH, N3, halo, alkyl, alkoxy, alkyl, alkenyl, alkynyl, acyl, cyano, amino, ester, and amido; each of Z and Y are independently chosen from a bond, amino, amido, alkylene, alkenylene, alkynylene, thioether, sulfonyl, sulfonamido, ether, ketone, carbonyl, anhydride, ester, imido, urea, urethane, and combinations thereof; and CXN is chosen from alkylene, alkenylene, alkynylene, ketone, carbonate, ester, ether, anhydride, amido, amino, aminoalkyl, imino, imido, diazo, carbamate ester, phosphodiester, sulfide, disulfide, sulfonyl, sulfonamido, and a heterocyclic group containing from one to four N, O, S atom(s) or a combination thereof where heterocyclic group is optionally substituted at carbon, nitrogen or sulfur atom(s).

In further aspects, the oligonucleotide-tethered nucleotides used herein may have a structure according to formula (I), or a salt thereof:

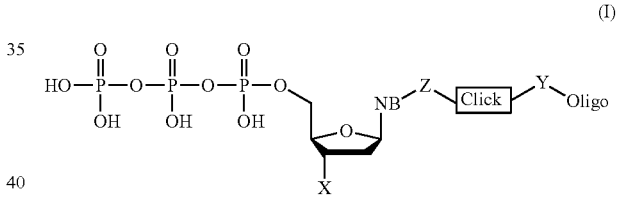

wherein X is H, OH or $N_3$, NB represents a nucleobase, Z and Y are linkers, Oligo represents an oligonucleotide of 3 to 100 nucleotides in length, and Click represents the reaction product of a Click reaction, which covalently binds the Z and Y linkers. In some aspects, the nucleobase is chosen from adenine, 7-deaza-adenine, cytosine, guanine, 7-deazaguanine, thymine, uracil and inosine. In some aspects, Z and Y each independently comprise at least one linking moiety chosen from amino, amido, alkyl, alkenyl, alkynyl, thioether, sulfonyl, sulfonamido, ether, ketone, carbonyl, anhydride, ester, imide, urea, urethane, or any combination thereof, or any combination thereof.

Alternatively, the oligonucleotide-tethered nucleotide can be acyclic (I').

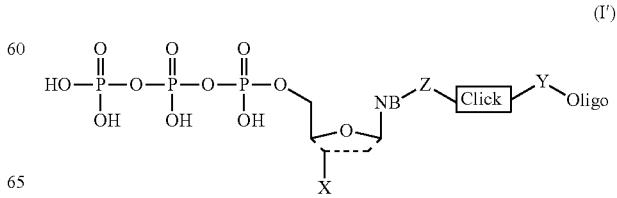

The Click reaction product includes the products of reactions such as, but not limited to, copper catalyzed azide-alkyne cycloaddition (CuAAC); strain-promoted azide-alkyne cycloaddition (SPAAC) also known as copper-free click chemistry; strain-promoted alkyne-nitrone cycloaddition (SPANC); alkyne hydrothiolation; and alkene hydrothiolation.

In some aspects, the Click reaction is a (3+2) cycloaddition reaction of an azide and an alkyne, resulting an 1,2,3-triazole. The reaction product provides triazole product, thereby providing an oligonucleotide-tethered nucleotide of formula (II), or a salt thereof:

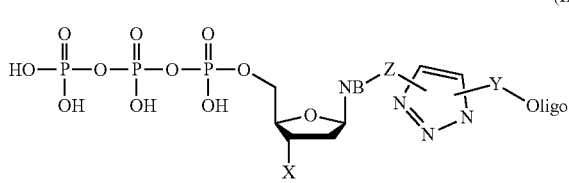

(II)

wherein, X, NB, Z, Y and Oligo are as defined above. In formula (II), one of Z and Y is covalently bound to the 1 position of the triazole, while the other of Z and Y is covalently bound to the 4 or 5 position of the triazole. In one aspect, X is OH, and in another aspect, X is H, and in yet another aspect X is $N_3$.

In some aspects, the linkers Z and/or Y include a carbon-based chain, for example an alkyl chain having 1 to 12 carbon atoms that may be linear or branched. In some aspects, the alkylene is a straight or branched $C_1$-$C_6$ alkylene. Linkers Z and/or Y may also include a straight or branch alkenylene having 2 to 12 carbons. Alternatively, the alkenylene is a straight or branched $C_2$-$C_6$ alkenylene. In some aspects, linkers X and Y include a straight or branched alkynylene chain of 2 to 12 carbons. In some aspects, the alkynylene is a straight or branched $C_2$ to $C_6$ alkynylene.

In some aspects, X and/or Y includes a polyalkylene glycol having from 2 to 20 alkylene glycol units, while in other aspects, the polyalkylene glycol has 2 to 8 alkylene glycol units. In some aspects, the polyalkylene glycol has 2, 4, or 6 to 8 glycol units. Suitable alkylene glycol units include ethylene glycol, 1,2-propane-diol, 1,2-butylene glycol, and the like.

The oligonucleotide-tethered nucleotide may more particularly have the structure of formula (III), or a salt thereof:

wherein $L^1$ and $L^2$ are each linkers independently comprising an alkylene, an alkynylene, a polyalkylene glycol, or any combination thereof.

In some aspects, the oligonucleotide-tethered nucleotide may have the structure of formula (III), or a salt thereof, wherein $L^1$ is a linker comprising an alkylene, a polyalkylene glycol, or a combination thereof, and $L^2$ is a linker comprising an alkynylene having from 2 to 12 carbons. More particularly, $L^2$ is hexynyl. The polyalkylene glycol may be a polyethylene glycol having from 2 to 6 ethylene glycol units. In another aspect, $L^1$ comprises an alkylene having 1 to 12 carbon atoms. More particularly, the alkylene is methylene, ethylene, n-propylene, isopropylene, 1-butylene, cis-2-butylene, trans-2-butylene, isobutylene, 1-pentylene, cis-2-pentylene, trans-2-pentylene, isopentylene, or hexylene.

Alternatively, when strain-promoted azide-alkyne cycloaddition (SPAAC) also known as copper-free click chemistry, is used to generate oligonucleotide-tethered nucleotides, the resulting oligonucleotide-tethered nucleotides described herein generally have a structure according to formula (IV), or a salt thereof:

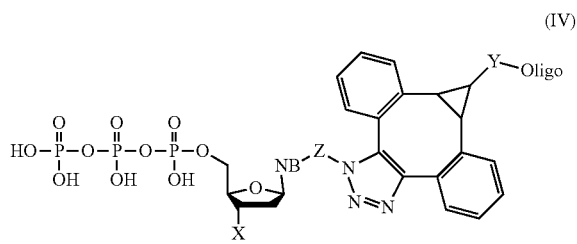

(IV)

wherein X is H or OH or $N_3$, NB represents a nucleobase, Z and Y are linkers, Oligo represents an oligonucleotide of 3 to 100 nucleotides in length. In some aspects, the nucleobase is chosen from adenine, 7-deaza-adenine, cytosine, guanine, 7-deazaguanine, thymine, uracil and inosine. In some aspects, Z and Y each independently comprise at least one linking moiety chosen from—amino, amido, alkyl, alkenyl, alkynyl, thioether, sulfonyl, sulfonamido, ether, ketone, carbonyl, anhydride, ester, imide, urea, urethane, or any combination thereof, or any combination thereof.

Alternatively, in some aspects azide modification can be introduced at the 3' position of the nucleotide and therefore oligonucleotide can be covalently tethered to the 3' position of the nucleotide (V and VI).

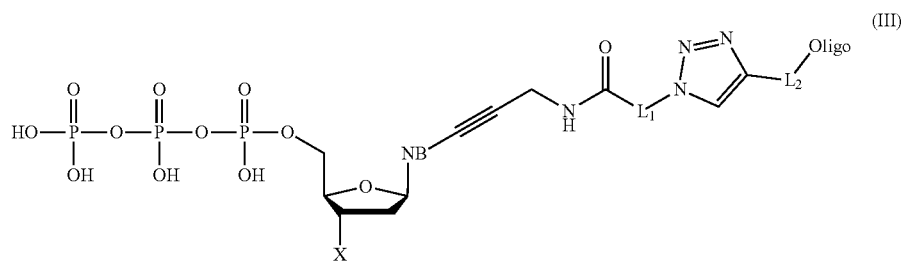

(III)

41

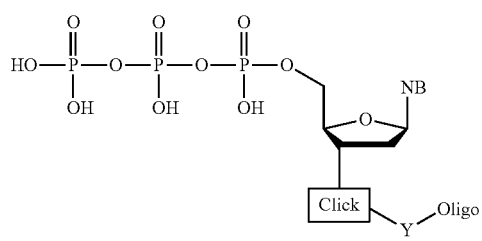

(V)

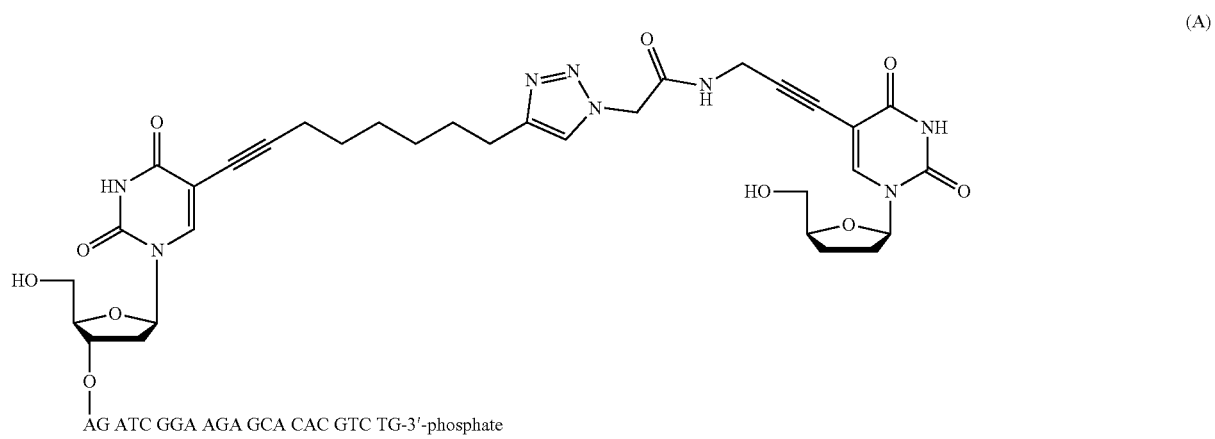

(A)

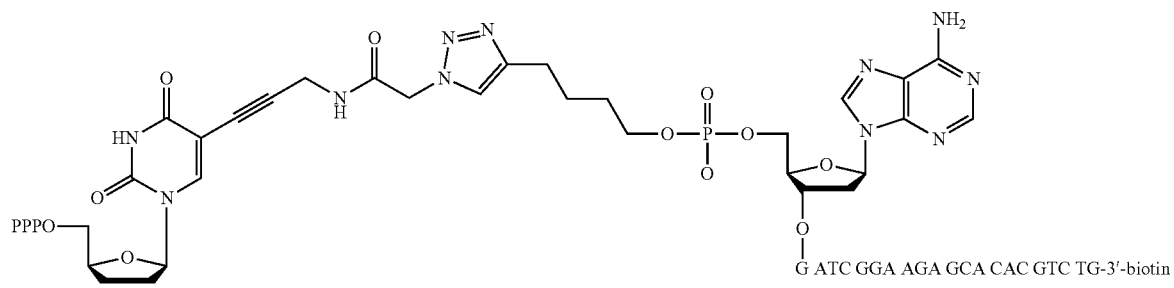

(B)

-continued

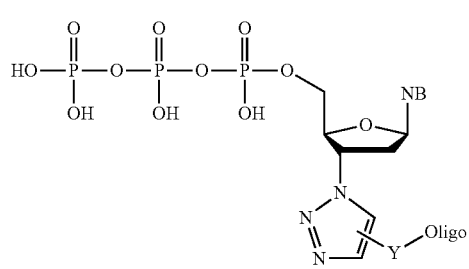

(VI)

NB represents a nucleobase Y is a linker, Oligo represents an oligonucleotide of 3 to 100 nucleotides in length. In some aspects, the nucleobase is chosen from adenine, 7-deazaadenine, cytosine, guanine, 7-deazaguanine, thymine, uracil and inosine. In some aspects, Z and Y each independently comprise at least one linking moiety chosen from —C(O)

42

NH—, —C(O)C—, —NH—, —S—, —O—, alkyl, alkenyl, and alkynyl, or any combination thereof.

The oligonucleotide-tethered nucleotide of the present disclosure comprises, in some aspects, a pyrimidine nucleobase. In these aspects, the pyrimidine nucleobase is bound to the oligonucleotide at the 5 position of the pyrimidine (see formula A, below). Alternatively, when the oligonucleotide-tethered nucleotide comprises a purine base, the purine nucleobase is bound to the oligonucleotide at the 7 position of the nucleobase. In other aspects, the oligonucleotide is bound to the nucleotide at the 3' position of the nucleotide (see formula B)

Salts of the oligonucleotide-tethered nucleotides of the present disclosure include quaternary ammonium salts, sodium salts, potassium salts and the like.

The oligonucleotide used herein may comprise a barcode sequence, an adapter sequence, a unique molecular identifier, or any combination thereof. The oligonucleotide used is not limited to any specific sequence. Further, in some aspects, the oligonucleotide is tethered to the nucleotide at its 5' end. In some aspects, alkyne modification is added to the oligonucleotide nucleobase via a spacer of 8 carbon atoms and is referred as "Ald" modification, or alternatively the alkyne group is attached to the phosphate of the 5' terminus of the oligonucleotide via hexynyl linker and is referred as "Alxyl" modification. In some examples, 3' end of the oligonucleotide has biotin, phosphate, amine or phosphorothioate modifications.

1. Methods of Making Oligonucleotide-Tethered Nucleotides

Various strategies may be used to prepare the oligonucleotide-tethered nucleotides and the claimed compositions and methods of using them are not limited by any description of the methods of making these useful compounds.

A) Click Chemistry in Nucleic Acid Modification

The term "click chemistry" is well understood in the art in the art and generally refers to fast reactions that easily purified and regiospecific. Click chemistry includes without limitation copper catalyzed azide-alkyne cycloaddition (CuAAC); strain-promoted azide-alkyne cycloaddition (SPAAC), also known as copper-free click chemistry; strain-promoted alkyne-nitrone cycloaddition (SPANC); alkyne hydrothiolation; and alkene hydrothiolation.

As used herein, and unless otherwise indicated, the terms "contacting," "adding," "reacting," "treating," or the like means contacting one reactant, reagent, solvent, catalyst, reactive group or the like with another reactant, reagent, solvent, catalyst, reactive group or the like. Reactants, reagents, solvents, catalysts, reactive groups or the like can be added individually, simultaneously or separately and can be added in any order that achieves a desired result. They can be added in the presence or absence of a heating or cooling apparatus and can optionally be added under an inert atmosphere.

In some aspects, a method for preparing an oligonucleotide-tethered nucleotide according to the present disclosure comprises providing a nucleotide covalently bound to a first functional group capable of undergoing a click reaction with a second functional group; providing an oligonucleotide covalently bound to the second functional group capable of undergoing a click reaction, wherein the first and second functional groups are respectively chosen from the following pairs: alkynyl and azido; azido and alkynyl, thiol and alkynyl; alkynyl and thiol; thiol and alkenyl; alkenyl and thiol; azido and cyclooctanyl; cyclooctanyl and azido; nitrone and cyclooctanyl; cyclooctanyl and nitrone; contacting the nucleotide with the oligonucleotide in the presence of a copper catalyst and copper (I) ligand to form a click reaction product.

In a particular aspect, the method comprises a click reaction of an azide and an alkyne to form a 1,2,3-triazole. Azides and terminal or internal alkynes can undergo a 1,3-dipolar cycloaddition (Huisgen cycloaddition) reaction to give a 1,2,3-triazole. However, this reaction requires long reaction times and elevated temperatures. Alternatively, azides and terminal alkynes can undergo Copper (I)-catalyzed Azide-Alkyne Cycloaddition (CuAAC) at room temperature. Such copper (I)-catalyzed azide-alkyne cycloadditions, also known as "click chemistry," is a variant of the Huisgen 1,3-dipolar cycloaddition, wherein organic azides and terminal alkynes react to give 1,4-regioisomers of 1,2,3-triazoles. Examples of "click" chemistry reactions are described by Sharpless et al. (U.S. Patent Application Publication No. 20050222427, published Oct. 6, 2005, PCT/US03/17311; Lewis W. G. et al., Angewandte Chemie-Int'l Ed. 41 (6): 1053; method reviewed in Kolb, H. C., et al., Angew. Chem. Inst. Ed. 2001, 40:2004-2021), which developed reagents that react with each other in high yield and with few side reactions in a heteroatom linkage (as opposed to carbon-carbon bonds) in order to create libraries of chemical compounds.

The copper used as a catalyst for the "click chemistry" reaction used in the methods described herein to conjugate a label (reporter group, solid support or carrier molecule) to a nucleic acid is in the Cu(I) reduction state. The sources of copper (I) used in such copper (I)-catalyzed azide-alkyne cycloadditions can be any cuprous salt including, but not limited to, cuprous halides such as cuprous bromide or cuprous iodide. However, this regioselective cycloaddition can also be conducted in the presence of a metal catalyst and a reducing agent.

In certain aspects, copper can be provided in the Cu(II) reduction state (for example, as a salt, such as but not limited to $Cu(NO_3)_2$, $Cu(OAc)_2$, or $CuSO_4$), in the presence of a reducing agent wherein Cu(I) is formed in situ by the reduction of Cu(II). Such reducing agents include, but are not limited to, ascorbate, Tris(2-Carboxyethyl) Phosphine (TCEP), 2,4,6-trichlorophenol (TCP), NADH, NADPH, thiosulfate, metallic copper, quinone, hydroquinone, Vitamin K, glutathione, cysteine, 2-mercaptoethanol, dithiothreitol, Fe(II), Co(II), or an applied electric potential. In other aspects, the reducing agents include metals chosen from Al, Be, Co, Cr, Fe, Mg, Mn, Ni, Zn, Au, Ag, Hg, Cd, Zr, Ru, Fe, Co, Pt, Pd, Ni, Rh, and W. In particular aspects, the reducing agent is ascorbate.

In some aspects, the (3+2) cycloaddition of azides and alkynes is conducted in the presence of a ligand. While not being bound by theory, the ligand is believed to stabilize the Cu(I) ion, thereby preventing its oxidation to the Cu(II) ion. 3-[4-({bis [(1-tert-butyl-1H-1,2,3-triazol-4-yl)methyl] amino}methyl)-1H-1,2,3-triazol-1-yl]propanol (BTTP); 3-[4-({bis [(1-tert-butyl-1H-1,2,3-triazol-4-yl)methyl] amino}methyl)-1H-1,2,3-triazol-1-yl]propyl hydrogen sulfate (BTTPS); 2-[4-({bis [(1-tert-butyl-1H-1,2,3-triazol-4-yl)methyl]amino}methyl)-1H-1,2,3-triazol-1-yl]ethyl hydrogen sulfate (BTTES); bathophenanthroline disulphonate disodium salt (BTTAA); Nε-((1R,2R)-2-azidocyclopentyloxy) carbonyl)-L-lysine (BPS); pentamethyldiethylenetriamine (PMDETA); tris(2-benzimidazolylmethyl) amine ((BimH)$_3$) tris-(benzyltriazolylmethyl)amine (TBTA); and tris(3-hydroxypropyltriazolylmethyl)amine (THPTA). In a particular aspect, the ligand is THPTA.

The copper (I)-catalyzed azide-alkyne cycloadditions for labeling nucleic acids can be performed in water and a variety of solvents, including mixtures of water and a variety of (partially) miscible organic solvents including alcohols, dimethyl sulfoxide (DMSO), dimethyl formamide (DMF), tert-butanol (tBuOH) and acetone.

B. Exemplary Methodologies

The mutant polymerases described herein can be used in a variety of methodologies, including the exemplary methods listed below and those in the Examples.

In some aspects, a method comprises an amplification reaction, wherein at least one or more of the nucleic acids synthesized by the mutant polymerase serves as a primer. The appropriate length of such primer or primers depends on the intended use of the primer but typically ranges from about 8 to about 200 nucleotides, including intermediate ranges, such as from about 10 to about 50 nucleotides, from about 15 to about 35 nucleotides, from about 18 to about 75 nucleotides and from about 25 to about 150 nucleotides. In some aspects, the primer comprises up to 50 deoxyribonucleotides. In some aspects, the primer is comprised of deoxyribonucleotides and ribonucleotides. In some aspects, the amplification is template dependent. In some aspects, the amplification is template independent. In some aspects, the template independent amplification is terminal deoxynucleotidyl transferase (TdT) amplification.

In some aspects, a PCR amplification reaction is performed after production of one or more nucleic acid comprising deoxyribonucleotides and ribonucleotides. In some aspects, a PCR amplification reaction is performed after production of one or more nucleic acid comprising deoxyribonucleotides. In some aspects, the amplification reaction does not require addition of primers other than one or more nucleic acids synthesized by mutant polymerases according to the current disclosure.

In some aspects, the amplification reaction is performed by a reverse transcriptase.

In some aspects, the method is for production of barcoded nucleic acid oligonucleotides, enzymatic primer synthesis, unbiased amplification of specific targets, whole genome amplification, or tagging via in vitro transcription.

In some aspects, nucleic acids synthesized by a mutant polymerase are used for amplicon sequencing or preparation of a sequencing library.

1. Synthesis of Single-Stranded DNA (ssDNA)

Enzymatic synthesis of ssDNA would be useful for many applications. In some aspects, during in vitro transcription reaction, a mutant polymerase according to current disclosure produces long (>100 nt) DNA oligonucleotides with improved efficiency and fidelity compared to other polymerases. In some aspects, synthesis of ssDNA from an inserted promoter sequence allows isothermal amplification of DNA of individual targets or whole genomes. In some aspects, highly multiplexed enzymatic primer synthesis, where a pool of plasmids which would serve as in vitro transcription templates, is used for multiplexed enzymatic primer synthesis. In some aspects, single-stranded DNA molecules longer than 1 kb are enzymatically synthesized by a mutant polymerase described herein. For example, such enzymatically synthesized ssDNA molecules may be used for example, as donor DNA in genome editing applications, in transfection or in the field of next generation sequencing and other applications. In some aspects, the enzymatically synthesized molecules may also comprise ribonucleotides.

In addition, as an example, T7 RNA polymerase and mutant variants as described herein accept base-modified nucleotides, thus this enzymatic approach can be useful for the production of functionalized ssDNA.

2. Clonal Oligo Amplification and Synthesis of Randomer Pools

Some applications may require generation of primers starting from a single or a few molecules, for example, if introduction of unique barcode sequences within the reaction vessel is desired. In some aspects, a single or a few in vitro transcription (IVT) templates are provided, including but not limited to plasmids, PCR products, and oligonucleotide duplexes bearing a T7 RNA polymerase promoter sequence, and these templates are subjected to IVT with polymerase mutants described herein with a pool of nucleoside triphosphates including dNTPs or other modified or non-canonical nucleotides. The resulting molecules can be readily used in PCR or any other priming-based reactions.

In some applications synthesis of oligonucleotide pools bearing randomized regions might be desirable. In such applications, a library of IVT templates can be used to simultaneously synthesize a library of corresponding oligonucleotides by mutant polymerases described herein within a single IVT reaction in the presence of dNTPs and modified or non-canonical nucleotides. The resulting molecules can be readily used in PCR or any other priming-based reaction.

3. Eberwine-Like Amplification mRNA can be amplified in an Eberwine-like fashion by polymerase mutants described herein in the presence of dNTPs or modified or non-canonical nucleotides.

The "Eberwine Method" has been extensively described (See, for example, Marko et al., *BMC Genomics* 2005, 6:27 (2005)). In the Eberwine method, RNA templates are primed with an oligo (dT) primer that has been 5' modified to contain a promoter for the T7 RNA polymerase and are subsequently reverse transcribed into first-strand cDNA. The RNA-cDNA hybrid is then treated with *E. coli* RNAse H, and priming for second-strand cDNA synthesis occurs either by RNA nicking and priming or by cDNA hairpinning. Then, second-strand cDNA synthesis is carried out with *E. coli* DNA polymerase and *E. coli* DNA ligase followed by blunt-ending with T4 DNA polymerase. Transcription and amplification are then accomplished using the T7 RNA polymerase, which binds to the T7 promoter introduced during first-strand cDNA synthesis, producing antisense RNA (aRNA). When polymerase mutants described herein are used in the presence of deoxy- or non-canonical nucleotides, the resulting aRNA in a chimeric, more stable form may be produced. Alternatively, when dNTPs are used as described herein, single stranded DNA may be produced during such amplification.

4. Synthesis of Stable Nucleic Acids for Therapeutic and Molecular Biology Applications RNA-based vaccines are a promising therapeutic tool for gene delivery. Improving the stability of such therapeutic transcripts can improve the production process as well as the robustness of immune response. More nuclease-resistant and chemically stable RNA consisting of certain non-canonical modified nucleotides might be synthesized by IVT using mutant polymerases described herein. RNA synthesized via in vitro transcription (IVT) can also be capped during the transcription reaction (in a process called "co-transcriptional capping"), when a cap analog (i.e. synthetic analogs of the N7-methylated guanosine triphosphate cap) is included in the IVT reaction along with other nucleotide triphosphates.

5. Aptamer Generation

Aptamers are short single-stranded DNA or RNA molecules that can bind to certain target molecules with high affinity and specificity. Aptamers can be produced by IVT using mutant polymerases described herein. Enzymatic synthesis may enable the simultaneous production of certain pools of aptamers for high-throughput profiling studies.

6. Sequencing-Ready Library Preparation

Certain sequencing-ready library preparation methods, including but not limited to CEL-Seq (See Hashimshony T, et al. *Cell Rep.* 2 (3): 666-73 (2012)), CEL-Seq2 (See Hashimshony T, et al. *Genome Biol.* 17:77 (2016)), and LIANTI (See Chen C, et al. *Science*. 356 (6334): 189-194 (2017)), contain a linear amplification step which is performed by IVT. Target DNA or cDNA is amplified in RNA form and then converted back to DNA to produce NGS libraries. Linear amplification directly into ssDNA or chimeric nucleic acid form which may be tolerated by DNA polymerases and directly amplified might improve such workflows by omitting RNA to DNA conversion step. Such improvement may be achieved by using mutant polymerases described herein.

EXAMPLES

This disclosure has been described broadly and generically herein. Each of the narrower species and subgeneric groupings falling within the generic disclosure also form part of the disclosure. This includes the generic description with a proviso or negative limitation removing any subject matter from the genus, regardless of whether or not the excised material is specifically recited herein. Other embodiments are within the following claims. In addition, where features are described in terms of Markush groups, those skilled in the art will recognize that the features are hereby described in terms of any individual member or subgroup of members of the Markush group.

One skilled in the art would readily appreciate that the present disclosure is well adapted to carry out the objects and obtain the ends and advantages mentioned, as well as those inherent therein. Further, it will be readily apparent to one skilled in the art that varying substitutions and modifications may be made without departing from the scope and spirit. The compositions, methods, procedures, treatments, molecules and specific compounds described herein are presently representative of preferred aspects are exemplary and are not intended as limitations on the scope. Changes therein and other uses will occur to those skilled in the art which are encompassed within the spirit are defined by the scope of the claims. The listing or discussion of a previously published document in this specification should not necessarily be taken as an acknowledgement that the document is part of the state of the art or is common general knowledge.

The embodiments illustratively described herein may suitably be practiced in the absence of any element or elements, limitation or limitations, not specifically disclosed herein. Thus, for example, the terms "comprising", "including," containing", etc. shall be read expansively and without limitation. The word "comprise" or variations such as "comprises" or "comprising" will accordingly be understood to imply the inclusion of a stated integer or groups of integers but not the exclusion of any other integer or group of integers. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope claimed. Thus, it should be understood that although the present disclosure has been specifically disclosed by exemplary embodiments and optional features, modification and variation o embodied therein herein disclosed may be resorted to by those skilled in the art, and that such modifications and variations are considered to be within the scope of this disclosure.

The content of all documents and patent documents cited herein is incorporated by reference in their entirety.

Example 1. Generation of T7 RNAP Mutant Library

A T7 RNA polymerase (T7 RNAP) mutant library was constructed using the strategy of site-saturation mutagenesis (See Packer and Liu, Nature Rev Genetics 16 (7): 379-394 (2015)). A total of 77 amino acid positions were chosen for mutagenesis, based on their proximity to the location of the substrate incorporation site in a structural model of the T7 RNAP (Cheetham et al, 1999). All selected amino acids are located within 10 Å radius from His784 and Gly542 amino acids, which are believed to be responsible for the enzyme and substrate interaction (See Cheetham and Steitz TA. Science 286:2305-9 (1999)). 33 of selected amino acids belong to fingers subdomain and the remaining 44 amino acids belong to palm subdomain.

Selected amino acid positions of T7 RNAP for site-saturation mutagenesis were M420, D421, W422, R423, G424, R425, V426, Y427, G538, S539, C540, S541, G542, I543, Q544, H545, F546, S547, A548, M549, L550, D552, G555, G556, V559, N560, L561, I570, Y571, V634, M635, T636, L637, A638, Y639, G640, V689, A691, A692, V693, A695, M696, L699, W727, T729, P730, D731, F733, V735, Q737, Y739, S776, G777, I778, A779, P780, N781, F782, V783, H784, S785, Q786, D787, G788, S789, H790, L791, R792, H811, D812, F814, M832, Y836, V841, L842, F882, and A883.

Saturation mutagenesis of 77 amino acids results in unique 1463 single-mutation mutants of T7 RNAP (multiplication of 77 amino acid positions and 19 different possible amino acids results in 1463).

Saturation mutagenesis was performed by Invitrogen™ GeneArt™ as a gene synthesis service (www.thermofisher.com/lt/en/home/life-science/cloning/gene-synthesis/geneart-gene-synthesis.html). 77 separate sub-libraries were assembled from synthetic oligonucleotides with the objective to introduce one substitution per molecule at defined positions. The pooled sub-libraries were digested with R.XhoI (Thermo Scientific™, FD0695) and R.HindIII (Thermo Scientific™, FD0504) and ligated into vector pBA-DHis_A_A236 (V43001, Thermo Scientific). Ligation reactions were transformed into E. coli strain DH10B-TIR (Invitrogen, C640003). Total cells from the transformation plates were harvested for glycerol stock preparation. Cells were resuspended in 50% glycerol at 3×1 ml ($1.3 \times 10^{10}$ cells/ml). 48 colonies of the transformation plates (LB agar medium: 1.2% of agar, 1% of tryptone, 0.5% of yeast extract, 0.5% of NaCl solution with 100 µg/mL of ampicillin) were picked. 0 of the 48 clones showed empty plasmids in the colony-PCR control, and 35 clones were sequence analysed (Sanger sequencing). 6 of the 35 clones contained erroneous sequences with substitution (6×) or deletion (0×) or insertion (0×) within the reading frame (data not shown). 29 of the 35 clones contained correct sequences (resulting library correctness is 83%).

In order to evaluate substitution rate and distribution in the final mutant library, it was analysed by NGS, Illumina™ MiSeq™ platform. Plasmid DNA pool was purified from E. coli glycerol stock using GeneJET™ Plasmid Miniprep Kit (Thermo Scientific, K0503). Purified plasmid DNA was sonicated and analysed on Agilent™ 2100 Bioanalyzer using High Sensitivity DNA Kit (Agilent Technologies, 5067-4626). Average size of fragmented DNA was 350 bp. Plasmid DNA library was prepared for NGS using Collibri™ PCR-free PS DNA Library Prep Kit for Illumina Systems (Invitrogen™, A38609024). Size distribution and quality of prepared DNA library verified by performing capillary electrophoresis analysis on Agilent™ 2100 Bioanalyzer instrument using the Agilent High Sensitivity DNA Kit (Agilent Technologies, 5067-4626). Prepared library was quantified by qPCR using Collibri™ Library Quantification Kit (Invitrogen, A38524100). The resulting library was sequenced on the Illumina MiSeq™ using the MiSeq Reagent Kit v2 (Illumina, CA, USA, MS-102-2002), 300-cycles (Illumina, CA, USA); 2×151 bp paired-end reads were performed. Data analysis revealed all the target substitutions were present in the library. Frequency to coverage values varied from 0.001% to 0.6% in the final library.

Expression level and solubility of total proteins from the mutant library were subsequently evaluated as follows. E. coli DH10B-TIR cells bearing plasmid DNA library (T7 RNAP mutant library) were cultivated in LB medium (1% of tryptone, 0.5% of yeast extract and 0.5% of NaCl solution) containing 100 µg/mL of ampicillin for ~16 h at 37° C. 220 rpm. 1/100 of overnight culture were transferred to fresh LB medium containing 100 µg/mL of ampicillin. Cells were cultivated at 37° C. 220 rpm until optical density ($OD_{600}$) of 0.7-0.8 was reached, and L-arabinose was added to 10 mM of final concentration and mutant protein expression was performed for 4 h at 37° C. 220 rpm. After protein expression, cells were collected by centrifugation and resuspended to concentration of 1 optical unit ($OD_{600}$) in 100 µl of 10 mM Tris-HCl, 1 mM EDTA buffer solution (pH 8). Cells were then sonicated. Soluble and insoluble protein fraction were separated by centrifugation: 35 µl of cell lysate (total proteins) centrifuged for 15 min at 14 000 rpm 4° C.

Samples for SDS-PAGE prepared by adding NuPAGE™ LDS Sample Buffer (Invitrogen, NP0007) to 1× final concentration and DTT to final concentration of 100 mM. Samples were incubated at 95° C. for 5 min and then chilled on ice. ⅕ of each sample were used for SDS-PAGE in Novex™ 10% Tris-Glycine Mini Gel (Invitrogen, XP00100BOX) with 1×Novex™ Tris-Glycine SDS Running Buffer (Invitrogen, LC26754). Gel was washed and stained using PageBlue™ Protein Staining Solution (Thermo Scientific™, 24620).

Example 2. Selection of T7 Mutant RNAPs with Altered Substrate Specificity

Selection was performed to identify T7 polymerase mutants with expanded substrate range, such as being able to incorporate deoxyribonucleotides.

In vitro compartmentalization is an emulsion-based technology commonly used for protein in vitro evolution (Tawfik and Griffiths Nature *Biotechnol* 16:652-656 (1998)). Conventional enzyme in vitro evolution experimental systems, such as compartmentalized self-replication (CSR) approach, are limited in their ability to manage and quality control the selection process. Results obtained using such systems are often questionable and may drive to false conclusions. Precise and/or quantitative experiments using this approach are difficult because of relatively high polydispersity of the droplets. Moreover, addition of new reagents to the droplets once they are formed, real time detection and sorting of droplets are impossible.

Microfluidics-based in vitro evolution design in combination with fluorescence-activated droplet sorting techniques as used herein allowed for precision and control over nearly all experimental aspects, which in turn allows for fast and highly confident selection of enzyme mutants of interest (See Aharoni et al., *PNAS* 101:482-487 (2004); Agresti et al., *PNAS* 107 (9): 4004-4009 (2010); and Kintses et al., *Chemistry & Biology* 19 (8): 929-931 (2012)). Microfluidic technology allowed reproducible preparation of emulsions and introduced automation and real time monitoring of in vitro evolution experiments.

Figure 1:
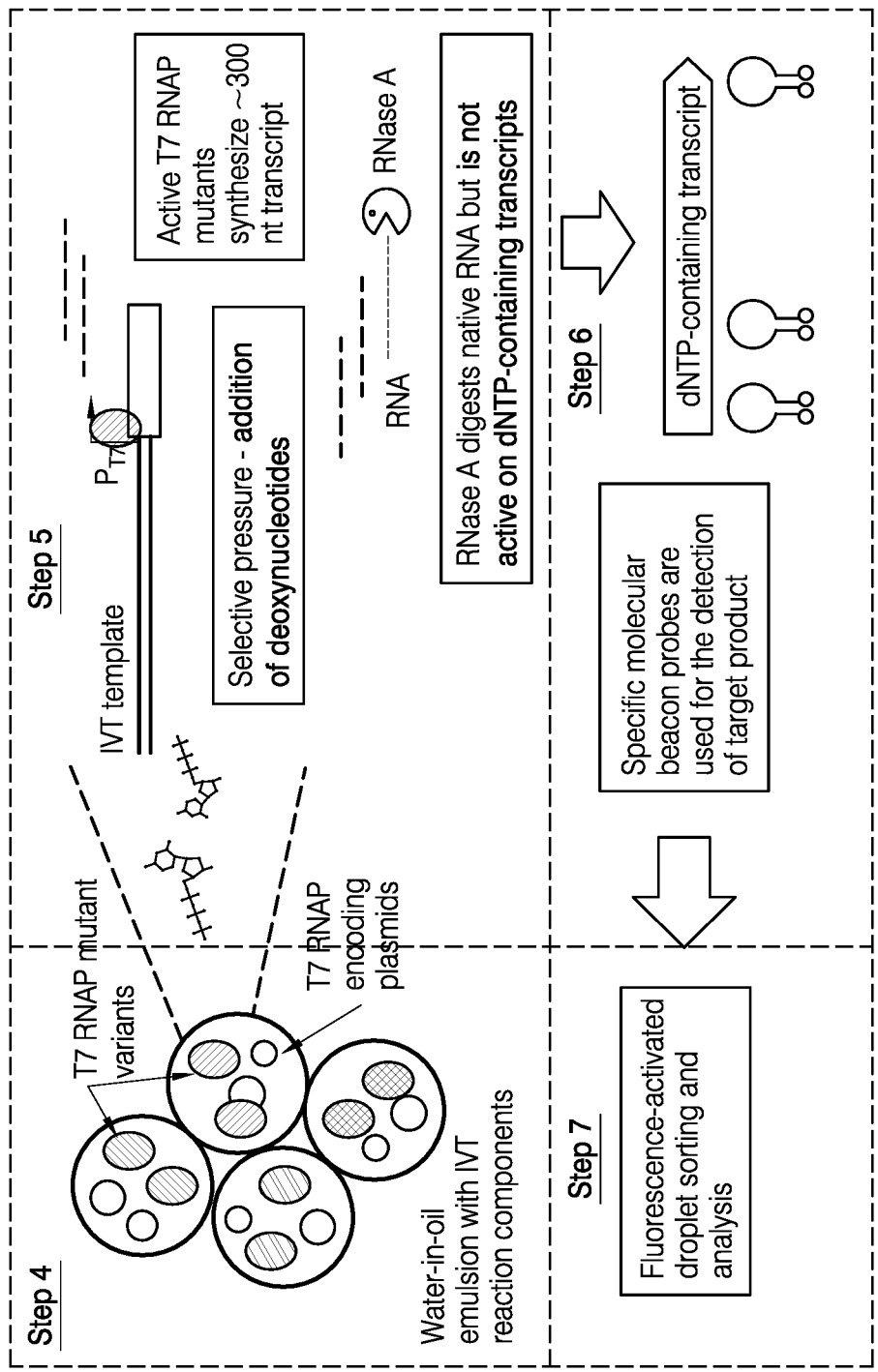
FIG. 1 provides a scheme of in vitro evolution of T7 RNA polymerase towards altered substrate specificity.

The main steps of T7 RNA polymerase mutant library screening for mutants that are able to use dNTPs as substrates include:
1. Generation of a library of mutant T7 RNAP genes and cloning it under the control of inducible promoter;
2. Design and construction of in vitro transcription (IVT) template which has T7 promoter sequence and a downstream sequence (~300 nt) unrelated to the sequence of T7 RNAP gene;
3. Expressing T7 RNAP mutants in *Escherichia coli* cells;
4. Co-encapsulation of individual *E. coli* cells with in vitro transcription buffer, cell lysis agent, dTTP, dCTP, ATP, GTP, RNase A, IVT template and molecular beacon probes into droplets; molecular beacon probes may hybridize to the sequence of IVT product;
5. Incubation of resulting emulsion at 37° C. to allow for the transcription of IVT template and degradation of any reaction products comprised only of ribonucleotides by RNase A.;
6. Incubation of emulsion at 60° C. to allow for probe hybridization to deoxypyrimidine-containing IVT products;
7. Injection of the emulsion into the microfluidics sorting chip, detection of fluorescence signals and droplet sorting; steps 4 to 7 are shown in FIG. 1.
8. Collecting sorted droplets that had fluorescence signals, breakage of resulting emulsion, clean-up of nucleic acids and recovery of T7 RNAP mutants-encoding genes: amplification via PCR; and
9. PCR product cloning and library preparation from plasmid DNA pool of selected T7 RNAP mutants.

After two rounds of selection under pressure to incorporate deoxypyrimidines, 2.7% of unique mutants have increased in frequency compared to their frequencies in the initial mutant library of Example 1 (See Table 1).

TABLE 1 changes in initial mutant library composition after selection of T7 RNAP mutants with altered substrate specificity

| | Frequency, % |
|---|---|
| Eliminated unique mutant | 20.5 |
| Unique mutant where frequency decreased | 49.8 |
| Unique mutant where frequency remained the same[a] | 27.1 |
| Unique mutant where frequency increased[b] | 2.7 |

[a] up to 2× enrichment.
[b] more than 2× enrichment.

Also, three mutations resulted in the frequency above 1% in the final library: Y639F (~11%), V783M (~4%), V783L (~1%). These mutations were enriched by 72×, 54× and 9× respectively after selection (FIG. 2).

The present system proved to be precise and highly efficient for sorting out a Y639F mutant of T7 RNAP, which is described in the art (See Sousa and Padilla, 1995). The frequency of the Y639F mutant in the mutant library was ~11% after two sorting cycles. Y639F mutant was enriched 72-fold compared to its frequency in the initial T7 RNAP mutant library.

Figure 2:
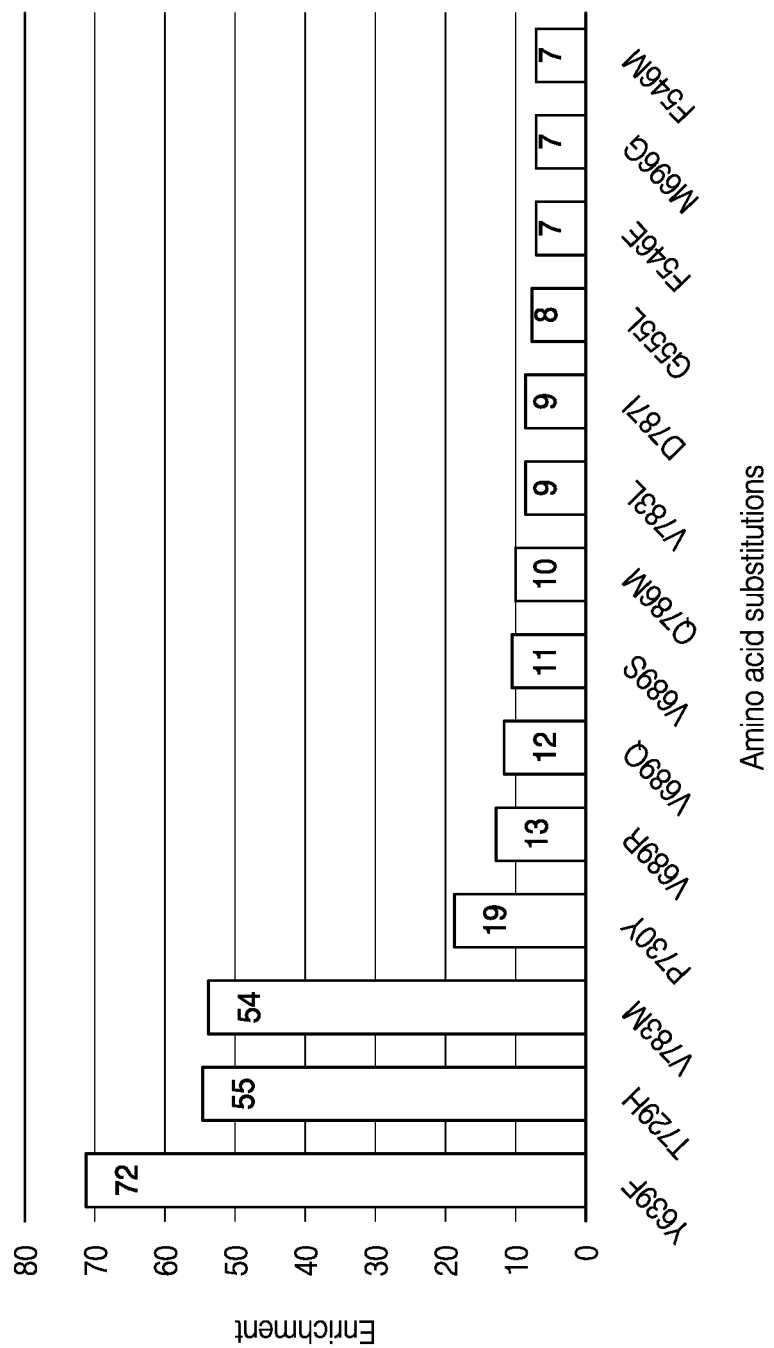
FIG. 2 shows mutant polymerases that have the highest enrichment (increase in relative mutation frequency) after selection. Mutant polymerases with enrichment not lower than 7× (i.e., not less than 10× lower enrichment compared to the enrichment of the Y639F mutant) were analyzed.
Figure 3A:
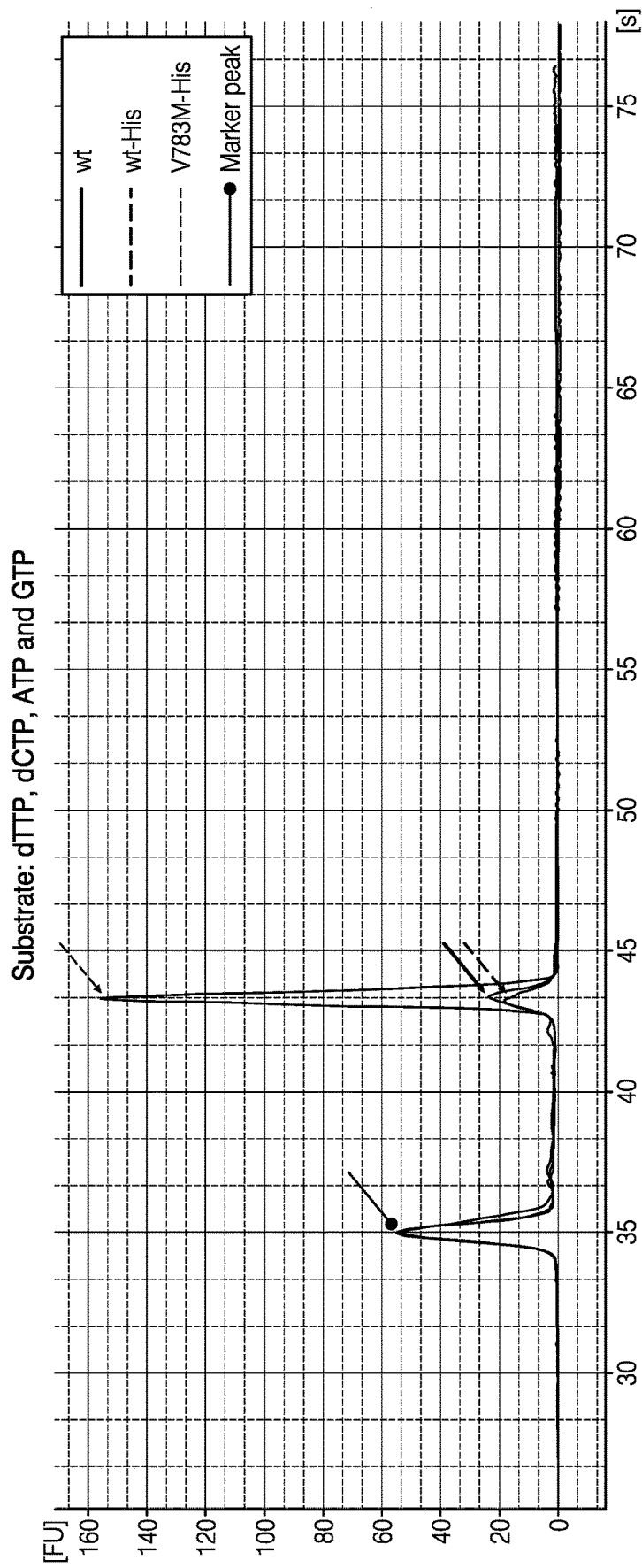
FIGS. 3A-3E show the activity of V783M T7 RNA polymerase mutant using different nucleotide substrates for in vitro transcription reaction. A)-E) represent specific combinations of ribo- and/or deoxyribonucleotides, as described in Example 5. Different dash types of the arrows indicate reaction products by a specific T7 RNA polymerase used: wt-wild type T7 RNA polymerase without a His tag (Thermo Scientific, EP0113); wt-His-purified wild type T7 RNA polymerase with a His tag; and V783M-His-purified T7 RNA polymerase having aV783M mutation. A peak at around 43 seconds(s) denotes a full length in vitro transcription product (42 nt); arrow with a round tip marks a marker peak (4 nt). The peaks that are between the full product peak and marker peak denote truncated in vitro transcription products. If arrows are horizontal and have no end, target full length product was not detected.
Figure 3B:
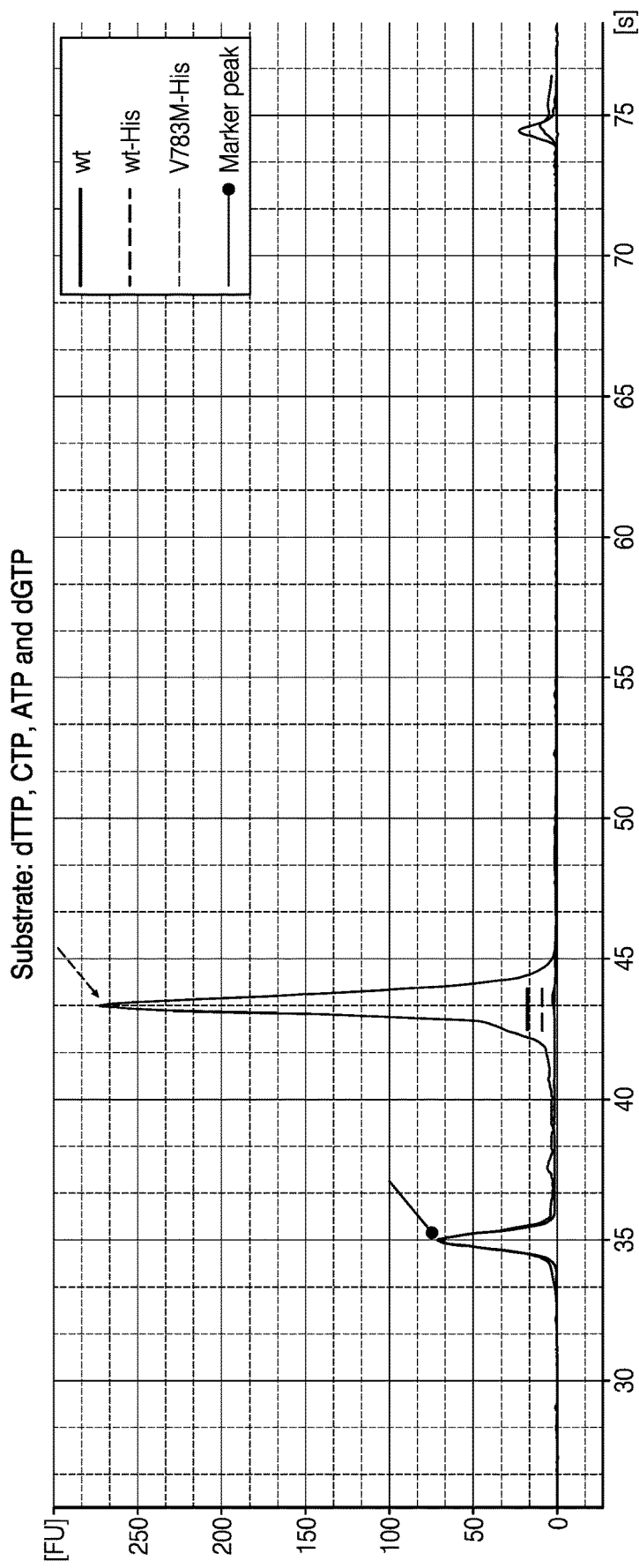
Figure 3C:
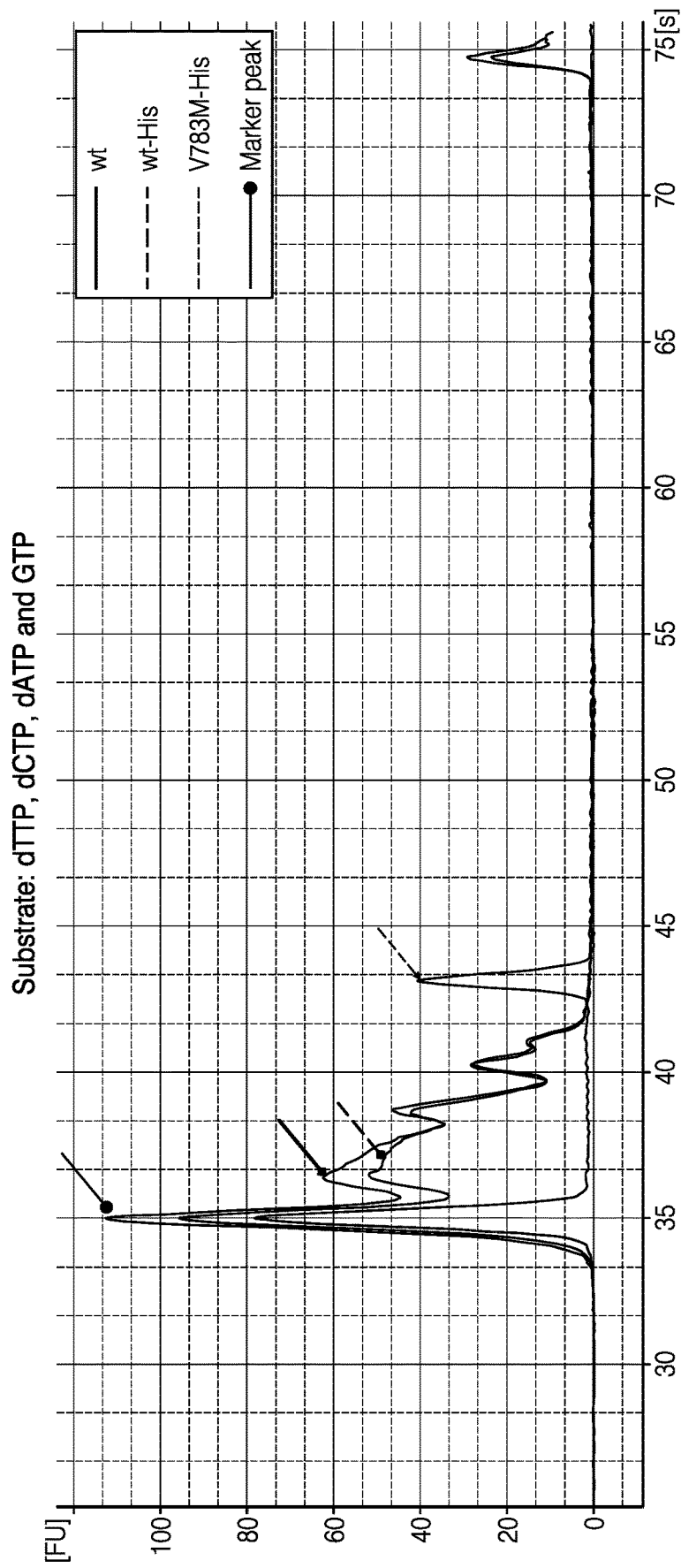
Figure 3D:
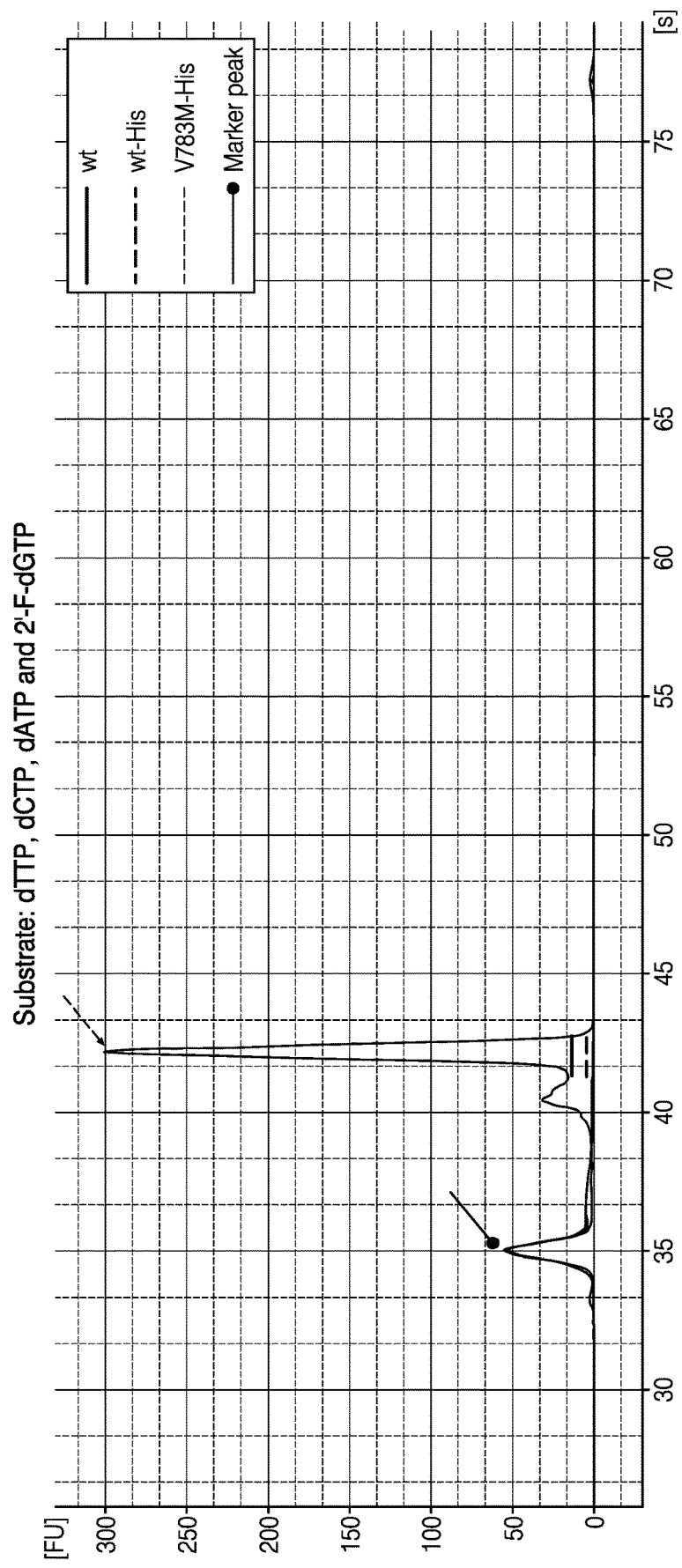
Figure 3E:
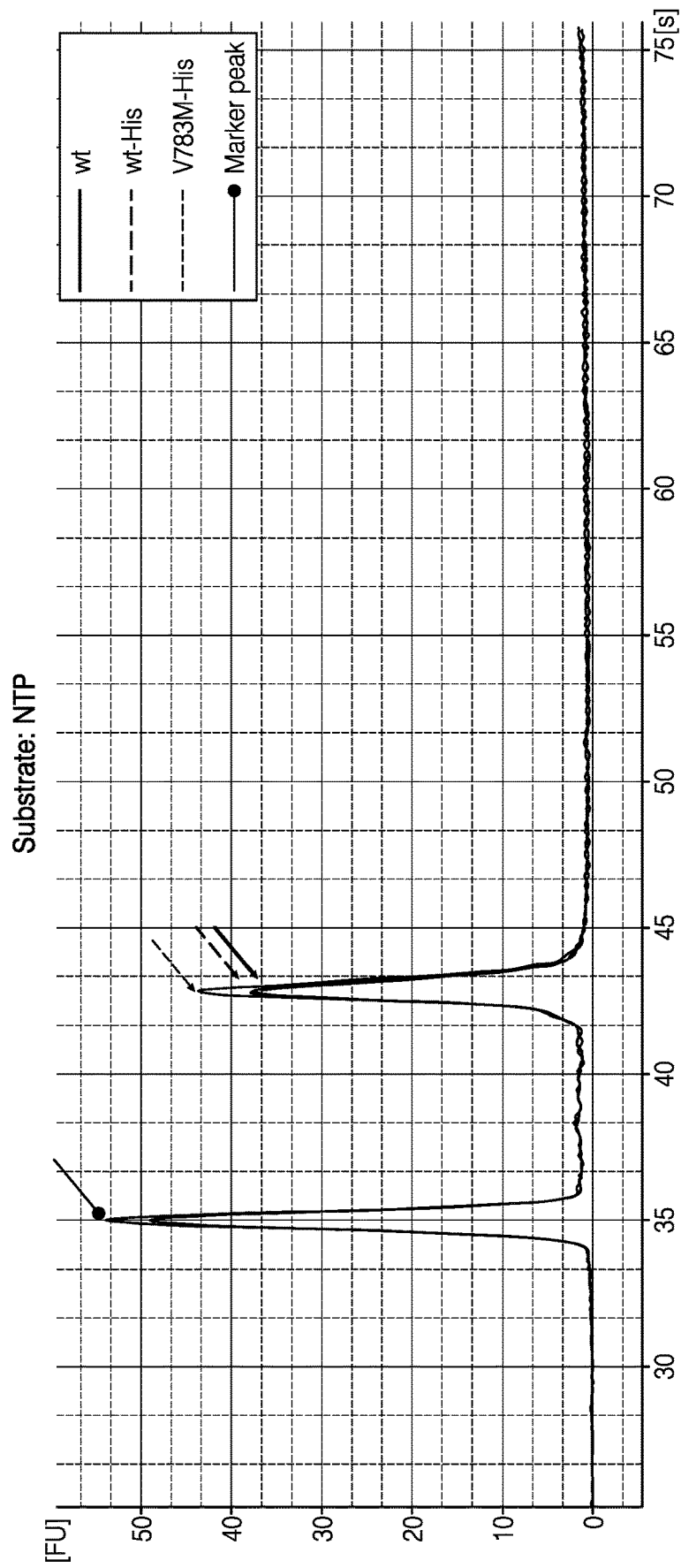
Figure 4A:
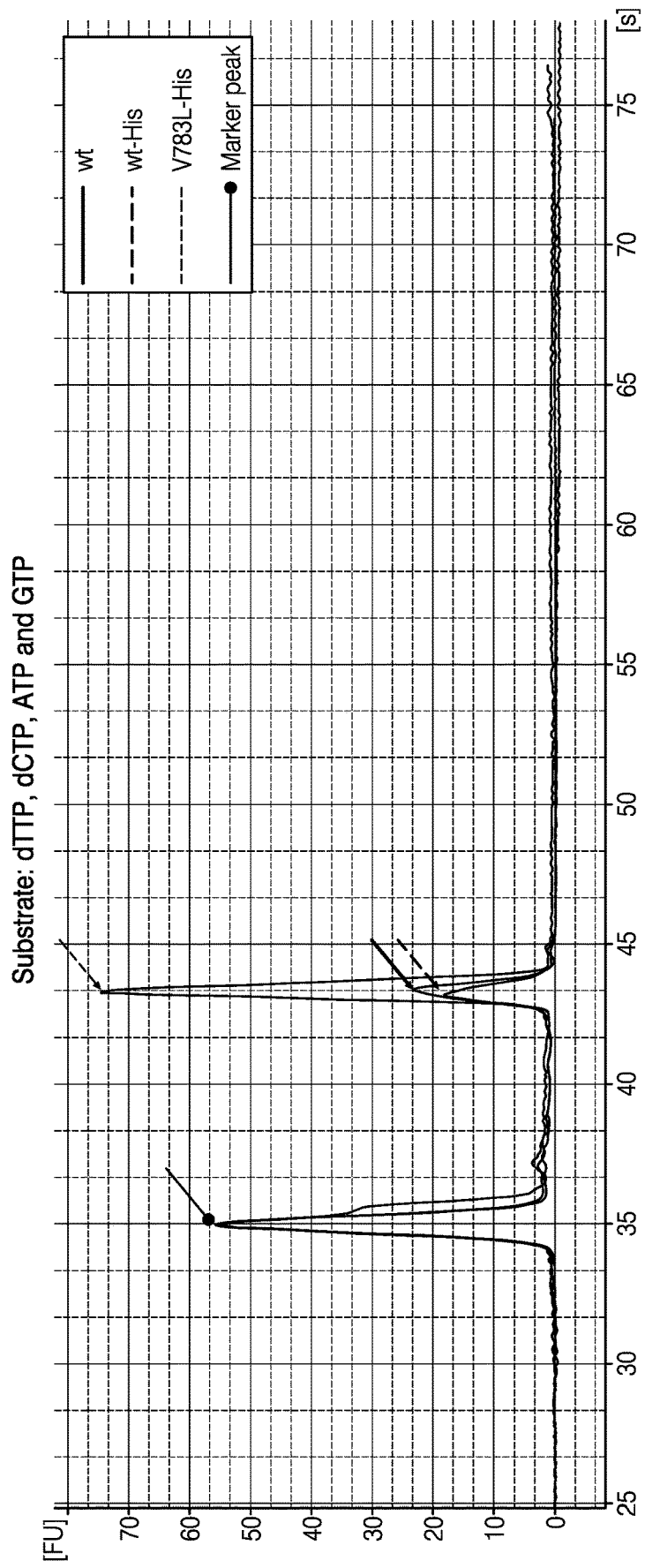
FIGS. 4A-4E show the activity of V783L T7 RNA polymerase mutants using different nucleotide substrates for in vitro transcription reaction. A)-E) represent specific combinations of ribo- and/or deoxyribonucleotides, as described in Example 5. Different dash types of the arrows indicate reaction products by different polymerases: wt-wild type T7 RNA polymerase without a His tag (Thermo Scientific, EP0113); wt-His-purified wild type T7 RNA polymerase with a His tag; and V783L-His purified T7 RNA polymerase having aV783L mutation. Peaks and labels are described above for FIGS. 3A-3E.
Figure 4B:
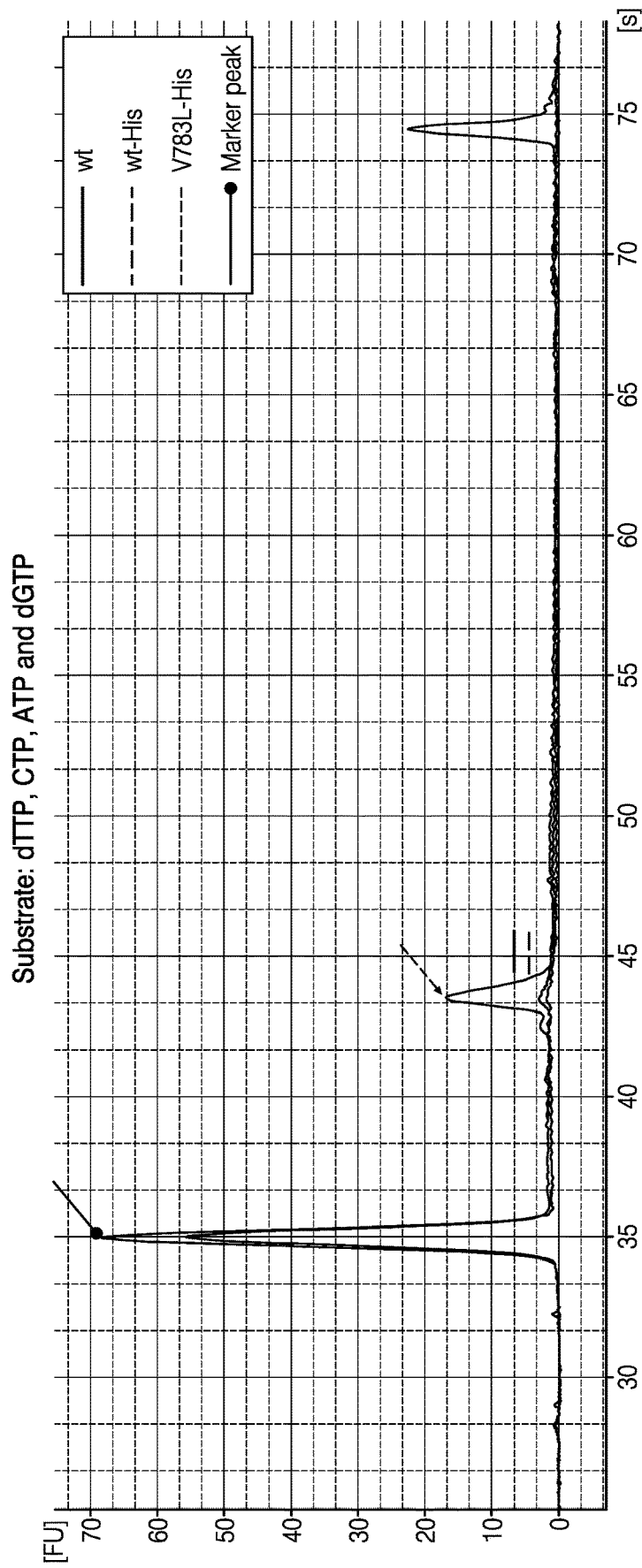
Figure 4C:
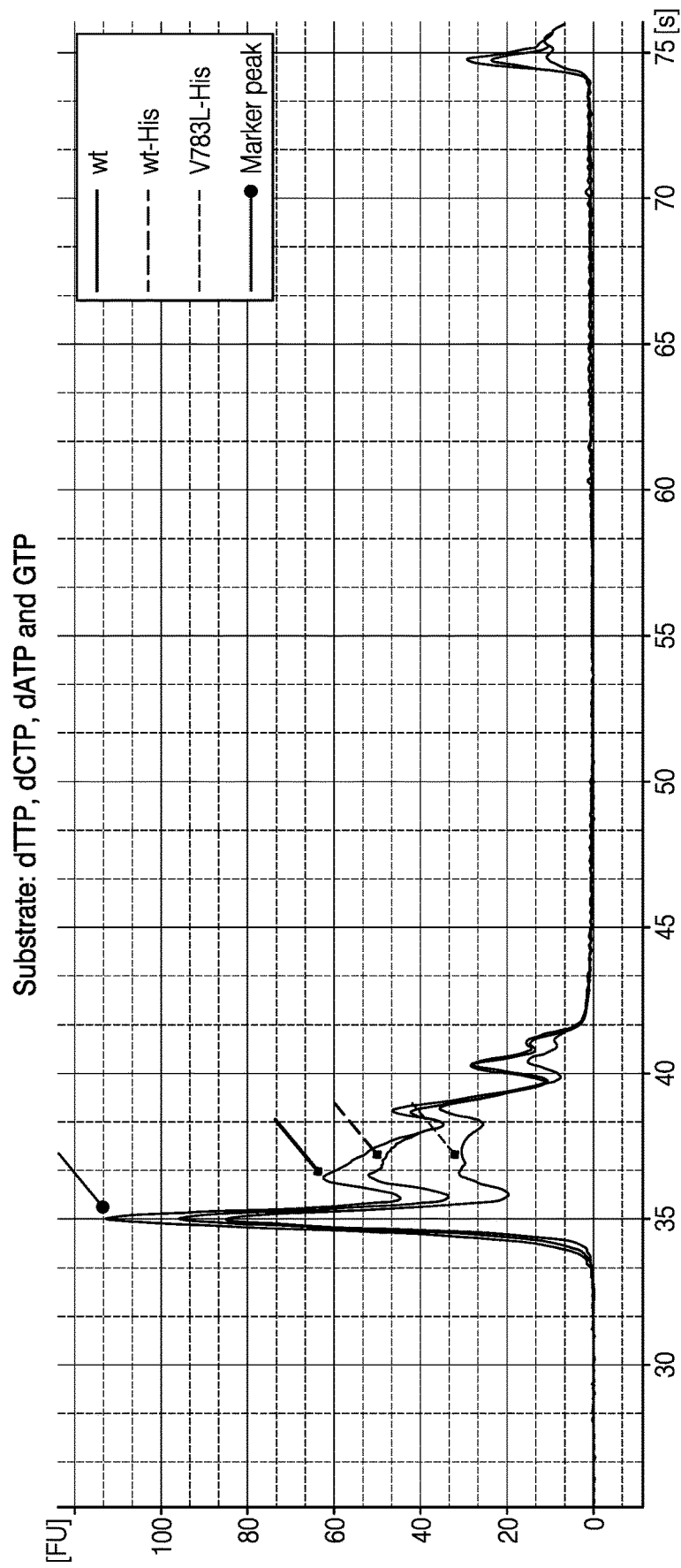
Figure 4D:
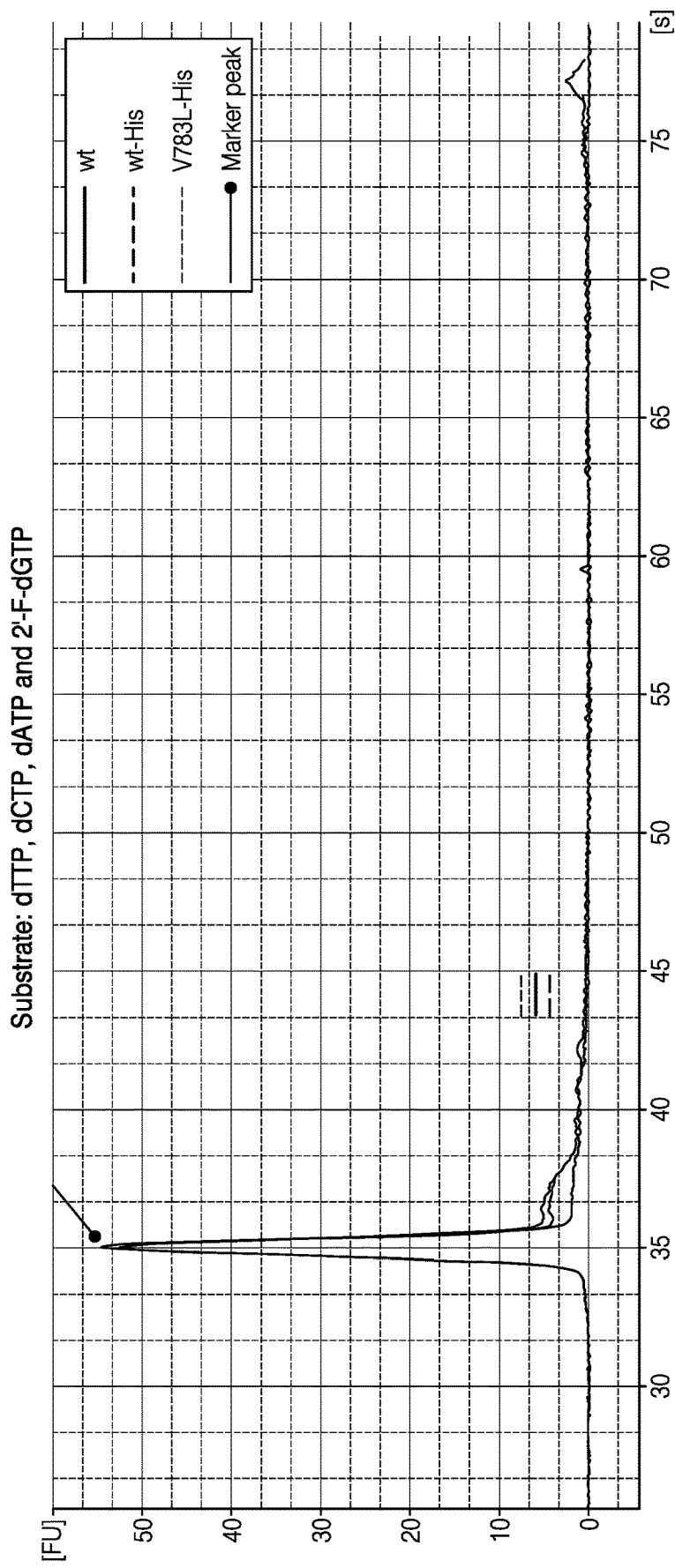
Figure 4E:
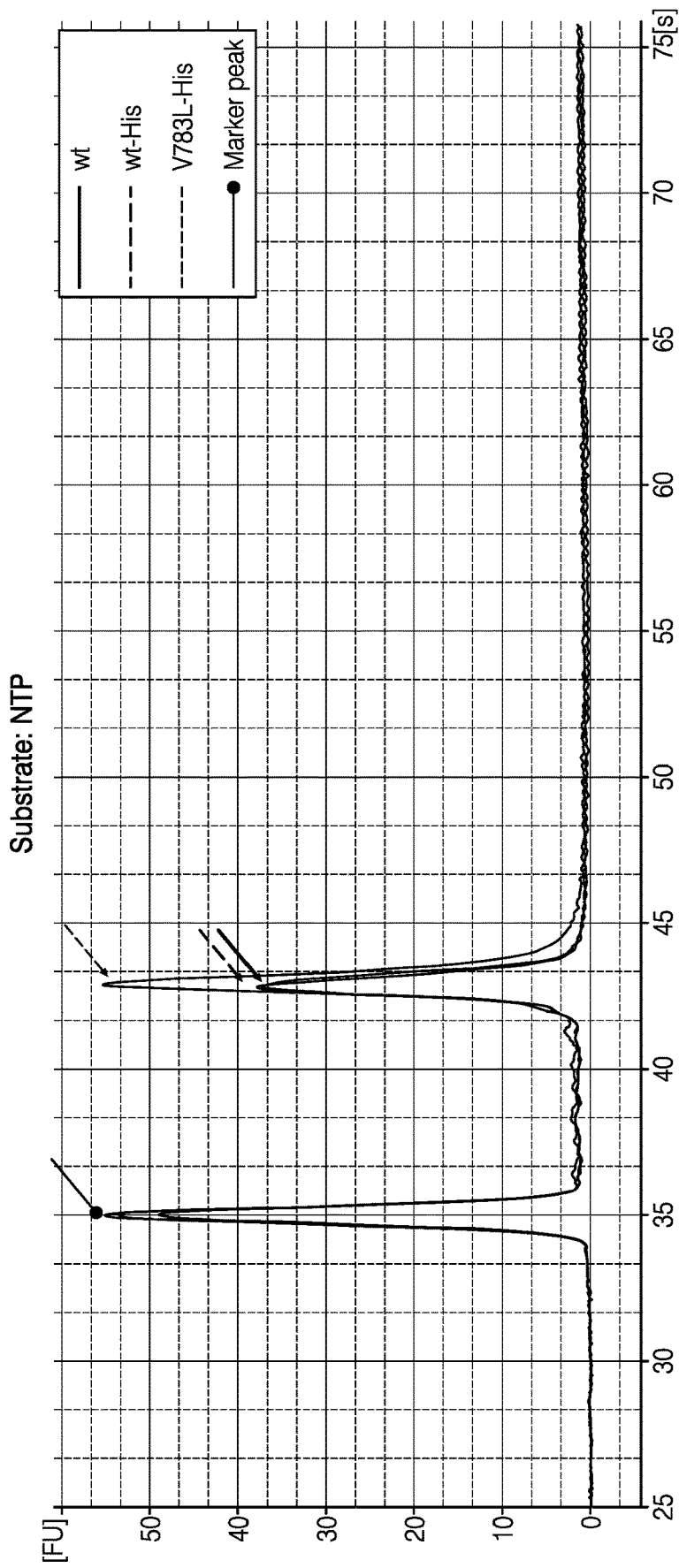
Figure 5A:
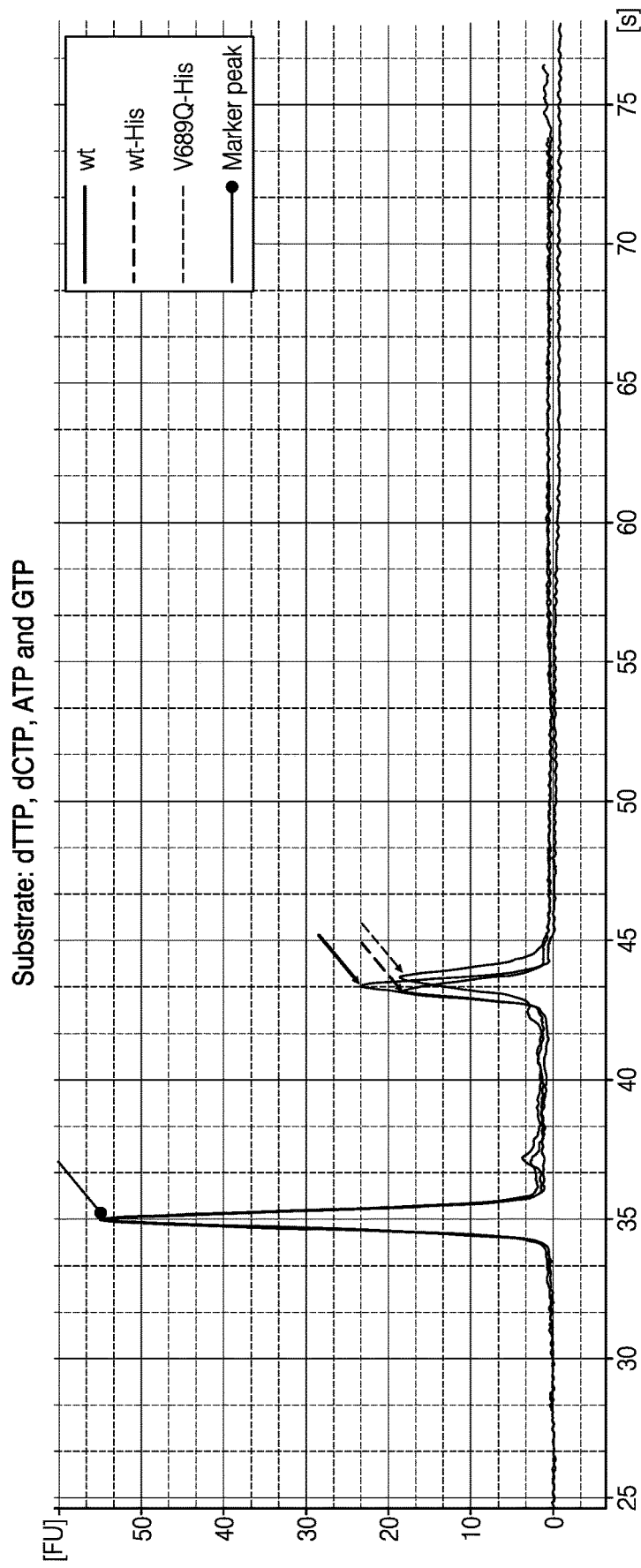
FIGS. 5A-5E show the activity of V689Q T7 RNA polymerase mutants using different nucleotide substrates for in vitro transcription reaction. A)-E) represent specific combinations of ribo- and/or deoxyribonucleotides, as described in Example 5. Different dash types of the arrows indicate reaction products by different polymerases: wt-wild type T7 RNA polymerase without a His tag (Thermo Scientific, EP0113); wt-His-purified wild type T7 RNA polymerase with a His tag; and V689Q-purified T7 RNA polymerase having a V689Q mutation. Peaks and labels are described above for FIGS. 3A-3E.
Figure 5B:
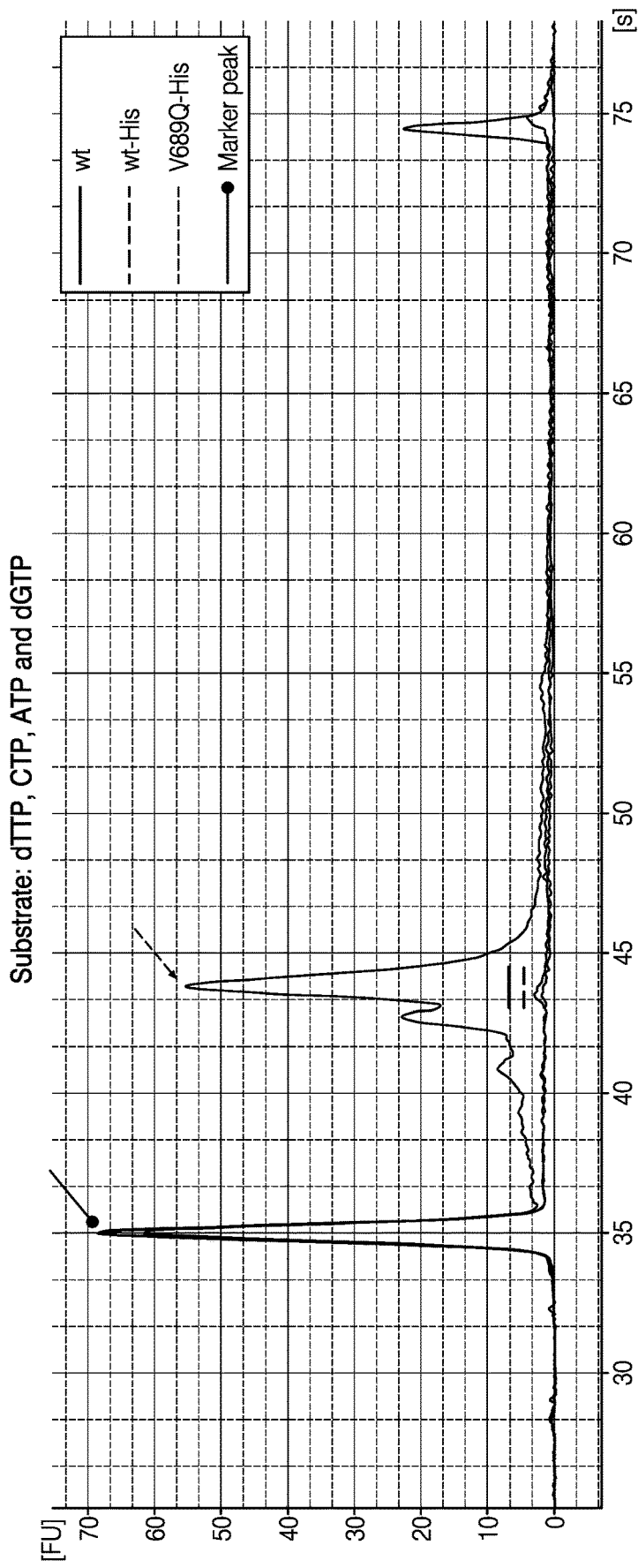
Figure 5C:
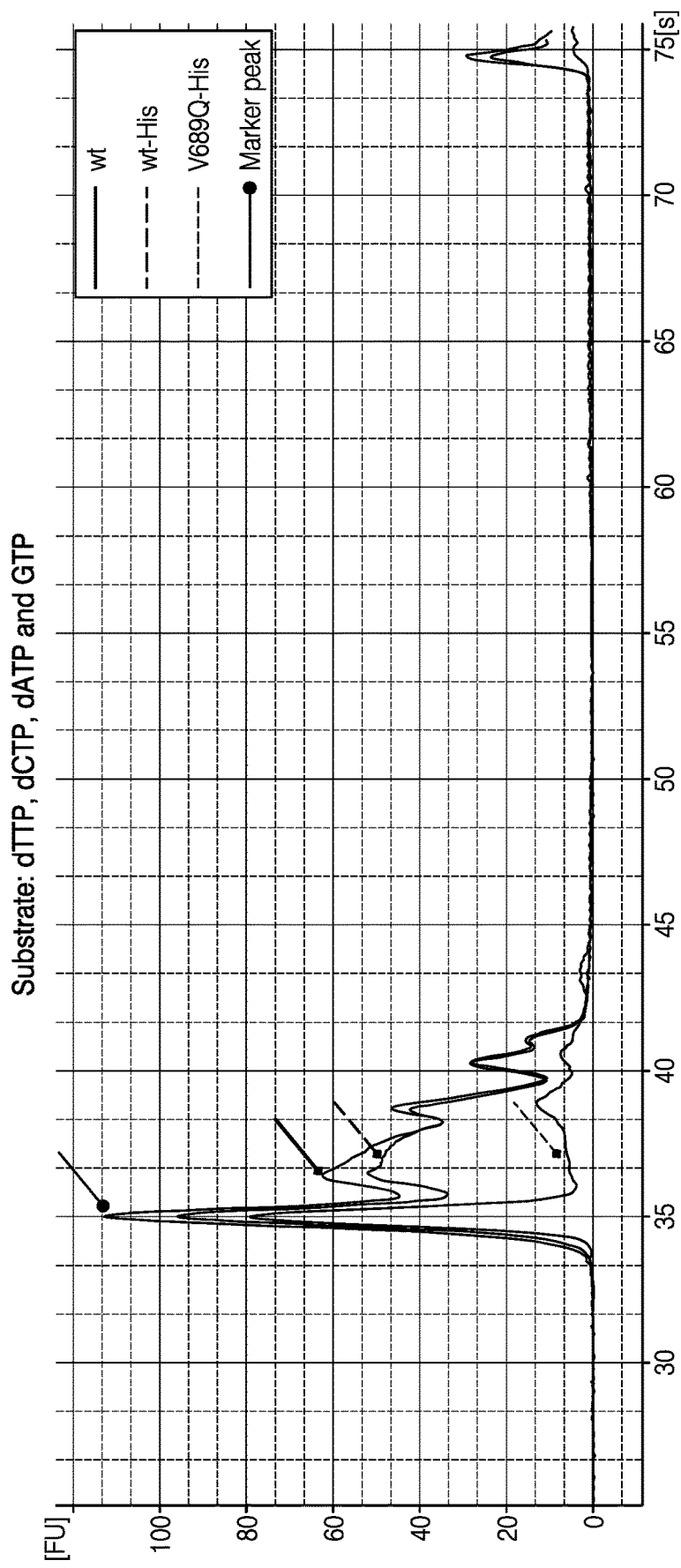
Figure 5D:
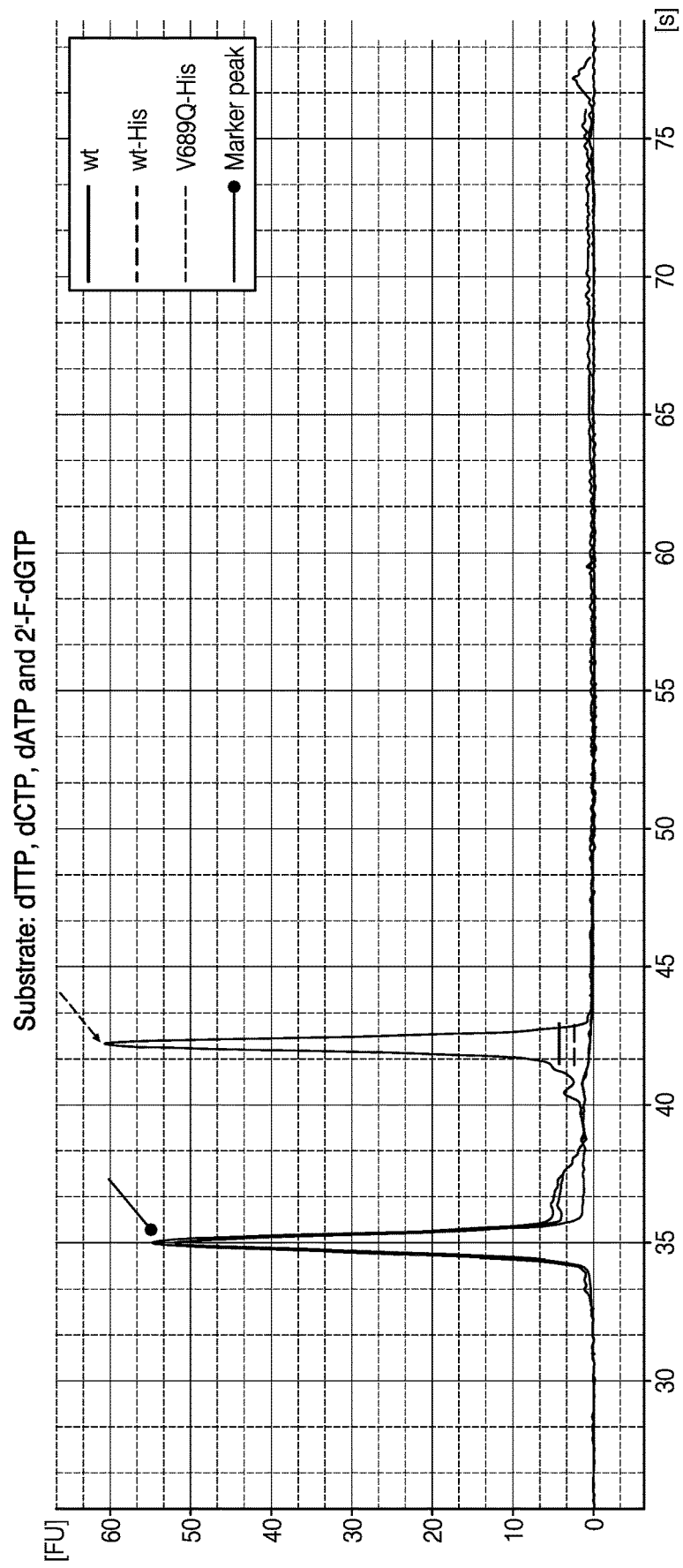
Figure 5E:
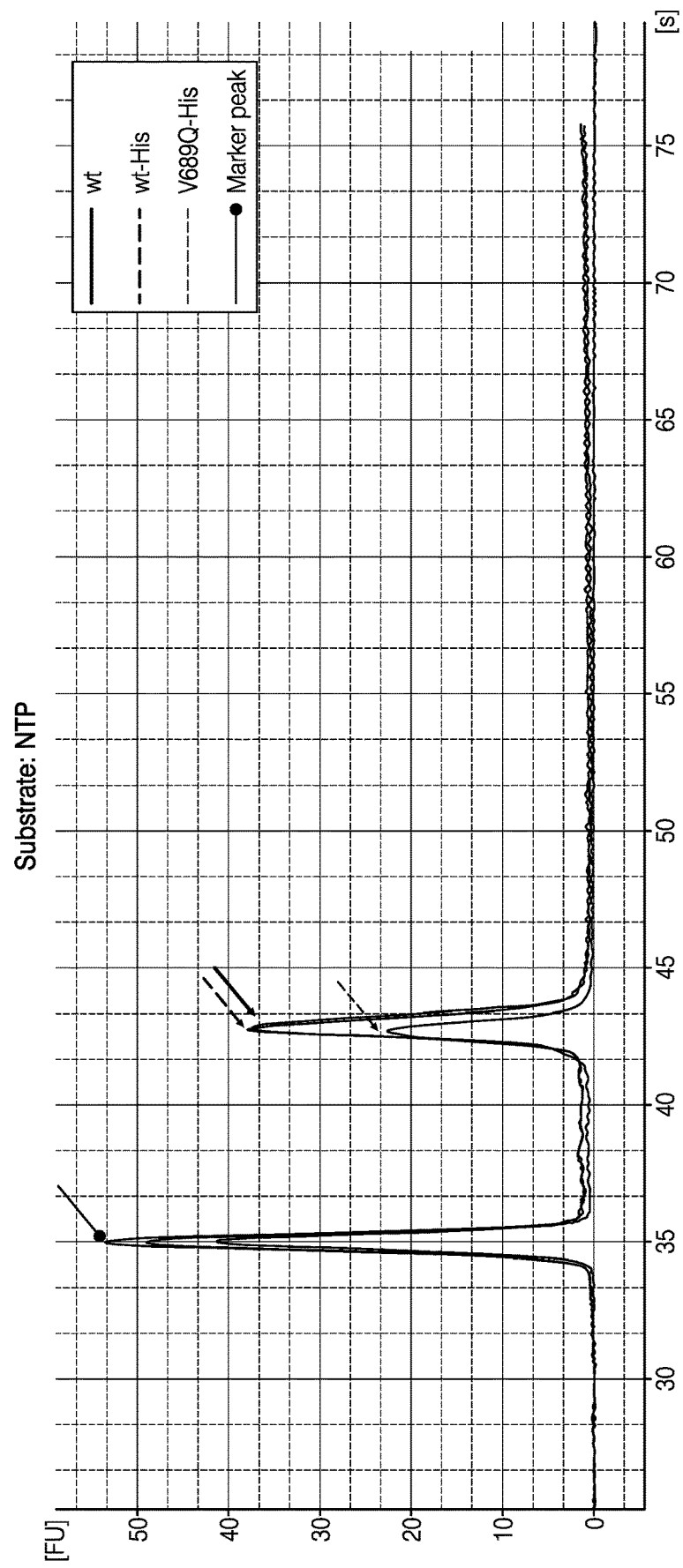
Figure 6A:
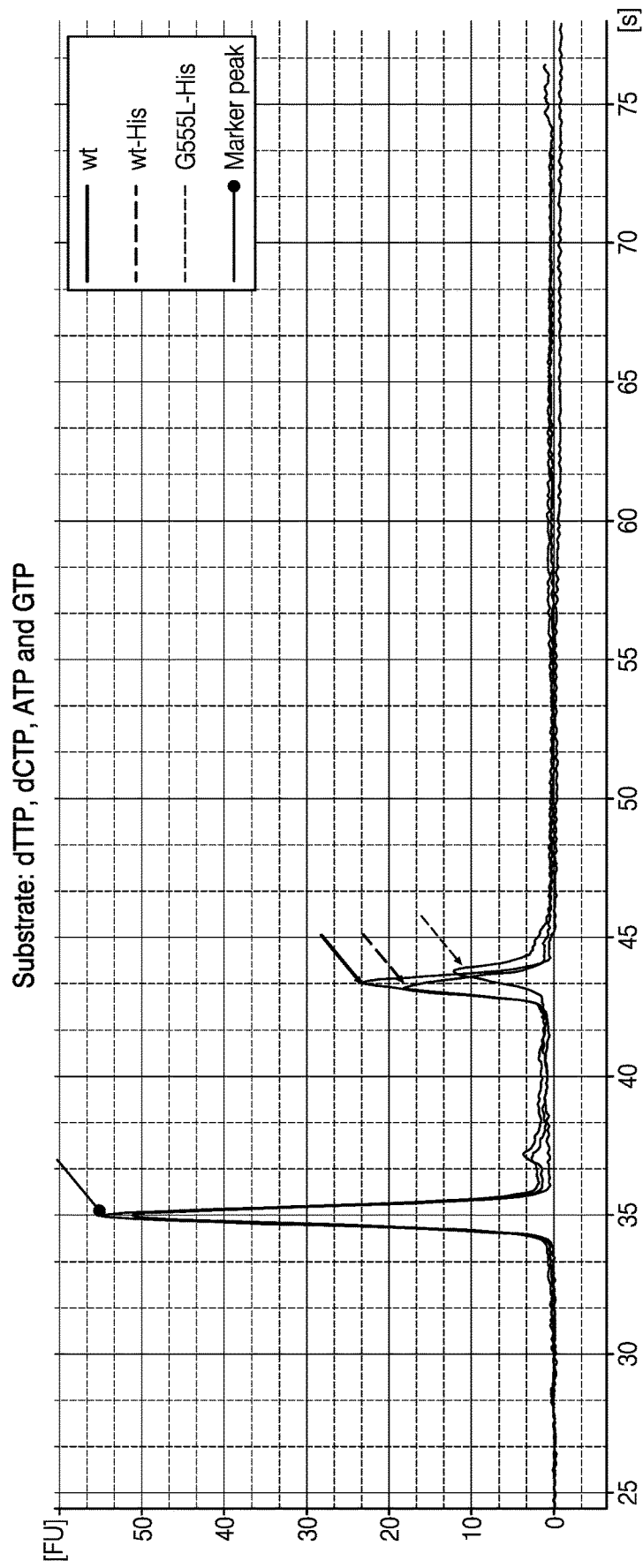
FIGS. 6A-6E show the activity of G555L T7 mutant RNA polymerase using different nucleotide substrates for in vitro transcription reaction. A)-E) represent specific combinations of ribo- and/or deoxyribonucleotides, as described in Example 5. Different dash types of the arrows indicate reaction products by different polymerases: wt-wild type T7 RNA polymerase without a His tag (Thermo Scientific, EP0113); wt-His-purified wild type T7 RNA polymerase with a His tag; and G555L-His purified T7 RNA polymerase having a G555L mutation. Peaks and labels are described above for FIGS. 3A-3E.
Figure 6B:
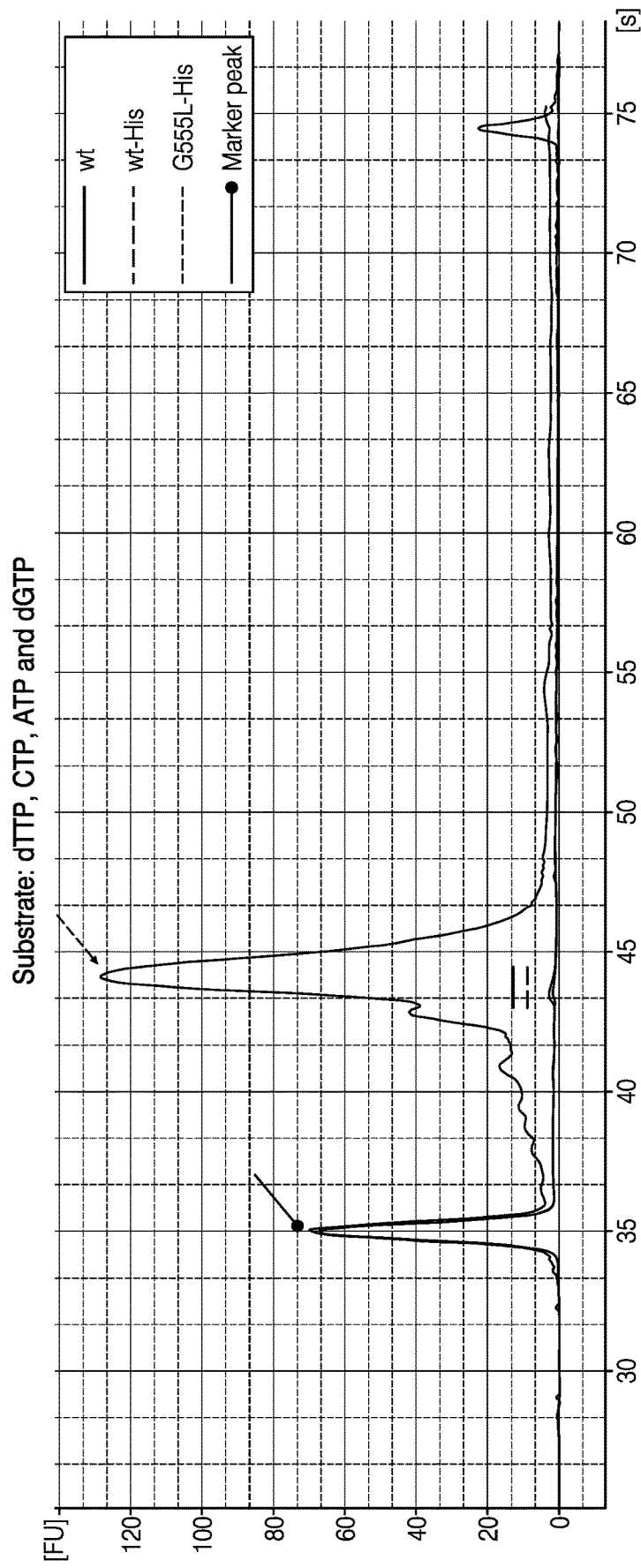
Figure 6C:
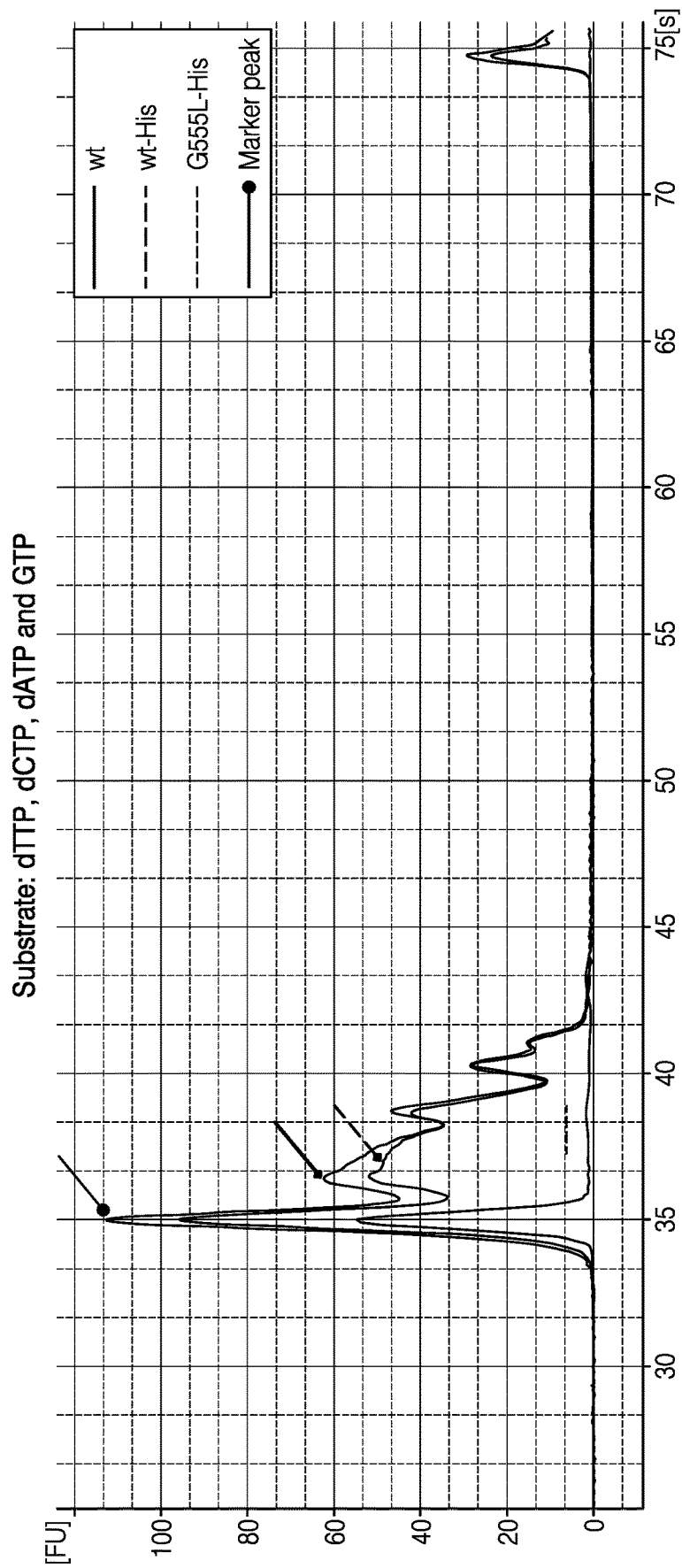
Figure 6D:
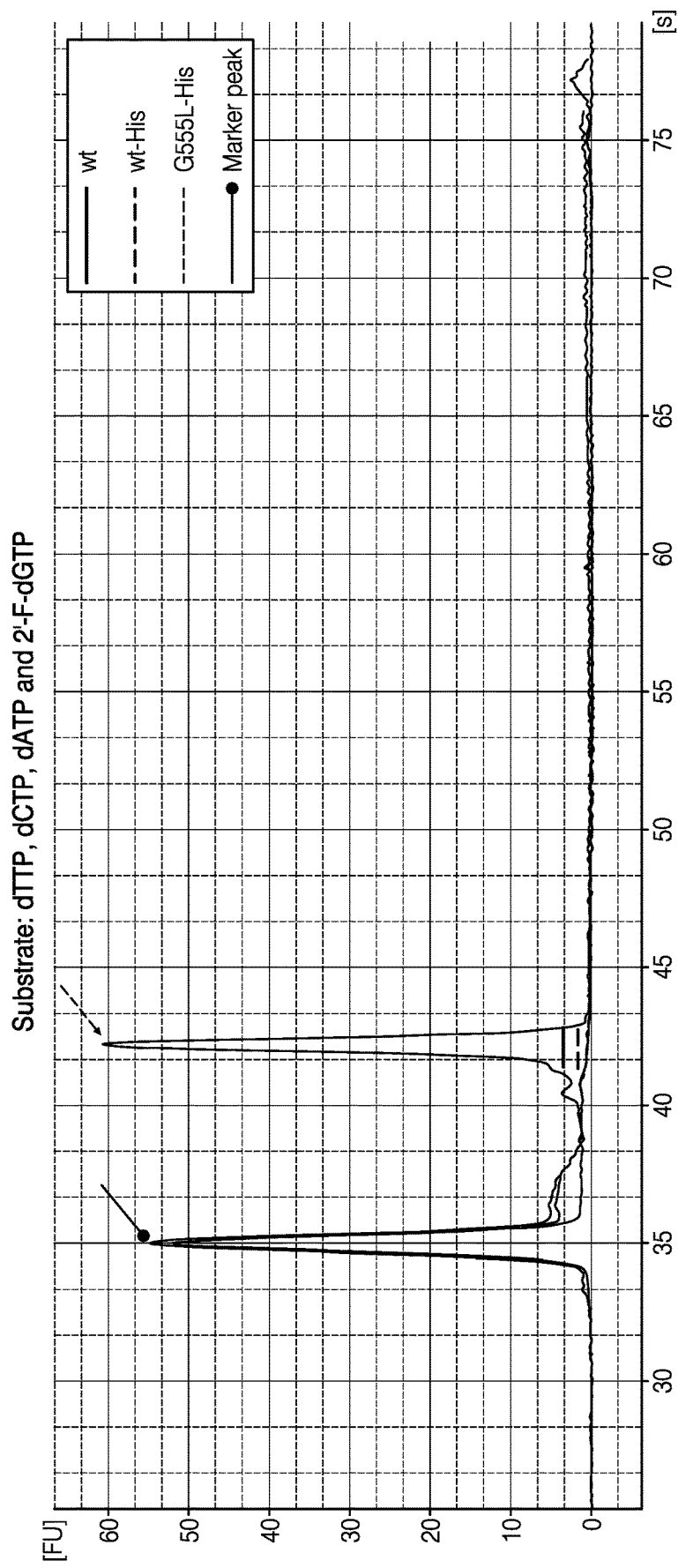
Figure 6E:
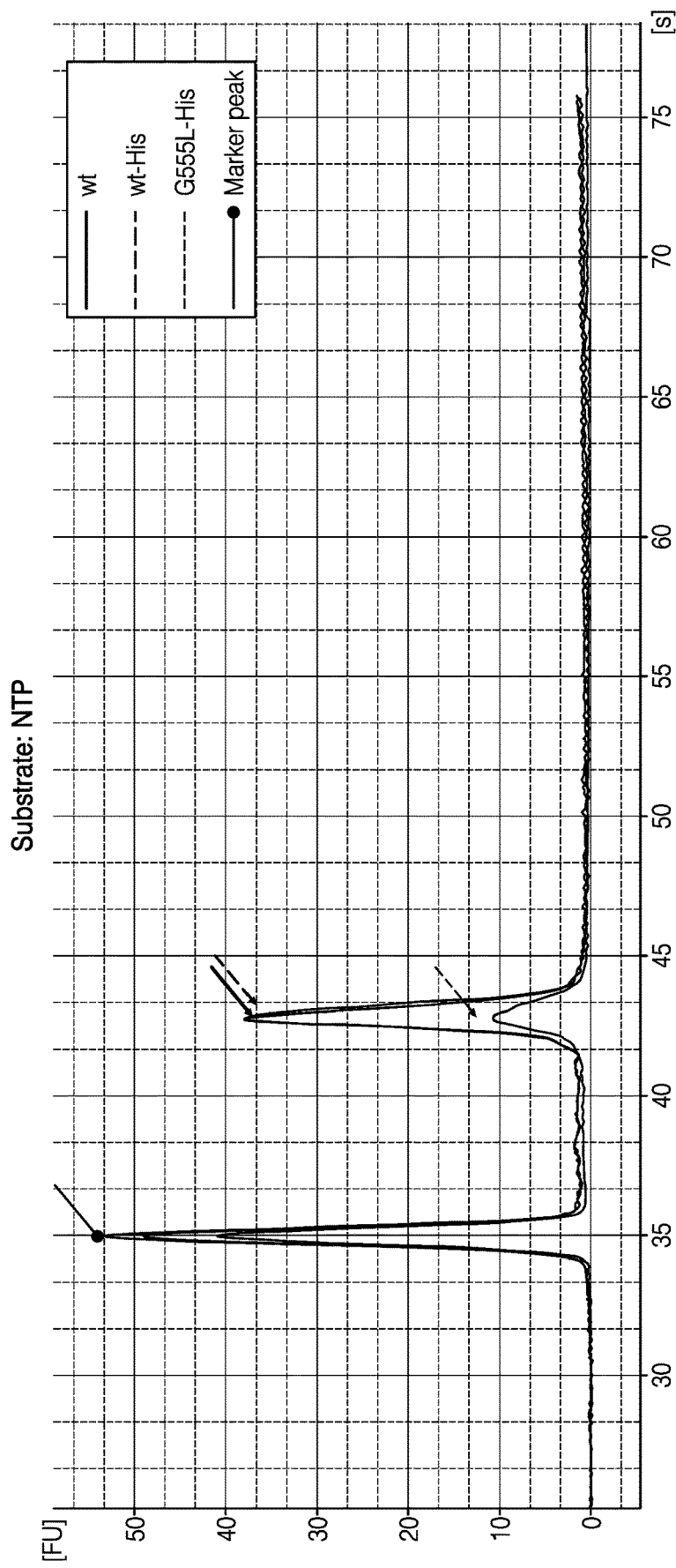

Further, the mutations that were enriched no less than ~7× as shown in FIG. 2 (no more than 10× lower enrichment compared to the enrichment of the Y639F mutant) were selected for further evaluation.

Example 3. Construction of T7 RNAP Mutants for Protein Purification

To evaluate if individual T7 RNAP mutants exhibit expanded substrate range, expression in *E. coli* was performed.
a. Construction of Selected T7 RNAP Mutants Vector pBAD-T7RNAP-wt comprising the wild type T7 RNAP gene sequence was used for site directed mutagenesis of T7 RNAP gene. Site specific mutagenesis was performed using Phusion Site-Directed Mutagenesis Kit (Thermo Scientific, F541) following standard workflow. 5'-phosphorylation of oligonucleotides prior PCR was also performed as it is described in Phusion™ Site-Directed Mutagenesis Kit manual. Mutagenic primers used for introduction of chosen point mutations:
SEQ ID NO: 10 and SEQ ID NO: 11 primers for V783M mutation,
SEQ ID NO: 12 and SEQ ID NO: 13 primers for V689Q mutation,
SEQ ID NO: 14 and SEQ ID NO: 15 primers for V783L mutation, and
SEQ ID NO: 16 and SEQ ID NO: 17 primers for G555L mutation.

After PCR amplification of the pBAD-T7RNAP-wt plasmid DNA to be mutated, parental methylated and hemimethylated DNA was digested with FastDigest DpnI (Thermo Scientific, FD1703). After template DNA digestion, PCR product of approximately 6.8 kbp was purified from 1% agarose gel using GeneJET Gel Extraction Kit (Thermo Scientific, K0691) according to the standard protocol. Circularization of mutated PCR products was performed by ligation with T4 DNA Ligase using Rapid DNA Ligation Kit (Thermo Scientific, K1423) according to the standard protocol (30 ng of mutated PCR product was used for each reaction). Competent E. coli DH10B cells were prepared and transformed with ligation mixture following standard calcium chloride heat-shock transformation techniques (See Hanahan J Mol Biol 166:557-580 (1983)). Half of the ligation mixture were used for transformation. After the cell recovery period at 37° C. for 30 min, half of the transformation mixture were plated on LB medium supplemented with 100 μg/ml of ampicillin. Plates were incubated overnight at 37° C. Plasmid DNA identity of eight colonies from each mutation were checked via colony PCR using DreamTaq Green PCR Master Mix (Thermo Scientific, K1081) Three positive clones for each mutation were picked and cultured overnight in LB medium supplemented with 100 μg/ml of ampicillin at 37° C. Plasmid DNA was purified using GeneJET Plasmid Miniprep Kit (Thermo Scientific, K0502). Sequences of T7 RNAP gene mutants were determined by Sanger sequencing using BigDye™ Terminator v3.1 Cycle Sequencing Kit (Applied Biosystems, 4337457) and BigDye Xterminator™ Purification Kit (Applied Biosystems, 4376484) following standard protocols. Sanger sequencing confirmed which clones have correct desired mutations. Hence, expression vectors containing mutated T7 RNAP gene mutants (V783M, V689Q, V783L and G555L) were constructed: pBAD-T7RNAP-V783M, pBAD-T7RNAP-V689Q, pBAD-T7RNAP-V783L, pBAD-T7RNAP-G555L.

B. Construction of Polyhistidine-Tagged T7 RNAP Mutants

Phusion Site-Directed Mutagenesis Kit (Thermo Scientific, F541) and primers that have repetitive histidine codons (CATCACCATCACCATCAC, SEQ ID NO: 18) directly upstream of the START codon of the T7 RNAP gene were used for construction of plasmid DNA vectors. Standard workflow was followed, and 30 PCR cycles were performed. 5'-phosphorylation of oligonucleotides prior to PCR was performed as described in Phusion™ Site-Directed Mutagenesis Kit manual. Mutagenic primers used for introduction of desired insertion were SEQ ID NO: 19 and SEQ ID NO: 20. After PCR, all the steps were the same as described in the Example 3A.

Sequences of T7 RNAP gene mutants that have six repetitive histidine codons right upstream of the START codon were determined by Sanger sequencing using BigDye™ Terminator v3.1 Cycle Sequencing Kit (Applied Biosystems, 4337457) and BigDye Xterminator™ Purification Kit (Applied Biosystems, 4376484) following standard protocols. Expression vectors containing T7 RNAP mutants (V783M, V689Q, V783L and G555L) which have six repetitive histidine codons right next to the START codon of T7 RNAP gene were constructed: pBAD-T7RNAP-V783Mhis, pBAD-T7RNAP-V689Qhis, pBAD-T7RNAP-V783LHis, and pBAD-T7RNAP-G555LHis.

Example 4. Expression and Purification of T7 Mutant RNAPs

E. coli ER2566 cells were transformed with pBAD-T7RNAP-V783Mhis, pBAD-T7RNAP-V689Qhis, pBAD-T7RNAP-V783LHis, pBAD-T7RNAP-G555LHis and pBAD-T7RNAP-wtHis plasmid vectors. Competent E. coli ER2556 cells were prepared and transformed with plasmid vectors following standard calcium chloride heat-shock transformation techniques (See Hanahan 1983). 10 ng of each plasmid DNA were used for transformation. After the cell recovery period at 37° C. for 30 min, 1/10 of the transformation mixture were plated on LB medium supplemented with 100 μg/ml of ampicillin. Plates were incubated overnight at 37° C.

Single colony from each transformation plate were picked and cultured overnight in LB medium supplemented with 100 μg/ml ampicillin at 37° C., 220 rpm. 1/100 of overnight culture was transferred to fresh LB medium containing 100 μg/mL of ampicillin. Cells were cultivated in one liter of LB medium at 37° C. 220 rpm until optical density ($OD_{600}$) of 0.7-0.8 was reached, and L-arabinose was added to 10 mM of final concentration. T7 RNAP expression was performed for 4 h at 37° C. 220 rpm. After protein expression, cultures were centrifuged at 6000×g 4° C. for 30 min.

Purification of T7 RNAP mutants was performed by first resuspending prepared E. coli biomass in lysis buffer (50 mM Tris-HCl, 300 mM NaCl, 10 mM imidazole, 10 mM β-mercaptoethanol, 1 mg/ml lysozyme and 0.5 mM phenylmethylsulfonyl fluoride solution in water with pH 8 at 4° C. temperature). Cells were then lysed by sonication. Lysate was centrifuged at 16 000×g 4° C. for 30 min, and supernatant (soluble proteins) was collected.

T7 RNAP mutants were purified using HisPur™ Ni-NTA Superflow Agarose (Thermo Scientific, 25215) following standard instructions in the manual. Pierce™ Disposable Columns (Thermo Scientific, 29924) were used. Ratio of biomass and Ni-NTA Superflow Resin amount was from 1:2 to 1:4 (e.g., for protein purification from 1 g of biomass, 2-4 ml of Ni-NTA Superflow Resin were used). Composition of wash buffer (pH 8 at 4° C. temperature) used was 50 mM Tris-HCl, 300 mM NaCl, 20 mM imidazole, 10 mM β-mercaptoethanol, 0.1% (v/v) octyl phenol ethoxylate (Triton™ X-100). Composition of elution buffer (pH 8 at 4° C. temperature) used was 50 mM Tris-HCl, 300 mM NaCl, 250 mM imidazole, 10 mM β-mercaptoethanol, 0.1% (v/v) octyl phenol ethoxylate (Triton™ X-100).

After elution all the fractions from protein purification process were analysed by SDS-PAGE, and elution fractions containing the proteins of interest were selected. The combined elution fractions of each of the proteins, respectively, were transferred to T7 RNAP storage buffer (50 mM Tris-HCl (pH 8.0), 150 mM NaCl, 5 mM DTT, 0.03% (v/v) ELUGENT Detergent and 50% (v/v) glycerol). Dialysis was performed overnight at 4° C. using SnakeSkin™ Dialysis Tubing (Thermo Scientific, 88244). 0.1 mg/ml BSA was added to protein samples after dialysis. Purity of the proteins was more than 80%.

Polymerization activity was measured by performing in vitro transcription (IVT) with [3H] labelled ATP. Definition of activity unit was one unit of the enzyme incorporates 1 nmol of AMP into a polynucleotide fraction in 60 minutes at 37° C.

Example 5. In Vitro Transcription by T7 Mutant RNAPs

To evaluate the effects of V783M, V783L, G555L or V689Q mutation on T7 RNAP substrate specificity, in vitro transcription was performed.

Composition of in vitro transcription reaction was:
Water, nuclease-free (Thermo Scientific, R0581) to 20 μL;
1.25 μL of RiboLock Rnase Inhibitor (40 U/μL) (Thermo Scientific, EO0381);

1 µL of Pyrophosphatase, inorganic (0.1 U/µL) (Thermo Scientific, EF0221);

1.6 µL of DMSO, Anhydrous (Invitrogen, D12345);

1 µL of dCTP Solution (100 mM) (Thermo Scientific, R0151) or 20 µL of CTP Solution, Tris-buffered (100 mM) (Thermo Scientific, R1451)—depending on the reaction;

1 µL of dTTP Solution (100 mM) (Thermo Scientific, R0171) or 20 µL of UTP solution, Tris buffered (100 mM) (Thermo Scientific, R1471)—depending on the reaction;

1 µL of ATP Solution, Tris buffered (100 mM) (Thermo Scientific, R1441) or 1 µL of dATP Solution (100 mM) (Thermo Scientific, R0141)—depending on the reaction;

1 µL of GTP Solution, Tris buffered (100 mM) (Thermo Scientific, R1461) or 1 µL dGTP Solution (100 mM) (Thermo Scientific, R0161) or 1 µL of 2'-F-dGTP (100 mM) (TriLink Biotechnologies, N-1009)—depending on the reaction;

4 µL of 5× TranscriptAid Reaction Buffer from TranscriptAid T7 High Yield Transcription Kit (Thermo Scientific, K0441);

~1 µg of linearized and purified pTZ19R DNA (Thermo Scientific, SD0141). Prior in vitro transcription pTZ19R DNA (Thermo Scientific, SD0141) was digested with FastDigest SmaI (Thermo Scientific, FD0663) according to the standard reaction conditions. Restriction reaction was purified using GeneJET Gel Extraction and DNA Cleanup Micro Kit (Thermo Scientific, K0831);

50 U of purified T7 RNA polymerases (wt, V783M, V783L, G555L or V689Q). Also, wt T7 RNA polymerase without His tag was used (Thermo Scientific, EP0113).

In vitro transcription reactions were incubated at 37° C. for 4.5 hours. Next, template DNA was digested with Lambda exonuclease (Thermo Scientific, EN0561) at 37° C. for 10 min, then the reaction was stopped by adding 4 µL of 0.5 M EDTA. In vitro transcription products were purified using AMPure XP magnetic beads (Beckman Coulter, A63882). Subsequently, 88 µL of AMPure XP magnetic beads was added, and samples were incubated for 15 minutes at room temperature. Elution was performed in 15 µL of nuclease-free water (Thermo Scientific, R0581) at 65° C. for 5 min. Purified products of single-stranded nucleic acids were incubated at 70° C. for 2 min to eliminate secondary structures.

Purified samples were diluted 5-200 times with water, and 11 µL of each diluted sample was analysed on Agilent™ 2100 Bioanalyzer using Agilent Small RNA Kit (Agilent Technologies, 5067-1548). Since template DNA was linearized with SmaI restriction endonuclease, in vitro transcription product length should be 42 nucleotide sequence corresponding to SEQ ID NO: 21, comprised of ribo- and/or deoxyribonucleotides, respectively (depending on a mixture of nucleoside triphosphates used in in vitro transcription reaction). Five different mixtures of nucleoside triphosphates were used for this experiment:

dTTP, dCTP, ATP, and GTP;
dTTP, CTP, ATP, and dGTP;
dTTP, dCTP, dATP, and GTP;
dTTP, dCTP, dATP, and 2'-F-dGTP; and
UTP, CTP, ATP, and GTP.

The results of this experiment are provided in Agilent 2100 Bioanalyzer electropherograms (FIGS. 3A-6E). and summarized in Table 2, where activity of T7 RNAP mutants is provided as compared to wt T7 RNAP activity using different nucleotide substrates in an in vitro transcription reaction. Values indicate a yield ratio of the amount of full-length target transcript produced by a particular T7 mutant polymerase compared to the amount of the transcript produced by wt T7 RNAP under the same conditions. Full-length transcript yield is determined from Agilent Small RNA electropherogram data (target peak concentration). If no target product detected, its concentration considered as a lowest value of measurement unit of Agilent Bioanalyzer in Small RNA Kit. Such value is 0.01 pg/µL because peak concentration is measured with two decimal points in Small RNA Kit.

TABLE 2

Comparison of T7 mutant polymerases versus WT T7 RNAP

| Substrate mix | V783M | V783L | V689Q | G555L |
|---|---|---|---|---|
| a) dTTP, dCTP, ATP, GTP | 5.2 | 2.5 | 1.2 | 0.8 |
| b) dTTP, CTP, ATP, dGTP | 289.4 | 22.7 | 91.8 | 253.8 |
| c) dTTP, dCTP, dATP, GTP | 27.8 | 1.0 | 1.0 | 1.0 |
| d) dTTP, dCTP, dATP, 2'-F-dGTP | 316.0 | 1.0 | 73.7 | 137.5 |

Results with positive control samples (RNA synthesis, where UTP, CTP, ATP, and GTP mixture was used) are shown in electropherograms in FIGS. 3E, 4E, 5E and 6E, respectively.

V783M T7 mutant polymerase synthesizes full-length 42 nt product using all tested substrate nucleotide combinations, and the efficiency of incorporation of sugar modified substrate is significantly higher compared to wt T7 RNA polymerase (see Table 2). V783M T7 mutant polymerase synthesizes 5.2-316.0 times more target transcript compared to WT T7 RNA polymerase.

V783L T7 mutant polymerase exhibits ability to use deoxyribonucleoside triphosphates (e.g. dTTP, dGTP) instead of ribonucleoside triphosphates (e.g., UTP, GTP) for nucleic acid synthesis. Target transcript yield is respectively 2.5 and 22.7 times higher compared to WT T7 RNA polymerase.

V689Q and G555L T7 polymerase mutants synthesize full-length ssDNA using 2'-F-dGTP instead of rGTP 73.7-times and 137.5-times, respectively, more efficiently compared to WT T7 RNA polymerase. Also, the yield of the target transcript is 91.8-times higher with the V689Q mutant and 253.8-times higher with G555L mutant compared to WT T7 RNA polymerase when dTTP, CTP, ATP, dGTP are used as substrates.

Thus, all the analysed mutants of T7 RNA polymerase (including T7 mutant polymerases comprising V783M, V783L, V689Q or G555L mutations) have an expanded substrate range compared to WT T7 RNA polymerase and can incorporate deoxyribonucleotides more efficiently as compared to wt T7 RNA polymerase. Additionally tested T7 mutant polymerases comprising V783I or G555Y mutations, respectively, showed expanded substrate range compared to WT T7 RNA polymerase and could incorporate at least dCTP, dTTP, 2'-F-dCTP, 2'-F-dTTP and 2'F-dGTP nucleotides.

Example 6. Amplification Using Enzymatically Synthesized Oligonucleotides

T7 mutant polymerases that can incorporate dNTPs could be used as tools for de novo synthesis of oligonucleotides that may serve, for example, as primers for PCR.

In this experiment, six different mixtures of nucleoside triphosphates were used for in vitro transcription reaction:
a) UTP, CTP, ATP, and GTP;
b) dTTP, dCTP, ATP, and GTP;
c) dTTP, dCTP, dATP, and GTP;
d) dTTP, dCTP, dATP, and 2'-F-dGTP;
e) dUTP, dCTP, ATP, and GTP; and
f) dUTP, dCTP, dATP, and GTP.

Oligonucleotides with a 42 nucleotide sequence corresponding to SEQ ID NO: 21, comprised of ribo- and/or deoxyribonucleotides, respectively (depending on a mixture of nucleoside triphosphates used) were synthesized enzymatically via in vitro transcription. The in vitro transcription reactions comprised:
Water, nuclease-free (Thermo Scientific, R0581) to 200 µL,
12.5 µL of RiboLock Rnase Inhibitor (40 U/L) (Thermo Scientific, EO0381),
10 µL of Pyrophosphatase, inorganic (0.1 U/µL) (Thermo Scientific, EF0221),
16 µL of DMSO, Anhydrous (Invitrogen, D12345),
20 µL of dCTP Solution (100 mM) (Thermo Scientific, R0151) or 20 µL of CTP Solution, Tris-buffered (100 mM) (Thermo Scientific, R1451),
20 µL of dTTP Solution (100 mM) (Thermo Scientific, R0171) or 20 µL of UTP solution, Tris buffered (100 mM) (Thermo Scientific, R1471) or dUTP Solution (100 mM) (Thermo Scientific, R0133),
20 µL of ATP Solution, Tris buffered (100 mM) (Thermo Scientific, R1441) or 20 µL of dATP Solution (100 mM) (Thermo Scientific, R0141),
20 µL of GTP Solution, Tris buffered (100 mM) (Thermo Scientific, R1461) or 20 µL dGTP Solution (100 mM) (Thermo Scientific, R0161) or 1 µL of 2'-F-dGTP (100 mM) (TriLink Biotechnologies, N-1009),
40 µL of 5× TranscriptAid Reaction Buffer from TranscriptAid T7 High Yield Transcription Kit (Thermo Scientific, K0441)—reaction buffer was kept at room temperature,
~30 µg of linearized and purified pTZ19R DNA (Thermo Scientific, SD0141). Prior in vitro transcription pTZ19R DNA (Thermo Scientific, SD0141) was digested with FastDigest SmaI (Thermo Scientific, FD0663) and purified as described in Example 5, and
2000 U of purified T7 RNA polymerase mutant V783M.

All frozen reaction components were thawed, mixed, and centrifuged briefly to collect all drops. RiboLock Rnase Inhibitor, Pyrophosphatase, dCTP, dTTP, dATP, ATP, GTP, dGTP, 2'-F-dGTP and T7 polymerase mutants were kept on ice. Water, DMSO, 5× TranscriptAid Reaction Buffer, and pTZ19R/SmaI DNA were kept at room temperature. Reaction components were combined at room temperature in the order listed above (i.e., water was added first, and T7 RNA polymerase was added last). In vitro transcription reactions were incubated at 37° C. for 5 hours.

Next, template DNA was digested with Lambda exonuclease. 160 µL of water, nuclease-free (Thermo Scientific, R0581), 20 µL of 10× Reaction Buffer and 20 µL of Lambda Exonuclease (10 U/µL) (Thermo Scientific, EN0561) were directly added to the in vitro transcription reaction mixture. Template digestion was performed at 37° C. for 15 min. Reaction was stopped by the addition 40 µL of 0.5 M EDTA. In vitro transcription products were purified using AMPure XP magnetic beads (Beckman Coulter, A63882) following standard PCR purification protocol, except for AMPure XP volume used, incubation time, and elution. After IVT and template DNA digestion, 880 µL of AMPure XP magnetic beads and 880 µL of 96% ethanol were added, and mixed samples were incubated for 15 minutes at room temperature. Elution was performed in 100-150 µL of nuclease-free water (Thermo Scientific, R0581) at 65° C. for 5 min. Purified synthesized oligonucleotides were incubated at 70° C. for 2 min to eliminate secondary structures. After heat denaturation, samples were kept on ice or stored at −70° C.

Purified samples were diluted 500-1000 times in water, and 1 µL of each diluted sample were analyzed on Agilent™ 2100 Bioanalyzer using Agilent Small RNA Kit (Agilent Technologies, 5067-1548), where distinct peaks of the reaction products were observed. Because template DNA was linearized with SmaI restriction endonuclease, in vitro transcription products-oligonucleotides should be 42 bases.

The concentration of oligonucleotides was measured using NanoDrop™ spectrophotometer (Thermo Scientific). Next, the oligonucleotides were used to prepare primers for PCR. A chemically synthesized forward primer (synthesized by Metabion International AG) having SEQ ID NO: 21 and comprised of deoxyribonucleotides was used as a positive control reaction. The concentration of oligonucleotides was measured using NanoDrop™ spectrophotometer (Thermo Scientific).

The composition of the PCR reaction mixtures was as follows:
25 µL of a selected PCR Master Mix
19 µL of Water, nuclease-free (Thermo Scientific, R0581)·
5 ng of pTZ19R (Thermo Scientific, SD0141).
2.5 µL of chemically synthesized reverse primer of SEQ ID NO: 22 (10 µM).
2.5 µL of 10 µM enzymatically synthesized primer comprised of nucleotides as listed in a, b, c, d, e or f options; or a chemically synthesized forward primer of SEQ ID NO: 21, comprised of deoxyribonucleotides.

Figure 7A:
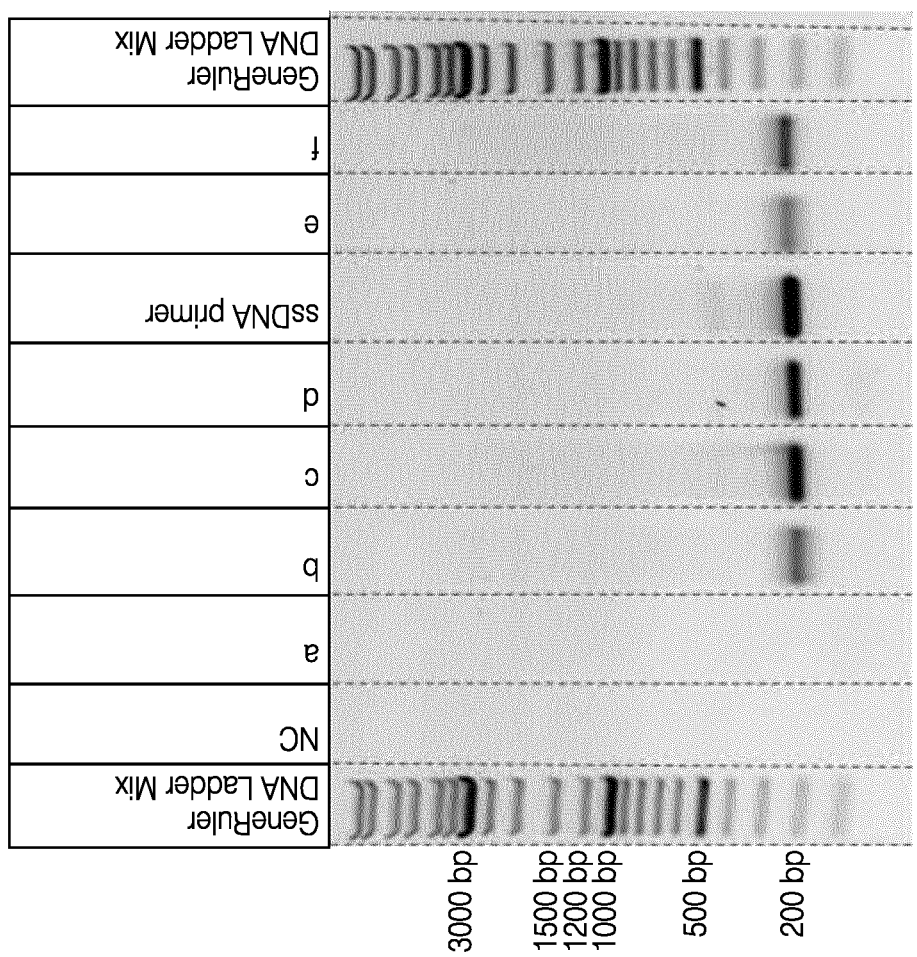
FIGS. 7A-7E show results with de novo synthesis of oligonucleotides using a variety of substrates mixes, with these mixes labeled on different lanes of the figures:
a) UTP, CTP, ATP, and GTP;
b) dTTP, dCTP, ATP, and GTP;
c) dTTP, dCTP, dATP, and GTP;
d) dTTP, dCTP, dATP, and 2'-F-dGTP;
e) dUTP, dCTP, ATP, and GTP; and
f) dUTP, dCTP, dATP, and GTP.
Figure 7B:
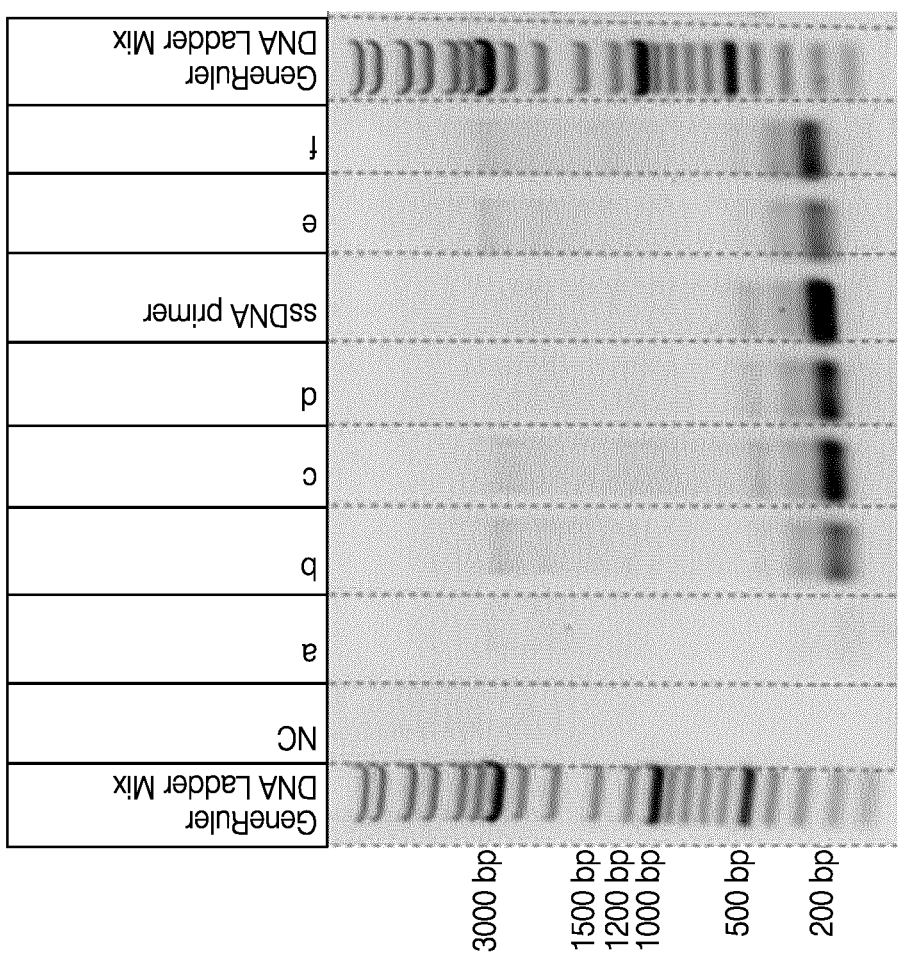

Selected PCR Master Mixes and respective cycling conditions were as shown in the data in FIGS. 7A-7E:

FIG. 7A: Dream Taq PCR Master Mix (2×) (Thermo Scientific, K1071). Cycling conditions: 1 cycle of initial denaturation at 95° C. for 2 min; 30 cycles of denaturation at 95° C. for 30 s, annealing at 53° C. for 30 s and extension at 72° C. for 1 min; 1 cycle of final extension at 72° C. for 5 min. FIG. 7B: Platinum II Hot-Start PCR Master Mix (2×) (Invitrogen, 14000014). Cycling conditions: 1 cycle of initial denaturation at 94° C. for 2 min; 30 cycles of denaturation at 94° C. for 30 s, annealing at 60° C. for 30 s and extension at 68° C. for 30 s.

Figure 7C:
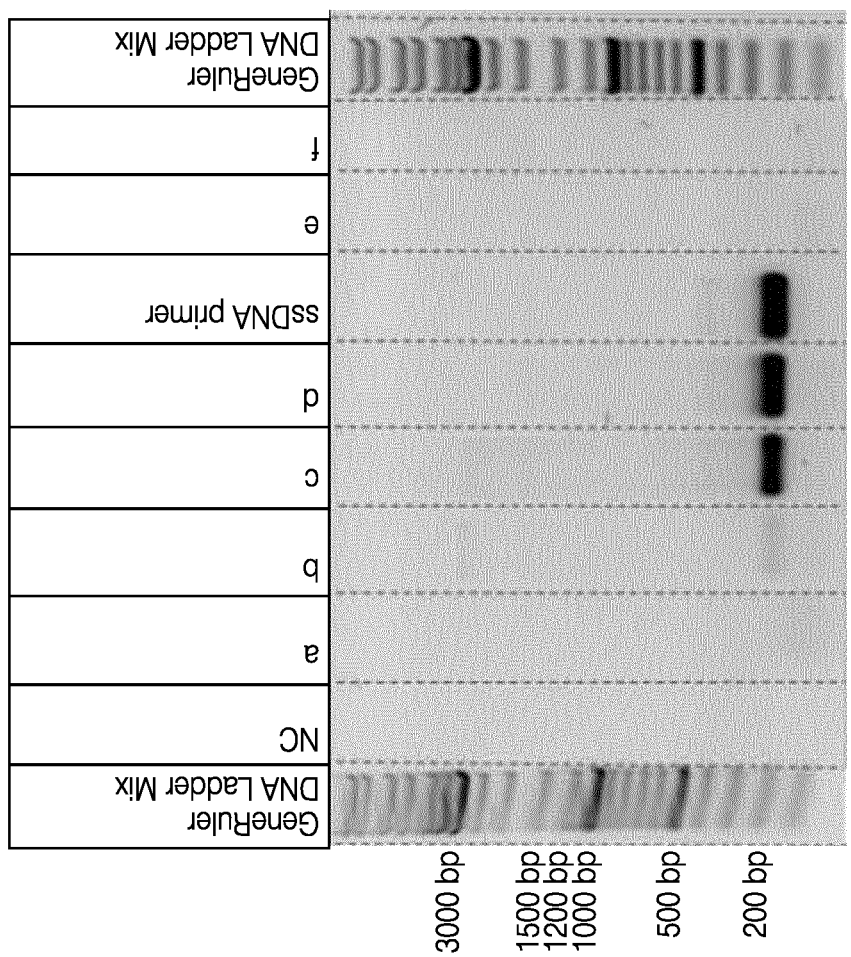

FIG. 7C: Platinum SuperFi PCR Master Mix (Invitrogen, 12358010). Cycling conditions: 1 cycle of initial denaturation at 98° C. for 30 s; 30 cycles of denaturation at 98° C. for 30 s, annealing at 62° C. for 30 s and extension at 72° C. for 30 s; 1 cycle of final extension at 72° C. for 5 min.

Figure 7D:
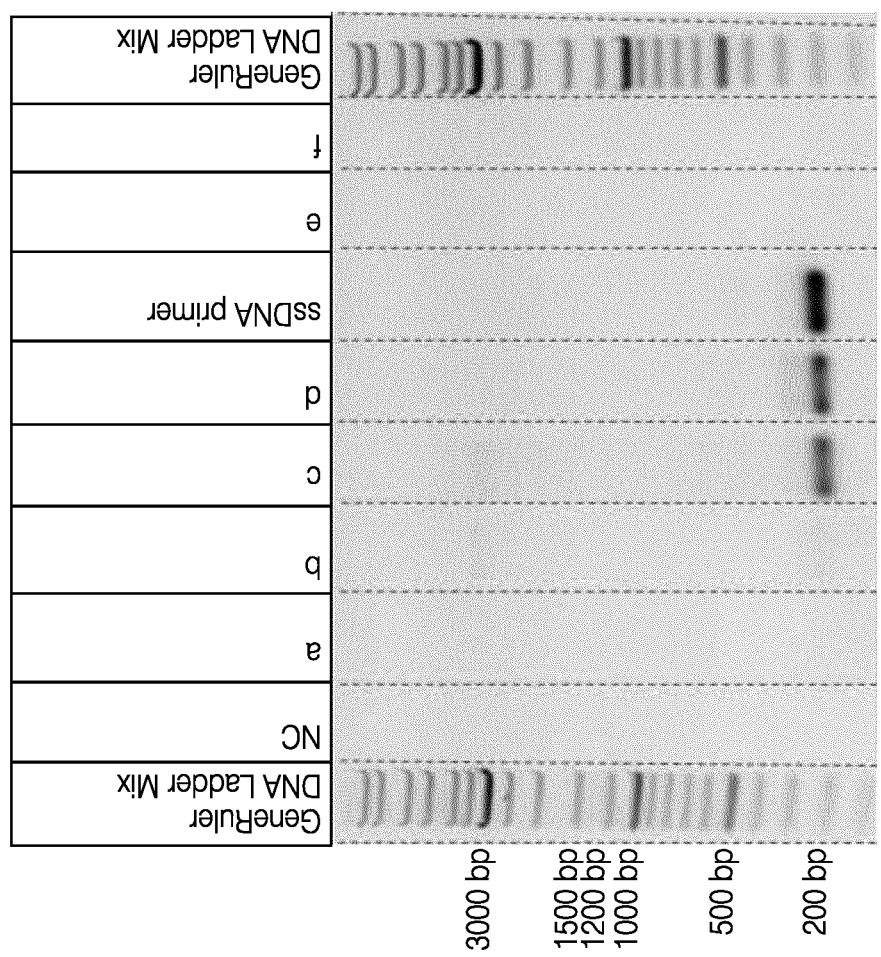

FIG. 7D: Phusion Hot Start II High-Fidelity PCR Master Mix (Thermo Scientific, F565L). Cycling conditions: 1 cycle of initial denaturation at 98° C. for 30 s; 30 cycles of denaturation at 98° C. for 30 s, annealing at 62° C. for 30 s and extension at 72° C. for 30 s; 1 cycle of final extension at 72° C. for 5 min.

Figure 7E:
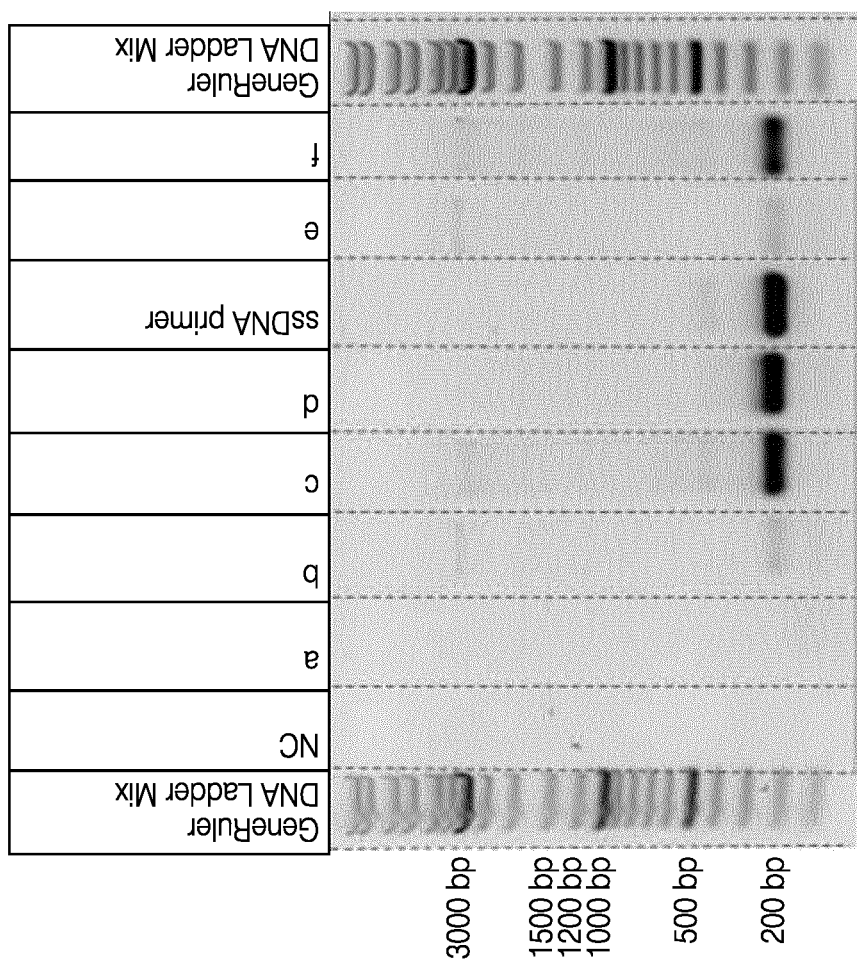

FIG. 7E: Phusion U Multiplex PCR Master Mix (Thermo Scientific, F562L). Cycling conditions: 1 cycle of initial denaturation at 98° C. for 30 s; 30 cycles of denaturation at 98° C. for 30 s, annealing at 62° C. for 30 s and extension at 72° C. for 30 s; 1 cycle of final extension at 72° C. for 5 min.

After PCR, 5 µL of each sample was analysed by standard agarose gel electrophoresis (1% agarose, 1× Tris-Acetate-EDTA, 0.25 µg/mL of Ethidium bromide). Prior to electrophoresis, 5 µL of PCR products were mixed DNA Gel Loading Dye (6×) (Thermo Scientific, R0611) following general recommendations for DNA electrophoresis. The results of this experiment are shown in agarose gel electrophoresis images. As can be seen from FIGS. 7A-7E, target PCR products of 225 bp were synthesized, when various chimeric oligonucleotides were used. Thus, chimeric oligonucleotides (i.e., comprising deoxyribonucleotides and ribonucleotides, as DNA/RNA) synthesized by a T7 mutant polymerase can serve as primers in PCR. There are some yield differences depending on the type of enzymatically synthesized primer that were used for PCR. The more deoxyribonucleotides a primer comprised, the higher yield of target PCR product was obtained (i.e., higher yields of target product were obtained when oligonucleotide comprised of dTTP, dCTP, dATP, and GTP were used compared to oligonucleotide comprising of dTTP, dCTP, ATP, and GTP). Also, chimeric oligonucleotides comprising of dUTP instead of dTTP cannot serve as primers when proofreading polymerases are used (FIGS. 7C-7D) for PCR. Such polymerases by nature are not able to incorporate dUTP and read through uracil present in template. On the contrary, Taq-based DNA polymerases (FIG. 7A-7B) and engineered proofreading DNA polymerase (Figure E) could use oligonucleotides comprising dUTP as primers, and thus synthesized target PCR products of 225 bp (FIGS. 7A-7B and 7E).

PCR products were purified from 1% agarose gel using GeneJET Gel Extraction Kit (Thermo Scientific, K0691) according to the standard protocol. Amplicon libraries were prepared using Collibri™ PCR-free PS DNA Library Prep Kit for Illumina Systems, with UD indexes (Set B, 25-48) (Invitrogen, A43608024). Size distribution and quality of prepared amplicon libraries were verified by performing capillary electrophoresis analysis on Agilent™ 2100 Bioanalyzer instrument using the Agilent High Sensitivity DNA Kit (Agilent Technologies, 5067-4626). Before proceeding to sequencing prepared libraries were quantified by qPCR using Collibri™ Library Quantification Kit (Invitrogen, A38524100). The resulting libraries were sequenced on the Illumina MiSeq™ using the MiSeq Reagent Kit v2 (Illumina, CA, USA, MS-102-2002), 300-cycles (Illumina, CA, USA); 2×151 bp paired-end reads were performed. Libraries were sequenced at average depth of 0.1M reads/sample. Data analysis revealed the target amplicon sequences in all cases, and the majority of generated reads (>92%) aligned to a reference sequence. Ratio of mapped reads for each of the oligos was comparable to the ratio of mapped reads for PCR with chemically synthesized oligonucleotide. Thus, specific products are produced when chimeric oligonucleotides synthesized by a mutant T7 RNA polymerase are used in an amplification reaction. In addition, the amount of insertions/deletions was substantially lower in regions covered by enzymatically synthesized GTP or 2'-F-dGTP containing primers.

The enzymatic synthesis methods employing mutant polymerases as described herein and throughout the current disclosure advantageously provides for high-quality, simple and cheap oligonucleotide and polynucleotide synthesis.

Example 7. Using Enzymatically Synthesized Oligonucleotides in Reverse Transcription T7 mutant polymerases capable of incorporating dNTPs can be used as tools for de novo synthesis of primers for reverse transcription. An experiment having a workflow corresponding to the scheme provided in FIG. 8 was performed.

pTZ19R plasmid derivative with a sequence of PCR handle no. 2 (SEQ ID NO: 24) and oligo $(dT)_{24}VN$ (SEQ ID NO: 69) (where V is A or G; N is A, T, C or G) directly downstream of T7 promoter sequence was constructed. Plasmid DNA library was generated by performing site-directed insertional mutagenesis. Further, the template for in vitro transcription was prepared as follows:

Linearization and blunting of constructed plasmid DNA pool-Mva1269I restriction endonuclease and T4 DNA polymerase were used; and Linearized and end repaired plasmid DNA pool was purified as described in previous examples.

In vitro transcription was performed using T7 RNA polymerase mutant V783M. Provided nucleotide substrates were a mixture of dTTP, dCTP, dATP and GTP or a mixture of dTTP, dCTP, dATP and 2'-F-dGTP. After in vitro transcription, a chimeric anchored oligo (dT) (comprising sequence corresponding to SEQ ID NO: 45, and containing ribonucleotides or modified deoxyribonucleotides, depending on nucleotide triphosphates used during in vitro transcription) was generated. The synthesized reverse transcription primers at the 5'-end had a PCR handle No 2 sequence for introduction of full length P7 Illumina adapter. Next, template DNA was digested with 2 exonuclease, and in vitro transcription products were purified using magnetic beads.

A 3' mRNA-Seq library preparation was performed using either enzymatically or chemically synthesized anchored oligo (dT) primer (SEQ ID NO: 45) and ERCC Ex-Fold Mix2 (Invitrogen, #4456739) as an input mRNA. An oligonucleotide-tethered ddCTP (ddCTP-(Alxyl)-NNNNNNN-NAGATCGGAAGAGCGTCGTGTA-3'-biotin, SEQ ID NO: 46) was used for random reverse transcription termination and tagging with PCR handle No 1 (SEQ ID NO: 23). SuperScript IV reverse transcriptase (Invitrogen) was used; the ratio of oligonucleotide-tethered ddCTP and dCTP was 1:20. Reverse transcription products were purified using streptavidin magnetic beads. Streptavidin magnetic beads ensured purification of cDNA tagged at 3'-end because the oligonucleotide-tethered ddNTP also comprised a biotin tag.

Introduction of full-length adapter sequences was performed via indexing PCR with Collibri Stranded RNA Library Prep Kit (Invitrogen, A38994024). During indexing PCR, products of reverse transcription were amplified and barcoded. Libraries were purified using magnetic beads; size distribution and quality of prepared libraries verified by performing capillary electrophoresis analysis on Agilent™ 2100 Bioanalyzer instrument. Before proceeding to sequencing, the prepared libraries were quantified by qPCR with Collibri Library Quantification Kit (Invitrogen, A38524500).

The resulting libraries were sequenced on the Illumina MiSeq™ using the MiSeq Reagent Kit v2, 300-cycles; sequencing was performed at single-read mode, 109 bp R1. Samples were sequenced at 0.1 M reads/sample depth.

Data analysis revealed a ratio of mapped reads: 92-96%. The library that was prepared using chemically synthesized anchored oligo (dT) primer resulted in comparable alignment rate-99%. All mapped reads in all samples have an expected ERCC-spike biotype. Obtained strand-specificity in all samples was 99.9-100%. Enzymatically synthesized oligo (dT) as well as chemically synthesized oligo (dT) primed reverse transcription reaction ensured specific mRNA capture in all cases. Detected genes counts and ERCC linearity did not differ meaningfully if enzymatically or chemically synthesized reverse transcription primer were used. These results confirm that chimeric oligonucleotide synthesized by a T7 RNA mutant polymerase can be used in the priming-based reaction of reverse transcription.

Example 8. Nucleic Acid Amplification and Random Termination/Tagging Via In Vitro Transcription DNA amplification and random termination/tagging via in vitro transcription using a T7 RNA mutant polymerase was tested, using the protocol shown in FIG. 9A.

In vitro transcription was performed using T7 RNA polymerase mutant V783M. Intact pTZ19R plasmid DNA bearing a PCR handle sequence no. 2 (SEQ ID NO: 24) directly downstream of a T7 promoter was used as a template DNA. Provided nucleotide substrates for in vitro transcription were either a mixture of dTTP, dTCP, dATP and GTP or a mixture of dTTP, dCTP, dATP and 2'-F-dGTP. Also, synthesis was randomly terminated and tagged using oligonucleotide-tethered ddUTP (ddUTP-(Alxyl)-NNNNNNNNAGATCGGAAGAGCGTCGTGTA-3'-biotin, SEQ ID NO: 46) or oligonucleotide-tethered ddCTP (ddCTP-(Alxyl)-NNNNNNNNAGATCG-GAAGAGCGTCGTGTA-3'-biotin, SEQ ID NO: 46)). A ratio of oligonucleotide-tethered ddNTP and respective dNTP was either 1:500 or 1:5000. The oligonucleotide-tethered ddNTPs used have a PCR handle sequence no. 1 (SEQ ID NO: 23). After in vitro transcription, ssDNA fragments tagged at both ends were generated. Next, template DNA was digested with λ exonuclease and in vitro transcription products were purified using streptavidin magnetic beads. Streptavidin magnetic beads ensured purification of fragments that were tagged at 3' end because the oligonucleotide-tethered ddNTPs comprised a biotin tag.

Introduction of full-length adapter sequences was performed via indexing PCR as in previous example. During indexing, PCR products of in vitro transcription were amplified and barcoded. Libraries were purified using magnetic beads; size distribution and quality of prepared libraries was verified by performing capillary electrophoresis analysis on Agilent™ 2100 Bioanalyzer instrument. Before proceeding to sequencing, the prepared library was quantified by qPCR as in previous example.

The resulting libraries were sequenced on the Illumina MiSeq™ using the MiSeq Reagent Kit v2 Nano, 300-cycles; sequencing was performed at single-read mode, 109 bp R1. Samples were sequenced at 0.1 M reads/sample depth. Data analysis confirmed that a T7 mutant RNAP can use as a nucleotide substrate and incorporate oligonucleotide-tethered ddNTP. Generated reads had a correct structure as shown in FIG. 9B:
  first 8 nucleotides represent unique molecular identifier (UMI) region,
  9th nucleotide represents ddNTP incorporation site (almost all reads at that position have the same nucleotide), and
  10-109th positions indicate target plasmid DNA sequence.

The majority of generated reads (>90%) aligned to a reference sequence. Coverage across the reference sequence indicated that all reads covered a template sequence under T7 promoter (FIG. 9C). As expected, the highest sequencing depth was observed near the transcription start. Also, as expected, termination by incorporation of oligonucleotide-tethered dideoxynucleotides was random and thus, transcription termination position varied.

These results demonstrate that a T7 mutant polymerase described herein can be used for nucleic acid amplification and random termination/tagging via in vitro transcription. Linear amplification directly into ssDNA or into chimeric RNA/DNA nucleic acid form that is tolerated by DNA polymerases and is directly amplified may improve various workflows by omitting the step of RNA to DNA conversion. Synthesis of ssDNA from the artificially added T7 promoter sequence enables isothermal amplification of DNA of individual targets or even whole genomes.

Example 9. Multiplexed Synthesis of Oligonucleotides Via In Vitro Transcription A multiplexed enzymatic oligonucleotide synthesis can be performed, for example, according to the principal workflow as shown in FIG. 10.

11 pairs of primers for amplification of specific fragments from bacteriophage λ genomic DNA (GenBank: J02459.1) were synthesized. Chosen targets were tail and tail tip genes of 2 phage: Z, U, V, G, T, H, M, L, K, I and J (estimated amplicon length of 234-271 bp).

Plasmid DNA pools that would serve as IVT templates for multiplexed enzymatic primer synthesis were constructed. Pools having templates for forward and reverse primers were generated separately. In vitro transcription templates were constructed to have a specific sequence downstream of T7 promoter: a sequence of a PCR-handle (PCR handle 1 in forward primers, and PCR handle 2 in reverse primers) and a sequence complementary to one of the 22 target sequences. As a control, chemically synthesized primers having the same sequences as would be synthesized enzymatically were used (SEQ ID Nos: 47-68).

Next, transformation of E. coli with the plasmid pools and collection of E. coli colony pools were performed. After purification of plasmid DNA libraries from E. coli pools, templates for in vitro transcription were prepared as follows:
  Linearization and blunting of constructed plasmid DNA pools; restriction endonuclease and T4 DNA polymerase were used, and
  Linearized and end repaired plasmid DNA pools were purified.

In vitro transcription was performed using T7 mutant RNA polymerase V783M. Provided substrate for in vitro transcription were mixture of 1) dTTP, dTCP, dATP and GTP or 2) dTTP, dCTP, dATP and 2'-F-dGTP. These primers at its 5'-end have a PCR handle sequences. Next, template DNA was digested with 2 exonuclease and in vitro transcription products were purified using magnetic beads.

Synthesized primer pools (comprising sequences corresponding to SEQ ID Nos: 47-68; in case of enzymatically synthesized primers, also containing ribonucleotides or modified deoxyribonucleotides, depending on nucleotide triphosphates used during in vitro transcription) were used for amplification of 2 genomic DNA target sequences. After multiplexed PCR and treatment of exonuclease I, reaction products were cleaned up using magnetic beads. Barcoding and introduction of full-length adapter sequences was performed via indexing PCR as in previous examples. Amplicon libraries were purified using magnetic beads. Size and quality of prepared libraries were verified by performing capillary electrophoresis analysis on Agilent™ 2100 Bioanalyzer instrument. Before proceeding to sequencing the prepared libraries were quantified by qPCR as in previous examples.

The resulting libraries were sequenced on the Illumina MiSeq™ using the MiSeq Reagent Kit v2, 300-cycles; 2×151 bp paired-end reads were performed. Libraries were sequenced at average depth of 0.2 M reads/sample.

Data analysis revealed that all 11 targets were amplified. Thus, it is possible to produce multiple oligonucleotide sequences with a T7 mutant polymerase, and they can all be used in targeted amplification (multiplex) reaction. Multiplexed enzymatic primer synthesis using a T7 RNA mutant polymerase could be a unique offering for amplicon sequencing solutions.

Example 10. Alignment of RNAPs and Determining Conserved Amino Acids

Alignment was done to determine whether the amino acids that confer changes in activity of T7 RNAP mutants, such as G555, V689, and V783, are conserved in other RNAPs.

The program "MultiAlin" was used to align the sequence of a given RNAP with the T7 RNAP. MultiAlin is publicly available at www.multalin.toulouse.inra.fr/multalin/and described in Corpet, 1988. Representative parameters included: symbol comparison table: blosum62; gap weight: 12; and gap length weight: 2.

As shown in FIG. 11, amino acids related to the mutation positions found during the screening for T7 RNAP mutants were conserved across the aligned RNA polymerases. Thus, generating mutations at equivalent positions to those found for the T7 RNAP may provide other RNAPs with altered substrate specificity.

Example 11. Incorporation of 5' Cap Analogs by Mutant T7 RNA Polymerases

To test the ability to incorporate anti reverse cap analog (ARCA) during co-transcriptional capping, in vitro transcription (IVT) was performed in the following reaction mixture: 1 µg of template DNA (pTZ19R/AanI), 7.5 mM CTP, 7.5 mM ATP, 7.5 mM dTTP, 1.5 mM dGTP, 6 mM ARCA (Thermo Fisher Scientific), 50 U RiboLock RNase Inhibitor (Thermo Scientific), 0.1 U Inorganic Pyrophosphatase (Thermo Scientific), 8% DMSO, 50 U T7 RNA polymerase V783M in 1× TranscriptAid reaction buffer. Reaction mixture was incubated at 37° C. for 4 h, and then treated with lambda exonuclease to remove template DNA. IVT products were purified using AMPure XP magnetic beads and analyzed on Agilent 2100 Bioanalyzer using Small RNA Kit. The efficiency of ARCA incorporation was comparable to that obtainable with wild type T7 RNAP and ribonucleotide triphosphates.

EQUIVALENTS

The foregoing written specification is considered to be sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

As used herein, the term about refers to a numeric value, including, for example, whole numbers, fractions, and percentages, whether or not explicitly indicated. The term about generally refers to a range of numerical values (e.g., +/−5-10% of the recited range) that one of ordinary skill in the art would consider equivalent to the recited value (e.g., having the same function or result). When terms such as at least and about precede a list of numerical values or ranges, the terms modify all of the values or ranges provided in the list. In some instances, the term about may include numerical values that are rounded to the nearest significant figure.

What is claimed is:

1. A mutant polymerase comprising:
a catalytic domain having at least 95% sequence identity with SEQ ID NO: 4, and wherein the mutant polymerase comprises one or more mutations at position V459, G231, and/or V365 relative to SEQ ID NO: 4.

2. The mutant polymerase of claim 1, wherein the mutant polymerase further comprises an N-terminal domain having at least 80% sequence identity with the amino acid sequence corresponding to amino acids 1-324 of SEQ ID NO: 1.

3. The mutant polymerase of claim 1, wherein the mutant polymerase comprises:
(i) a catalytic domain having at least 98% sequence identity with SEQ ID NO: 4, and
one or more mutations at position V459, G231, and/or V365 relative to SEQ ID NO: 4; and
(ii) an N-terminal domain having at least 80% sequence identity with amino acid sequence corresponding to amino acids 1-324 of SEQ ID NO: 1.

4. The mutant polymerase of claim 3, wherein the catalytic domain and the N-terminal domain are non-covalently linked.

5. The mutant polymerase of claim 1, wherein the mutant polymerase comprises a non-conservative substitution at V459.

6. The mutant polymerase of claim 1 wherein the mutant polymerase comprises V459G, V459A, V459T, V459S, V459C, V459P, V459F, V459Y, V459W, V459H, V459K, V459R, V459D, V459E, V459N, or V459Q.

* * * * *